United States Patent
Ikeda et al.

(10) Patent No.: US 8,593,511 B2
(45) Date of Patent: Nov. 26, 2013

(54) PLAYBACK DEVICE, INTEGRATED CIRCUIT, RECORDING MEDIUM

(75) Inventors: Wataru Ikeda, Osaka (JP); Taiji Sasaki, Osaka (JP); Tomoki Ogawa, Osaka (JP); Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 299 days.

(21) Appl. No.: 13/063,065

(22) PCT Filed: Jun. 10, 2010

(86) PCT No.: PCT/JP2010/003881
§ 371 (c)(1),
(2), (4) Date: Mar. 9, 2011

(87) PCT Pub. No.: WO2010/143441
PCT Pub. Date: Dec. 16, 2010

(65) Prior Publication Data
US 2011/0164121 A1  Jul. 7, 2011

(30) Foreign Application Priority Data
Jun. 11, 2009 (JP) ................. 2009-140055

(51) Int. Cl.
*H04N 13/00* (2006.01)
(52) U.S. Cl.
USPC ........... 348/51; 386/98; 386/126; 386/95; 386/131; 375/240; 348/46
(58) Field of Classification Search
USPC ................................. 348/42–51
See application file for complete search history.

(56) References Cited

U.S. PATENT DOCUMENTS

| | | | |
|---|---|---|---|
| 5,923,869 A | 7/1999 | Kashiwagi et al. |
| 6,141,036 A | 10/2000 | Katayama et al. |
| 6,393,574 B1 | 5/2002 | Kashiwagi et al. |

(Continued)

FOREIGN PATENT DOCUMENTS

| | | |
|---|---|---|
| JP | 11-191895 | 7/1999 |
| JP | 2004-274125 | 9/2004 |

(Continued)

OTHER PUBLICATIONS

Chinese Office Action dated Aug. 2, 2012 in corresponding Chinese Patent Application No. 201080002646.3.

(Continued)

*Primary Examiner* — David Czekaj
*Assistant Examiner* — Md Haque
(74) *Attorney, Agent, or Firm* — Wenderoth, Lind & Ponack, L.L.P.

(57) ABSTRACT

A playback device for playing back a graphics stream in accordance with a stream selection table recorded on the recording medium. A procedure means determines a playback type of a graphics corresponding to the current stream number, based on the playback capability indicated by the capability register. The playback of graphics streams falls into two types, one of which is a first playback type in which a monoscopic graphics stream is used and the other is a second playback type in which a pair of left-eye graphics stream and right-eye graphics stream is used to perform a stereoscopic playback. The capability register indicates whether or not a capability to perform the stereoscopic playback by using the pair of left-eye graphics stream and right-eye graphics stream is present in the graphics decoder.

5 Claims, 103 Drawing Sheets

(56) References Cited

U.S. PATENT DOCUMENTS

| | | |
|---|---|---|
| 6,470,460 B1 | 10/2002 | Kashiwagi et al. |
| 6,484,266 B2 | 11/2002 | Kashiwagi et al. |
| 6,502,198 B2 | 12/2002 | Kashiwagi et al. |
| 6,502,199 B2 | 12/2002 | Kashiwagi et al. |
| 6,502,200 B2 | 12/2002 | Kashiwagi et al. |
| 6,516,138 B2 | 2/2003 | Kashiwagi et al. |
| 6,516,139 B2 | 2/2003 | Kashiwagi et al. |
| 6,519,414 B2 | 2/2003 | Kashiwagi et al. |
| 6,526,226 B2 | 2/2003 | Kashiwagi et al. |
| 6,546,195 B2 | 4/2003 | Kashiwagi et al. |
| 6,573,819 B1 | 6/2003 | Oshima et al. |
| 6,574,423 B1 | 6/2003 | Oshima et al. |
| 6,907,190 B2 | 6/2005 | Kashiwagi et al. |
| 6,925,250 B1 | 8/2005 | Oshima et al. |
| 6,954,584 B2 | 10/2005 | Kashiwagi et al. |
| 7,194,194 B2 | 3/2007 | Kashiwagi et al. |
| 7,317,868 B2 | 1/2008 | Oshima et al. |
| 7,519,278 B2 | 4/2009 | Ikeda et al. |
| 7,552,450 B1 * | 6/2009 | Evans et al. .................. 719/328 |
| 7,583,888 B2 | 9/2009 | Ikeda et al. |
| 7,609,948 B2 | 10/2009 | Ikeda et al. |
| 7,747,145 B2 | 6/2010 | Oshima et al. |
| 7,853,125 B2 | 12/2010 | Ikeda et al. |
| 7,856,169 B2 | 12/2010 | Ikeda et al. |
| 7,877,002 B2 | 1/2011 | Ikeda et al. |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2002/0163970 A1 * | 11/2002 | Nishio et al. ............. 375/240.26 |
| 2003/0053797 A1 * | 3/2003 | Oshima et al. .................. 386/98 |
| 2003/0108341 A1 | 6/2003 | Oshima et al. |
| 2003/0138238 A1 | 7/2003 | Kashiwagi et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2005/0196155 A1 * | 9/2005 | Yoo et al. ....................... 386/126 |
| 2005/0248561 A1 | 11/2005 | Ito et al. |
| 2006/0072910 A1 * | 4/2006 | Kato ............................ 386/131 |
| 2006/0078301 A1 | 4/2006 | Ikeda et al. |
| 2006/0110132 A1 * | 5/2006 | Takakuwa et al. ............. 386/95 |
| 2007/0286576 A1 | 12/2007 | Ikeda et al. |
| 2008/0008450 A1 | 1/2008 | Ikeda et al. |
| 2008/0008451 A1 | 1/2008 | Ikeda et al. |
| 2008/0025697 A1 | 1/2008 | Ikeda et al. |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0232772 A1 | 9/2008 | Ikeda et al. |
| 2008/0232773 A1 | 9/2008 | Ikeda et al. |
| 2008/0232774 A1 | 9/2008 | Ikeda et al. |
| 2008/0292287 A1 | 11/2008 | Oshima et al. |
| 2009/0116818 A1 | 5/2009 | Sasaki et al. |
| 2009/0220213 A1 | 9/2009 | Ogawa et al. |
| 2009/0220215 A1 | 9/2009 | Oshima et al. |
| 2009/0252483 A1 | 10/2009 | Oshima et al. |
| 2009/0324204 A1 | 12/2009 | Watanabe |
| 2010/0020158 A1 | 1/2010 | Oshima et al. |
| 2010/0031347 A1 | 2/2010 | Ohto |
| 2010/0092148 A1 | 4/2010 | Ogawa et al. |
| 2010/0111503 A1 | 5/2010 | Oshima et al. |
| 2010/0119213 A1 | 5/2010 | Oshima et al. |
| 2010/0165083 A1 | 7/2010 | Sasaki et al. |
| 2010/0254680 A1 | 10/2010 | Ogawa et al. |
| 2010/0254681 A1 | 10/2010 | Ogawa et al. |
| 2010/0260481 A1 | 10/2010 | Ogawa et al. |
| 2010/0303437 A1 | 12/2010 | Leichsenring et al. |
| 2010/0315489 A1 * | 12/2010 | Shepherd ........................ 348/46 |
| 2011/0069153 A1 | 3/2011 | Nakane |
| 2013/0058628 A1 | 3/2013 | Sasaki et al. |

FOREIGN PATENT DOCUMENTS

| | | |
|---|---|---|
| JP | 2006-135747 | 5/2006 |
| JP | 3935507 | 3/2007 |
| WO | 2005/124780 | 12/2005 |
| WO | 2008/108084 | 9/2008 |
| WO | 2009/057298 | 5/2009 |
| WO | 2009/077969 | 6/2009 |
| WO | 2009/090868 | 7/2009 |
| WO | 2010/013382 | 2/2010 |
| WO | 2010/038412 | 4/2010 |

OTHER PUBLICATIONS

International Search Report issued Sep. 14, 2010 in International (PCT) Application No. PCT/JP2010/003876.
International Search Report issued Sep. 14, 2010 in International (PCT) Application No. PCT/JP2010/003881.
Office Action mailed Jun. 28, 2011 in U.S. Appl. No. 12/813,716.
U.S. Office Action issued in corresponding U.S. Appl. No. 13/346,850.

* cited by examiner

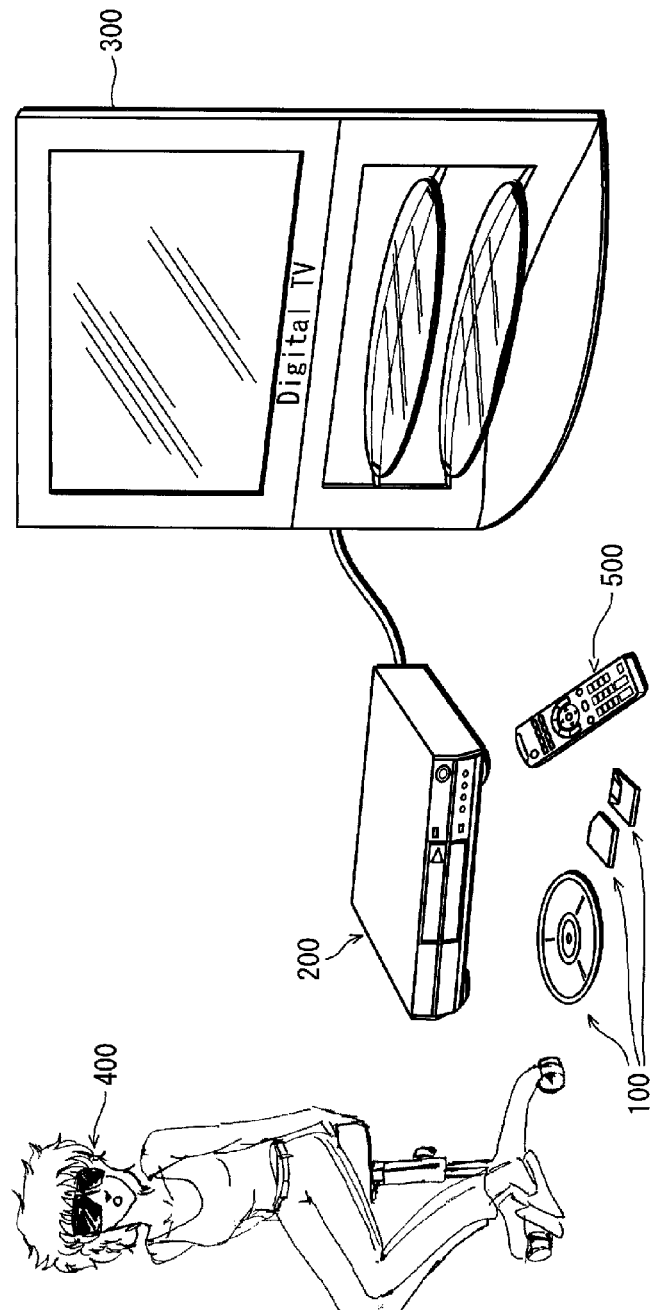
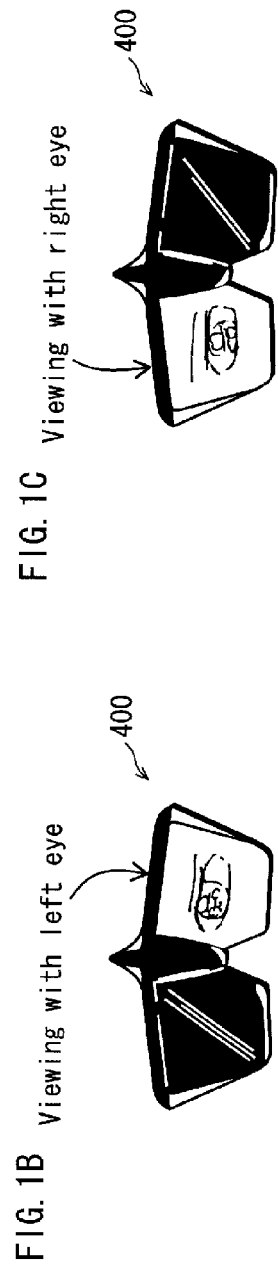
FIG. 1A
FIG. 1B Viewing with left eye
FIG. 1C Viewing with right eye Recording medium Playlist information Main playback section information (playitem info)

Subjectional playback section information (sub-playitem info)

FIG. 8

Extension data

Extension stream selection table (STN_table_SS)

| Length |
| Fixed_offset_during_Popup |
| Dependent-view video stream registration seq. corresponding to playitem #1 | ⎫ Registration seq.
| PG stream registration seq. corresponding to playitem #1 | ⎬ corresponding to
| IG stream registration seq. corresponding to playitem #1 | ⎭ playitem #1
| Dependent-view video stream registration seq. corresponding to playitem #2 | ⎫ Registration seq.
| PG stream registration seq. corresponding to playitem #2 | ⎬ corresponding to
| IG stream registration seq. corresponding to playitem #2 | ⎭ playitem #2
| ... |
| Dependent-view video stream registration seq. corresponding to playitem #N | ⎫ Registration seq.
| PG stream registration seq. corresponding to playitem #N | ⎬ corresponding to
| IG stream registration seq. corresponding to playitem #N | ⎭ playitem #N N represents the number of playitems in main path

FIG. 9A

Dependent-view video stream registration seq.
- SS_dependent_view_block #1
- SS_dependent_view_block #2
- ...
- SS_dependent_view_block #V(x)

Stream No. =1:
- Stream entry
- Stream attribute
- Number of offset sequences

FIG. 9B

PG stream registration seq.
- PG stream registration info #1
- PG stream registration info #2
- ...
- PG stream registration info #P(x)

Stream No. =1:
- PG text subtitle offset sequence ID reference info
- Stereoscopic PG presence/absence flag (is_SS_PG)
- Left-eye stream entry
- Right-eye stream entry
- Common stream attribute
- Stereoscopic PG text subtitle offset sequence ID reference info

FIG. 9C

IG stream registration seq.
- IG stream registration info #1
- IG stream registration info #2
- ...
- IG stream registration info #I(x)

Stream No. =1:
- IG offset sequence ID reference info
- B-B mode offset direction info
- B-B mode offset value info
- Stereoscopic IG presence/absence flag (is_SS_IG)
- Left-eye stream entry
- Right-eye stream entry
- Common stream attribute
- Stereoscopic IG offset sequence ID reference info

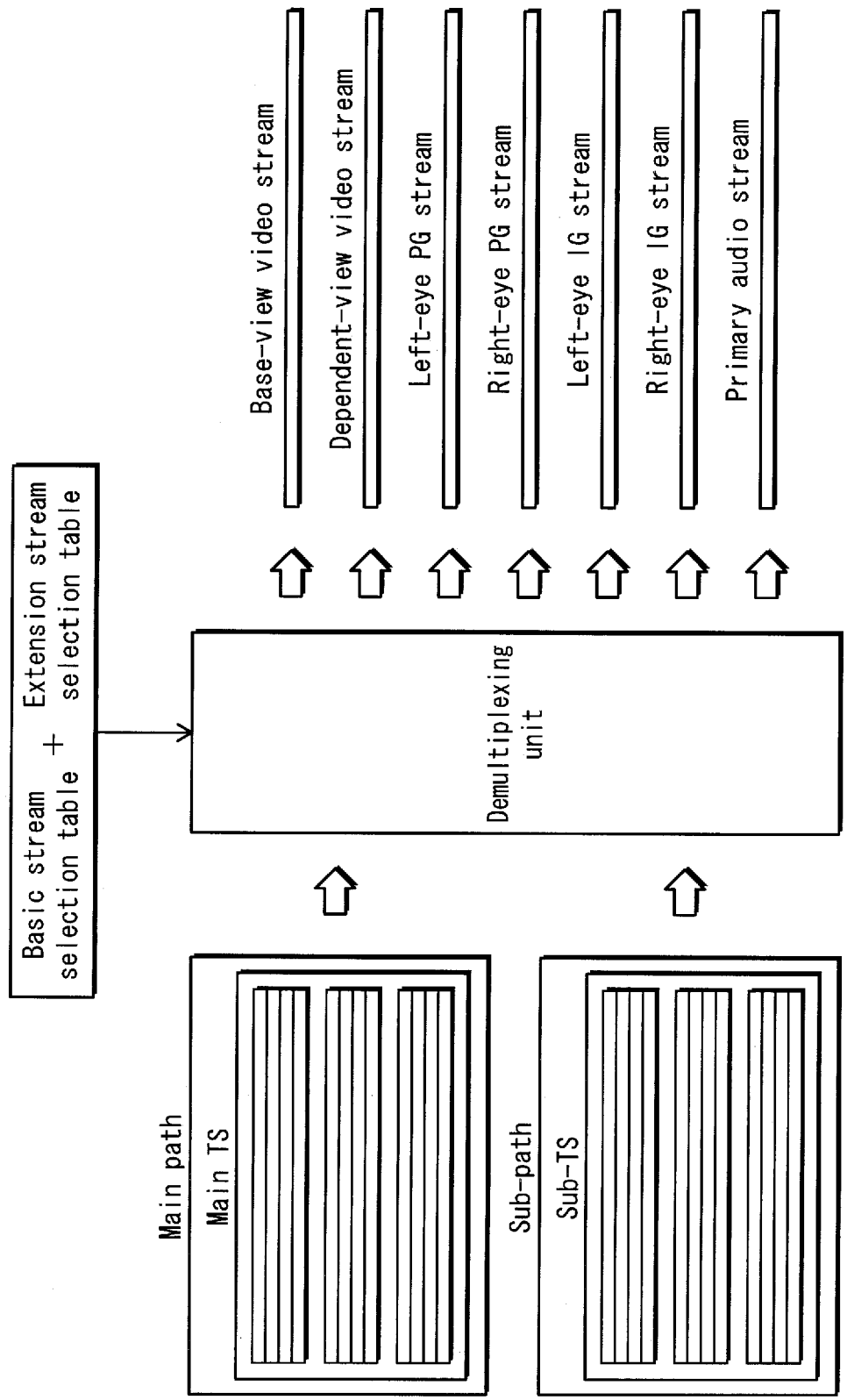

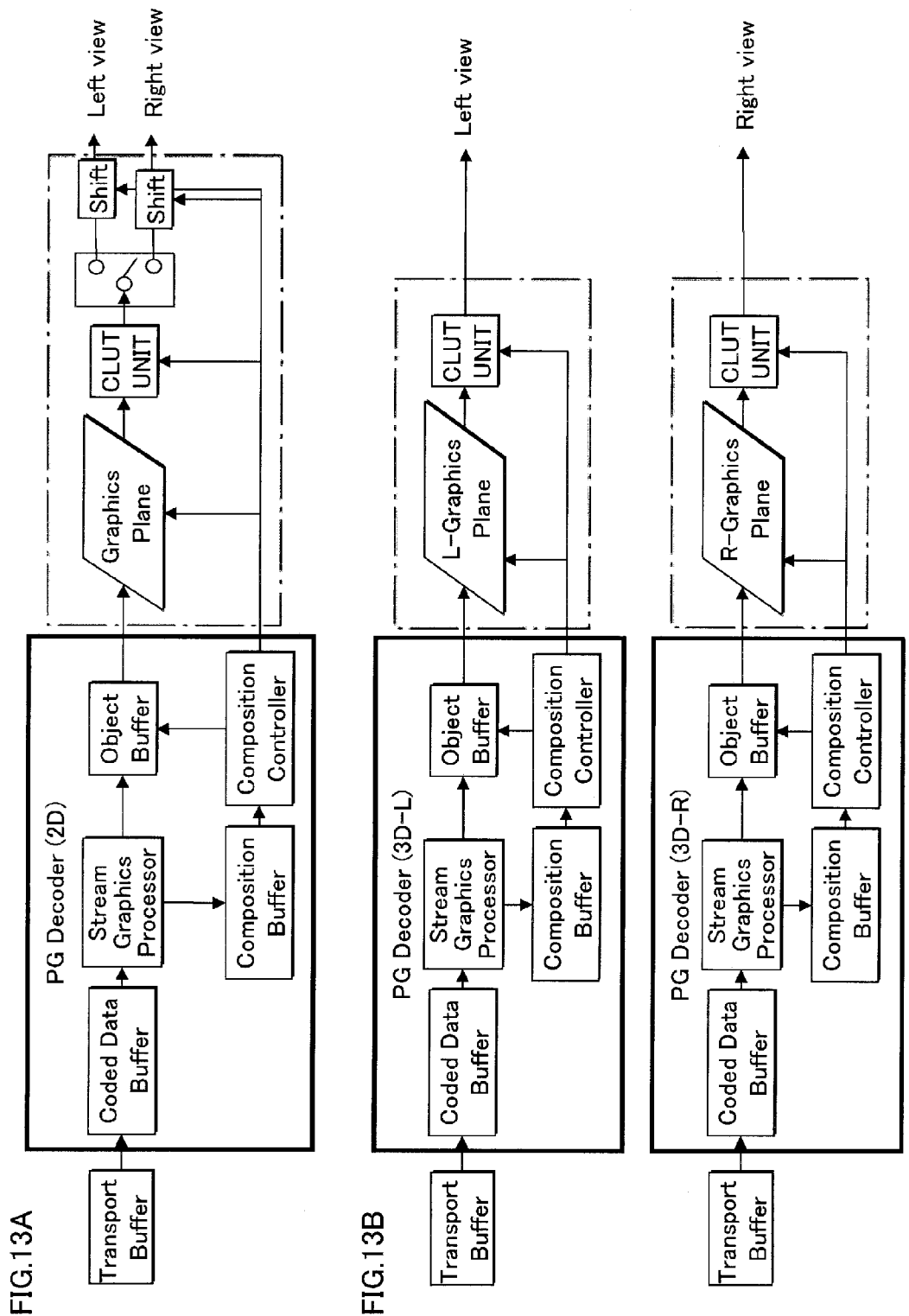

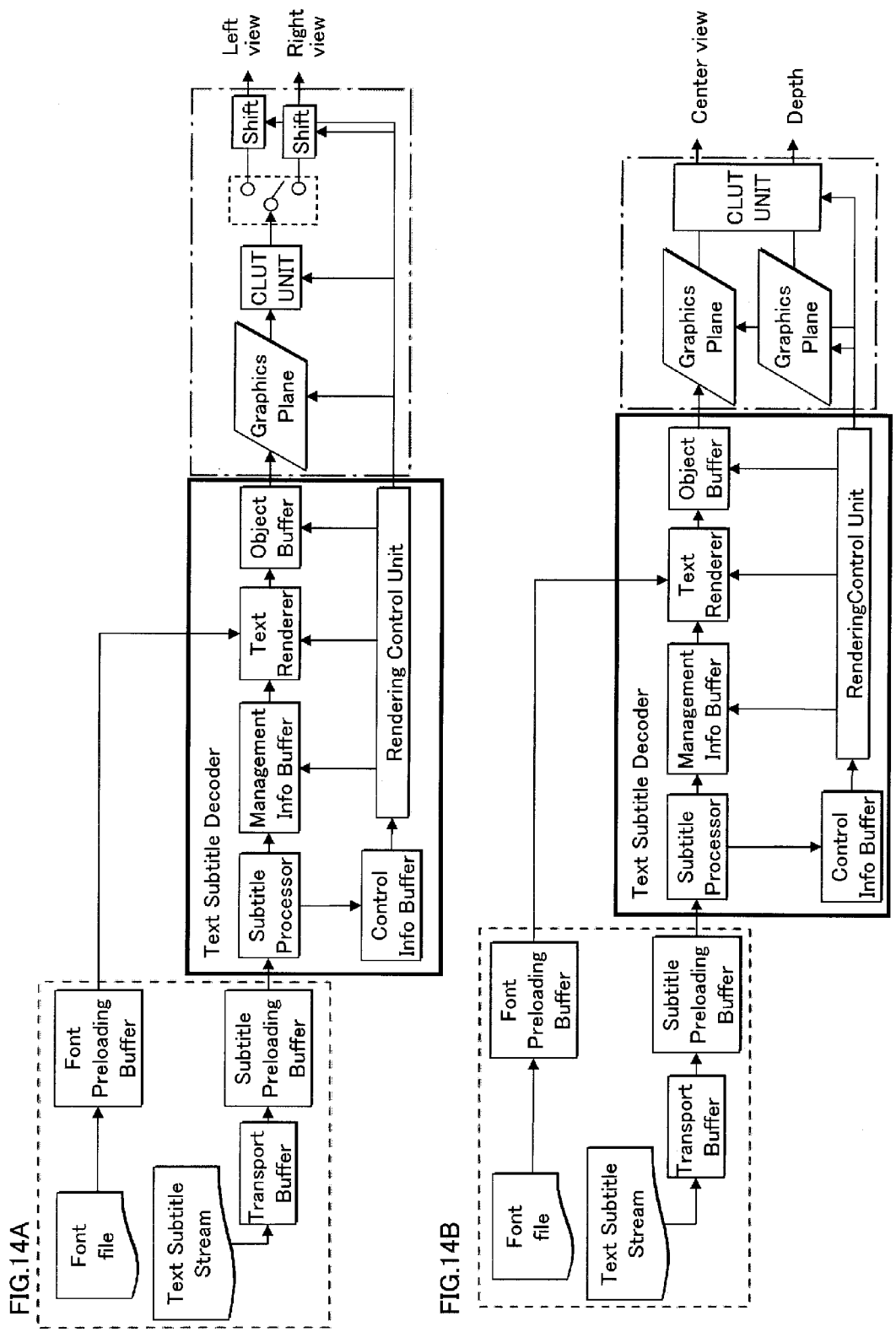

FIG. 19    PSR24

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| reserved | | | | | | | |

| b7 | b6 | b5 | b4 | b3 | b2 | b1 | b0 |
|---|---|---|---|---|---|---|---|
| | | BD-J Capability Flag in Stereoscopic Output Mode | | Stereoscopic IG Capability Flag | Stereoscopic PG Capability Flag | | Stereoscopic 1280×720 50p video Capability Flag |

Stereoscopic 1280×720 50p video Capability Flag
 0b: Playback device does not have capability to play back Stereoscopic 1280×720/50Hz Progressive video
 1b: Playback device has capability to play back Stereoscopic 1280×720/50Hz Progressive video Stereoscopic PG Capability Flag
 0b: Playback device does not have capability to play back Stereoscopic PG presentation
 1b: Playback device has capability to play back Stereoscopic PG presentation Stereoscopic IG Capability Flag
 0b: Playback device does not have capability to play back Stereoscopic IG presentation
 1b: Playback device has capability to play back Stereoscopic IG presentation BD-J Capability Flag in Stereoscopic Output Mode
 0b: Can process BD-J Mode in Stereoscopic Output Mode
 1b: Cannot process BD-J Mode in Stereoscopic Output Mode

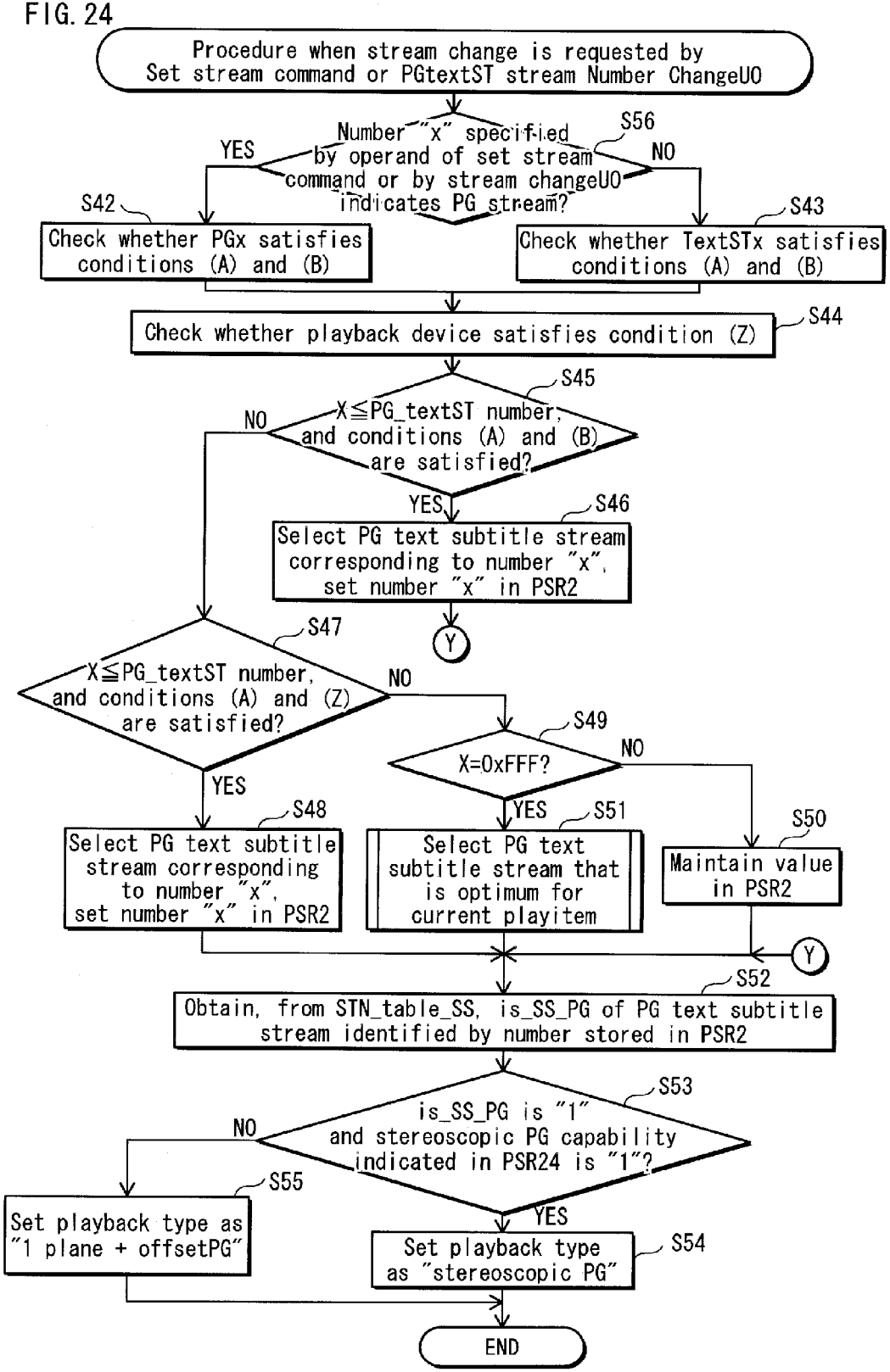

PSR21:Output Mode Preference

PSR22:Stereoscopic status

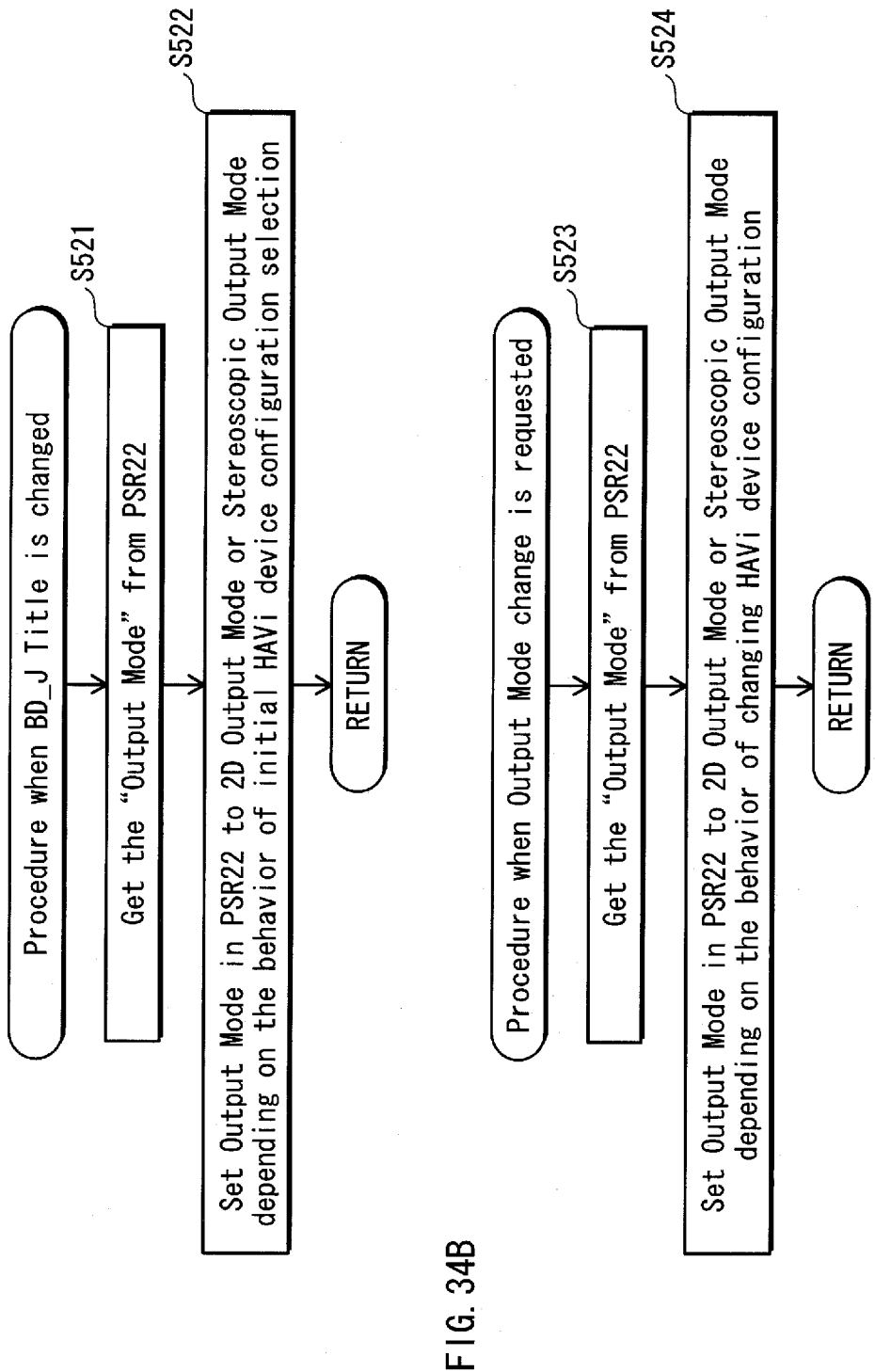

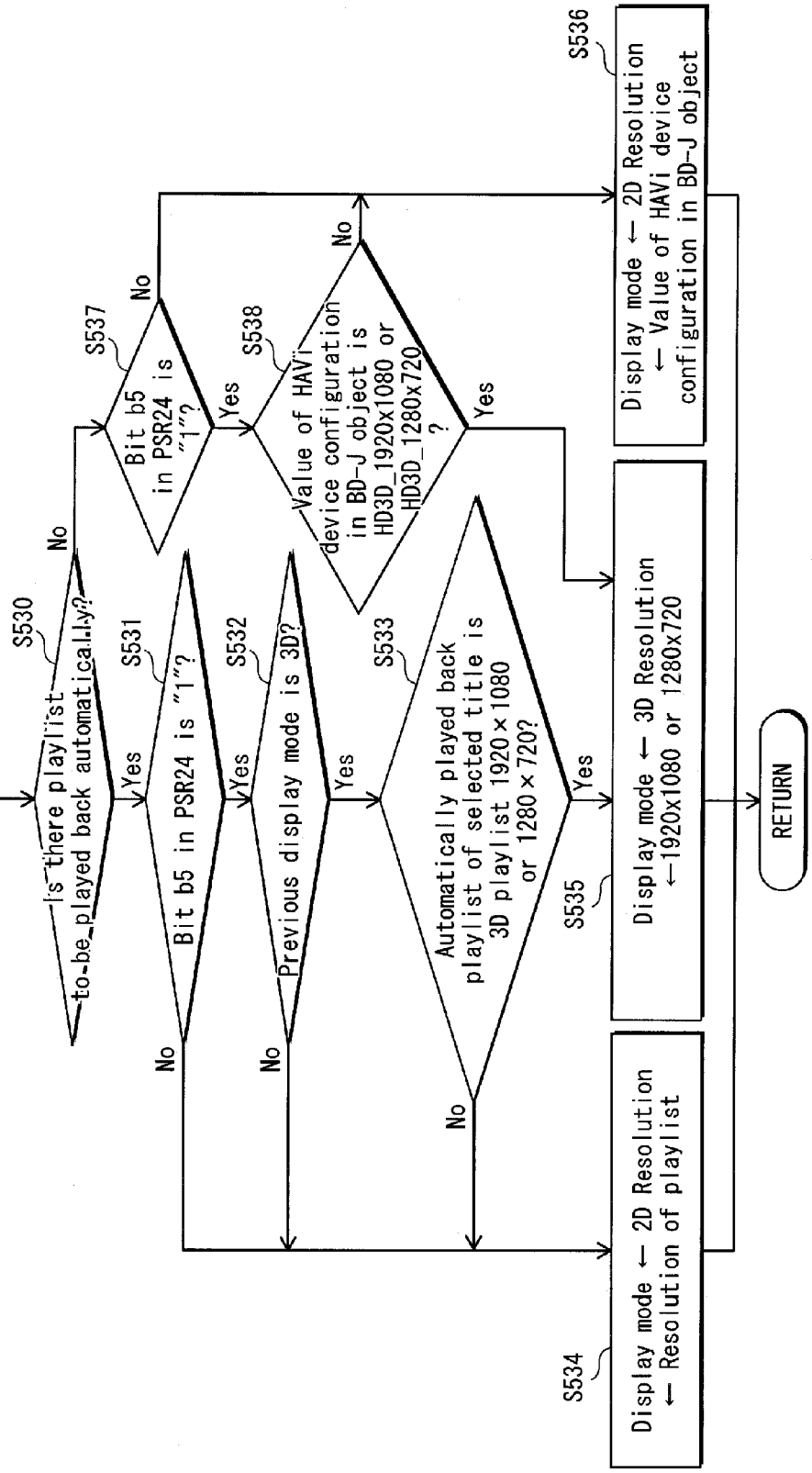

FIG. 36

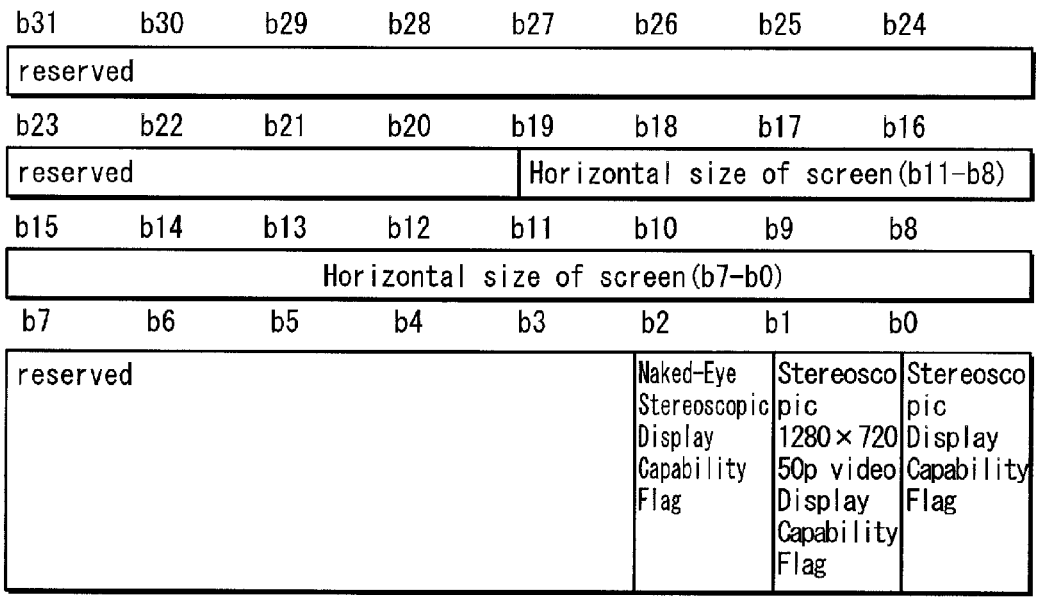

| Stereoscopic Display Capability Flag | 0b: Display device connected with playback device has neither capability to display 1920x1080/23.976 Hz progressive video nor capability to display 1920x1080/59.94 Hz progressive video<br>1b: Display device connected with playback device has capability to display 1920x1080/23.976 Hz progressive video or capability to display 1920x1080/59.94 Hz progressive video |
|---|---|
| Stereoscopic 1280×720 50p video Display Capability Flag | 0b: Display device connected with playback device does not have capability to display stereoscopic 1280x720/50 Hz progressive video<br>1b: Display device connected with playback device has capability to display stereoscopic 1280x720/50 Hz progressive video |
| Naked-Eye Stereoscopic Display Capability Flag | 0b: User needs to wear 3D glasses to view in stereoscopic output mode<br>1b: Naked-eye stereoscopic viewing is possible |
| Horizontal size of screen | 0×000: Undefined<br>0×001 to 0xFFE: Range of 1 cm to 4094 cm<br>0xFFF: Larger than 4094 cm |

FIG. 38A
Index table file

| Plurality of title indexes (Indexes) |
| BDMV application info (AppInfoBDMV) |

FIG. 38C
BDMV application info

| Initial output mode preference (initial_Output_mode_Preference) |
| Stereoscopic content presence/absence flag (SS_content_exist_flag) |
| Video format info (video_format) |
| Frame rate info (frame_rate) |
| Content provider user data (content_provider_user_data) |

FIG. 38B
Title index

| Object type |
| Movie object reference |
| Object file name info |

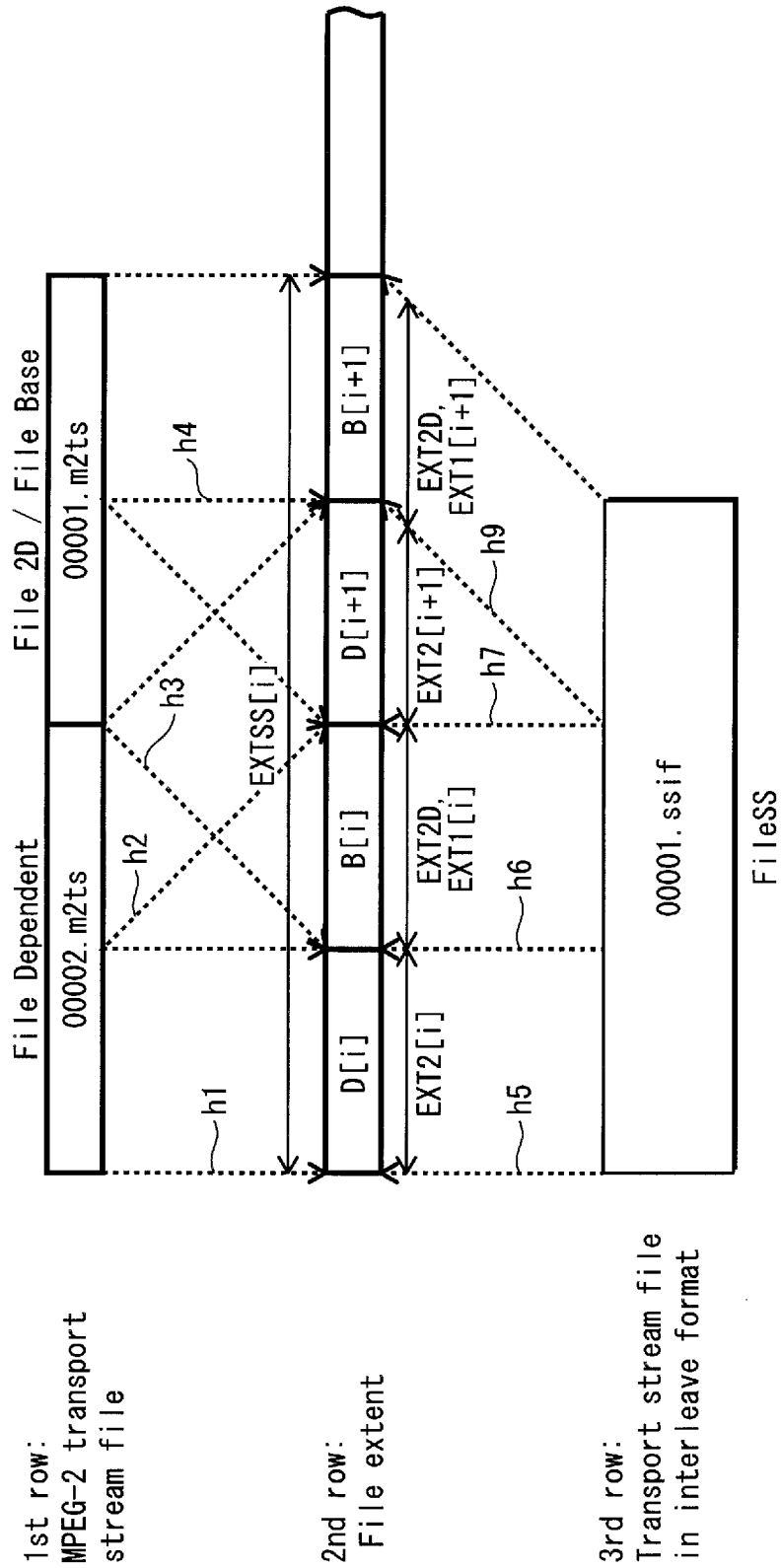

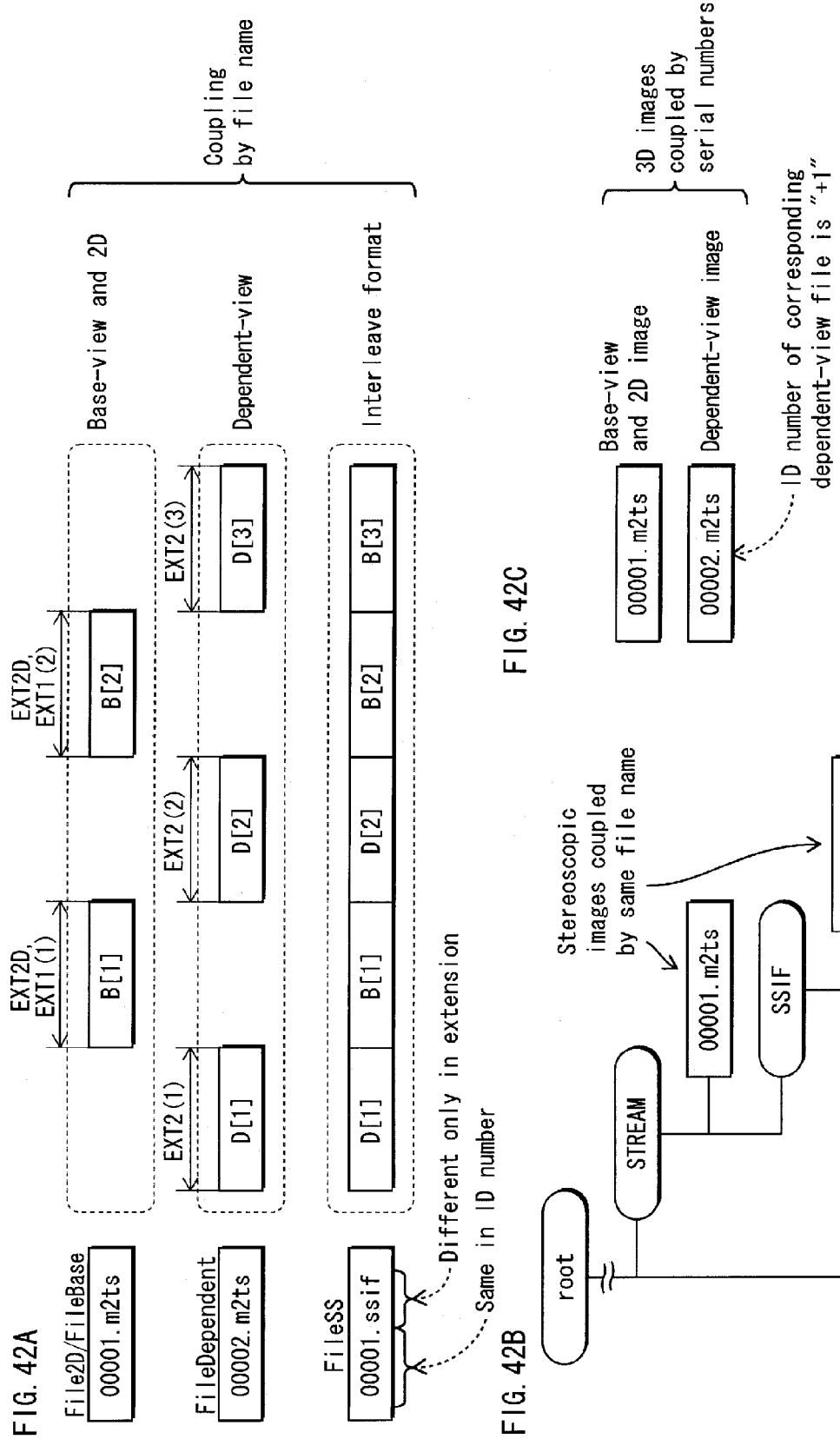

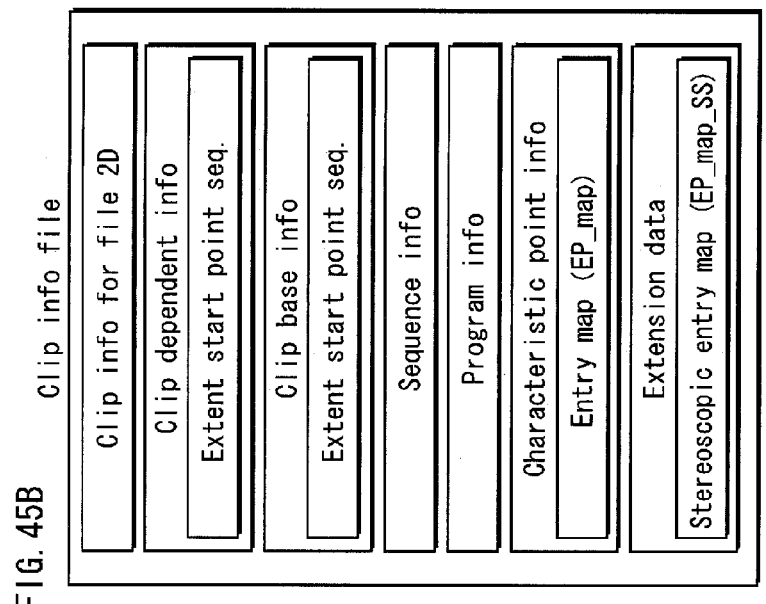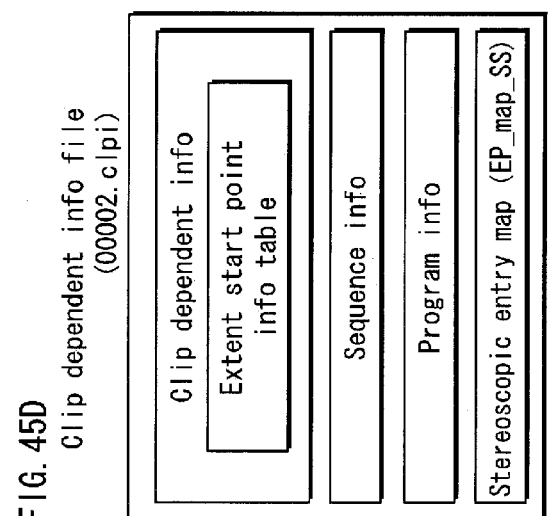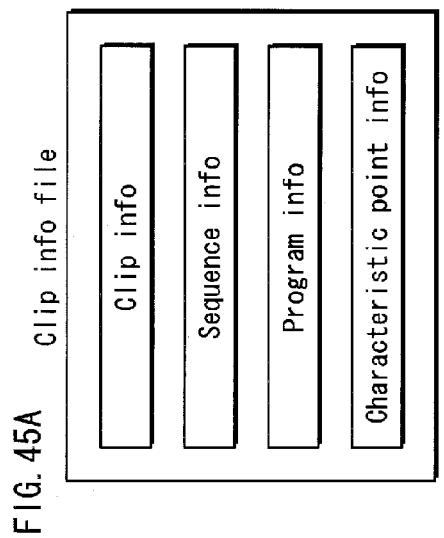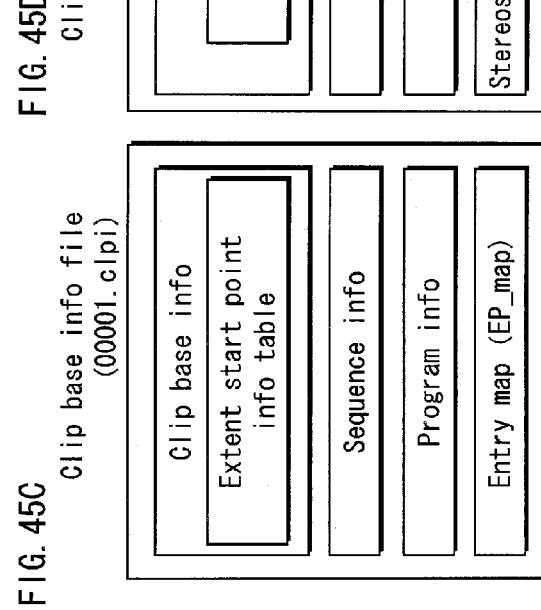

Clip base info, clip dependent info

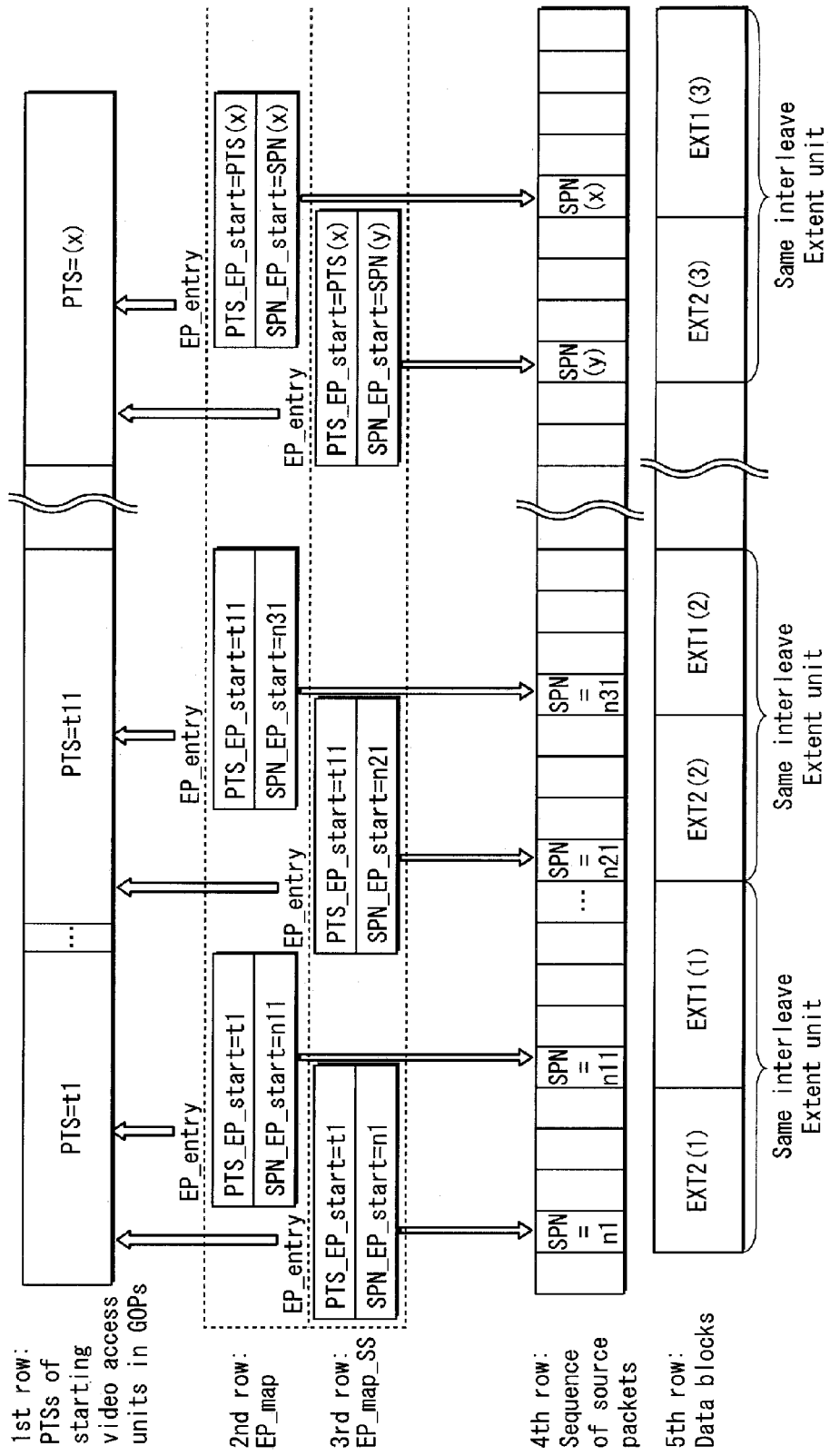

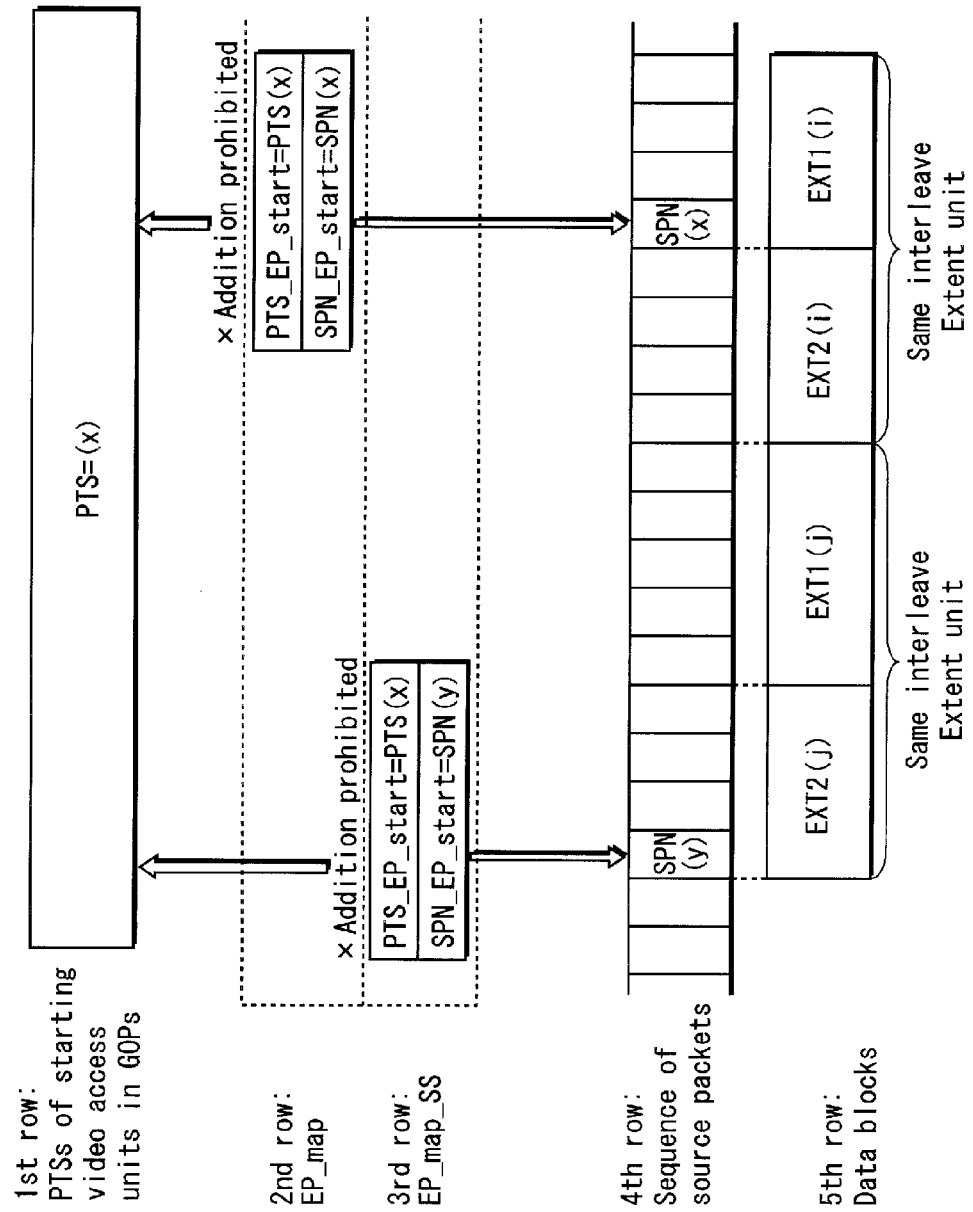

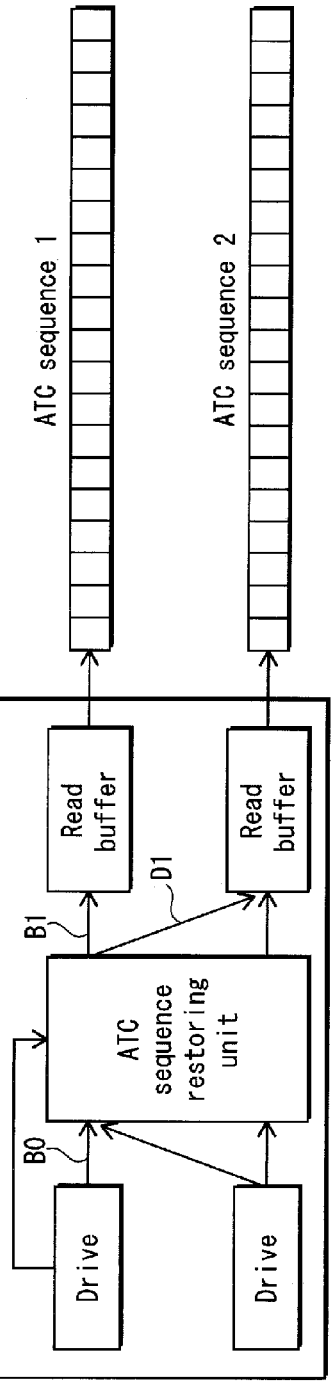
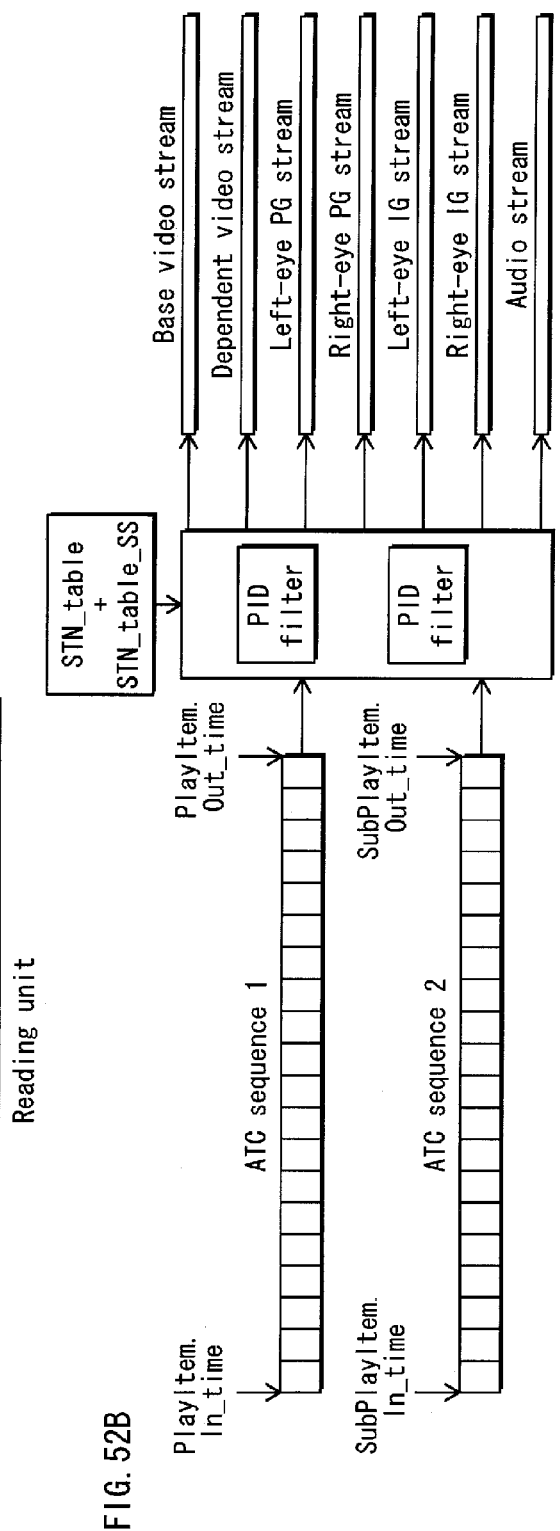
FIG. 52A
FIG. 52B

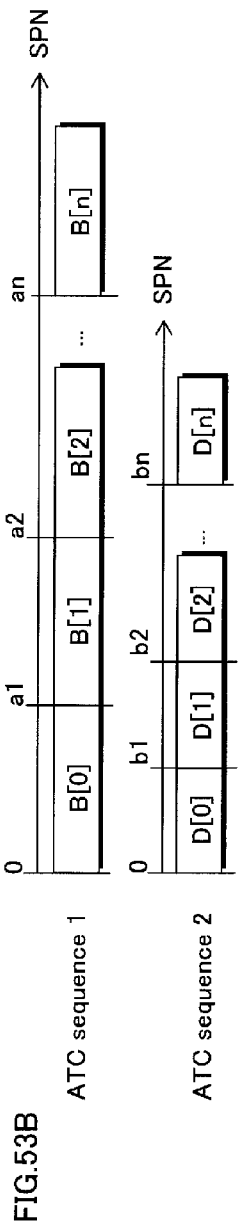
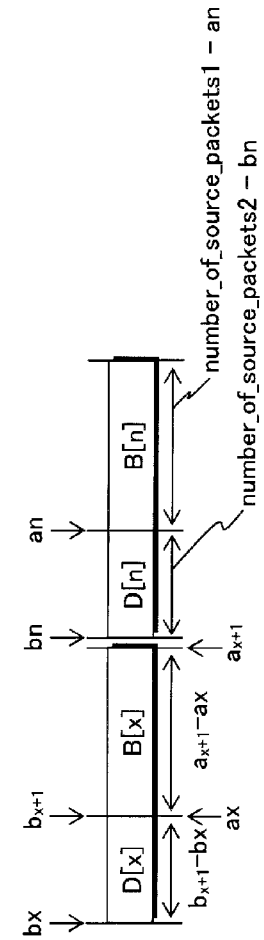
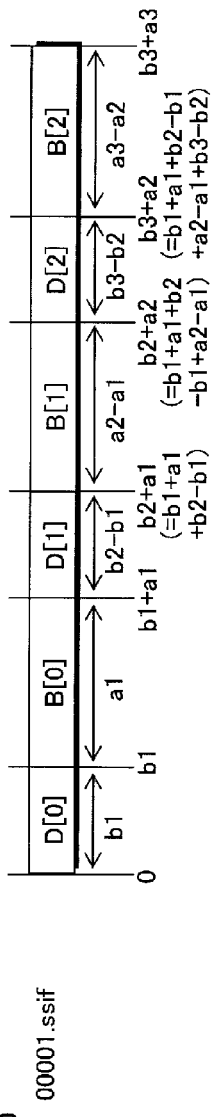
FIG.53A FIG.53B FIG.53C FIG.53D

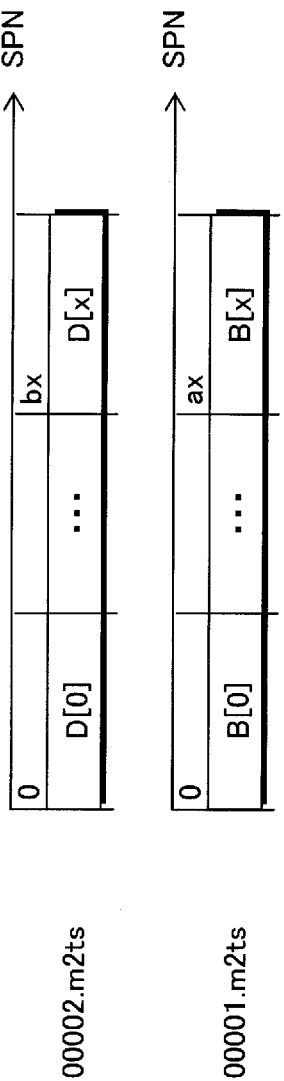
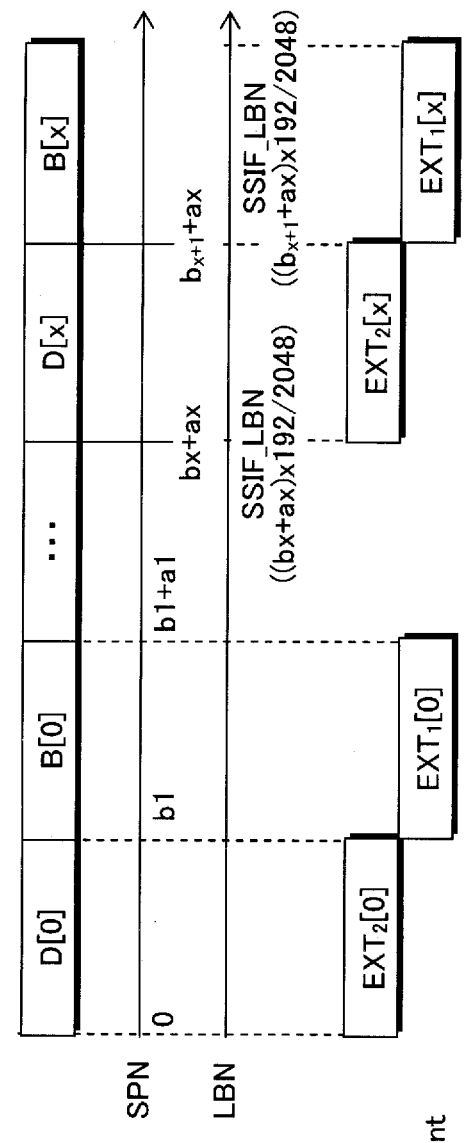
FIG.54A
FIG.54B
FIG.54C

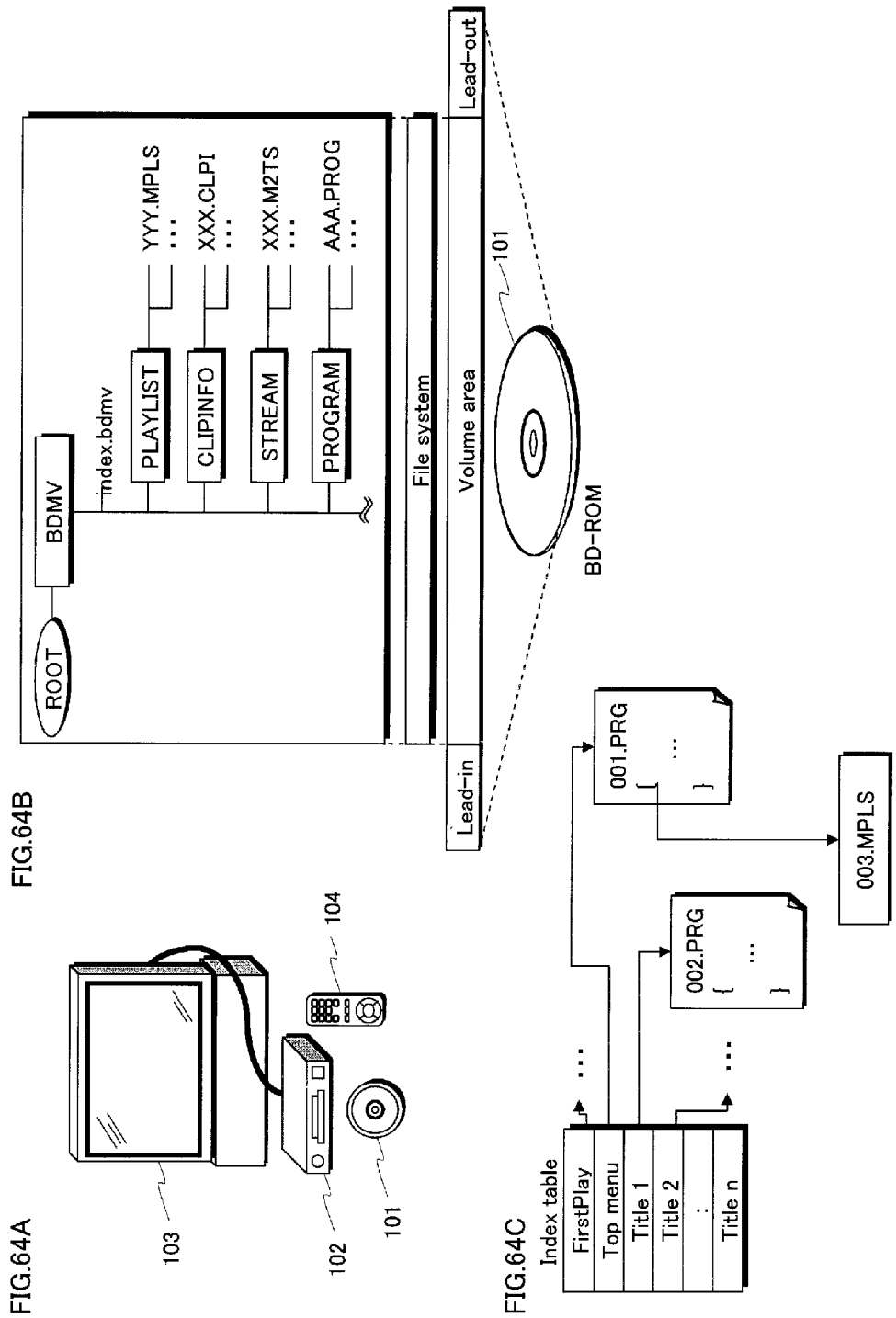

FIG.70A

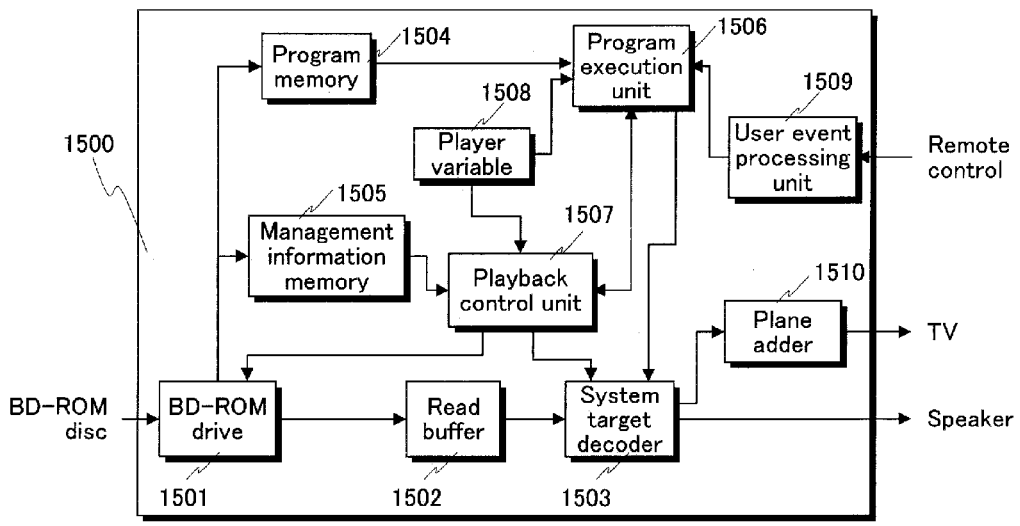

FIG.70B

Player variable (system parameter)

| 0 | Language Code | 11 | Player audio mixing mode for Karaoke | 22 | 2D/3D Output Mode |
|---|---|---|---|---|---|
| 1 | Audio stream number | 12 | Country code for parental management | 23 | Display Capability |
| 2 | Subtitle stream number | 13 | Parental level | 24 | 3D-Capability |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language coded ext. for STST | 30 | reserved |
| 9 | Navigation timer | 20 | Player region code | 31 | reserved |
| 10 | Current playback time | 21 | 2D/3D Output User Preference | 32 | reserved |

FIG.84A 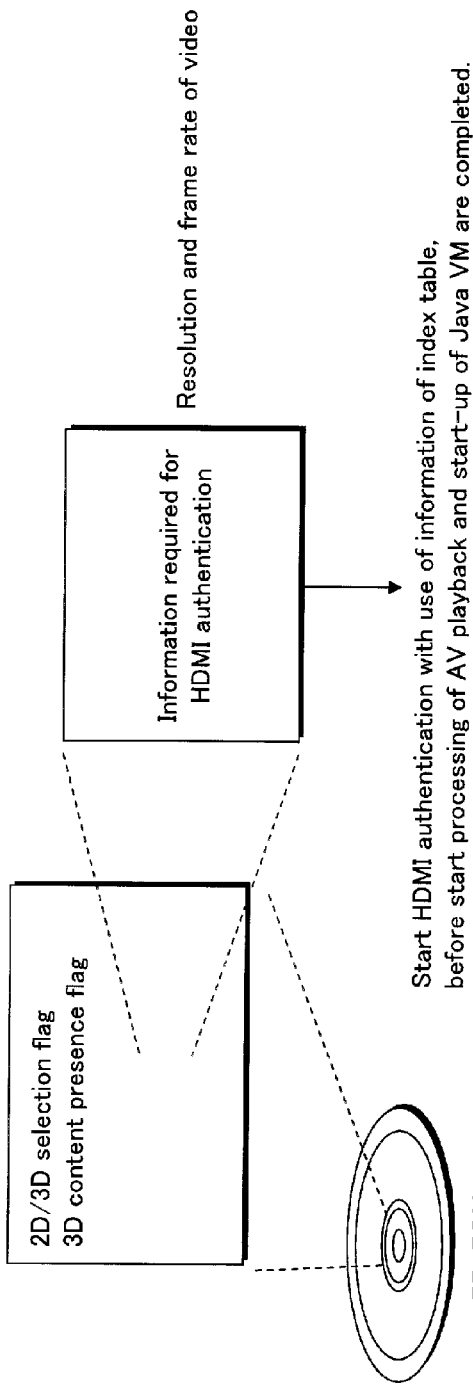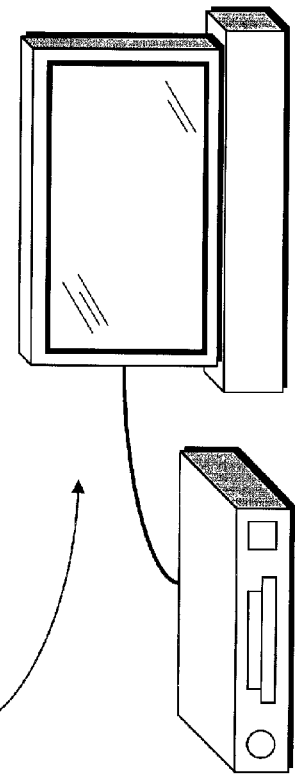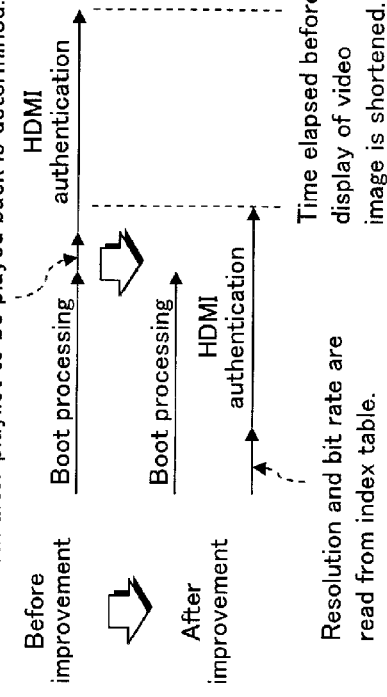
FIG.84B

FIG.92
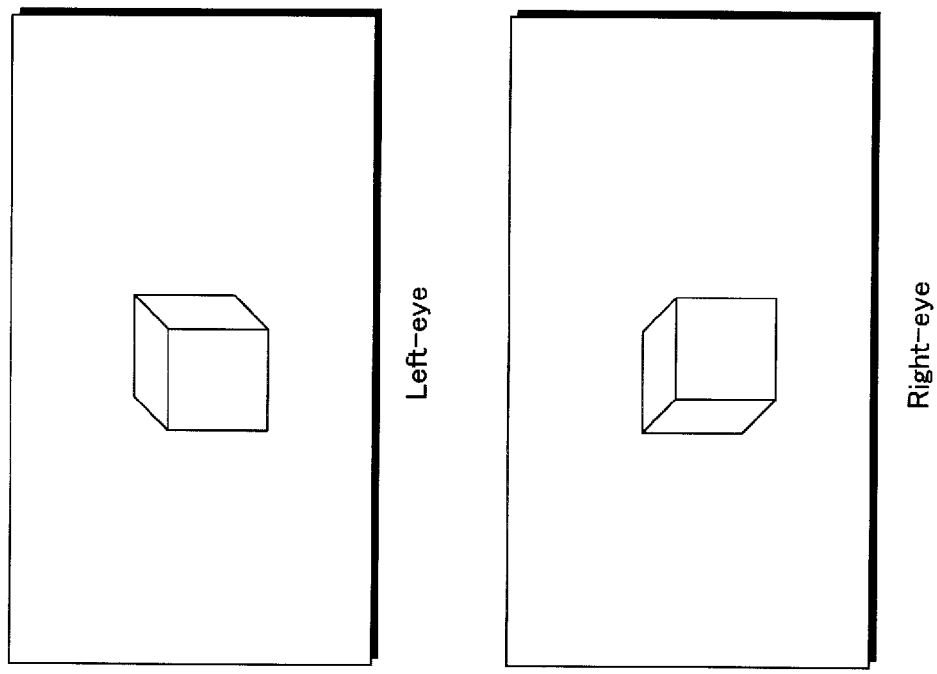
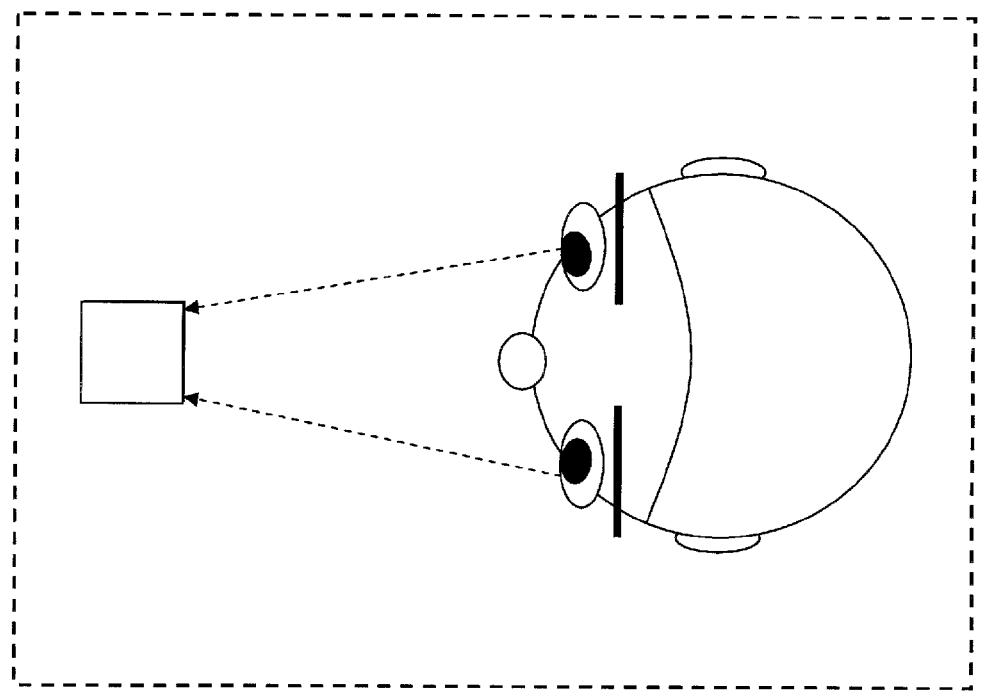

PLAYBACK DEVICE, INTEGRATED CIRCUIT, RECORDING MEDIUM

TECHNICAL FIELD

The present invention relates to a technology of playing back 3D and 2D images.

BACKGROUND ART

The 2D images, also called monoscopic images, are represented by pixels on an X-Y plane that is applied to the display screen of the display device.

In contrast, the 3D images have a depth in the Z-axis direction in addition to the pixels on the X-Y plane applied to the screen of the display device. The 3D images are presented to the viewers (users) by simultaneously playing back the left-view and right-view images to be viewed respectively by the left and right eyes so that a stereoscopic effect can be produced. The users would see, among the pixels constituting the 3D image, pixels having positive Z-axis coordinates in front of the display screen, and pixels having negative Z-axis coordinates behind the display screen.

It is preferable that an optical disc storing a 3D image has compatibility with a playback device that can play back only 2D images (hereinafter, such a playback device is referred to as "2D playback device"). This is because, otherwise, two types of discs for 3D and 2D images need to be produced so that the 2D playback device can play back the same content as that stored in a disc for 3D image. Such an arrangement will take a higher cost. It is accordingly necessary to provide an optical disc storing a 3D image that is played back as a 2D image by the 2D play back device, and as a 2D or 3D image by a play back device supporting both the 3D and 2D images (hereinafter, such a playback device is referred to as "2D/3D playback device").

Patent Literature 1 identified below is one example of prior art documents describing technologies for ensuring the compatibility in playback between 2D and 3D images, with respect to optical discs storing 3D images.

CITATION LIST

Patent Literature

[Patent Literature 1]
  Japanese Patent No. 3935507

SUMMARY OF INVENTION

Technical Problem

Meanwhile, when the video is displayed with a stereoscopic effect, the graphics representing subtitle and GUI need to be displayed with a stereoscopic effect as well to some extent. This is because the subtitle and GUI are displayed overlaid with the video, and thus there will be a mismatch if the video is displayed with a stereoscopic effect and the subtitle and GUI are displayed monoscopically.

When designing the playback device, the manufacturer of the playback device (hereinafter merely referred to as "manufacturer") can deal with the graphics representing subtitle and GUI with a design concept of always assuring the stereoscopic effect for the graphics or with a design concept of not assuring the stereoscopic effect for the graphics.

The design concept of always assuring the stereoscopic effect for the graphics has the following problem. That is to say, for the manufacturer to realize the stereoscopic effect in the video only, it takes a lot of work in designing the hardware, evaluation, and quality control. Thus further adding the function of displaying the graphics stereoscopically and controlling the quality thereof in the playback device is a heavy burden to the manufacture.

Accordingly, a problem with the design concept of always assuring the stereoscopic effect for the graphics representing subtitle and GUI is that the product cost cannot be reduced.

The design concept of not assuring the stereoscopic effect for the graphics is as follows. In many cases, a full-scale stereoscopic effect as provided in the video is not necessary for the graphics, but it is sufficient to merely realize the sense of depth, a simple stereoscopic effect, by an offset control of the plane memory. Thus it is possible to reduce the cost of playback devices supporting the stereoscopic effect, by keeping to the design concept and providing the playback devices with a graphics playback unit that performs the offset control to realize the simple stereoscopic effect. However, there are some graphics in which a character in a movie moves in synchronization with the movement of the video. When the design concept of always performing the offset control is adopted, such a character is inevitably displayed monoscopically, providing a cheap impression of the stereoscopic effect. It would be difficult to sell the playback devices as top-of-the-line products unless the playback devices could escape the impression of the cheapness.

Accordingly, when the product design is deviated toward either of the concepts, the above-mentioned problem will occur. Also, with this deviation, production of the playback device may be deviated to only top-of-the-line products or to only low-cost products. This prevents expansion of the lineup of products in the market and prevents popularization of playback devices supporting the stereoscopic playback.

It is thus an object of the present invention to provide a playback device of which a plurality of types, including a type having a function to provide a high-quality stereoscopic effect and a type not having the function to provide the high-quality stereoscopic effect, can be brought to the market to expand the lineup of products.

Solution to Problem

The above-mentioned object is fulfilled by a playback device comprising: a stream number register storing one of the stream numbers registered in the stream selection table that corresponds to a graphics stream to be played back; and a capability register indicating graphics playback capability, wherein playback of the graphics stream includes a process of selecting a playback type of the graphics stream from a first playback type and a second playback type, the first playback type using the graphics stream as a monoscopic graphics stream, and the second playback type realizing a stereoscopic display by using a pair of left-eye graphics stream and right-eye graphics stream, the graphics playback capability indicated by the capability register is presence or absence of a capability to perform the stereoscopic playback by using the left-eye graphics stream and the right-eye graphics stream, and the selection of playback type is performed in accordance with the presence or absence of the capability indicated by the capability register.

Advantageous Effects of Invention

With the above-described structure, the capability flag is provided to indicate whether or not a graphics stereoscopic effect can be realized, and the capability flag can be used to condition whether or not the stereoscopic effect is realized with respect to a graphics stream that is indicated in the extension stream selection table that the graphics stereoscopic effect is available. Accordingly, even if a graphics stream having the stereoscopic effect is recorded on the recording medium, the manufacturer can prohibit the stereoscopic effect of the graphics stream by setting the capability flag as "no capability", and can execute a stereoscopic playback by using a monoscopic graphics stream that provides an easier quality control.

Such a structure makes it possible to market a plurality of types of playback devices, including a type having a top-of-the-line stereoscopic effect and a type not having such a stereoscopic effect, thereby expanding the lineup of products.

This completes description of an aspect of the present invention having been made based on the technical concept for solving the technical problem stated in the "Technical Problem" section above. Although on an optional basis, the above-described playback device may have a structure to solve the following additional technical problems.

(Additional Technical Problem 1)

The current mainstream 3D playback devices are playback devices that require viewers to wear stereoscopic glasses. To enjoy stereoscopic viewing in this style, the viewers need to perform two actions: inserting into the playback device a recording medium on which a stereoscopic movie is recorded, and wearing the glasses. Since the two actions take time, some viewers may lose the sense of elation that "I am going to watch stereoscopic images", while performing these actions.

It is thus an object of the present invention to provide a playback device that can start a stereoscopic playback while the viewer has the sense of elation that "I am going to watch stereoscopic images".

The above-mentioned object is fulfilled by a playback device comprising: a capability register indicating whether or not a capability to perform a stereoscopic display is present in a display device connected with the playback device; and a mode register storing an output mode of the playback device, wherein it is judged whether or not a plurality of conditions are satisfied, and a stereoscopic output mode is set in the mode register when it is judged that the plurality of conditions are satisfied, a first condition among the plurality of conditions is that the capability register indicates that the capability to perform the stereoscopic display is present in the display device connected with the playback device, a second condition among the plurality of conditions is that an initial value of an output mode recorded on the recording medium indicates the stereoscopic output mode, and it is judged whether or not the first condition and the second condition are satisfied when a disc is read, and the stereoscopic output mode is set in the mode register when it is judged that the first condition and the second condition are satisfied.

With the above-described structure, the playback device enters the stereoscopic output mode as soon as a disc is inserted therein when the initial value of the output mode in the recording medium indicates that the stereoscopic playback is available, and the playback device has the capability to perform the stereoscopic playback. In that case, when the initial value indicates that the stereoscopic playback is available, the viewer can immediately be soaked in the virtual reality by the stereoscopic playback by wearing the 3D glasses immediately after inserting the recording medium into the playback device.

(Additional Technical Problem 2)

For the stream selection procedure in the current monoscopic playback device, a control program called a stream selection procedure has been established. In the stereoscopic playback device, it is necessary to ensure the switching between the stereoscopic output mode and the monoscopic output mode. A problem of this is that the man-hour for developing the control program doubles if the output mode selection procedure is contradictory with the stream selection procedure.

It is thus an object of the present invention to provide a playback device which realizes a mode setting that has a high affinity with the stream selection procedure in the monoscopic playback device.

The above-mentioned object is fulfilled by a playback device comprising: a capability register indicating whether or not a capability to perform a stereoscopic display is present in a display device connected with the playback device; and a mode register storing an output mode of the playback device, wherein it is judged whether or not a plurality of conditions are satisfied, and a stereoscopic output mode is set in the mode register when it is judged that the plurality of conditions are satisfied, the recording medium stores playlist information which indicates a playback path, a first condition among the plurality of conditions is that the capability register indicates that the capability to perform the stereoscopic display is present in the display device connected with the playback device, a second condition among the plurality of conditions is that a piece of playlist information to be played back includes an extension stream selection table for stereoscopic playback, the extension stream selection table shows a list of elementary streams that can be selected by the playback device in the stereoscopic output mode, in correspondence with stream numbers, and it is judged whether or not the first condition and the second condition are satisfied when a playback of a playlist is started while the stereoscopic output mode is set in the mode register, and the stereoscopic output mode set in the mode register is maintained when it is judged that the first condition and the second condition are satisfied.

With the above-described structure, a switching between output modes is performed on the condition that the extension stream selection table for the stereoscopic viewing is present in the current playlist information, separate from the stream selection table for the monoscopic viewing. This makes it possible to select an appropriate mode from the monoscopic output mode and the stereoscopic output mode without greatly changing the existing stream selection procedure based on the playlist information.

(Additional Technical Problem 3)

For the playback of playlists, a seamless connection between playitems constituting the playlist is ensured, and the author takes every care to keep the quality level of the playback. However there is a fear that the quality level of the playback ensured by the author in units of playlists may be degraded when the output mode is switched from the stereoscopic output mode to the monoscopic output mode, or from the monoscopic output mode to the stereoscopic output mode, in the middle of a playback of a playlist.

It is thus an object of the present invention to provide a playback device which prevents the quality level of the playback ensured by the author in units of playlists from being degraded.

The above-mentioned object is fulfilled by the above-described playback device, wherein when a monoscopic output mode is set in the mode register, the monoscopic output mode set in the mode register is maintained even if the plurality of conditions are satisfied.

With the above-described structure, a switching between the stereoscopic output mode and the monoscopic output mode is prohibited. This prevents occurrence of a sudden interruption of the display image even if the monoscopic display is changed to the stereoscopic display during a playback of a playlist.

(Additional Technical Problem 4)

For the playback of playlists, a seamless connection between playitems constituting the playlist is ensured, and the author takes every care to keep the quality level of the playback. However there is a fear that the quality level of the playback ensured by the author in units of playlists may be degraded when the output mode is switched from the stereoscopic output mode to the monoscopic output mode, or from the monoscopic output mode to the stereoscopic output mode by request from the user, in the middle of a playback of a playlist.

It is thus an object of the present invention to provide a playback device which prevents the quality level of the playback ensured by the author in units of playlists from being degraded.

The above-mentioned object is fulfilled by the above-described playback device, wherein when a playlist is being played back, the output mode stored in the mode register is maintained.

With the above-described structure, it is possible to prevent occurrence of a sudden interruption of the display image even if the monoscopic display is changed to the stereoscopic display during a playback of a playlist.

(Additional Technical Problem 5)

The current mainstream stereoscopic display format is the one that requires the viewers to wear glasses dedicated to the stereoscopic viewing. It is expected however that in near future, a display device supporting a naked-eye stereoscopic viewing is marketed. If such a display device supporting a naked-eye stereoscopic viewing is marketed, it is inevitable to greatly revise the control program for use in the playback device, which means that the control program must be re-developed, increasing the load of the manufacturer. Also, at present, it is impossible to accurately estimate the time when such a display device supporting a naked-eye stereoscopic viewing will be developed, and it is almost impossible to build a playback device development plan based on the possibilities.

It is thus an object of the present invention to provide a playback device with a control program that does not need to be greatly revised even if the a playback device is connected to a display device supporting a naked-eye stereoscopic viewing.

The above-mentioned object is fulfilled by a playback device comprising: a capability register indicating whether or not a capability to perform a stereoscopic display is present in a display device connected with the playback device; and a mode register storing an output mode of the playback device, wherein it is judged whether or not a predetermined condition is satisfied, and a stereoscopic output mode is set in the mode register when it is judged that the predetermined condition is satisfied, display devices having the capability to perform a stereoscopic display include display devices which require viewers to wear stereoscopic glasses to view a stereoscopic playback, and display devices which do not require viewers to wear stereoscopic glasses to view a stereoscopic playback, the capability register includes a glasses necessity flag that indicates whether or not it is required for viewers to wear stereoscopic glasses to view a stereoscopic playback when the display device connected with the playback device has the capability to perform a stereoscopic display, and when the glasses necessity flag indicates that it is not required for viewers to wear stereoscopic glasses to view a stereoscopic playback, it is judged that the predetermined condition is satisfied and the stereoscopic output mode is set in the mode register.

With the above-described structure, the playback device can select an appropriate output mode regardless of whether it is connected with a display device supporting a naked-eye stereoscopic viewing or a display device not supporting a naked-eye stereoscopic viewing.

(Additional Technical Problem 6)

The stereoscopic playback has a long history. Stereoscopic movies once missed a chance to become the mainstream of the movies, due to its insufficient resolution. If the quality level of the stereoscopic playback changes greatly depending on the display performance of the display device with which the playback device is connected, the stereoscopic playback may follow the same path as the past one.

It is thus an object of the present invention to provide a playback device which does not cause the quality level to change greatly depending on the resolution of the image or the display device.

The above-mentioned object is fulfilled by a playback device for playing back a recording medium, the playback device comprising: a capability register indicating whether or not a capability to perform a stereoscopic display is present in a display device connected with the playback device; and a mode register storing an output mode of the playback device, wherein the capability register includes a display type flag that indicates whether the display device connected with the playback device supports a normal-quality image display or a high-quality image display, and it is judged that the predetermined condition is not satisfied when the display type flag indicates that the display device supports the normal-quality image display.

With the above-described structure, when it is impossible to ensure the image quality required for the stereoscopic playback because the television support the normal-quality image display, it is possible to maintain the setting for the monoscopic playback mode. This makes it possible to prevent a stereoscopic playback from being realized with an insufficient resolution, preventing an image with insufficient quality from being presented to the viewers.

(Additional Technical Problem 7)

When the playback device is connected with a display device, an interface for connecting them is required.

Note that, when the playback device supports a stereoscopic playback, in a transmission system in which picture data to be displayed is transmitted to the display device in a non-compressed state, some parameters such as the video format and the frame rate are required in the negotiation. The reasons are as follows. That is to say, in a transmission system which presumes a transmission of non-compressed picture data, the picture data to be displayed in each frame period of the display device connected with the playback device needs to be transmitted to the display device in the non-compressed state, and thus non-compressed pixel data needs to be transmitted between the display device and the playback device in synchronization with the horizontal display period and the vertical display period.

On the other hand, the amount of the pixel data to be transmitted in synchronization with the horizontal display period and the vertical display period depends on the video format of the image. Accordingly the devices need to exchange information such as information of a video format and a frame rate that can be dealt with by the display device, and information of a video format and a frame rate that can be dealt with by the playback device, so that they can determine optimum video format and frame rate among those that can be dealt with by the devices.

However, the capability of the playback device to deal with the frame rate and video format depends on the frame rate and the video format of the video stream recorded on the recording medium. Thus these information cannot be obtained unless a title is selected and a playlist to be played back is determined.

Accordingly, after a disc is inserted, it is yet to be determined which of a plurality of video streams recorded on the disc is to be played back, and upon selection of a playlist, a negotiation is performed after the frame rate and the format are conveyed to the display device, which result in a delay of the display on the display device and a delay of the stereoscopic playback. More specifically, the start delay caused by the negotiation is an order of approximately five seconds.

It is thus an object of the present invention to provide a playback device which solves the problem of the start delay caused by the negotiation when a recording medium is inserted.

The above-mentioned object is fulfilled by a recording medium on which an index table is recorded, wherein the index table includes application information, the application information includes initial output mode information and format frame rate information, the initial output mode information is information that indicates whether an output mode preferentially set in a playback device is a monoscopic output mode or a stereoscopic output mode, and the format frame rate information indicates an image format and a frame rate that can be used as output mode information of the playback device when the recording medium is inserted in the playback device.

With the above-described structure, the index table includes application information, and the application information includes information of video format and video rate as parameters necessary for the negotiation. Accordingly, after the index table is read out, it is possible to start the authentication with the partner device at the same time as the playback of the first play title is started. Since it is possible to execute the process of playing back the first play title in parallel with the negotiation with the partner device, the start delay can be reduced to approximately half.

(Additional Technical Problem 8)

When the playback device attempts to perform a random access to a stream file which stores a video stream, it refers to an entry map recorded on the recording medium to identify a starting position of a GOP.

The entry map is generated as a video stream is recorded, by adding, into the entry map, each entry pointing to a piece of picture data that is positioned at the start of a GOP.

When a main transport stream is generated from a main-view video stream, a sub transport stream is generated from a sub-view video stream, and these transport streams are recorded as a stereoscopic interleaved stream file, a piece of picture data pointed to by an entry of the extension entry map and a piece of picture data pointed to by an entry of the basic entry map may be arranged in different pairs of Extents.

In the picture data stored in the main-view video stream and the sub-view video stream, the amount of information differs for each frame. When an attempt is made to divide the main transport stream including the main-view video stream and the sub transport stream including the sub-view video stream, in which the amount of information differs for each frame, into blocks of a fixed length that does not cause an underflow in the read buffer, and then record the blocks onto the recording medium, it might happen that a piece of base-view picture data pointed to by an entry of the basic entry map and a piece of sub-view picture data pointed to by an entry of the extension entry map belong to different pairs of areas, due to the difference in the amount of information among frames.

When the base-view picture data and the sub-view picture data belong to different pairs of areas, the following occurs. When a random access to the base-view picture data or the sub-view picture data is attempted, a pair of pieces of picture data corresponding to arbitrary playback times are sent to the decoder; and the decoder is required to access a pair of different Extents and read a pair of pieces of picture data from the pair of different Extents. When a pair of different Extents are accessed each time a random access is performed, a lot of seeks by the optical pickup occur, which causes a delay in the start of playback.

It is thus an object of the present invention to provide a recording medium which eliminates a delay that is caused when random accesses to a pair of base-view picture data and sub-view picture data are performed.

The above-mentioned object is fulfilled by a recording medium on which a stream file and a stream management file are recorded, the stream file includes a video stream which includes a plurality of pieces of picture data, the stream management file includes an entry map which includes entries each indicating an address of picture data in correspondence with a playback time, the picture data includes main-view picture data constituting a main view of a stereoscopic image and sub-view picture data constituting a sub view of the stereoscopic image, the entry map includes a basic entry map which is used when a monoscopic image is played back, and an extension entry map which is used together with the basic entry map when the stereoscopic image is played back, and the extension entry map has entries that indicate times that are indicated by entries of the basic entry map corresponding to the extension entry map.

In the above-stated recording medium, the stream file may be a stereoscopic interleave file in which Extents constituting a main-view stream and Extents constituting a sub-view stream are arranged in an interleaved manner, an $i^{th}$ Extent having identification number "i" among the Extents constituting the main-view stream includes a piece of main-view picture data indicated by an entry of the basic entry map, and an $i^{th}$ Extent identified by the identification number "i" among the Extents constituting the sub-view stream includes a piece of sub-view picture data indicated by an entry of the extension entry map, and the entry that indicates the main-view picture data included in the $i^{th}$ Extent of the main-view stream has the same playback time as the entry that indicates the sub-view picture data included in the $i^{th}$ Extent of the sub-view stream.

In the above-described recording medium, when GOPs constituting the main transport stream and GOPs constituting the sub transport stream are to be recorded onto the recording medium, entries of the extension entry map point to only pieces of sub-view picture data, wherein pieces of base-view picture data to be played back at the same playback times as the pieces of sub-view picture data are pointed to by entries of the basic entry map.

In this structure, pieces of picture data pointed to by entries of the basic entry map and pieces of picture data pointed to by entries of the extension entry map are present in the pairs of the same Extents. Therefore when the Extents are accessed via the basic entry map and the extension entry map, GOPs of the base view and GOPs of the corresponding sub view are played back as a group. This eliminates the delay in the start of playback.

BRIEF DESCRIPTION OF DRAWINGS

FIGS. 1A through 1C show a home theater system that is composed of a recording medium being a package medium, a playback device being a player device, a display device, and glasses.

FIG. 8 shows the internal structure of the extension stream selection table.

FIGS. 9A through 9C show stream registration sequences in the extension stream selection table.

FIG. 10 shows what elementary streams are demultiplexed from the main TS and the sub-TSs with use of the basic stream selection table and the extension stream selection table.

FIGS. 13A and 13B show the internal structure of the PG decoder.

FIGS. 14A and 14B show the internal structure of the text subtitle decoder.

FIG. 19 shows the bit assignment in PSR24.

FIG. 24 is a flowchart showing the procedure which is to be executed when a stream change is requested by the set stream command or by a user operation requesting a stream number change.

FIGS. 34A and 34B are flowcharts showing the procedures for setting the output mode in the BD-J title.

FIG. 35 is a flowchart showing one example of the behavior of the initial HAVi device configuration selection.

FIG. 36 shows the bit assignment in PSR23.

FIGS. 38A through 38C are illustrations for explanation of the index table.

FIG. 41 shows the correspondence between the file 2D/file base and the file dependent.

FIGS. 42A through 42C show the correspondence between the interleaved stream file and file 2D/file base.

FIGS. 45A through 45D show the internal structure of the clip information file.

FIG. 48 shows the basic entry map and the extension entry map.

FIG. 49 shows entries that are not permitted in the extension entry map.

FIGS. 52A and 52B show how the ATC sequence is restored.

FIGS. 53A through 53D show one example of the Extent start point information table in the base-view clip information and one example of the Extent start point information table in the dependent-view clip information.

FIGS. 54A through 54C are illustrations provided for explanation of the source packet numbers of arbitrary data blocks in ATC sequences 1 and 2.

FIGS. 64A through 64C show the embodiment of a usage act of a recording medium relating to the present invention, the structure of the BD-ROM, and the structure of the index file.

FIG. 70A and FIG. 70B show the structure of a 2D playback device and explain the player variable.

FIGS. 84A and 84B show how to improve the efficiency of the HDMI authentication before a stream starts to be played back.

FIG. 92 illustrates the stereoscopic viewing.

DESCRIPTION OF EMBODIMENTS

Figure 2:
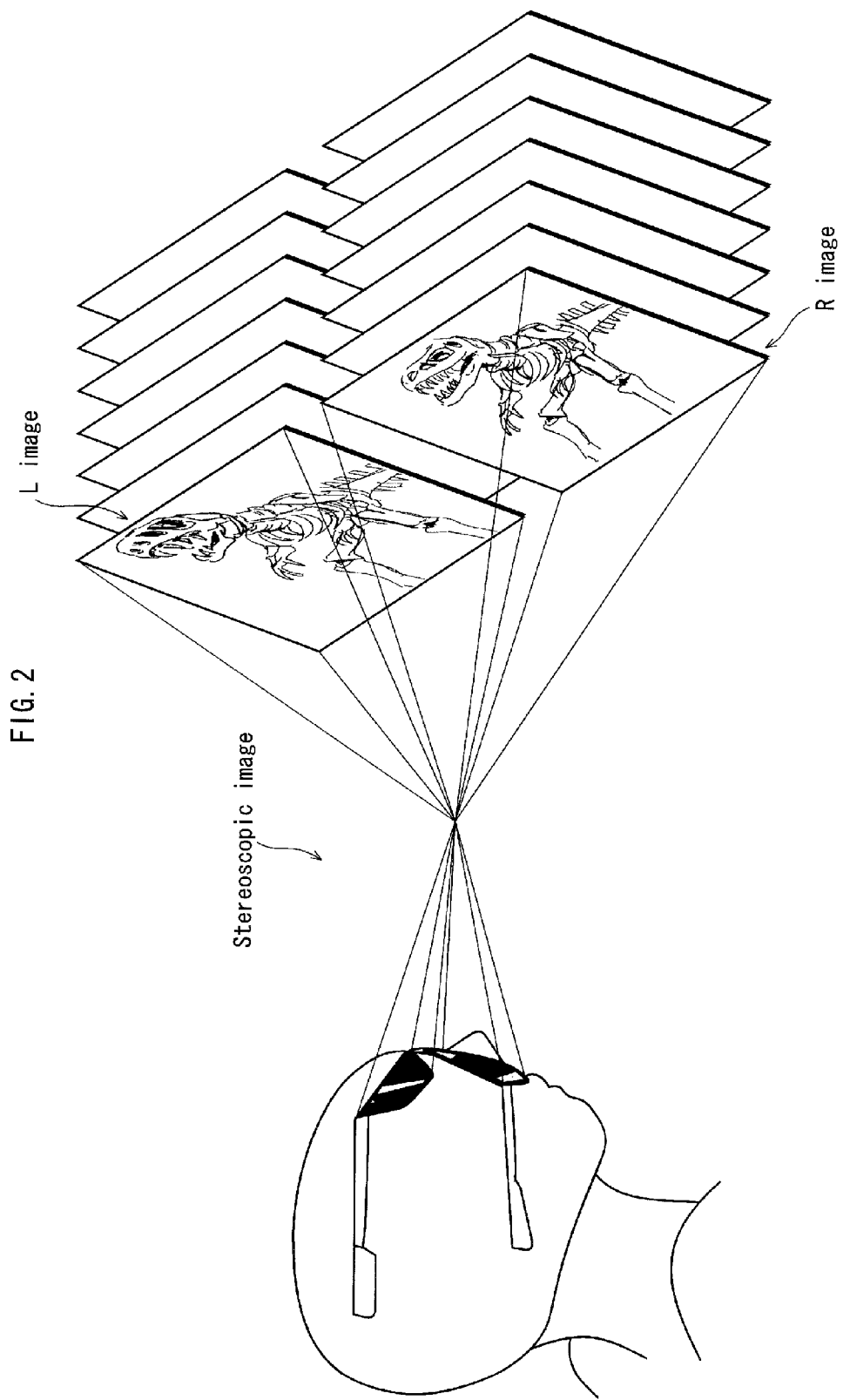
FIG. 2 shows the user's head on the left-hand side of the drawing and the images of a dinosaur skeleton seen respectively by the left eye and the right eye of the user on the right-hand side of the drawing.

The recording media provided with means for solving the above-described problems may be implemented as package media containing contents for sale on a store. Also, playback devices supporting the recording media may be implemented as player devices for playing back the package media, and integrated circuits supporting the recording media may be implemented as system LSIs to be embedded in the player devices.

FIGS. 1A through 1C show a home theater system that is composed of a recording medium being a package medium, a playback device being a player device, a display device, and glasses. As shown in FIG. 1A, a recording medium 100 being a package medium as described above and a playback device 200 being a player device constitute the home theater system together with a display device 300, 3D glasses 400, and a remote control 500. The home theater system structured as such is subject to use by the user.

The recording medium 100 provides the home theater system with, for example, a movie work. The movie work may provide a stereoscopic image. Here, the stereoscopic image is composed of at least two view-point images. The view-point image is an image that is deflected to some extent, and said at least two view-point images include a main-view image and a sub-view image. As shown in FIG. 1, the recording medium 100 may be, for example, a disc or a memory card among many types of recording media. In the following, a "recording medium" is presumed to be a disc unless otherwise noted.

The playback device 200 is connected with the display device 300 and plays back the recording medium 100. The playback device described in the present application is a 2D/3D playback device (player) which, provided with the 2D output mode and the 3D output mode, can switch between these output modes to play back a main-view video stream representing a main-view image and a sub-view video stream representing a sub-view image.

The display device 300 is a television and provides the user with an interactive operation environment by displaying a menu and the like as well as the movie work. In the present embodiment, the user needs to wear the 3D glasses 400 for the display device 300 to realize the stereoscopic viewing. Here, the 3D glasses 400 are not necessary when the display device 300 displays images by the lenticular method.

The 3D glasses 400 are equipped with liquid-crystal shutters that enable the user to view a parallax image by the sequential segregation method or the polarization glasses method. Here, the parallax image is an image which is composed of a pair of (i) an image that enters only into the right eye and (ii) an image that enters only into the left eye, such that pictures respectively associated with the right and left eyes respectively enter the eyes of the user, thereby realizing the stereoscopic viewing. FIG. 1B shows the state of the 3D glasses 400 when the left-view image is displayed. At the instant when the left-view image is displayed on the screen, the liquid-crystal shutter for the left eye is in the light transmission state, and the liquid-crystal shutter for the right eye is in the light block state. FIG. 1C shows the state of the 3D glasses 400 when the right-view image is displayed. At the instant when the right-view image is displayed on the screen, the liquid-crystal shutter for the right eye is in the light transmission state, and the liquid-crystal shutter for the left eye is in the light block state.

The remote control 500 is a machine for receiving from the user operations for playing back AV. The remote control 500 is also a machine for receiving from the user operations onto the layered GUI. To receive the operations, the remote control 500 is equipped with a menu key, arrow keys, an enter key, a return key, and numeral keys, where the menu key is used to call a menu constituting the GUI, the arrow keys are used to move a focus among GUI components constituting the menu, the enter key is used to perform ENTER (determination) operation onto a GUI component constituting the menu, the return key or numeric keys are used to return to a higher layer in the layered menu.

In the home theater system shown in FIGS. 1A through 1C, an output mode of the playback device for causing the display device 300 to display images in the 3D output mode is called "3D output mode", and an output mode of the playback device for causing the display device 300 to display images in the 2D output mode is called "2D output mode".

This completes the description of the usage act of the recording medium and the playback device.

Embodiment 1

Embodiment 1 is characterized in that a register in the playback device stores information that indicates whether or not the playback device has a capability to realize a stereoscopic viewing using a right-eye graphics stream and a left-eye graphics stream.

In the following description, the main view and the sub-view are used to realize the parallax image method. The parallax image method (also called a 3D-LR mode) is a method for realizing the stereoscopic viewing by preparing separately an image for the right eye and an image for the left eye, and causing the image for the right eye to enter only into the right eye and the image for the left eye enter only into the left eye. FIG. 2 shows the user's head on the left-hand side of the drawing and the images of a dinosaur skeleton seen respectively by the left eye and the right eye of the user on the right-hand side of the drawing. When the light transmission and block are repeated alternately for the right and left eyes, the left and right scenes are overlaid in the brain of the user by the effect of residual images of eyes, and the overlaid image is recognized as a stereoscopic image appearing in front of the user.

The MPEG4-MVC method is used as the method for encoding the video streams for realizing such a stereoscopic viewing. In the description hereinafter it is presumed that the main-view video stream is "base-view video stream" in the MPEG4-MVC method, and the sub-view video stream is "dependent-view video stream" in the MPEG4-MVC method.

The MPEG4-MVC base-view video stream is a sub-bit stream with view_id being set to "0", and is a sequence of view components with view_id being set to "0". The MPEG4-MVC base-view video stream conforms to the restrictions imposed on the MPEG4-AVC video stream.

The MPEG4-MVC dependent-view video stream is a sub-bit stream with view_id being set to "1", and is a sequence of view components with view_id being set to "1".

A view component is one of a plurality of pieces of picture data that are played back simultaneously for the stereoscopic viewing in one frame period. A compress-encoding that makes use of the correlation between view points is realized by using, as picture data, view components of the base-view and dependent-view video streams to realize a compress-encoding that makes use of the correlation between pictures. View components of the base-view and dependent-view video streams assigned to one frame period constitute one access unit. This makes it possible for the random access to be performed in a unit of the access unit.

Each of the base-view video stream and the dependent-view video stream has a GOP structure in which each view component is a "picture", and is composed of closed GOPs and open GOPs. The closed GOP is composed of an IDR picture, and B-pictures and P-pictures that follow the IDR picture. The open GOP is composed of a non-IDR I-picture, and B-pictures and P-pictures that follow the non-IDR I-picture.

The non-IDR I-pictures, B-pictures, and P-pictures are compress-encoded based on the frame correlation with other pictures. The B-picture is a picture composed of slice data in the bidirectionally predictive (B) format, and the P-picture is a picture composed of slice data in the predictive (P) format. The B-picture is classified into reference B (Br) picture and non-reference B (B) picture.

In the closed GOP, the IDR picture is disposed at the top. In the display order, the IDR picture is not the top, but pictures (B-pictures and P-pictures) other than the IDR picture cannot have dependency relationship with pictures existing in a GOP that precedes the closed GOP. As understood from this, the closed GOP has a role to complete the dependency relationship.

Figure 3:
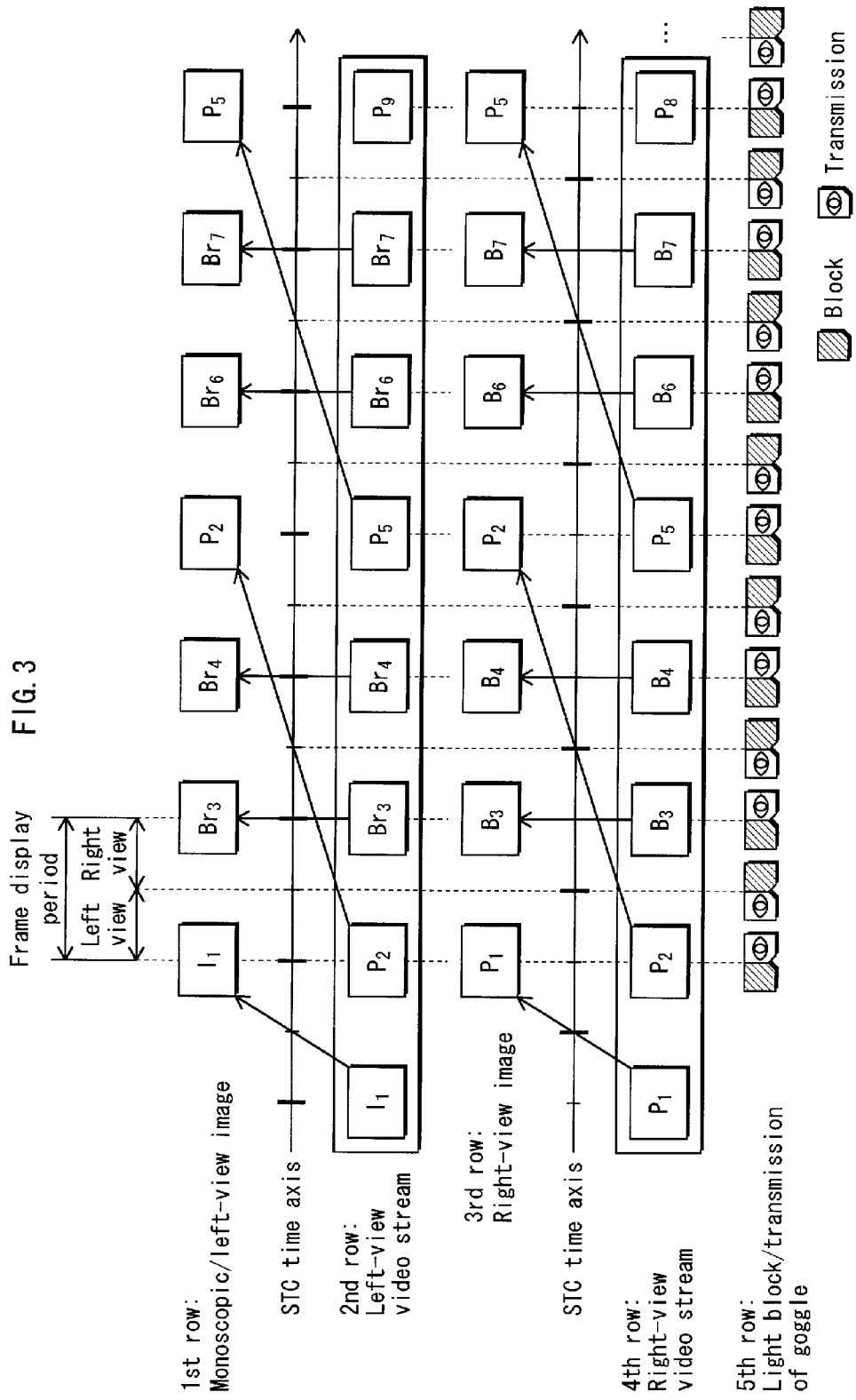
FIG. 3 shows one example of the internal structures of the base-view and dependent-view video streams for the stereoscopic viewing.

FIG. 3 shows one example of the internal structures of the base-view and dependent-view video streams for the stereoscopic viewing.

The second row of FIG. 3 shows the internal structure of the base-view video stream. This stream includes view components with picture types I1, P2, Br3, Br4, P5, Br6, Br7, and P9. These view components are decoded according to the Decode Time Stamps (DTS). The first row shows the left-eye image. The left-eye image is played back by playing back the decoded view components I1, P2, Br3, Br4, P5, Br6, Br7, and P9 according to the PTS, in the order of I1, Br3, Br4, P2, Br6, Br7, and P5.

The fourth row of FIG. 3 shows the internal structure of the dependent-view video stream. This stream includes view components with picture types P1, P2, B3, B4, P5, B6, B7, and P8. These view components are decoded according to the DTS. The third row shows the right-eye image. The right-eye image is played back by playing back the decoded view components P1, P2, B3, B4, P5, B6, B7, and P8 according to the PTS, in the order of P1, B3, B4, P2, B6, B7, and P5.

The fifth row shows how the state of the 3D glasses 400 is changed. As shown in the fifth row, when the left-eye image is viewed, the shutter for the right eye is closed, and when the right-eye image is viewed, the shutter for the left eye is closed.

Here, a mode, in which video frames of the base-view video stream (B) and video frames of the dependent-view video stream (D) are alternately output at a display cycle of ¼48 seconds like "B"-"D"-"B"-"D", is called a "B-D presentation mode".

The B-D presentation mode includes a 3D-depth mode in which the stereoscopic viewing is realized by using the 2D images and depth information, as well as a 3D-LR mode in which the stereoscopic viewing is realized by using L (Left) images and R (Right) images.

Also, a mode, in which a same type of video frame is repeatedly output twice or more while the 3D mode is maintained as the output mode, is called a "B-B presentation mode". In the B-B presentation mode, video frames of an independently playable base-view video stream are repeatedly output like "B"-"B"-"B"-"B".

The B-D presentation mode and the B-B presentation mode described above are basic presentation modes in the playback device. Other than these, an output mode called "1 plane+offset" mode is available in the playback device.

The "1 plane+offset" mode (also referred to as "3D-offset mode") is an output mode in which the stereoscopic viewing is realized by incorporating a shift unit in the latter half of the plane memory and functioning the shift unit. In each of the left-view period and the right-view period, the plane offset unit shifts the coordinates of the pixels in the plane memory in units of lines leftward or rightward to displace the image formation point of the right-eye and left-eye view lines frontward or backward so that the viewer can feel a change in the sense of depth. More specifically, when the pixels coordinates are shifted leftward in the left-view period, and rightward in the right-view period, the image formation point is displaced frontward; and when the pixels coordinates are shifted rightward in the left-view period, and leftward in the right-view period, the image formation point is displaced backward.

In such a plane shift, the plane memory for the stereoscopic viewing only needs to have one plane. It is thus the best method for generating the stereoscopic images with ease. However, the plane shift merely produces stereoscopic images in which monoscopic images come frontward or go backward. Therefore, it is suited for generating a stereoscopic effect for the menu or subtitle, but leaves something to be desired in realizing a stereoscopic effect for the characters or physical objects. This is because it cannot reproduce dimples or unevenness of the faces of characters.

To support the "1 plane+offset" mode, the playback device is structured as follows. For the playback of graphics, the playback device includes a plane memory, a CLUT unit, and an overlay unit. The plane shift unit is incorporated between the CLUT unit and the overlay unit. The plane shift unit realizes the above-described change of pixel coordinates by using the offset in the offset sequence incorporated in the access unit structure of the dependent-view video stream. With this arrangement, the level of jump-out of pixels in the "1 plane+offset" mode changes in synchronization with the MVC video stream. The "1 plane+offset" mode includes "1 plane+zero offset mode". The "1 plane+zero offset mode" is a display mode which, when the pop-up menu is ON, gives the stereoscopic effect only to the pop-up menu by making the offset value zero.

The target of the shift control by the offset sequence is a plurality of plane memories which constitute a predetermined layer model. The plane memory is a memory for storing one screen of pixel data, which has been obtained by decoding the elementary streams, in units of lines so that the pixel data can be output in accordance with the horizontal and vertical sync signals. Each of a plurality of plane memories stores one screen of pixel data that is obtained as a result of decoding by the video decoder, PG decoder, or IG decoder.

The predetermined layer model is composed of a layer of the left-eye video plane and the right-eye video plane, a layer of the PG plane, and a layer of the IG/BD-J plane, and is structured so that these layers (and the contents of the plane memories in these layers) can be overlaid in the order of the base-view video plane, PG plane, and IG/BD-J plane from the bottom.

The layer overlay is achieved by executing a superimposing process onto all combinations of the two layers in the layer model. In the superimposing process, pixel values of pixel data stored in the plane memories of the two layers are superimposed. The following describes the plane memories in each layer.

The left-eye video plane is a plane memory for storing pixel data constituting the left-eye picture data among one screen of pixel data that is obtained by decoding the view components. The right-eye video plane is a plane memory for storing pixel data constituting the right-eye picture data among one screen of pixel data that is obtained by decoding the view components.

The presentation graphics (PG) plane is a plane memory for storing graphics that are obtained when a graphics decoder, which operates by the pipeline method, performs the decoding process. The IG/BD-J plane is a plane memory that functions as an IG plane in some operation mode and functions as a BD-J plane in other operation mode. The interactive graphics (IG) plane is a plane memory for storing graphics that are obtained when a graphics decoder, which operates based on the interactive process, performs the decoding process. The BD-J plane is a plane memory for storing the drawing image graphics that are obtained when an application of an object-oriented programming language performs the drawing process. The IG plane and the BD-J plane are exclusive to each other, and when one of them is used, the other cannot be used. Therefore the IG plane and the BD-J plane share one plane memory.

In the above-mentioned layer model, with regard to the video plane, there are a base-view plane and a dependent-view plane. On the other hand, with regard to the IG/BD-J plane and the PG plane, there is neither a base-view plane nor a dependent-view plane. For this reason, the IG/BD-J plane and the PG plane are the target of the shift control.

This completes the explanation of the 3D output mode. The following explains the internal structure of the recording medium pertaining to the present embodiment.

Figure 4A:
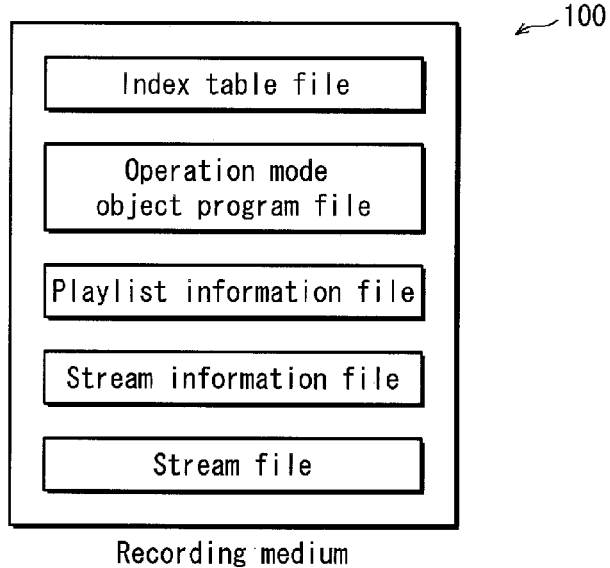
FIGS. 4A through 4C show the internal structure of the recording medium in Embodiment 1.
Figure 4B:
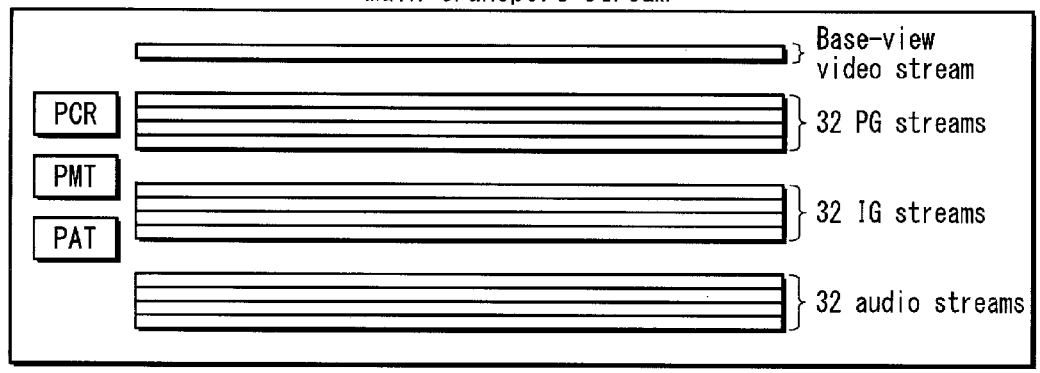
Figure 4C:
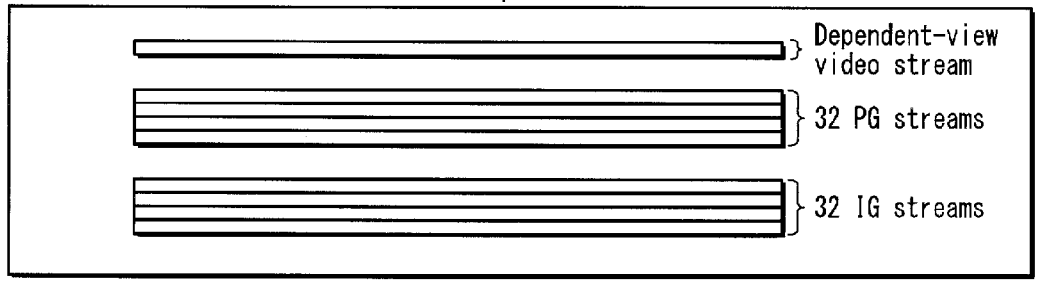

FIGS. 4A through 4C show the internal structure of the recording medium in Embodiment 1. As shown in FIG. 4A, the recording medium in Embodiment 1 stores an index table, an operation mode object program file, a playlist information file, a stream information file, and a stream file.

<Index Table>

The index table is management information of the entire recording medium. The index table is read first by a playback device after the recording medium is loaded into the playback device, thereby the recording medium is uniquely identified by the playback device.

<Program File>

The program file of the operation mode object stores control programs for operating the playback device. The control program may be written as a set of commands or written in an object-oriented compiler language. The former program supplies a plurality of navigation commands as a batch job to the playback device in the command-based operation mode to operate the playback device based on the navigation commands. The command-based operation mode is called "HDMV mode".

The latter program supplies bytecode applications, which are instances of class structure, to the playback device in the operation mode which is based on the object-oriented compiler language, in order to operate the playback device based on the instances. Java™ applications, which are one of the bytecode applications, can be used as the instances of class structure. The operation mode based on the object-oriented compiler language is called "BD-J mode".

<Stream File>

A stream file stores a transport stream that is obtained by multiplexing a video stream, one or more audio streams, and a graphics stream. The stream file has two types: 2D-only; and 2D/3D shared. The 2D-only stream file is in a normal transport stream format. The 2D/3D shared stream file is in a stereoscopic interleaved stream file format.

The stereoscopic interleaved stream file format is a file format in which Extents of a main transport stream (main TS) including a base-view stream and Extents of a sub transport stream (sub TS) including a dependent-view stream are arranged in an interleaved manner.

The main TS stored in the stream file contains packet management information (PCR, PMT, PAT) defined in the European digital broadcast standard, as information for managing and controlling a plurality of types of PES streams.

The PCR (Program Clock Reference) stores STC time information corresponding to an ATS that indicates the time when the PCR packet is transferred to a decoder, in order to achieve synchronization between an ATC (Arrival Time Clock) that is a time axis of ATSs, and an STC (System Time Clock) that is a time axis of PTSs and DTSs.

The PMT (Program Map Table) stores PIDs in the streams of video, audio, graphics and the like contained in the transport stream file, and attribute information of the streams corresponding to the PIDs. The PMT also has various descriptors relating to the TS. The descriptors have information such as copy control information showing whether copying of the AV clip is permitted or not.

The PAT (Program Association Table) shows a PID of a PMT used in the TS, and is registered by the PID arrangement of the PAT itself.

These PCR, PMT, and PAT, in the European digital broadcast standard, have a role of defining partial transport streams constituting one broadcast program (one program). This enables the playback device to cause the decoder to decode TSs as if it deals with the partial TSs constituting one broadcast program, conforming to the European digital broadcast standard. This structure is aimed to support compatibility between the recording medium playback devices and the terminal devices conforming to the European digital broadcast standard.

Each pair of an Extent of the main TS and an Extent of the sub-TS is set to have a data size that does not cause a double buffer underflow during playback so that the playback device can read each pair of the Extents seamlessly.

This completes the explanation of the stream file.

<Stream Information File>

The stream information file is a file for ensuring a random access to any source packet in a transport stream stored in a stream file, and ensuring a seamless playback with other transport streams. Via the stream information files, the stream files are managed as "AV clips". The stream information file includes information of the AV clip such as the stream encoding format, frame rate, bit rate, and resolution, and includes a basic entry map that shows correspondence between source packet numbers at the starts of GOPs and the presentation time stamps in the frame periods. Thus, by preloading the stream information file prior to an access to the stream file, the property of the transport stream in the stream file to be accessed is recognized, thereby the execution of the random access is ensured. The stream information file has two types: 2D stream information file; and 3D stream information file. The 3D stream information file includes clip information for the base view (clip base information), clip information for the dependent view (clip dependent information), and an entry map extended for the stereoscopic viewing.

The clip base information includes base-view Extent start point information, and the clip dependent information includes dependent-view Extent start point information. The base-view Extent start point information includes a plurality of source packet numbers. Each source packet number indicates a packet number of a packet including a boundary between Extents in the main TS. The dependent-view Extent start point information also includes a plurality of source packet numbers. Each source packet number indicates a packet number of a packet including a boundary between Extents in the sub-TS. By using these Extent start point information, the stereoscopic interleaved stream file is divided into an ATC sequence 1 constituting the main TS and an ATC sequence 2 constituting the sub-TS. The ATC sequence is a sequence of source packets, wherein Arrival_Time_Clocks referred to by the Arrival_Time_Stamps included in the ATC sequence do not include "arrival time-base discontinuity". Since the ATC sequence is a sequence of source packets in which the ATC time stamps are continuous, each source packet constituting the ATC sequence is subjected to continuous source packet depacketizing processes and continuous packet filtering processes while the clock counter is counting the arrival time clocks of the playback device.

While the ATC sequence is a sequence of source packets, a sequence of TS packets whose time stamps are continuous in the STC time axis is called an "STC sequence". The STC sequence is a sequence of TS packets which do not include "system time-base discontinuity", which is based on the STC (System Time Clock) that is a system standard time for TSs. The presence of the system time-base discontinuity is indicated by a "discontinuity_indicator" being ON, where the discontinuity_indicator is contained in a PCR packet carrying a PCR (Program Clock Reference) that is referred to by the decoder to obtain an STC. The STC sequence is a sequence of TS packets whose time stamps are continuous in the STC time axis. Therefore, each TS packet constituting the STC sequence is subjected to continuous decoding processes performed by the decoder provided in the playback device, while the clock counter is counting the system time clocks of the playback device.

The extended entry map indicates, in correspondence with the presentation time stamps representing the frame periods at the starts of GOPs, source packet numbers of access unit delimiters which indicate starting positions of view components at the starts of GOPs in the dependent-view video stream.

On the other hand, the basic entry map in the 3D stream information file indicates, while maintaining the compatibility with the 2D stream information file, in correspondence with the presentation time stamps representing the frame periods at the starts of GOPs, source packet numbers of access unit delimiters which indicate starting positions of view components at the starts of GOPs in the base-view video stream.

<Playlist Information File>

The playlist information file is a file storing information that is used to cause the playback device to play back a playlist. The "playlist" indicates a playback path defined by logically specifying a playback order of playback sections, where the playback sections are defined on a time axis of transport streams (TS). The playlist has a role of defining a sequence of scenes to be displayed in order, by indicating which parts of which transport streams among a plurality of transport streams should be played back. The playlist information defines "patterns" of the playlists. The playback path defined by the playlist information is what is called "multi-path". The multi-path is composed of a "main path" and one or more "sub-paths". The main path is defined for the main transport streams. The sub-paths are defined for sub streams. A plurality of sub-paths can be defined while one main path is defined. By defining a playback path of the base-view video stream in the main path and defining a playback path of the dependent-view video stream in the sub-path, it is possible to suitably define a set of video streams for performing a stereoscopic playback.

An AV playback by the multi-path can be started when the application of an object-oriented programming language instructs to generate a frame work player instance that plays back the playlist information. The frame work player instance is actual data that is generated on the heap memory of the virtual machine based on the media frame work player class. Also, an arrangement may be made so that a playback by the multi-path can be started when a command-based program issues a playback command with an argument specifying the playlist information.

The playlist information includes one or more pieces of playitem information. The playitem information is playback section information that defines one or more pairs of an "in_time" time point and an "out_time" time point on the video stream playback time axis.

The playlist information has a hierarchical structure composed of playitem information, clip information, and transport stream. It is possible to set a one-to-many relationship between (i) a pair of transport stream and clip information and (ii) playitem information so that one transport stream can be referenced by a plurality of pieces of playitem information. This makes it possible to adopt, as a bank film, a transport stream created for a title so that the bank film can be referenced by a plurality of pieces of playitem information in a plurality of playlist information files, making it possible to create a plurality of variations of a movie effectively. Note that the "bank film" is a term used in the movie industry and means an image that is used in a plurality of scenes.

In general, the users do not recognize the unit called playlist, and recognize a plurality of variations (for example, a theatrical version and a TV broadcast version) branched from the stream files as the playlists.

The playlist information falls into two types: 2D playlist information; and 3D playlist information. A difference between them is that the 3D playlist information includes a base-view indicator and a stereoscopic stream selection table.

The "stereoscopic stream selection table" is a table that shows, in correspondence with stream numbers, stream attributes and stream entries of elementary streams that are to be played back only in the 3D output mode.

The "base-view indicator" is information indicating either the left eye or the right eye for which the base-view video stream is to be indicated, wherein the base-view video stream is the base of the compress-encoding using the correlation between view points. By changing the base-view indicator of the playlist information, it is possible to change the assignment of the left eye and right eye at the level of the playlist.

Since the assignment of the left eye and right eye can be changed at the level of the playlist that does not depend on the structure of the stream, when, for example, there is a playlist in which the position and angle of an object in the image is set as "base view=left eye" and "dependent view=right eye", it is possible to generate a playlist in which the position and angle of an object in the image is set as "base view=right eye" and "dependent view=left eye", as another version.

By reversing the assignment of the left eye and right eye to the base-view and dependent-view video streams at the level of the playlist, it is possible to reverse the stereoscopic effect. For example, when there has already been generated a playlist intending a stereoscopic effect that the object appears in front of the screen, it is possible to generate another playlist intending a stereoscopic effect that the object appears behind the screen. This produces an advantageous effect that variations of 3D playlists with different stereoscopic effects can be generated easily.

FIG. 4B shows the internal structure of the main TS. FIG. 4C shows the internal structure of the sub-TS. As shown in FIG. 4B, the main TS includes one base-view video stream, 32 base-view PG streams, 32 base-view IG streams, and 32 audio streams. As shown in FIG. 4C, the sub-TS includes one dependent-view video stream, 32 dependent-view PG streams, and 32 dependent-view IG streams.

Next, the internal structure of TS will be described.

The elementary streams (ES) to be multiplexed in the TSs include the video stream, audio stream, presentation graphics stream, and interactive graphics stream.

Video Stream

The base-view video stream constitutes a primary video stream in a picture-in-picture application. The picture-in-picture application is composed of the primary video stream and a secondary video stream. The primary video stream is a video stream composed of picture data of the picture-in-picture application that represents a parent picture in the screen; and the secondary video stream is a video stream composed of picture data of the picture-in-picture application that represents a child picture that is fit in the parent picture.

The picture data constituting the primary video stream and the picture data constituting the secondary video stream are stored in different plane memories after being decoded. The plane memory that stores the picture data constituting the secondary video stream has, in the first half thereof, a structural element (Scaling & Positioning) that performs changing scaling of the picture data constituting the secondary video stream, and positioning display coordinates of the picture data constituting the secondary video stream.

Audio Stream

The audio stream is classified into a primary audio stream and a secondary audio stream. The primary audio stream is an audio stream that is to be a main audio when the mixing playback is performed; and the secondary audio stream is an audio stream that is to be a sub-audio when the mixing playback is performed. The secondary audio stream includes information for downsampling for the mixing, and information for the gain control.

Presentation Graphics (PG) Stream

The PG stream is a graphics stream that can be synchronized closely with the video, with the adoption of the pipeline in the decoder, and is suited for representing subtitles. The PG stream falls into two types: a 2D PG stream; and a stereoscopic PG stream. The stereoscopic PG stream further falls into two types: a left-eye PG stream; and a right-eye PG stream.

It is possible to define up to 32 2D PG streams, up to 32 left-eye PG streams, and up to 32 right-eye PG streams. These PG streams are attached with different packet identifiers. Thus, it is possible to cause a desired PG stream among these PG streams to be subjected to the playback, by specifying a packet identifier of the one to be played back to the demultiplexing unit.

A close synchronization with video is achieved due to the decoding with the pipeline adopted therein. Thus the use of the PG stream is not limited to the playback of characters such as the subtitle characters. For example, it is possible to display a mascot character of the movie that is moving in synchronization with the video. In this way, any graphics playback that requires a close synchronization with the video can be adopted as a target of the playback by the PG stream.

The PG stream is a stream that is not multiplexed into the transport stream but represents a subtitle. The text subtitle stream (also referred to as textST stream) is a stream of this kind, as well. The textST stream is a stream that represents the contents of subtitle by the character codes.

The PG stream and the text subtitle stream are registered as the same stream type in the same stream registration sequence, without distinction between them in type. And then during execution of a procedure for selecting a stream, a PG stream or a text subtitle stream to be played back is determined according to the order of streams registered in the stream registration sequence. In this way, the PG streams and text subtitle streams are subjected to the stream selection procedure without distinction between them in type. Therefore, they are treated as belonging to a same stream type called "PG_text subtitle stream".

The PG_text subtitle stream for 2D is played back in the "1 plane+offset" mode. Hereinafter, the 2D PG_text subtitle stream is referred to as a "1 plane+offset" PG_text subtitle stream.

Interactive Graphics (IG) Stream

The IG stream is a graphics stream which, having information for interactive operation, can display menus with the progress of playback of the video stream and display pop-up menus in accordance with user operations.

As is the case with the PG stream, the IG stream is classified into a 2D IG stream and a stereoscopic IG stream. The IG stream control information (called "interactive control segment") includes information (user_interface_model) that defines the user interface model. The person in charge of authoring can specify either "always on" or "pop-up menu on" by setting the user interface model information, wherewith the "always on", menus are displayed with the progress of playback of the video stream, and with the "pop-up menu on", the pop-up menus are displayed in accordance with user operations.

The interactive operation information in the IG stream has the following meaning. When the Java virtual machine instructs the playback control engine, which is proactive in the playback control, to start playing back a playlist in accordance with a request from an application, the Java virtual machine, after instructing the playback control engine to start the playback, returns a response to the application to notify that the playback of the playlist has started. That is to say, while the playback of the playlist by the playback control engine continues, the Java virtual machine does not enter the state waiting for end of execution. This is because the Java virtual machine is what is called an "event-driven-type" performer, and can perform operation while the playback control engine is playing back the playlist.

On the other hand, when, in the HDMV mode, the command interpreter instructs the playback control engine to play back a playlist, it enters the wait state until the execution of playback of the playlist ends. Accordingly, the command execution unit cannot execute an interactive process while the playback of the playlist by the playback control engine continues. The graphics decoder performs an interactive operation in place of the command interpreter. Thus, to cause the graphics decoder to perform the interactive operation, the IG stream is embedded with control information defining interactive operations for which buttons are used.

Display Modes Allowed for Each Stream Type

Different 3D display modes are allowed for each stream type. In the primary video stream 3D display mode, two output modes, namely the B-D presentation mode and the B-B presentation mode are allowed. The B-B presentation mode is allowed for the primary video stream only when the pop-up menu is on. The type of primary video stream when the playback is performed in the B-D presentation mode is called "stereoscopic B-D playback type". The type of primary video stream when the playback is performed in the B-B presentation mode is called "stereoscopic B-B playback type".

In the PG stream 3D display mode, three output modes, namely the B-D presentation mode, "1 plane+offset" mode, and "1 plane+zero offset" mode are allowed. The "1 plane+zero offset" mode is allowed for the PG stream only when the pop-up menu is on. The type of PG stream when the playback is performed in the B-D presentation mode is called "stereoscopic playback type". The type of PG stream and PG_text subtitle stream when the playback is performed in the "1 plane+offset" mode is called "1 plane+offset type". The type of PG stream and PG_text subtitle stream when the playback is performed in the "1 plane+zero offset" mode is called "1 plane+zero offset type".

In the text subtitle stream 3D display mode, two output modes, namely the "1 plane+offset" mode, and "1 plane+zero offset" mode are allowed. The "1 plane+zero offset" mode is allowed for the text subtitle stream only when the pop-up menu is on.

In the IG stream 3D display mode, three output modes, namely the B-D presentation mode, "1 plane+offset" mode, and "1 plane+zero offset" mode are allowed. The "1 plane+zero offset" mode is allowed for the IG stream only when the pop-up menu is on. It is supposed in the following description, except where otherwise mentioned, that the picture-in-picture cannot be used during playback in the 3D output mode. This is because each of the picture-in-picture and the 3D output mode requires two video planes for storing non-compressed picture data. It is also supposed in the following description, except where otherwise mentioned, that the sound mixing cannot be used in the 3D output mode.

Figure 5A:
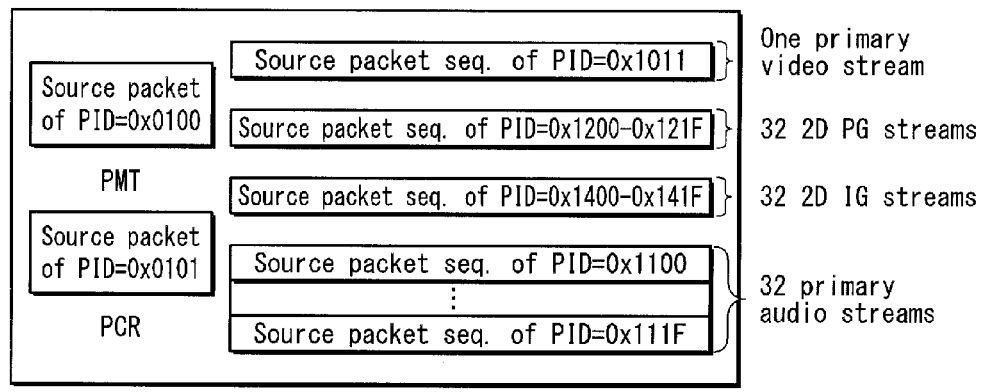
FIGS. 5A and 5B show the internal structures of the main TS and sub-TS.
Figure 5B:
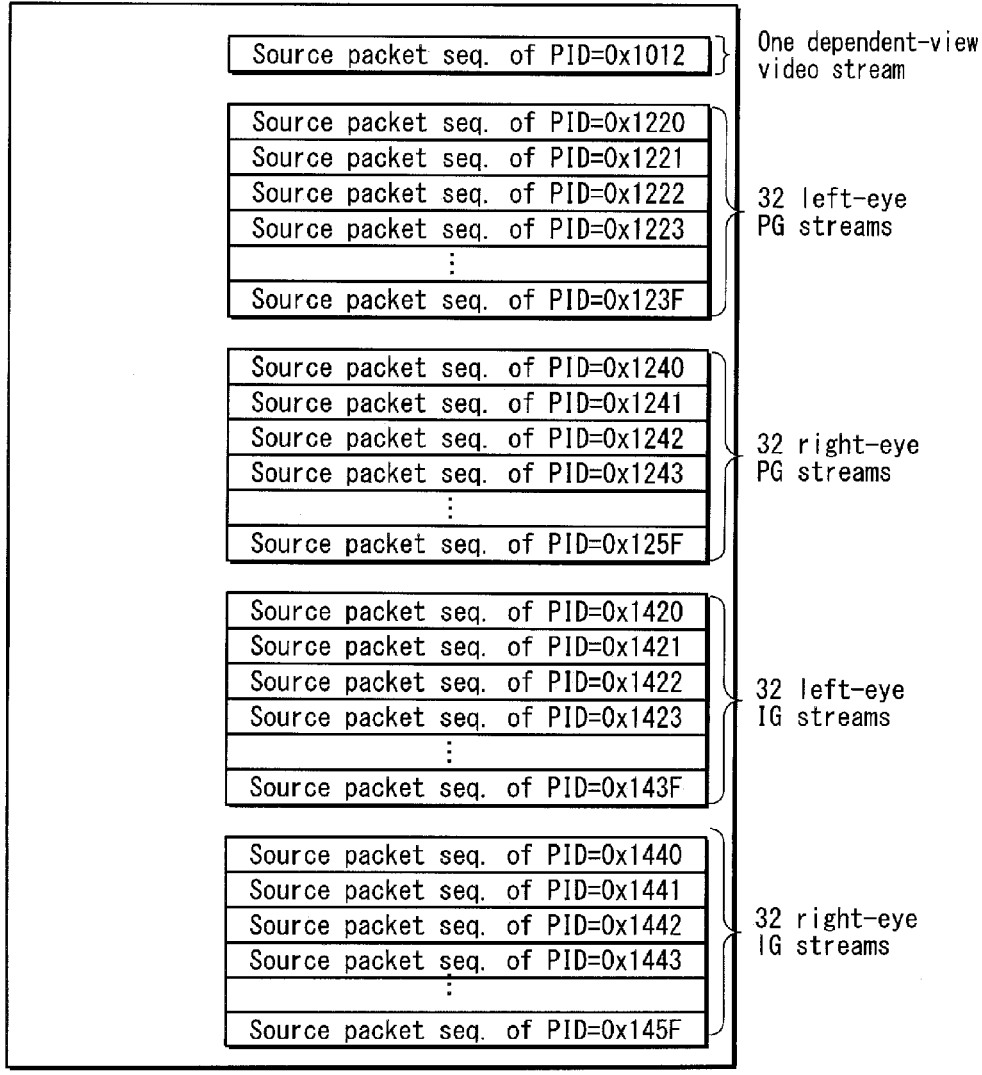

Next, the internal structures of the main TS and sub-TS will be described. FIGS. 5A and 5B show the internal structures of the main TS and sub-TS.

FIG. 5A shows the internal structure of the main TS. The main TS is composed of the following source packets.

A source packet having packet ID "0x0100" constitutes a Program_Map_Table (PMT). A source packet having packet ID "0x0101" constitutes a PCR.

A source packet sequence having packet ID "0x1011" constitutes the primary video stream.

Source packet sequences having packet IDs "0x1200" through "0x121F" constitute 32 2D PG streams.

Source packet sequences having packet IDs "0x1400" through "0x141F" constitute 32 2D IG streams.

Source packet sequences having packet IDs "0x1100" through "0x111F" constitute primary audio streams.

By specifying a packet identifiers of one of these source packets to the demultiplexing unit, it is possible to cause a desired elementary stream among a plurality of elementary streams multiplexed in the main transport streams to be demultiplexed and subjected to the decoder.

FIG. 5B shows the internal structure of the sub-TS. The sub-TS is composed of the following source packets.

A source packet sequence having packet ID "0x1012" constitutes the dependent-view video stream.

Source packet sequences having packet IDs "0x1220" through "0x123F" constitute 32 left-eye PG streams.

Source packet sequences having packet IDs "0x1240" through "0x125F" constitute 32 right-eye PG streams.

Source packet sequences having packet IDs "0x1420" through "0x143F" constitute 32 left-eye IG streams.

Source packet sequences having packet IDs "0x1440" through "0x145F" constitute 32 right-eye IG streams.

This completes the description of the stream file. Next is a detailed explanation of the playlist information.

Figure 6A:
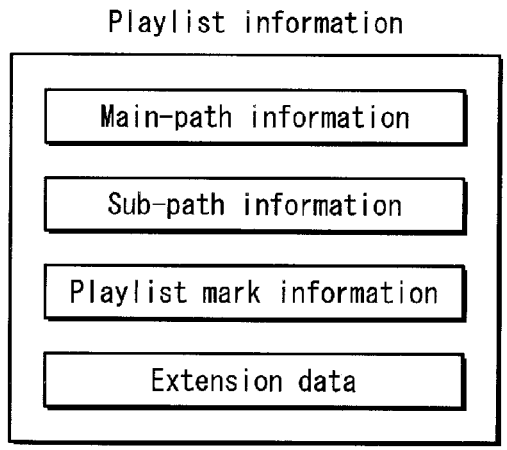
FIGS. 6A through 6D show the internal structures of the playlist information.

To define the above-described multi-path, the internal structures shown in FIGS. 6A through 6D are provided. FIG. 6A shows the internal structure of the playlist information. As shown in FIG. 6A, the playlist information includes main-path information, sub-path information, playlist mark information, and extension data. These constitutional elements will be described in the following.

Figure 6B:
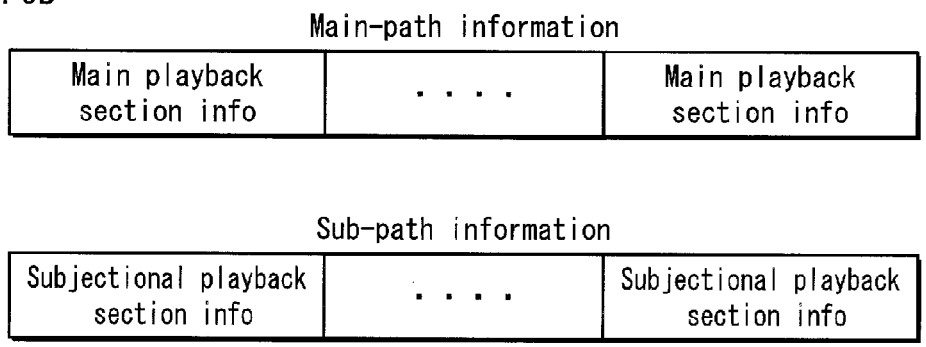

1) The main-path information is composed of one or more pieces of main playback section information. FIG. 6B shows the internal structures of the main-path information and the sub-path information. As shown in FIG. 6B, the main-path information is composed of one or more pieces of main playback section information, and the sub-path information is composed of one or more pieces of sub playback section information.

The main playback section information, called playitem information, is information that defines one or more logical playback sections by defining one or more pairs of an "in_time" time point and an "out_time" time point on the TS playback time axis. The playback device is provided with a playitem number register storing the playitem number of the current playitem. The playitem being played back currently is one of the plurality of playitems whose playitem number is currently stored in the playitem number register.

Figure 6C:
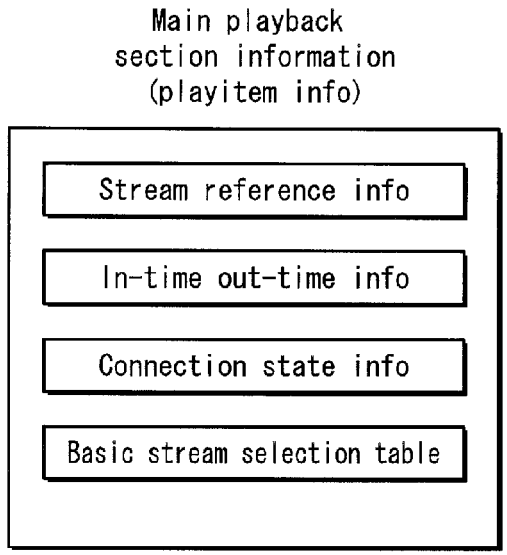

FIG. 6C shows the internal structure of the playitem information. As shown in FIG. 6C, the playitem information includes stream reference information, in-time out-time information, connection state information, and a basic stream selection table.

The stream reference information includes: "stream Information file name information (clip_Information_file_name)" that indicates the file name of the stream information file that manages, as "AV clips", the transport streams constituting the playitem; "clip encoding method identifier (clip_codec_identifier)" that indicates the encoding method of the transport stream; and "STC identifier reference (STC_ID_reference)" that indicates STC sequences in which in-time and out-time are set, among the STC sequences of the transport stream.

This completes description of the playitem information.

Figure 6D:
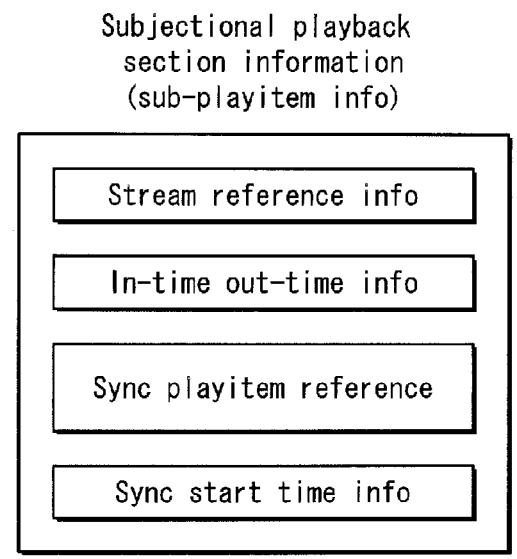

2) The sub playback section information, called sub-path information, is composed of a plurality of pieces of sub-playitem information. FIG. 6D shows the internal structure of the sub-playitem information. As shown in FIG. 6D, the sub-playitem information is information that defines playback sections by defining pairs of an "in_time" and an "out_time" on the STC sequence time axis, and includes stream reference information, in-time out-time information, sync playitem reference, and sync start time information.

The stream reference information, as in the playitem information, includes: "stream Information file name information", "clip encoding method identifier", and "STC identifier reference".

The "in-time out-time information (SubPlayItem_In_Time, SubPlayItem_Out_Time)" indicates the start point and end point of the sub-playitem on the STC sequence time axis.

The "sync playitem reference (Sync_Playitem_Id)" is information that uniquely indicates a playitem with which the sub-playitem is to be synchronized. The sub-playitem In_Time exists on playback time axis of the playitem specified by this sync playitem identifier.

The "sync start time information (Sync_Start_PTS_of Playitem)" indicates a time point on the STC sequence time axis of the playitem specified by the sync playitem identifier, that corresponds to the start point of the sub-playitem specified by the sub-playitem In_Time.

3) The playlist mark information is information that defines the mark point unique to the playback section. The playlist mark information includes an indicator indicating a playback section, a time stamp indicating the position of a mark point on the time axis of the digital stream, and attribute information indicating the attribute of the mark point.

The attribute information indicates whether the mark point defined by the playlist mark information is a link point or an entry mark.

The link point is a mark point that can be linked by the link command, but cannot be selected when the chapter skip operation is instructed by the user.

The entry mark is a mark point that can be linked by the link command, and can be selected even if the chapter skip operation is instructed by the user.

The link command embedded in the button information of the IG stream specifies a position for a random-access playback, in the form of an indirect reference via the playlist mark information.

<Basic Stream Selection Table (StreamNumber_table)>

The basic stream selection table shows a list of elementary streams that are to be played back in a monoscopic output mode, and the table, when a playitem containing the basic stream selection table itself becomes the current playitem among a plurality of playitems constituting the playlist, specifies, for each of the plurality of stream types, an ES which is permitted to be played back, among ESs multiplexed in AV clips referenced by the main path and the sub-path of the multi-path. Here, the stream types include: the primary video stream in the picture-in-picture; the secondary video stream in the picture-in-picture; the primary audio stream in the sound mixing; the secondary audio stream in the sound mixing; the PG_text subtitle stream; and the IG stream. It is possible to register an ES which is permitted to be played back, for each of these stream types. More specifically, the basic stream selection table is composed of sequences of stream registrations. Here, the stream registration is information that, when a playitem containing the basic stream selection table itself becomes the current playitem, indicates what kind of stream is the ES permitted to be played back. Each stream registration is associated with the stream number of the stream. Each stream registration has a data structure in which a pair of a stream entry and a stream attribute is associated with a logical stream number.

The stream number in the stream registration is represented by an integer such as "1", "2", or "3". The largest stream number for a stream type is identical with the number of streams for the stream type.

The playback device is provided with a stream number register for each stream type, and the current stream, namely the ES being played back currently, is indicated by the stream number stored in the stream number register.

A packet identifier of the ES to be played back is written in the stream entry. By making use of this structure in which a packet identifier of the ES to be played back can be written in the stream entry, the stream numbers included in the stream registrations are stored in the stream number registers of the playback device, and the playback device causes the PID filter thereof to perform a packet filtering based on the packet identifiers stored in the stream entries of the stream registrations. With this structure, TS packets in the ESs that are permitted to be played back according to the basic stream selection table are output to the decoder, so that the ESs are played back.

In the basic stream selection table, the stream registrations are arranged in an order of stream numbers. When there are a plurality of streams that satisfy the conditions: "playable by playback device"; and "the language attribute of the stream matches the language setting in the device", a stream corresponding to the highest stream number in the stream registration sequences is selected.

With this structure, when there is found a stream that cannot be played back by the playback device, among the stream registrations in the basic stream selection table, the stream is excluded from the playback. Also, when there are a plurality of streams that satisfy the conditions: "playable by playback device"; and "the language attribute of the stream matches the language setting in the device", the person in charge of authoring can convey the playback device how to select one with priority from among the plurality of streams.

It is judged whether there is a stream that satisfies the conditions: "playable by playback device"; and "the language attribute of the stream matches the language setting in the device". Also, a stream is selected from among a plurality of streams that satisfy the conditions. The procedure for the judgment and selection is called a "stream selection procedure". The stream selection procedure is executed when the current playitem is switched, or when a request to switch the stream is input by the user.

A sequential procedure for performing the above-described judgment and selection and setting a stream number in the stream number register of the playback device when a state change occurs in the playback device, such as when the current playitem is switched, is called "procedure to be executed at state change". Since the stream number registers are provided respectively in correspondence with the stream types, the above-described procedure is executed for each stream type.

A sequential procedure for performing the above-described judgment and selection and setting a stream number in the stream number register of the playback device when a request to switch the stream is input by the user is called "procedure at state change request".

A procedure for setting the stream number registers to the initial values of the stream registration sequences when a BD-ROM is loaded, is called "initialization".

Priorities are assigned evenly to the streams specified in the sub-playitem information and the streams specified in the playitem information, as indicated by the stream registration sequences in the basic stream selection table. As a result, even a stream not multiplexed with a video stream is targeted for selection as a stream to be played back in sync with the video stream, if the stream is specified by the sub-playitem information.

Furthermore, when playback device can play back a stream specified by the sub-playitem information, and when the priority of the stream specified by the sub-playitem information is higher than the priority of the graphics stream multiplexed with the video stream, the stream specified by the sub-playitem information is played back in place of the stream multiplexed with the video stream.

The following explains the use of the stream numbers recited in the basic stream selection table. The stream numbers recited in the basic stream selection table can be used as operands of the set stream command.

The set stream command is a command that instructs the playback device to change the current stream by setting the stream number specified by the operand into the stream number register as the current stream number. The set stream command is used by a command-based program when it causes the playback device to change the stream.

The set stream command can be used as an argument of the stream change UO or an argument of the set stream API, as well. The stream change UO is a user operation event that instructs the playback device to change the current stream by setting the stream number specified by the argument into the stream number register as the current stream number.

The set stream API is an API that instructs the playback device to change the current stream by setting the stream number specified by the argument into the stream number register as the current stream number. The set stream API is used by a program based on an object-oriented programming language when it causes the playback device to change the stream.

Figure 7A:
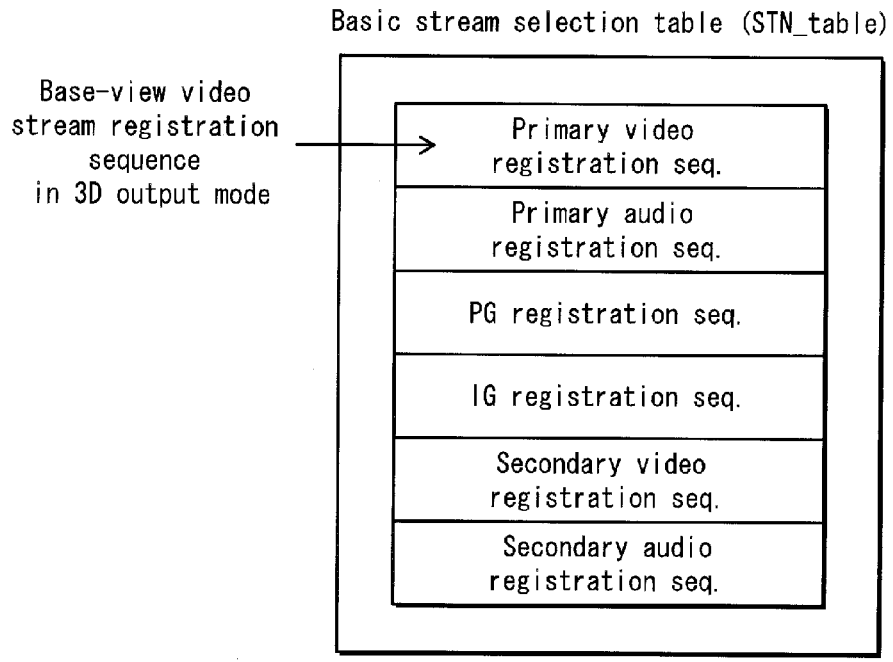
FIGS. 7A and 7B show one example of the basic stream selection table.
Figure 7B:
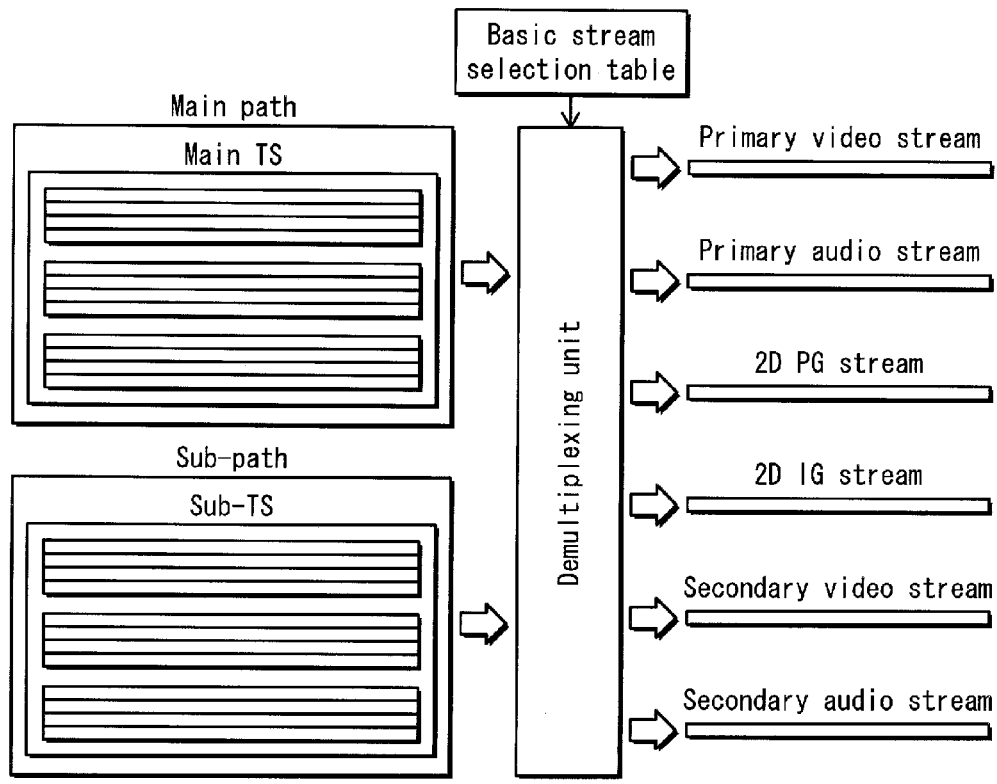

FIGS. 7A and 7B show one example of the basic stream selection table. FIG. 7A shows a plurality of stream registration sequences that are provided in the basic stream selection table when there are following stream types: primary video stream; primary audio stream; PG stream; IG stream; secondary video stream; and secondary audio stream. FIG. 7B shows the elementary streams that are demultiplexed from the main TS and the sub-TSs with use of the basic stream selection table. The left-hand side of FIG. 7B shows the main TS and the sub-TSs, the middle part of FIG. 7B shows the basic stream selection table and the demultiplexing unit, and the right-hand side of FIG. 7B shows the primary video stream, primary audio stream, PG stream, IG stream, secondary video stream, and secondary audio stream that are demultiplexed based on the basic stream selection table.

Next, the extension data will be described in detail.

When the playlist information refers to the MVC video stream, an extension stream selection table needs to be stored in a data block of extension data in the playlist information file.

When the playlist information refers to the MVC video stream on the disc, extension information of the sub-path information (sub-path block extension) needs to be stored in a data block of extension data in the playlist information file.

When a 2D playback device finds unknown extension data in the playlist file, the 2D playback device should disregard the extension data.

<Extension Stream Selection Table (StreamNumber_table_StereoScopic(SS))>

The extension stream selection table shows a list of elementary streams that are to be played back in a stereoscopic output mode, and is used together with the basic stream selection table only in the stereoscopic output mode. The extension stream selection table defines the elementary streams that can be selected when a playitem is played back or when a sub-path related to the playitem is played back.

The extension stream selection table indicates the elementary streams that are permitted to be played back only in the stereoscopic output mode, and includes stream registration sequences. Each piece of stream registration information in the stream registration sequences includes a stream number, and a stream entry and a stream attribute corresponding to the stream number. The extension stream selection table means an extension that is unique to the stereoscopic output mode. Therefore, a playlist for which each piece of playitem information is associated with the extension stream selection table (STN_table_SS) is called "3D playlist".

Each stream entry in the extension stream selection table indicates a packet identifier that is to be used in the demultiplexing by the playback device, when the playback device is in the stereoscopic output mode, and the corresponding stream number is set in the stream number register of the playback device. A difference from the basic stream selection table is that the stream registration sequences in the extension stream selection table are not targeted by the stream selection procedure. That is to say, the stream registration information in the stream registration sequences of the basic stream selection table is interpreted as the priorities of the elementary streams, and a stream number in any piece of stream registration information is written into the stream number register. In contrast, the stream registration sequences of the extension stream selection table are not targeted by the stream selection procedure, and the stream registration information of the extension stream selection table is used only for the purpose of extracting a stream entry and a stream attribute that correspond to a certain stream number when the certain stream number is stored in the stream number register.

Suppose that, when the output mode switches from the 2D output mode to the 3D output mode, the target stream selection table also switches from the basic stream selection table to the extension stream selection table. Then, the identity of the stream numbers may not be maintained, and the identity of the language attribute may be lost, as well.

Accordingly, the use of the extension stream selection table is restricted to the above-described one to maintain the identity of the stream attribute such as the language attribute.

The following explains the use of the stream numbers recited in the extension stream selection table. The stream numbers recited in the extension stream selection table can be used as operands of the set stream command and the set stereoscopic stream command.

The set stereoscopic stream command is a command that instructs the playback device to change the current stream by setting the stream number for stereoscopic viewing specified by the operand into the stream number register as the current stream number. The set stereoscopic stream command is used by a command-based program when it causes the playback device to change the stereoscopic stream.

The set stereoscopic stream command can be used as an argument of the stream change UO or an argument of the set stream API, as well.

The extension stream selection table is composed of stream registration sequences of the dependent-view streams, stream registration sequences of the PG streams, and stream registration sequences of the IG streams.

The stream registration sequences in the extension stream selection table are combined with the stream registration sequences of the same stream types in the basic stream selection table. More specifically, the dependent-view video stream registration sequences in the extension stream selection table are combined with the primary video stream registration sequences in the basic stream selection table; the PG stream registration sequences in the extension stream selection table are combined with the PG stream registration sequences in the basic stream selection table; and the IG stream registration sequences in the extension stream selection table are combined with the IG stream registration sequences in the basic stream selection table.

After this combination, the above-described procedure is executed onto the stream registration sequences in the basic stream selection table among the two tables after the combination.

FIG. 8 shows the internal structure of the extension stream selection table. The extension stream selection table is composed of: "length" which indicates the entire length of the extension stream selection table; "fixed offset during pop-up (Fixed_offset_during_Popup)"; and the stream registration sequences of each stream type corresponding to each playitem.

When there are N pieces of playitems identified as playitems #1-#N, stream registration sequences respectively corresponding to the playitems #1-#N are provided in the extension stream selection table. The stream registration sequences corresponding to each playitem are dependent-view stream registration sequence, PG stream registration sequence, and IG stream registration sequence.

The "Fixed_offset_during_Popup" is a fixed offset during pop-up, and controls the playback type of the video or PG_text subtitle stream when the pop-up menu is set to "on" in the IG stream. The "Fixed_offset_during_Popup" field is set to "on" when the "user_interface_model" field in the IG stream is on, namely, when the user interface of the pop-up menu is set to "on". Also, the "Fixed_offset_during_Popup" field is set to "off" when the "user_interface_model" field in the IG stream is off, namely, when the "AlwaysON" user interface is set.

When the fixed offset during pop-up is set to "0", namely, when the pop-up menu is set to "off" in the user interface of the IG stream, the video stream is in the B-D presentation mode, the stereoscopic PG stream becomes the stereoscopic playback type, and during playback in the "1 plane+offset" mode, the PG_text subtitle stream is in the "1 plane+offset" mode.

When the fixed offset during pop-up is set to "1", namely, when the pop-up menu is set to "on" in the IG stream, the video stream is in the B-B presentation mode, the stereoscopic PG stream is in the "1 plane+offset" mode, and the PG stream for "1 plane+offset" is played back as the "1 plane+zero offset" playback type.

In the "1 plane+offset" mode, the PG_text subtitle stream becomes "1 plane+zero offset".

The "offset sequence number information" ("number_of_offset_sequence" in the drawing) indicates the number of offset sequences in the dependent-view stream.

The value of the "offset sequence number information in the extension stream selection table is identical with the number of offset sequences that is included in the dependent-view stream.

FIGS. 9A through 9C shows the stream registration sequences in the extension stream selection table.

FIG. 9A shows the internal structure of the dependent-view video stream registration sequence. The dependent-view video stream registration sequence is composed of v(x) pieces of SS_dependent_view_blocks. Here, "v(x)" represents the number of primary video streams that are permitted to be played back in the basic stream selection table of the playitem information #x. The lead lines in the drawing indicates the close-up of the internal structure of the dependent-view video stream registration sequence. As indicated by the lead lines, the "SS_dependent_view_block" is composed of the stream number, stream entry, stream attribute, and the number of offset sequences (number_of_offset_sequence).

The stream entry includes: a sub-path identifier reference (ref_to_Subpath_id) specifying a sub-path to which the playback path of the dependent-view video stream belongs; a stream file reference (ref_to_subClip_entry_id) specifying a stream file in which the dependent-view video stream is stored; and a packet identifier (ref_to_stream_PID_subclip) of the dependent-view video stream in this stream file.

The "stream attribute" includes the language attribute of the dependent-view video stream.

The "the number of offset sequences (number_of_offset_sequence)" indicates the number of offsets provided in the dependent-view video stream.

The dependent-view video stream registration sequences shown in FIG. 9A indicate that a plurality of pieces of stream registration information are provided in correspondence with a plurality of dependent-view video streams. However, FIG. 9A merely illustrates the data structure thereof. In the actuality, since there is only one base-view video stream normally, the number of pieces of stream registration information for the dependent-view video stream is one.

FIG. 9B shows the internal structure of the PG stream registration sequence. The PG stream registration sequence is composed of P(x) pieces of stream registration information. Here, "P(x)" represents the number of PG streams that are permitted to be played back in the basic stream selection table of the playitem information #x.

The lead lines in the drawing indicates the close-up of the common internal structure of the PG stream registration sequences.

The "PG text subtitle offset sequence ID reference information (PGtextST_offset_sequence_id_ref)" is PG_text subtitle stream offset sequence reference information, and indicates an offset sequence with respect to the PG_text subtitle stream in the "1 plane+offset" mode.

The offset metadata is supplied by the access unit of the dependent-view video stream. The playback device should apply the offset, which is supplied by this field, to the presentation graphics (PG) plane of the "1 plane+offset" mode type.

When the field is an undefined value (FF), the playback device does not apply this offset to the PG stream plane memory.

The "stereoscopic PG presence/absence flag (is_SS_PG)" indicates the validity and presence of the following in the PG stream: the left-eye IG stream entry; the right-eye IG stream entry; and the stream attributes. When the structure is absent in the stereoscopic PG stream, this field should be set to "0"; and when the structure is present in the stereoscopic PG stream, this field should be set to "1".

The "left-eye stream entry" includes: a sub-path identifier reference (ref_to_Subpath_id) specifying a sub-path to which the playback path of the left-eye PG stream belongs; a stream file reference (ref_to_subClip_entry_id) specifying a stream file in which the left-eye PG stream is stored; and a packet identifier (ref_to_stream_PID_subclip) of the left-eye PG stream in this stream file.

The "right-eye stream entry" includes: a sub-path identifier reference (ref_to_Subpath_id) specifying a sub-path to which the playback path of the right-eye PG stream belongs; a stream file reference (ref_to_subClip_entry_id) specifying a stream file in which the right-eye PG stream is stored; and a packet identifier (ref_to_stream_PID_subclip) of the right-eye PG stream in this stream file. When the stream file referenced by the "stream_entry_for_dependent_view" in the stream registration information in the extension stream selection table is different from the stream file referenced by the stream entry in the basic stream selection table, a stream file storing the right-eye PG stream needs to be read again.

The "common stream attribute" includes language attributes of the left-eye PG stream and the right-eye PG stream.

The "stereoscopic PG text subtitle offset sequence ID reference information (SS_PG_textST_offset_sequence_id_ref)" is reference information for referencing an offset sequence for the PG_text subtitle stream, and indicates the offset sequence for the PG_text subtitle stream. The playback device should apply the offset, which is supplied by this field, to the PG plane.

When the field is an undefined value (FF), the playback device does not apply this offset to the PG stream plane memory.

FIG. 9C shows the internal structure of the IG stream registration sequence. The IG stream registration sequence is composed of I(x) pieces of stream registration information. Here, "I(x)" represents the number of IG streams that are permitted to be played back in the basic stream selection table of the playitem information #x. The lead lines in the drawing indicates the close-up of the common internal structure of the IG stream registration sequences.

The "IG offset sequence ID reference information (IG_offset_sequence_id_ref)" is an interactive graphics offset sequence reference, and is a reference to the sequence ID of the IG stream in the "1 plane+offset" mode. This value indicates an offset sequence ID defined for the offset sequence. As described above, the offset metadata is supplied by the dependent-view video stream. The playback device should apply the offset, which is supplied by this field, to the IG stream of the "1 plane+offset" mode type.

When the field is an undefined value (FF), the playback device does not apply this offset to the interactive graphics (IG) stream plane.

The "B-B mode offset direction information (IG_Plane_offset_direction_during_BB_video)" is the user interface of the pop-up menu in the B-B presentation mode, and indicates the offset direction in the IG plane in the "1 plane+offset" mode while the IG stream is played back.

When this field is set to "0", it is the front setting. That is to say, the plane memory exists between the television and the viewer, and the plane is shifted rightward during the left-view period, and the plane is shifted leftward during the right-view period.

When this field is set to a value "1", it is the behind setting. That is to say, the plane memory exists behind the television or the screen, and the left plane is shifted rightward, and the right plane is shifted leftward.

The "B-B mode offset value information (IG_Plane_offset_value_during_BB_video)" indicates, in units of pixels, the offset value of the IG plane in the "1 plane+offset" mode while the IG stream is played back by the user interface of the pop-up menu in the B-B presentation mode.

The "stereoscopic IG presence/absence flag (is_SS_IG)" indicates the validity and presence of the following in the IG stream: the left-eye IG stream entry; the right-eye IG stream entry; and the stream attributes. When the data structure is absent in the stereoscopic IG stream, this field should be set to value "0"; and when the data structure is present in the stereoscopic IG stream, this field should be set to value "1".

The "left-eye stream entry" includes: a sub-path identifier reference (ref_to_Subpath_id) specifying a sub-path to which the playback path of the left-eye IG stream belongs; a stream file reference (ref_to_subClip_entry_id) specifying a stream file in which the left-eye IG stream is stored; and a packet identifier (ref_to_stream_PID_subclip) of the left-eye IG stream in this stream file.

The "right-eye stream entry" includes: a sub-path identifier reference (ref_to_Subpath_id) specifying a sub-path to which the playback path of the right-eye IG stream belongs; a stream file reference (ref_to_subClip_entry_id) specifying a stream file in which the right-eye IG stream is stored; and a packet identifier (ref_to_stream_PID_subclip) of the right-eye IG stream in this stream file. When the stream file referenced by the "stream_entry_for_dependent_view" in the stream registration information in the extension stream selection table is different from the stream file referenced by the stream entry in the basic stream selection table, a stream file storing the right-eye IG stream needs to be read.

The "common stream attribute" includes language attributes of the left-eye IG stream and the right-eye IG stream.

The "stereoscopic IG offset sequence ID reference information" is a reference to the offset sequence ID for the stereoscopic-type IG stream, and indicates the offset sequence for the offset metadata of the dependent-view video stream. The playback device should apply the offset, which is supplied by this field, to the stereoscopic-type IG plane.

When the field is an undefined value (FF), the playback device does not apply this offset to the IG plane.

The PG text subtitle stream offset sequence reference information and the IG stream offset sequence reference information are written in the stream registration information in correspondence with stream numbers. Therefore, when the stream selection procedure is executed due to a change of the device state or occurrence of a request for stream change and a stream number corresponding to the language setting on the device side is set in the stream number register, an offset sequence indicated by a reference corresponding to the new stream number is supplied from the video decoder to the shift unit. With this structure, an optimum offset sequence corresponding to the language setting in the playback device is supplied to the shift unit, thus it is possible to set the depth of the graphics in "1 plane+offset" mode to an optimum value corresponding to the language setting in the playback device.

The following describes restrictions for the extension stream selection table.

The stream entry in the stereoscopic dependent-view block should not change in the playlist.

When the type of the stream entry in the stereoscopic dependent-view block is the ES type (stream type=2) that is used by the sub-path, the sub-path ID reference and the sub-clip entry ID reference (ref_to_subclip_entry_id) do not change in the playlist.

Only two types of elementary streams are permitted to be the types of the stream entry, stream entry for the base view, and stream entry for the dependent view. The two types are: ES (stream type=1) in the AV clip used by the playitem; and ES (stream type=2) in the AV clip used by the sub-path.

In the stereoscopic dependent-view block, the stream encoding method in the stream attribute is set to "0x20".

FIG. 10 shows what elementary streams are demultiplexed from the main TS and the sub-TSs with use of the basic stream selection table and the extension stream selection table.

The middle part of FIG. 10 shows the demultiplexing unit. The upper part of FIG. 10 shows the combination of the basic stream selection table and the extension stream selection table. The left-hand side of FIG. 10 shows the main TS and the sub-TSs, and the right-hand side of FIG. 10 shows the demultiplexed base-view video stream, dependent-view video stream, left-eye PG stream, right-eye PG stream, left-eye IG stream, right-eye IG stream, and primary audio stream.

Figure 11:
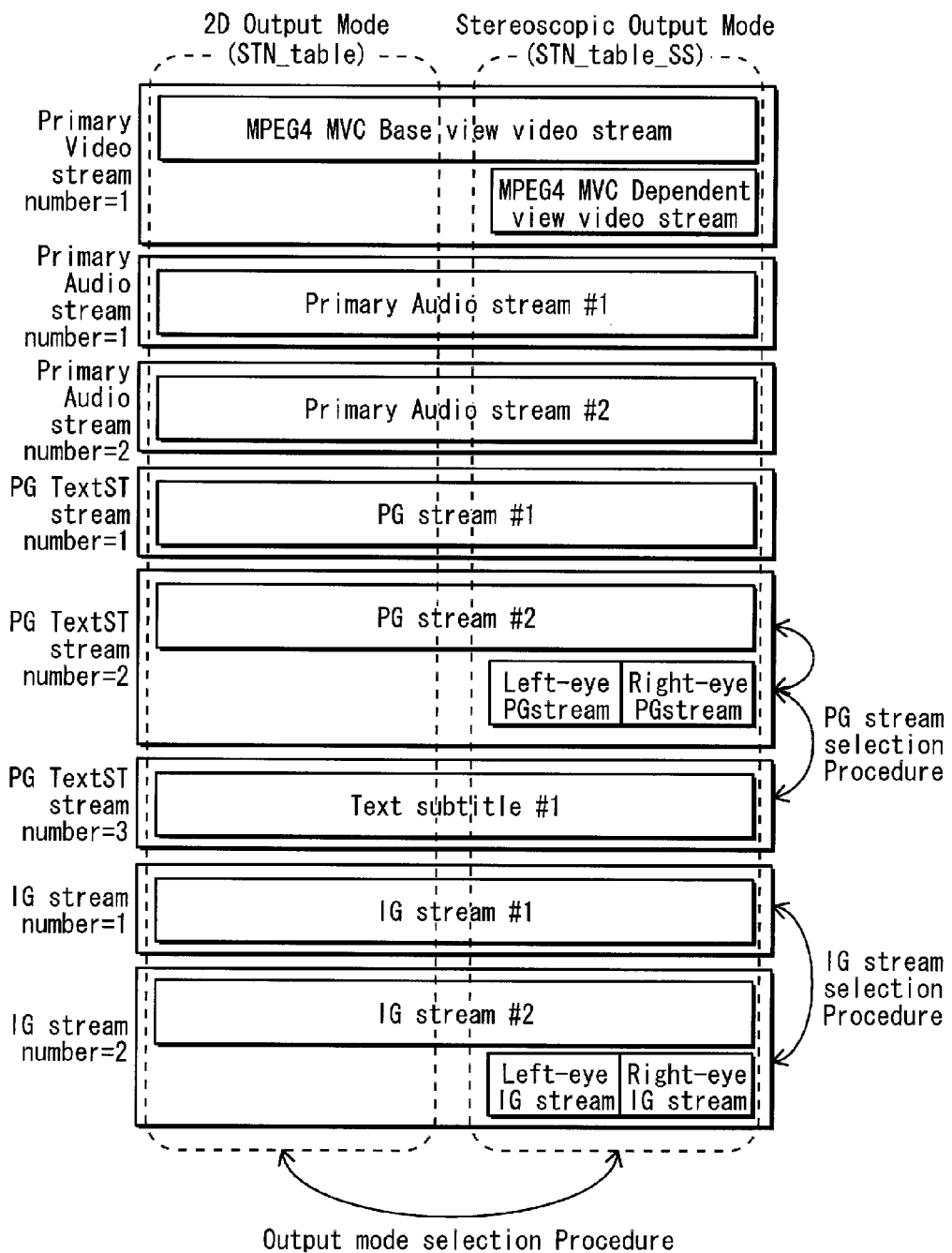
FIG. 11 shows stream numbers to be assigned in the 2D output mode and the 3D output mode.

FIG. 11 shows stream numbers to be assigned in the 2D output mode and the 3D output mode.

The vertical column on the left-hand side of FIG. 11 shows the following stream numbers: primary video stream #1; primary audio streams #1 and #2; PG text subtitle streams #1, #2 and #3; and IG streams #1 and #2.

The element streams arranged on the left-hand side of FIG. 11, enclosed by a dotted line, are element streams that are targeted for demultiplexing only in the 2D output mode, and that are permitted by the stream selection table (STN_table) to be played back.

The element streams arranged on the right-hand side of FIG. 11, enclosed by a dotted line, are element streams that are targeted for demultiplexing only in the 3D output mode, and that are permitted by the extension stream selection table (STN_table_SS) to be played back.

The element streams enclosed by the combined dotted lines of the left-hand side and right-hand side are element streams that are targeted for demultiplexing in both the 2D and the 3D output modes.

With regard to the video stream #1, the MPEG4-MVC base-view video stream is enclosed by the combined dotted lines of the left-hand side and the right-hand side. This indicates that the MPEG4-MVC base-view video stream is targeted to be played back in both the 2D and the 3D output modes. On the other hand, the MPEG4-MVC dependent-view video stream is enclosed by only the dotted line of the right-hand side. This indicates that the MPEG4-MVC dependent-view video stream is to be played back only in the 3D output mode.

With regard to the primary audio streams #1 and #2, they are both enclosed by the combined dotted lines of the left-hand side and the right-hand side. This indicates that the audio streams #1 and #2 are targeted to be played back in both the 2D and the 3D output modes.

With regard to the PG text subtitle streams, the PG text subtitle streams #1 and #2 are 2D PG streams, and are enclosed by the combined dotted lines of the left-hand side and the right-hand side, indicating that they are targeted to be played back in both the 2D and the 3D output modes. On the other hand, the left-eye PG stream and the right-eye PG stream are enclosed by only the dotted line of the right-hand side. This indicates that the left-eye PG stream and the right-eye PG stream are to be played back only in the 3D output mode.

With regard to the IG streams, the IG streams #1 and #2 are 2D IG streams, and are enclosed by the combined dotted lines of the left-hand side and the right-hand side, indicating that they are targeted to be played back in both the 2D and the 3D output modes. On the other hand, the left-eye IG stream and the right-eye IG stream are enclosed by only the dotted line of the right-hand side. This indicates that the left-eye IG stream and the right-eye IG stream are to be played back only in the 3D output mode.

As understood from the above description, in the 3D output mode, the dependent-view video stream is added to the target for playback regarding the stream type "video stream".

It is also understood that, in the 3D output mode, the left-eye PG stream and the right-eye PG stream are added to the target for playback regarding the stream type "PG stream", and the left-eye IG stream and the right-eye IG stream are added to the target for playback regarding the stream type "IG stream". The reason for adding the left-eye PG stream and the right-eye PG stream to the target for playback is that the left-eye PG stream and the right-eye PG stream are used to realize the stereoscopic playback in the 3D output mode. The reason for adding the left-eye IG stream and the right-eye IG stream to the target for playback is that the left-eye IG stream and the right-eye IG stream are used to realize the stereoscopic playback in the 3D output mode.

This completes the description of the recording medium. In the following, the playback device will be described in detail.

Figure 12:
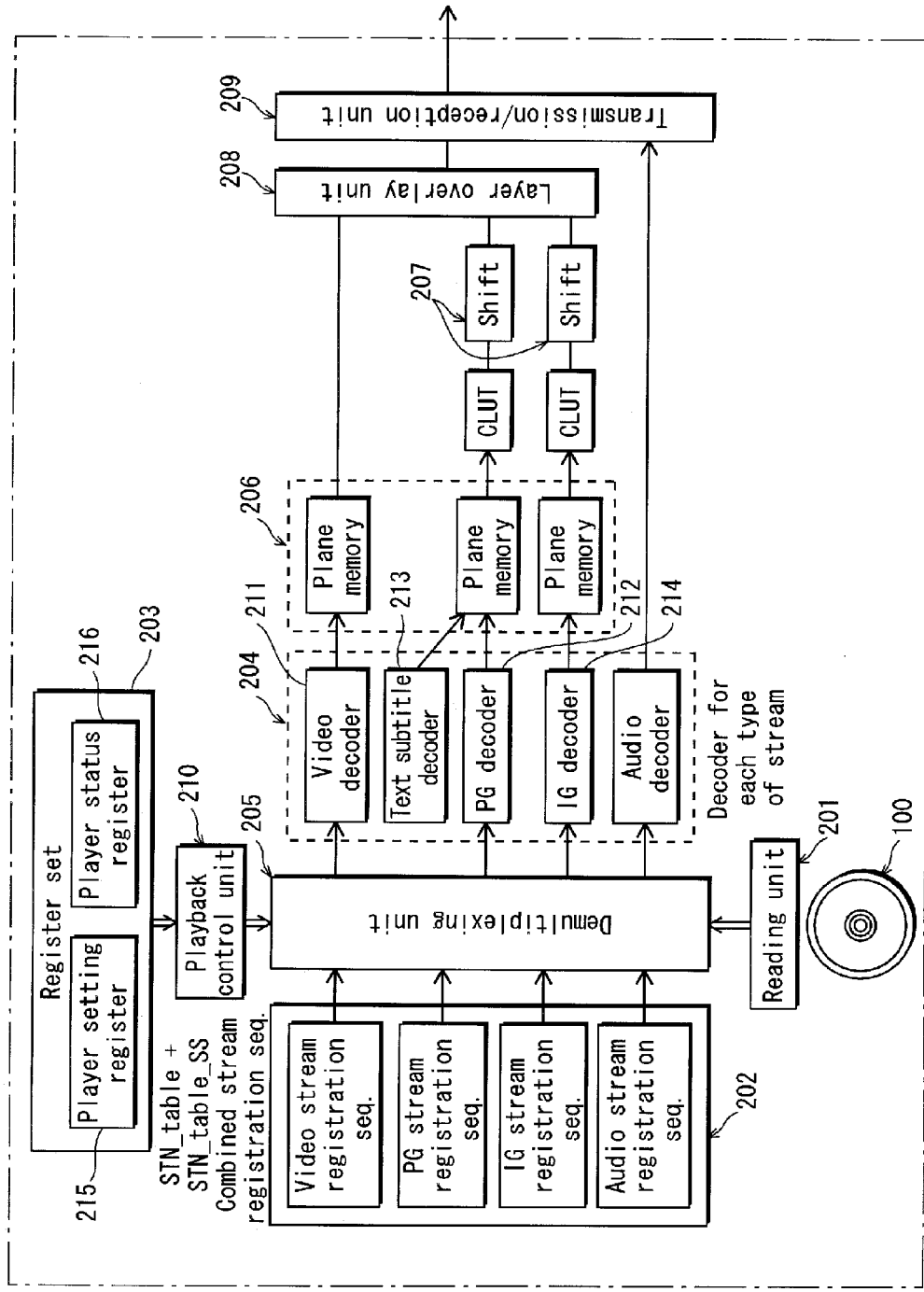
FIG. 12 shows the internal structure of the playback device.

FIG. 12 shows the internal structure of the playback device. As shown in FIG. 12, the playback device includes a reading unit 201, a memory 202, a register set 203, a decoder 204, a demultiplexing unit 205, a plane memory set 206, a shift unit 207, a layer overlay unit 208, a transmission/reception unit 209, and a playback control unit 210. The internal structure of FIG. 12 is composed of the minimum structural elements that are required to realize the playback device provided with a problem solving means. A more detailed internal structure will be described in a later embodiment.

The reading unit 201 reads out, from the recording medium, the index table, program file, playlist information file, stream information file, and stream file. When reading the stereoscopic interleaved stream file, the reading unit 201 performs a process in which it divides the stereoscopic interleaved stream file into (i) an ATC sequence 1 corresponding to the main TS and (ii) an ATC sequence 2 corresponding to the sub-TS, by using (a) the Extent start point information of the clip base information in the 3D clip information file and (b) the Extent start point information in the clip dependent information, and stores the ATC sequences 1 and 2 into different read buffers. This division is realized by repeating two processes: the first process of extracting, from the stereoscopic interleaved stream file, as many source packets as the number of packets corresponding to the source packet number indicated by the Extent start point information in the clip dependent information, and adding the extracted source packets into the ATC sequence 1; and the second process of extracting, from the stereoscopic interleaved stream file, as many source packets as the number of packets corresponding to the source packet number indicated by the Extent start point information in the clip base information, and adding the extracted source packets into the ATC sequence 2.

The memory 202 stores a combined stream registration sequence that is obtained by combining the extension stream selection table and the basic stream selection table included in the playlist information.

The player number register 203 includes a plurality of registers that are required for the playback device to operate.

The decoder 204 is composed of a video decoder 211, a PG decoder 212, a text subtitle decoder 213, an IG decoder 214, and an audio decoder which correspond to respective stream types.

The demultiplexing unit 205 is provided with: a source depacketizer for converting the source packets into TS packets; and a PID filter for performing the packet filtering. The demultiplexing unit 205 converts source packets having packet identifiers written in stream entries of the basic stream selection table in the 3D playlist information into TS packets, and outputs the TS packets to the decoder. Also, the demultiplexing unit 207 converts source packets having packet identifiers written in stream entries of the stereoscopic stream selection table in the 3D playlist information into TS packets, and outputs the TS packets to the decoder. Which packet identifiers, among a plurality of packet identifiers written in a plurality of stream entries of the basic and stereoscopic stream selection tables, are to be used is determined in accordance with the setting in the stream number register among the player setting registers. The stream number register is a register for storing the current stream number.

The plane memory set 206 is composed of a plurality of plane memories.

These plane memories constitute a layer model, and the data stored in each plane memory are used to overlay the layers with each other. The plane memory set includes a left-eye plane memory and a right-eye plane memory. Respective non-compressed picture data obtained by decoding the base-view and dependent-view components of each access unit are written into the left-eye and right-eye plane memories. The writing is performed each time the playback start time indicated by the presentation time stamp of each access unit is reached.

To which of the left-eye plane memory and the right-eye plane memory the picture data after decoding is to be written is determined in accordance with the base-view indicator in the playlist information. When the base-view indicator specifies the base-view video stream as "for the left eye", the picture data of the base-view video stream is written to the left-eye plane memory, and the picture data of the dependent-view video stream is written to the right-eye plane memory.

When the base-view indicator specifies the base-view video stream as "for the right eye", the picture data of the base-view video stream is written to the right-eye plane memory, and the picture data of the dependent-view video stream is written to the left-eye plane memory. These view components are output to the display device in sequence. More specifically, in one frame period, the picture data stored in the left-eye plane memory and the picture data stored in the right-eye plane memory are output simultaneously.

The shift unit 207 shifts the pixel coordinates.

The layer overlay unit 208 overlays the layers in the plurality of plane memories.

The transmission/reception unit 209 transits to a data transfer phase via a mutual authentication phase and a negotiation phase, when playback device is connected with another device in the home theater system via an interface. The transmission/reception unit 209 performs data transfer in the transfer phase.

In the negotiation phase, the capabilities of the partner device (including the decode capability, playback capability, and display frequency) are grasped, and the capabilities are set in the player setting register, so that the transfer method for the succeeding data transfers is determined. The negotiation phase includes a mutual authentication phase in which each of the devices confirms the authenticity of the other device. After the negotiation phase, one line of the pixel data in the non-compression/plaintext format in the picture data after the layer overlaying is transferred to the display device at a high transfer rate in accordance with the horizontal sync period of the display device. On the other hand, in the horizontal and vertical blanking intervals, audio data in the non-compression/plaintext format is transferred to other devices (including an amplifier and a speaker as well as the display device) connected with the playback device. With this structure, the devices such as the display device, amplifier and speaker can receive the picture data and audio data both in the non-compression/plaintext format, and a reproduced output is achieved. Further, when the partner device has the decode capability, a pass-through transfer of the video and audio streams is possible. In the pass-through transfer, it is possible to transfer the video stream and audio stream in the compressed/encrypted format, as they are.

The playback control unit 210 executes a random access from an arbitrary time point on the time axis of the video stream. More specifically, when it is instructed to play back from an arbitrary time point on the time axis of the video stream, the playback control unit 210 search for a source packet number of an access unit corresponding to the arbitrary time point, by using a normal entry map in the 3D clip information file and a stereoscopic entry map. The access unit includes a pair of a view component of the base-view video stream and a view component of the dependent-view video stream, and this searching identifies a source packet number of a source packet storing an access unit delimiter for the access unit. Reading from the source packet number and decoding enable a random access to be performed. When a 3D playlist is to be played back, random accesses to the main TS and the sub-TS are executed by using the in-time and the out-time defined in the main-path information and the in-time and the out-time defined in the sub-path information of the 3D playlist information, to start the playback of the playlist.

The video decoder 211 is a representative decoder among the decoders constituting the decoder set 204. The video decoder 211 preloads view components that constitute the dependent-view video stream, and decodes view components of a picture type for which the Instantaneous Decoder Refresh (IDR) at the start of the closed GOP in the base-view video stream is intended (IDR type). In this decoding, all the coded data buffers and decode data buffers are cleared. After decoding the view components of the IDR type in this way, (i) view components following the base-view video stream compress-encoded based on the correlation with these view components and (ii) view components of the dependent-view video stream, are decoded. Non-compressed picture data is obtained by this decoding of the view components. The obtained non-compressed picture data is stored in the decode data buffer to be used as the reference picture.

By using the reference picture, the motion compensation is performed onto (i) view components following the base-view video stream and (ii) view components of the dependent-view video stream. Non-compressed picture data with regard to (i) view components following the base-view video stream and non-compressed picture data with regard to (ii) view components of the dependent-view video stream are obtained by the motion compensation. The obtained non-compressed picture data are stored in the decode data buffer to be used as reference pictures. The above-described decoding is performed each time the decode start time indicated in the decode time stamp of each access unit is reached.

The following describes the PG decoder 212, text subtitle decoder 213, and IG decoder 214, and the internal structures of the streams that are to be decoded by these decoders.

For the PG stream: the decoder structure is "1 decoder+1 plane" when the "1 plane+offset" method is adopted; and the decoder structure is "2 decoders+2 planes" when the 3D-LR method is adopted.

Similarly, for the IG stream: the decoder structure is "1 decoder+1 plane" when the "1 plane+offset" method is adopted; and the decoder structure is "2 decoders+2 planes" when the 3D-LR method is adopted.

For the text subtitle stream for which the 3D-LR method cannot be adopted: the decoder structure is "1 decoder+1 plane" when the "1 plane+offset" method is adopted.

First, the internal structure of the PG stream, and the internal structure of the PG decoder for decoding the PG stream will be described.

Each of the left-eye PG stream and the right-eye PG stream includes a plurality of display sets. The display set is a set of functional segments that constitute one screen display. The functional segments are processing units that are supplied to the decoder while they are stored in the payloads of the PES packets which each have the size of approximately 2 KB, and are subjected to the playback control with use of the DTSs and PTSs.

The display set falls into the following types.

A. Epoch-Start Display Set

The epoch-start display set is a set of functional segments that start the memory management by resetting the composition buffer, code data buffer, and graphics plane in the graphics decoder. The epoch-start display set includes all functional segments required for composition of the screen.

B. Normal-Case Display Set

The normal-case display set is a display set that performs the composition of the screen while continuing the memory management of the composition buffer, code data buffer, and graphics plane in the graphics decoder. The normal-case display set includes functional segments that are differentials from the preceding display set.

C. Acquisition-Point Display Set

The acquisition-point display set is a display set that includes all functional segments required for composition of the screen, but does not reset the memory management of the composition buffer, code data buffer, and graphics plane in the graphics decoder. The acquisition-point display set may include functional segments that are different from those in the previous display set.

D. Epoch-Continue Display Set

The epoch-continue display set is a display set that continues the memory management of the composition buffer, code data buffer, and graphics plane in the playback device as it is when the connection between a playitem permitting the playback of the PG stream and a playitem immediately before the playitem is the "seamless connection" (CC=5) that evolves a clean break. In this case, the graphics objects obtained in the object buffer and the graphics plane are kept to be present in the object buffer and the graphics plane, without being discarded.

Certain time points on the playback time axis of the STC sequence are assigned to the start point and end point of these display sets, and the same times are assigned to the left-eye view and to the right-eye view. Also, for the left-eye PG stream and the right-eye PG stream, the types of the display sets that are present on the same time point on the time axis are the same. That is to say, when the display set on the left-eye side is the epoch-start display set, the display set on the right-eye side that is at the same time point on the time axis of the STC sequence is the epoch-start display set.

Further, when the display set on the left-eye side is the acquisition-point display set, the display set on the right-eye side that is at the same time point on the time axis of the STC sequence is the acquisition-point display set.

Each display set includes a plurality of functional segments. The plurality of functional segments include the following.

(1) Object Definition Segment

The object definition segment is a functional segment for defining the graphics object. The object definition segment defines the graphics object by using a code value and a run length of the code value.

(2) Pallet Definition Segment

The pallet definition segment includes pallet data that indicates correspondence among each code value, brightness, and red color difference/blue color difference. The same correspondence among the code value, brightness, and color difference is set in both the pallet definition segment of the left-eye graphics stream and the pallet definition segment of the right-eye graphics stream.

(3) Window Definition Segment

The window definition segment is a functional segment for defining a rectangular frame called "window" in the plane memory that is used to extend the non-compressed graphics object onto the screen. The drawing of the graphics object is restricted to the inside of the plane memory, and the drawing of the graphics object is not performed outside the window.

Since a part of the plane memory is specified as the window for displaying the graphics, the playback device does not need to perform the drawing of the graphics for the entire plane. That is to say, the playback device only needs to perform the graphics drawing onto the window that has a limited size. The drawing of the part of the plane for display other than the window can be omitted. This reduces the load of the software on the playback device side.

(4) Screen Composition Segment

The screen composition segment is a functional segment for defining the screen composition using the graphics object, and includes a plurality of control items for the composition controller in the graphics decoder. The screen composition segment is a functional segment that defines in detail the display set of the graphics stream, and defines the screen composition using the graphics object. The screen composition falls into the types such as Cut-In/-Out, Fade-In/-Out, Color Change, Scroll, and Wipe-In/-Out. With use of the screen composition defined by the screen composition segment, it is possible to realize display effects such as deleting a subtitle gradually, while displaying the next subtitle.

(5) End Segment

The end segment is a functional segment that is located at the end of a plurality of functional segments belonging to one display set. The playback device recognizes a series of segments from the screen composition segment to the end segment as the functional segments that constitute one display set.

In the PG stream, the start time point of the display set is identified by the DTS of the PES packet storing the screen composition segment, and the end time point of the display set is identified by the PTS of the PES packet storing the screen composition segment.

The left-eye graphics stream and the right-eye graphics stream are packetized elementary streams (PES). The screen composition segment is stored in the PES packet. The PTS of the PES packet storing the screen composition segment indicates the time when the display by the display set to which the screen composition segment belongs should be executed.

The value of the PTS of the PES packet storing the screen composition segment is the same for both the left-eye video stream and the right-eye video stream.

Decoder Models of PG Decoder

The PG decoder includes: a "coded data buffer" for storing functional segments read from the PG stream; a "stream graphics processor" for obtaining a graphics object by decoding the screen composition segment; an "object buffer" for storing the graphics object obtained by the decoding; a "composition buffer" for storing the screen composition segment; and a "composition controller" for decoding the screen composition segment stored in the composition buffer, and performing a screen composition on the graphics plane by using the graphics object stored in the object buffer, based on the control items included in the screen composition segment.

A "transport buffer" for adjusting the input speed of the TS packets constituting the functional segments is provided at a location before the graphics plane.

Also, at locations after the graphics decoder, a "graphics plane", a "CLUT unit" for converting the pixel codes constituting the graphics object stored in the graphics plane into values of brightness/color difference based on the pallet definition segment, and a "shift unit" for the plane shift are provided.

The pipeline in the PG stream makes it possible to simultaneously executes the following processes: the process in which the graphics decoder decodes an object definition segment belonging to a certain display set and writes the graphics object into the graphics buffer; and the process in which a graphics object obtained by decoding an object definition segment belonging to a preceding display set is written from the object buffer to the plane memory.

FIGS. 13A and 13B show the internal structure of the PG decoder. FIG. 13A shows a decoder model for displaying data in the "1 plane+offset" mode. FIG. 13B shows a decoder model for displaying data in the LR mode.

In FIGS. 13A and 13B, the PG decoder itself is represented by a frame drawn by the solid line, and a portion that follows the PG decoder is represented by a frame drawn by the chain line.

FIG. 13A shows that the PG decoder has "1 decoder" structure, and the graphics plane has "1 plane" structure. However, the output of the graphics plane branches to the left-eye output and the right-eye output. Thus the left-eye output and the right-eye output are each provided with a shift unit.

FIG. 13B shows that two series of "transport buffer"-"PG decoder"-"graphics plane"-"CLUT unit" are provided so that the left-eye stream and the right-eye stream can be processed independently.

The offset sequence is contained in the right-eye video stream. Thus, in the plane offset format, the PG decoder has "1 decoder" structure, and the output from the PG decoder is supplied to the left-eye view and the right-eye view by switching therebetween.

The PG decoder performs the following to switch between 2D and 3D.

1. The mutual switching between the "1 plane+offset" mode and the 2D mode is performed seamlessly. This is realized by invalidating the "Offset".

2. When switching between the 3D-LR mode and the 2D mode is performed, the display of the subtitle temporarily disappears because the switching between the modes requires switching between PIDs. This is the same as the switching between streams.

This completes the explanation of the PG decoder. In the following, the text subtitle decoder will be described in detail.

Decoder Models of Text Subtitle Decoder

The text subtitle decoder is composed of a plurality of pieces of subtitle description data.

The text subtitle decoder includes: a "subtitle processor" for separating the text code and the control information from the subtitle description data; a "management information buffer" for storing the text code separated from the subtitle description data; a "text render" for extending the text code in the management information buffer to the bit map by using the font data; an "object buffer" for storing the bit map obtained by the extension; and a "drawing control unit" for controlling the text subtitle playback along the time axis by using the control information separated from the subtitle description data.

The text subtitle decoder is preceded by: a "font preload buffer" for preloading the font data; a "TS buffer" for adjusting the input speed of the TS packets constituting the text subtitle stream; and a "subtitle preload buffer" for preloading the text subtitle stream before the playback of the playitem.

The graphics decoder is followed by a "graphics plane"; a "CLUT unit" for converting the pixel codes constituting the graphics object stored in the graphics plane into values of brightness and color difference based on the pallet definition segment; and a "shift unit" for the plane shift.

FIGS. 14A and 14B show the internal structure of the text subtitle decoder. FIG. 14A shows a decoder model of the text subtitle decoder in the "1 plane+offset" mode. FIG. 14B shows a decoder model of the text subtitle decoder in the 3D-LR method. In FIGS. 14A and 14B, the text subtitle decoder itself is represented by a frame drawn by the solid line, a portion that follows the text subtitle decoder is represented by a frame drawn by the chain line, and a portion that precedes the text subtitle decoder is represented by a frame drawn by the dotted line.

FIG. 14A shows that the output of the graphics plane branches to the left-eye output and the right-eye output, and that the left-eye output and the right-eye output are each provided with a shift unit.

FIG. 14B shows that the left-eye graphics plane and the right-eye graphics plane are provided, and that the bit map extended by the text subtitle decoder is written into the graphics planes.

The text subtitle stream differs from the PG stream as follows. That is to say, the font data and the character code are sent, not the graphics data is sent as the bit map, so that the rendering engine generates the subtitle. Thus the stereoscopic viewing of the subtitle is realized in the "1 plane+offset" mode.

This completes the description of the text subtitle stream and the text subtitle decoder. Next, the internal structure of the IG stream and the structure of the IG decoder will be described.

IG Stream

Each of the left-eye IG stream and the right-eye IG stream includes a plurality of display sets. Each display set includes a plurality of functional segments. As is the case with the PG stream, the display set falls into the following types. epoch-start display set, normal-case display set, acquisition-point display set, and epoch-continue display set.

The plurality of functional segments belonging to these display sets include the following types.

(1) Object Definition Segment

The object definition segment of the IG stream is the same as that of the PG stream. However, the graphics object of the IG stream defines the in-effect and out-effect of pages, the normal, selected, and active states of the button members. The object definition segments are grouped into those that define the same state of the button members, and those that constitute the same effect image. The group of object definition segments defining the same state is called "graphics data set".

(2) Pallet Definition Segment

The pallet definition segment of the IG stream is the same as that of the PG stream.

(3) Interactive Control Segment

The interactive control segment includes a plurality of pieces of page information. The page information is information that defines a screen composition of the multi-page menu. Each piece of page information includes an effect sequence, a plurality of pieces of button information, and a reference value of a pallet identifier.

The button information is information that realizes an interactive screen composition on each page constituting the multi-page menu by displaying the graphics object as one state of a button member.

The effect sequence constitutes the in-effect or the out-effect with use of the graphics object, and includes effect information, where the in-effect is played back before a page corresponding to the page information is displayed, and the out-effect is played back after the page is displayed.

The effect information is information that defines each screen composition for playing back the in-effect or the out-effect. The effect information includes: a screen composition object that defines a screen composition to be executed in the window (partial area) defined by the window definition segment on the graphics plane; and effect period information that indicates a time interval between the current screen and the next screen in the same area.

The screen composition object in the effect sequence defines a control that is similar to the control defined by the screen composition segment of the PG stream. Among the plurality of object definition segments, an object definition segment that defines the graphics object used for the in-effect is disposed at a location that precedes an object definition segment that defines the graphics object used for the button member.

Each piece of button information in the page information is information that an interactive screen composition on each page constituting the multi-page menu by displaying the graphics object as one state of a button member. The button information includes a set button page command that, when a corresponding button member becomes active, causes the playback device to perform the process of setting a page other than the first page as the current page.

To make it possible for the offset in the plane shift to be changed for each page during a playback of the IG stream, a navigation command for changing the offset is incorporated into the button information, and the "auto-activate" of the navigation command is defined in the corresponding piece of button information, in advance. This makes it possible to change automatically the value or direction of the offset defined in the stream registration information of the IG stream.

(4) End Segment

The end segment is a functional segment that is located at the end of a plurality of functional segments belonging to one display set. A series of segments from the interactive control segment to the end segment are recognized as the functional segments that constitute one display set.

The following are the control items of the interactive control segment that are the same for both the left-eye graphics stream and the right-eye graphics stream: button adjacency information; selection time-out time stamp; user time-out duration; and composition time-out information.

1. Button Adjacency Information

The button adjacency information is information that specifies a button to be changed to the selected state when a key operation specifying any of upward, downward, leftward, and rightward is performed while a certain button adjacent to the specified button is in the selected state.

2. Selection Time-Out Time Stamp

The selection time-out time stamp indicates a time-out time that is required to automatically activate a button member in the current page and cause the playback device to execute the button member.

3. User Time-Out Duration

The user time-out duration indicates a time-out time that is required to return the current page to the first page so that only the first page is displayed.

4. Composition Time-Out Information

The composition time-out information indicates a time period that is required to end an interactive screen display by the interactive control segment. With respect to the IG stream, the start time point of a display set is identified by the DTS of the PES packet storing the interactive control segment, and the end time point of the display set is identified by the composition time-out time of the interactive control segment. The same DTS and the same composition time-out time are set for both the left eye and the right eye.

Decoder Models of IG Decoder

The IG decoder includes: a "coded data buffer" for storing functional segments read from the IG stream; a "stream graphics processor" for obtaining a graphics object by decoding the screen composition segment; an "object buffer" for storing the graphics object obtained by the decoding; a "composition buffer" for storing the screen composition segment; and a "composition controller" for decoding the screen composition segment stored in the composition buffer, and performing a screen composition on the graphics plane by using the graphics object stored in the object buffer, based on the control items included in the screen composition segment.

A "transport buffer" for adjusting the input speed of the TS packets constituting the functional segments is provided at a location before the graphics plane.

Also, at locations after the graphics decoder, a "graphics plane", a "CLUT unit" for converting the pixel codes constituting the graphics object stored in the graphics plane into values of brightness/color difference based on the pallet definition segment, and a "shift unit" for the plane shift are provided.

Figure 15A:
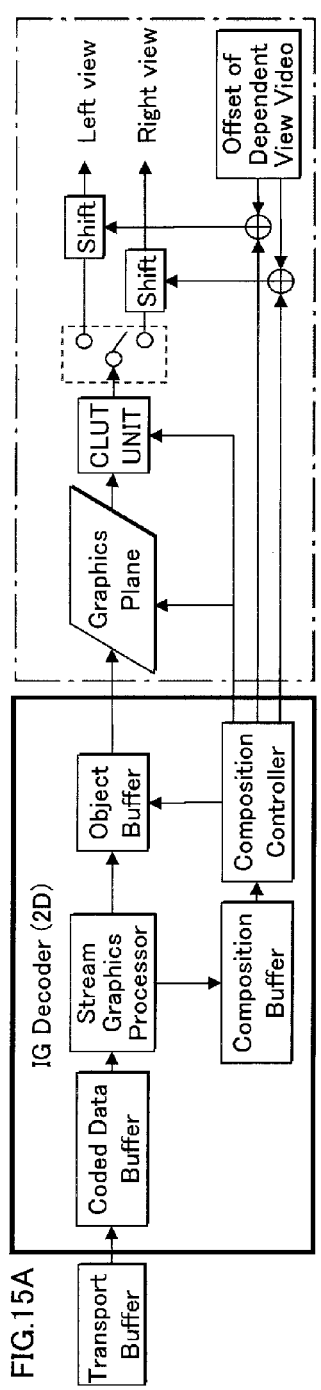
FIGS. 15A and 15B show decoder models of the IG decoder.
Figure 15B:
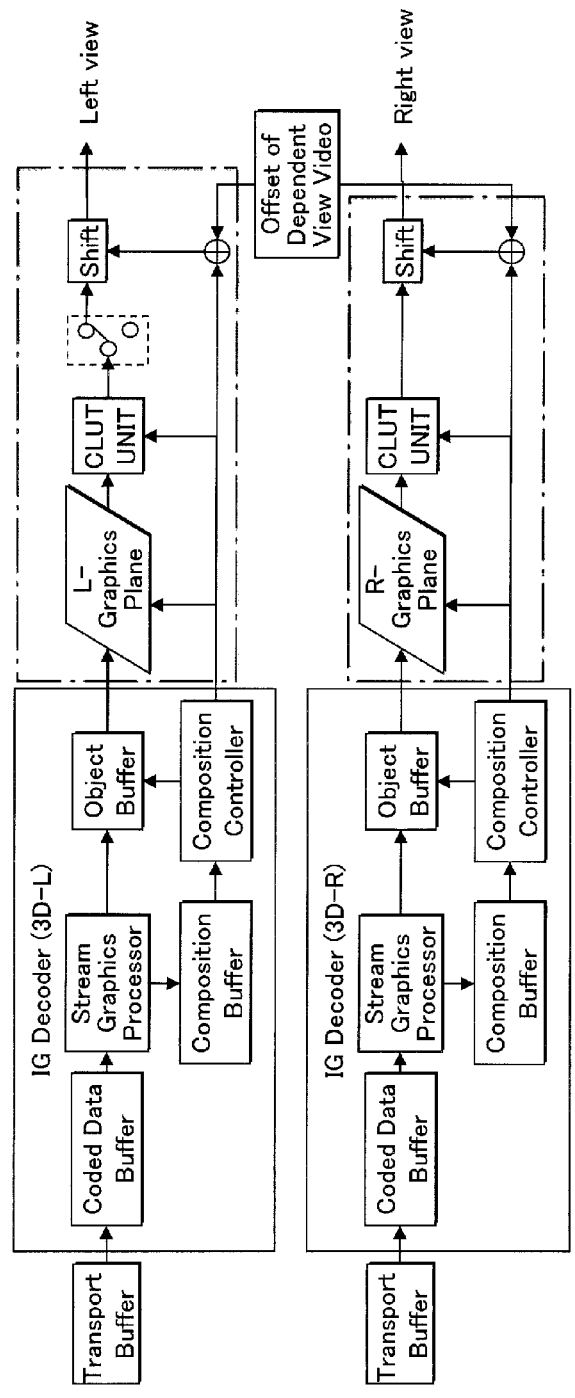

FIGS. 15A and 15B show decoder models of the IG decoder. In FIGS. 15A and 15B, the IG decoder itself is represented by a frame drawn by the solid line, a portion that follows the graphics decoder is represented by a frame drawn by the chain line, and a portion that precedes the IG decoder is represented by a frame drawn by the dotted line.

FIG. 15A shows a decoder model for displaying the 2D-format IG stream in the LR format in the "1 plane+offset" mode. FIG. 15B shows a decoder model of the IG stream for displaying LR-format data.

These decoders include a circuit for reflecting values of system parameters onto the offsets so that the program can control the depth information of the menu graphics.

FIG. 15B shows a two-decoder model that enables the offset values to be changed with use of a command. Accordingly, in this decoder model, the depth information of the menu can be changed by the command. Note that different offset values may be set for the left view and the right view. On the other hand, in the depth method, the offset is invalid.

The composition controller in the graphics decoder realizes the initial display of the interactive screen by displaying the current button, among a plurality of button members in the interactive screen, by using the graphics data of the graphics data set corresponding to the selected state, and displaying the remaining buttons by using the graphics data set corresponding to the normal state.

When a user operation specifying any of upward, downward, leftward, and rightward is performed, it writes, into the button number register, a number of a button member that is present in the direction specified by the user operation among a plurality of button members in the normal state and adjacent to the current button, the writing causing the button member having become newly the current button to change from the normal state to the selected state.

In the interactive screen, when a user operation for changing the button member from the selected state to the active state is performed, the interactive screen is updated by extracting the graphics data constituting the active state from the graphics data set and displaying the extracted graphics data.

The update of the interactive screen should be executed in common to the left-eye view and the right-eye view. Thus it is preferable that the left-eye graphics decoder and the right-eye graphics decoder have in common a composition controller for the two-decoder model.

In the above-described case, the inter-changing is realized by using the same navigation command for both the left-eye view and the right-eye view of the stereoscopic IG stream, and setting the same button structure for both the 3D graphics object and the 2D graphics object.

When switching between the 2D IG stream and the stereoscopic IG stream, it is possible to change only the displayed graphics object when the attribute and number and the like of the navigation command and button information are the same for both. Switching from the 3D-LR mode to the display of only the L image can be made without reloading, but there is a possibility that the display position may be shifted. It is preferable that the playback device performs the switching based on a flag set to indicate which is adopted by the title producer.

The following are notes on switching between modes.

Reloading does not occur when switching between the "1 plane+offset" mode and the 2D mode is performed. This is because the IG stream does not need to be reloaded, and only invalidation of the offset is required.

Reloading occurs when switching between the 3D-LR mode and the 2D mode is performed. This is because the streams are different.

This completes the description of the IG stream and the IG decoder. Next, the plane memory will be described in detail.

The following describes the plane memory structure in the "1 plane+offset" mode method.

The layer overlaying in the plane memory is achieved by executing a superimposing process onto all combinations of the layers in the layer model. In the superimposing process, pixel values of pixel data stored in the plane memories of the two layers are superimposed. The layer overlaying by the layer overlay unit 208 is achieved by executing a superimposing process onto all combinations of two layers among the layers in the layer model. In the superimposing process, pixel values of pixel data stored in the plane memories of the two layers are superimposed in the layer model of the plane memory.

The superimposing between layers is performed as follows. A transmittance $\alpha$ as a weight is multiplied by a pixel value in unit of a line in the plane memory of a certain layer, and a weight of (1−transmittance α) is multiplied by a pixel value in unit of a line in the plane memory of a layer below the certain layer. The pixel values with these brightness weights are added together. The resultant pixel value is set as a pixel value in unit of a line in the layer. The layer overlaying is realized by repeating this superimposing between layers for each pair of corresponding pixels in a unit of a line in adjacent layers in the layer model.

A multiplication unit for multiplying each pixel value by the transmittance to realize the layer overlaying, an addition unit for adding up the pixels, and a scaling/positioning unit for performing the scaling and positioning of the secondary video, are provided at locations after the plane memory, as well as the above-described CLUT unit, shift unit and the like.

Figure 16:
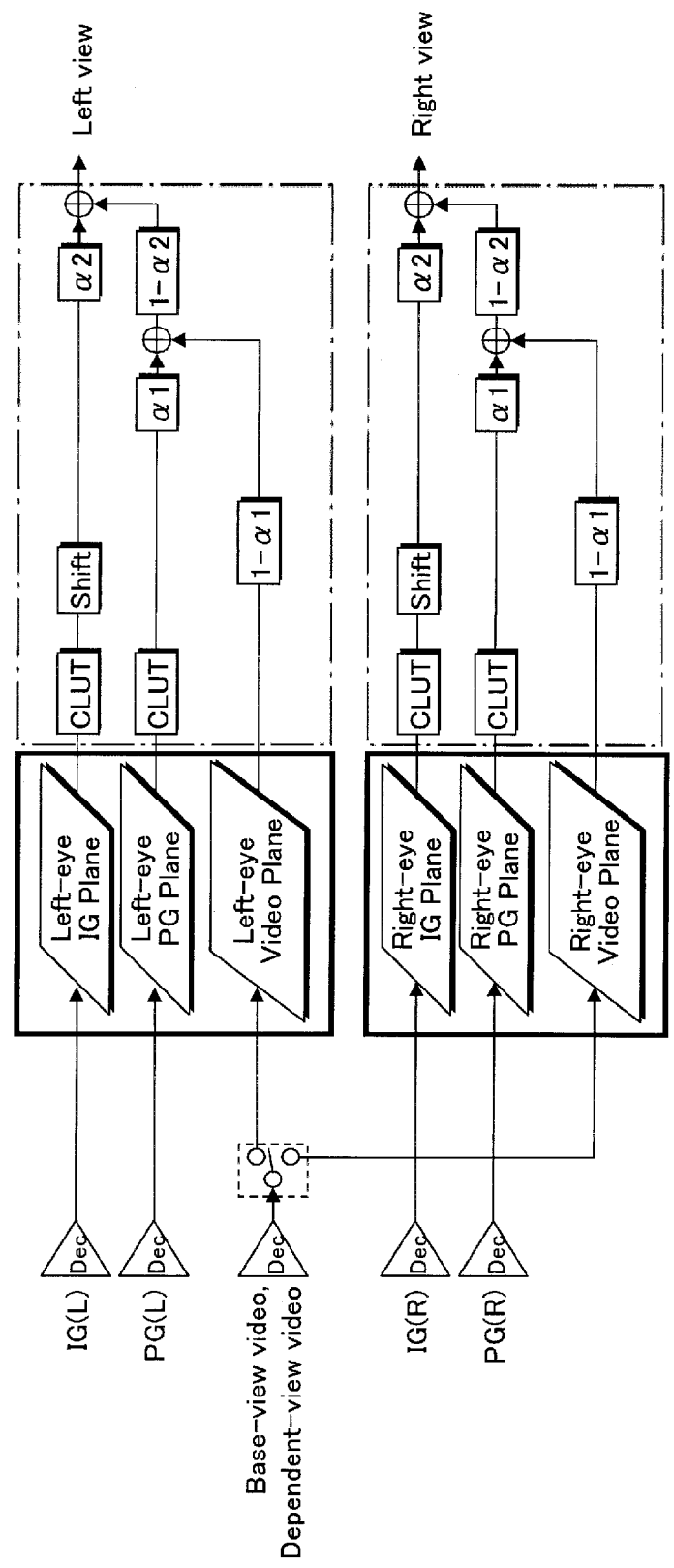
FIG. 16 shows a circuit structure for overlaying the outputs of the decoder models and outputting the result in the 3D-LR mode.

FIG. 16 shows a circuit structure for overlaying the outputs of the decoder models and outputting the result in the 3D-LR mode. In FIG. 16, the layer models each composed of video plane, PG plane, and IG plane are enclosed by solid lines, and portions that follow the plane memories are enclosed by chain lines. As shown in FIG. 16, there are two above-described layer models. Also, there are two portions following the plane memories.

With the plane memory structure for the 3D-LR method which is provided with two pairs of a layer model and a portion following the plane memory, two pairs of the video plane, PG plane, and IG plane are provided for the left-eye view and the right-eye view, and the outputs from each plane memory are overlaid, as the layer overlaying, separately for the left-eye view and the right-eye view.

Figure 17:
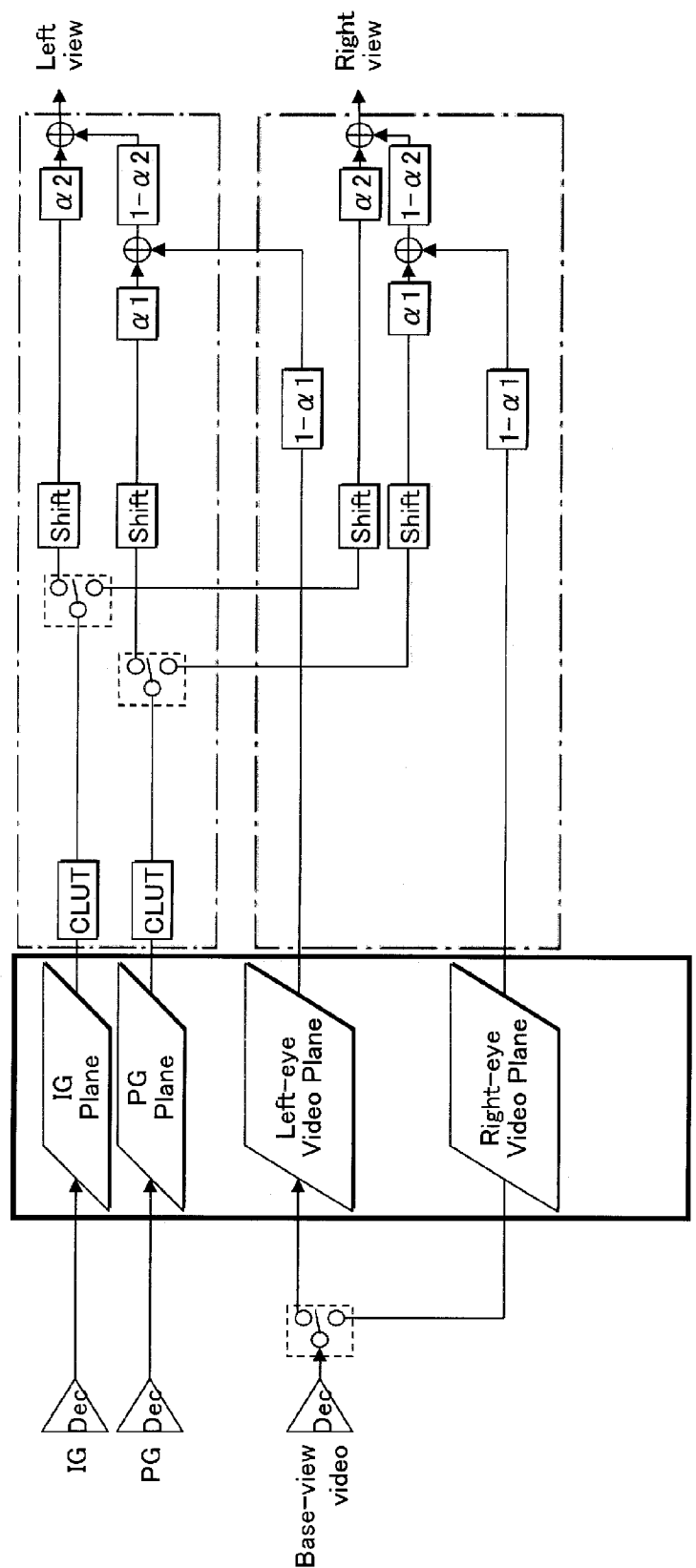
FIG. 17 shows a circuit structure for overlaying the outputs of the decoder models and outputting the result in the "1 plane+offset" mode.

FIG. 17 shows a circuit structure for overlaying the outputs of the decoder models and outputting the result in the "1 plane+offset" mode.

In FIG. 17, the layer model composed of the left-eye and right-eye video planes, PG plane, and IG plane is encircled by the solid line, and a portion that follows the plane memory is encircled by the chain line. As shown in FIG. 17, there is only one above-described layer model. Also, there are two portions following the plane memory.

In the "1 plane+offset" mode: the video plane is provided, one for each of the left-eye view and right-eye view; and each of the PG plane and the IG plane is provided, one for both the left view and the right view. There is only one plane memory for both the left-eye view and the right-eye view. With this structure, the above-described layer overlaying is performed onto the left-eye and right-eye outputs.

The playback device needs to support both the B-D presentation mode and the "1 plane+offset" mode. Thus the hardware structure of the playback device is basically "2 decoders+2 planes". When the mode switches to the "1 plane+offset" mode or the 2D output mode, the playback device becomes the "1 decoder+1 plane" structure, invalidating one of the two pairs of "1 decoder+1 plane".

It is at the discretion of the manufacturer of the playback device which of 1-decoder structure and 2-decoder structure is adopted as the decoder model and which of 1-plane structure and 2-planes structure is adopted as the plane model. Of course, the playback device may be designed to have the 2-decoder and 2-plane structure, then it may be set to be able to play back the stereoscopic PG and IG as the top-of-the-line product, and may be set not to be able to play back the stereoscopic PG and IG as the lower-cost product. This expands the lineup. Such a configuration having the capability to play back the stereoscopic PG or a configuration having the capability to play back the stereoscopic IG exists in the register set.

The following explains the register set.

The register set is composed of a plurality of player status registers and a plurality of player setting registers. Each of the player status registers and player setting registers is a 32-bit register and is assigned with a register number so that a register to be accessed is identified by the register number.

The bit positions of the bits (32 bits) that constitute each register are represented as "b0" through "b31". Among these, bit "b31" represents the highest-order bit, and bit "b0" represents the lowest-order bit. Among the 32 bits, a bit sequence from bit "bx" to bit "by" is represented by [bx:by].

The value of an arbitrary bit range [bx:by] in a 32-bit sequence stored in the player setting register/player status register of a certain register number is treated as an environment variable (also called "system parameter" or "player variable") that is a variable of an operation system in which the program runs. The program that controls the playback can obtain a system parameter via the system property or the application programming interface (API). Also, unless otherwise specified, the program can rewrite the values of the player setting register and the player status register. For the program based on an object-oriented programming language to do this, the program needs to have the authority to obtain or rewrite system parameters.

The player status register is a hardware resource for storing values that are to be used as operands when the MPU of the playback device performs an arithmetic operation or a bit operation. The player status register is also reset to initial values when an optical disc is loaded, and the validity of the stored values is checked. The values that can be stored in the player status register are the current title number, current playlist number, current playitem number, current stream number, current chapter number, and so on. The values stored in the player status register are temporary values because the player status register is reset to initial values each time an optical disc is loaded. The values stored in the player status register become invalid when the optical disc is ejected, or when the playback device is powered off.

The player setting register differs from the player status register in that it is provided with power handling measures. With the power handling measures, the values stored in the player setting register are saved into a non-volatile memory when the playback device is powered off, and the values are restored when the playback device is powered on. The values that can be set in the player setting register include: various configurations of the playback device that are determined by the manufacturer of the playback device when the playback device is shipped; various configurations that are set by the user in accordance with the set-up procedure; and capabilities of a partner device that are detected through negotiation with the partner device when the device is connected with the partner device.

Figure 18:
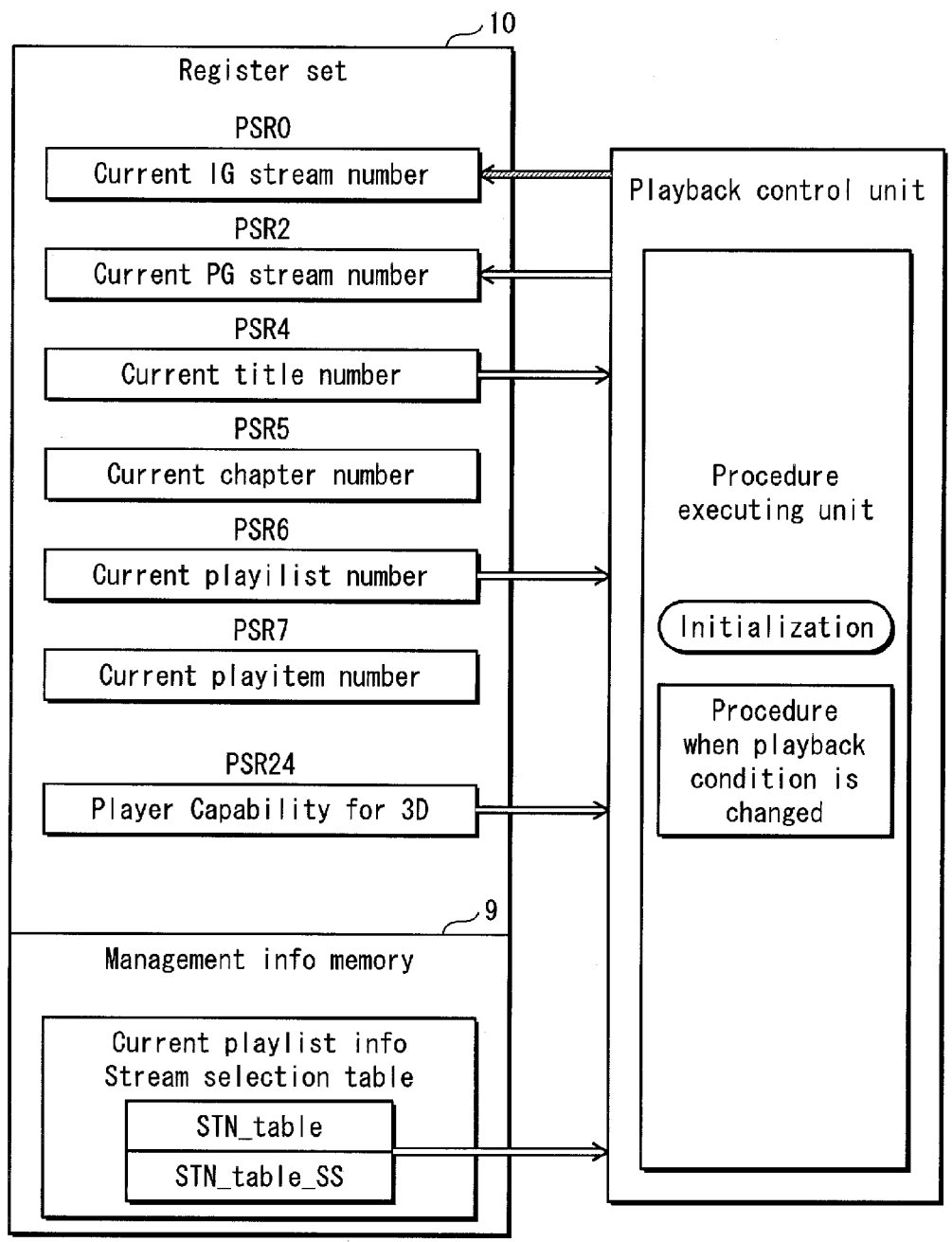
FIG. 18 shows the internal structures of the register set 203 and the playback control unit.

FIG. 18 shows the internal structures of the register set 203 and the playback control unit.

The left-hand side of FIG. 18 shows the internal structures of the register set 203, and the right-hand side shows the internal structures of the playback control unit.

The following describes the player status registers and the player setting registers assigned with respective register numbers.

PSR0 is a stream number register for the IG stream, and stores a current IG stream number.

PSR2 is a stream number register for the PG stream, and stores a current PG stream number.

PSR24 is used for the setting of "Player Capability for 3D". This indicates whether or not the playback device has a capability to perform the stereoscopic playback.

On the other hand, the playback control unit includes a stream selection procedure for determining a unique current PG stream number and a unique current IG stream number in the current playlist, by referring to the PSR24 in the register set 203 and the stream selection table of the current playlist information in the memory. The stream selection procedure includes "Initialization" and "Procedure when playback condition changed".

FIG. 19 shows the bit assignment in PSR24. PSR24 indicates the 3D capability of the playback device. The program recorded on the recording medium cannot change the value of PSR24.

The bit "b0" in PSR24 represents the video display capability of stereoscopic 1280×720 50p. More specifically, when bit "b0" is set to "0", it indicates that the playback device does not have the processing capability to display the 1280×720/50 Hz progressive video; and when bit "b0" is set to "1", it indicates that the playback device has the processing capability to display the 1280×720/50 Hz progressive video.

The bit "b2" in PSR24 represents the stereoscopic PG capability. More specifically, when bit "b2" is set to "0", it indicates that the playback device does not have the capability to play back the stereoscopic PG; and when bit "b2" is set to "1", it indicates that the playback device has the capability to play back the stereoscopic PG.

The bit "b3" in PSR24 represents the stereoscopic IG capability. More specifically, when bit "b3" is set to "0", it indicates that the playback device does not have the capability to play back the stereoscopic IG; and when bit "b3" is set to "1", it indicates that the playback device has the capability to play back the stereoscopic IG.

The bit "b5" in PSR24 represents the BD-J capability in the 3D output mode. More specifically, when bit "b5" is set to "1", it indicates that the playback device can process the BD-J mode in the 3D output mode; and when bit "b5" is set to "0", it indicates that the playback device cannot process the BD-J mode in the 3D output mode. The use of the bit "b5" in PSR24 is not related to the subject of the present embodiment, and thus will be described in some subsequent embodiment.

As described above, PSR24 can be set to indicate whether or not the stereoscopic playback is available for each of the IG and PG. This makes it possible to provide: a configuration in which each of the IG and PG decoders is composed of two decoders and the playback device supports the stereoscopic playback for both IG and PG, or a configuration in which each of the IG and PG decoders is composed of two decoders and the playback device supports the stereoscopic playback for only PG and the "1 plane+offset" mode for IG, or a converse configuration in which each of the IG and PG decoders is composed of two decoders and the playback device supports the stereoscopic playback for only IG and the "1 plane+offset" mode for PG.

Furthermore, to sell the playback device as a lower-cost product, it is possible to provide a configuration in which although each of the IG and PG decoders is composed of two decoders, the playback device supports merely the "1 plane+offset" mode for each of IG and PG. In this way, while having a common configuration in which each of the IG and PG decoders is composed of two decoders, the present embodiment makes it possible to determine whether to support the stereoscopic playback for each of IG and PG separately, depending on the grade of the product. This expands lineup of products of the playback device that the manufacturer can provide.

Also, when each of or both of the IG and PG decoders is composed of one decoder, it clearly indicates the availability of the stereoscopic playback. Accordingly, even if the playlist can be played back in a stereoscopic mode, it is possible to prevent the playback type from being set to the stereoscopic PG or stereoscopic IG erroneously.

The playback control having been described up to now can be realized by causing a computer to execute a program which is generated by writing the processing procedure represented by the flowcharts of FIGS. 20 through 25 in an object-oriented compiler language.

Figure 20:
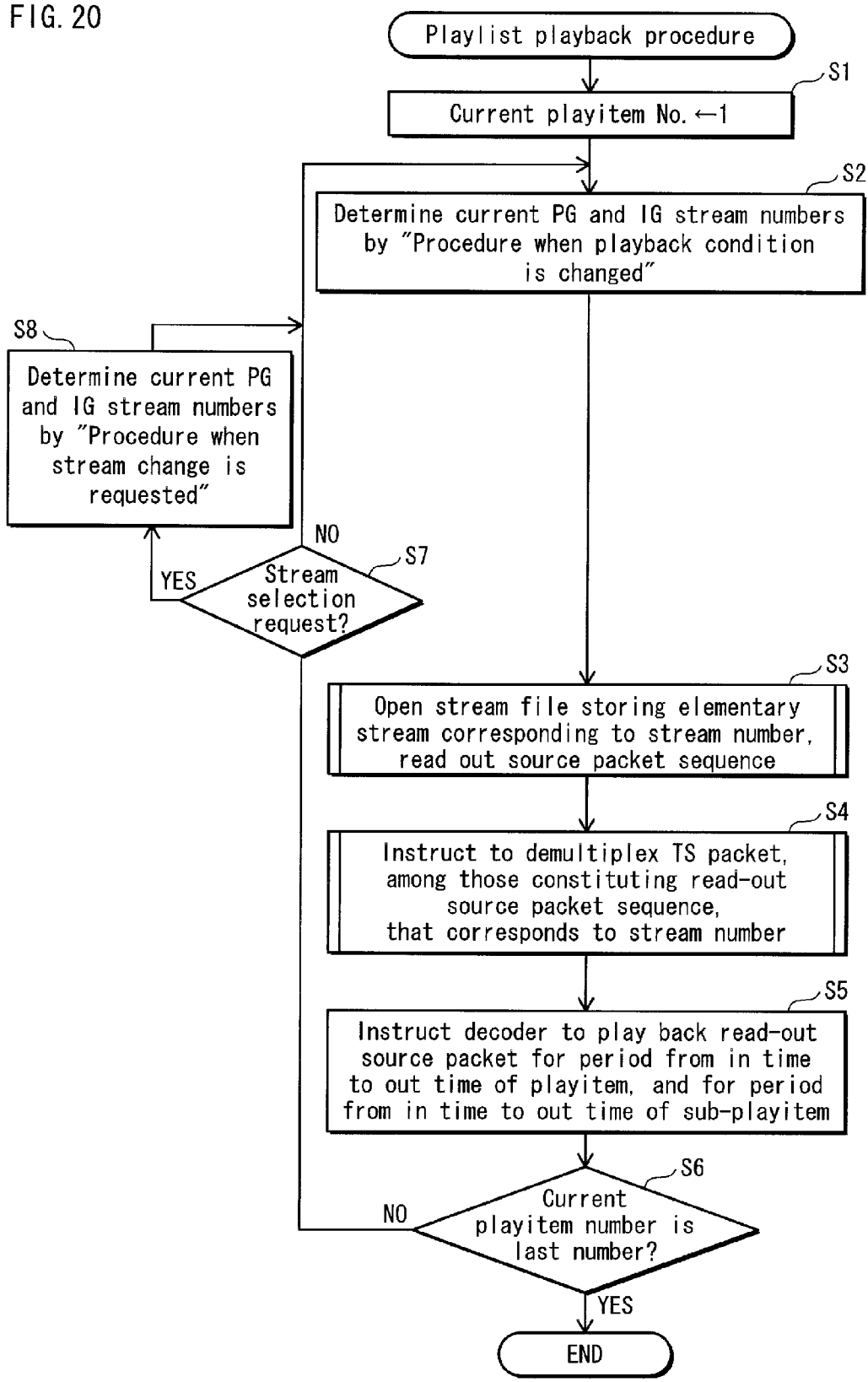
FIG. 20 shows the playlist playback procedure.

FIG. 20 shows the playlist playback procedure. In this flowchart, the current playitem number is set to "1" in step S1, and then the control enters a loop in which the steps S2 to S6 are repeated. In this loop, the steps are performed as follows. The stream number is determined by the "procedure when playback condition is changed" (step S2). A stream file storing an elementary stream corresponding to the stream number is opened, and the source packet sequence is read therefrom (step S3). It is instructed that a source packet, among those constituting the source packet sequence, that corresponds to the stream number should be demultiplexed (step S4). The decoder is instructed to play back the read source packet for the period from the in-time to the out-time of the playitem, and for the period from the in-time to the out-time of the sub-playitem (step S5). These steps constituting the loop are repeated until the current playitem number becomes the last number. When it is judged that the current playitem number is not the last number (NO in step S6), the current playitem number is incremented, and the control moves to step S2.

At this timing, step S7 is performed to judge whether or not there has been a stream selection request. When it is judged that there has been a stream selection request, the "procedure when playback condition is changed" is executed, with the requested stream number being regarded as "x" (step S8). When it is judged that the current playitem number is the last number (YES in step S6), the process ends.

<Determination of Current PG Stream and Playback Type Thereof>

A current PG text subtitle stream whose stream number is to be stored in PSR2 is selected based on the output mode (PSR22), stereoscopic PG capability in PSR24, and "is_SS_PG".

Figure 21:
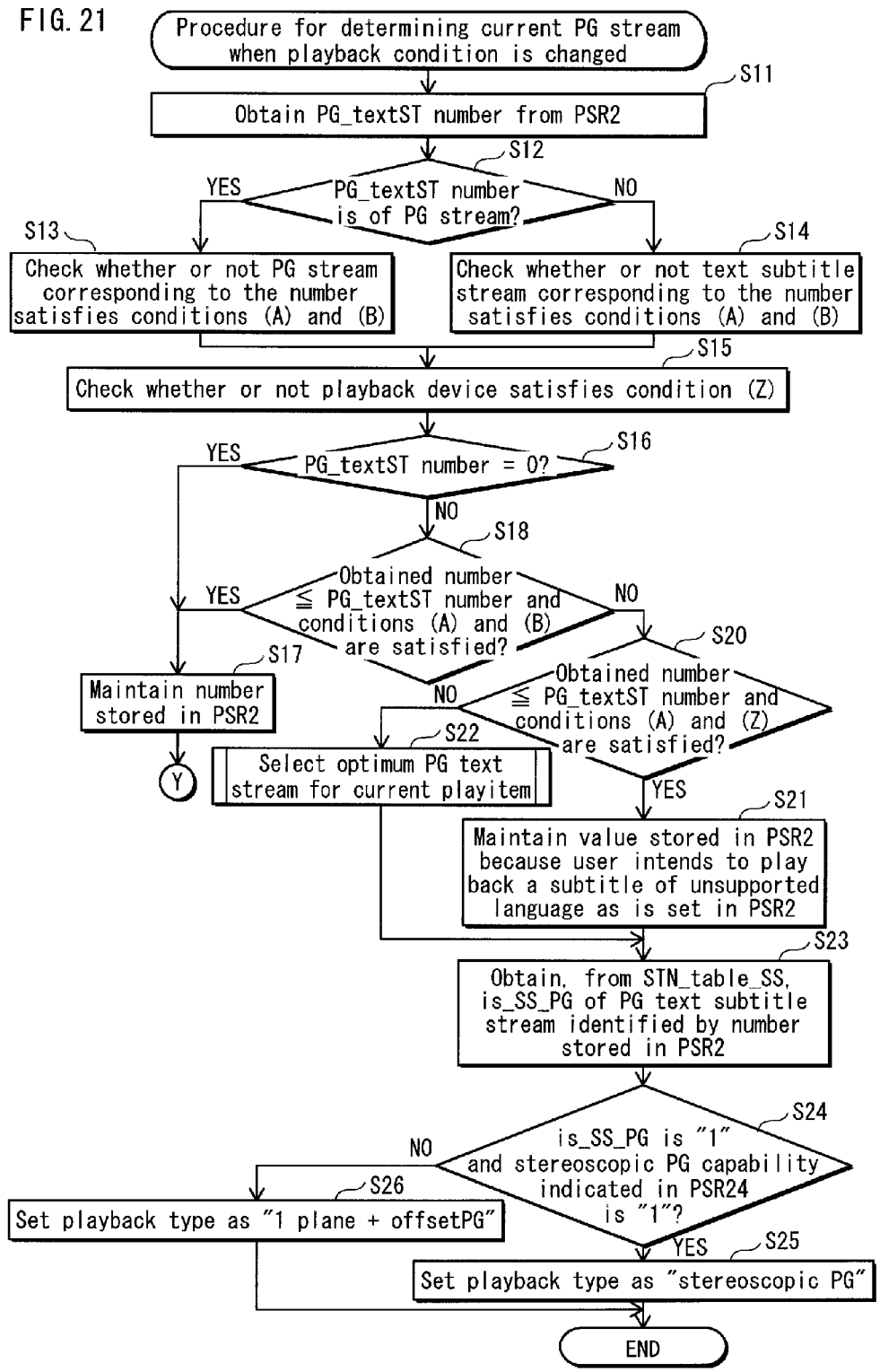
FIG. 21 is a flowchart showing the procedure for determining the current PG text subtitle stream when playback condition is changed.

FIG. 21 is a flowchart showing the procedure for determining the current PG text subtitle stream when playback condition is changed. Among the steps shown in this flowchart, the process of steps S11 to S22 is common to the 3D output mode and the 2D output mode, and the process of steps S23 to S26 is unique to the 3D output mode.

In step S11, the current PG text subtitle stream number is obtained from PSR2. In step S12, it is judged whether the current PG text subtitle stream number is of PG stream (YES) or of text subtitle stream (NO). In step S13, it is checked whether or not the PG stream corresponding to the current PG text subtitle stream number satisfies conditions (A) and (B).

Here, the conditions (A) and (B) are defined as follows.

Condition (A): The playback device has a capability to decode a PG stream that is identified by the current PG text subtitle stream number.

Condition (B): The playback device has a capability to play back the specified language.

On the other hand, in step S14, it is checked whether or not the text subtitle stream corresponding to the current PG text subtitle stream number satisfies conditions (A) and (B).

Here, the conditions (A) and (B) are defined as follows.

Condition (A): The playback device has a capability to extend the character code of the text subtitle stream, which is identified by the current PG text subtitle stream number, into a bit map. This playback capability is indicated in PSR30 in the register set 203.

Condition (B): the playback device has a capability to support characteristics of the language of the text subtitle stream identified by the current PG text subtitle stream number.

It should be noted here that, for a playback device to "be able to decode" a text subtitle stream which represents the subtitle of a language, the playback device should have the capability to extend the text subtitle stream of the language into the bit map, and the capability to support characteristic of the language.

Here, this will be considered by taking examples of English, Japanese, and Arabic. As for subtitle displays in English, the language characteristics of English are judged to be supported only when the functions of "horizontal writing", "kerning", "double letter/logotype" are all supported.

As for subtitle displays in Japanese, the language characteristics of Japanese are judged to be supported only when the functions of "horizontal writing" "vertical writing" "prohibit line breaks after certain characters", "characters in smaller size" are all supported.

As for subtitle displays in Arabic, the language characteristics of Arabic are judged to be supported only when the functions of "rendering from the right to the left" and "double letter/logotype" are all supported.

When the playback device has the capability to extend the text subtitle stream of a language into the bit map and has the capability to support characteristics of the language, it can be said that the above-described conditions (A) and (B) are satisfied. When the playback device has the capability to extend the text subtitle stream of a language into the bit map, but not the capability to support characteristic of the language, it can be said that the condition (B) is not satisfied, but only the condition (A) is satisfied.

The capability to support characteristics of language is set for each language in bits constituting PSR48 through PSR61 in the register set. More specifically, PSR48 through PSR61 have flags that correspond to respective 3-byte language codes defined in ISO 639-2/T. Each of the flags is set to indicate whether or not the playback device has a capability to display a text subtitle of a language code that corresponds to the flag.

Among the 3-byte language codes defined in ISO 639-2/T, a 3-byte language code called "ita" indicates Italian, and a 3-byte language code called "jpn" indicates Japanese. Also, a 3-byte language code called "jav" indicates Javanese. Approximately 430 languages are covered by the 3-byte language codes defined in ISO 639-2/T. The flags in PSR48 through PSR61 are referred to when, to determine the current PG text subtitle stream, it is judged whether or not the text subtitle stream written in the stream number table can be decoded. With this structure, it is possible to perform appropriately the judgment on whether a text subtitle stream can be decoded, even if the text subtitle stream is of a minor language.

After the above-described judgments, the control proceeds to step S15 in which it is checked whether or not the playback device satisfies a condition (Z).

Here, the condition (Z) is that the user is intending to play back a subtitle of an unsupported language, wherein the "unsupported language" is a language whose characteristics are not supported. The intention is indicated in PSR30 in the register set.

The control then proceeds to step S16 in which it is judged whether or not the number of PG text subtitle streams in the stream selection table of the current playitem is "0". When the stream selection table indicates that no PG text subtitle stream has been permitted to be played back, the PG text subtitle stream number stored in PSR2 is maintained (step S17).

When the stream selection table indicates at least one PG text subtitle stream that is permitted to be played back, the control proceeds to step S18 to check for the validity of the current PG text subtitle stream. In step S18, it is judged whether or not the current PG text subtitle stream number is equal to or greater than the total number of stream entries in the stream selection table and conditions (A) and (B) are satisfied. When the result of judgment in step S18 is negative, the control proceeds to step S20 in which it is judged whether or not the current PG text subtitle stream number is equal to or greater than the total number of stream entries in the stream selection table and conditions (A) and (Z) are satisfied. When the result of judgment in step S20 is affirmative, the value in PSR2 is maintained since it is determined that, although a PG text subtitle stream number of a text subtitle of an unsupported language is set in PSR2, the user is intending to play back a subtitle of the unsupported language (step S21). When the result of judgment in step S20 is negative, an optimum stream for the current playitem is selected (step S22).

The steps S23 through S25 following this are unique to the 3D output mode. More specifically, steps S23 through S25 in the 3D output mode are performed as follows. An "is_SS_PG" of a PG stream identified by the PG stream number stored in PSR2 is obtained from the stream registration information in the extension stream selection table (step S23). It is judged whether or not the obtained "is_SS_PG" flag is "1" and the stereoscopic PG capability indicated by "b2" in PSR24 is "1" (step S24). When the result of judgment in step S24 is YES, the playback type is set as the stereoscopic PG that uses the left-eye PG stream and right-eye PG stream (step S25).

When the playback type is set as the stereoscopic PG, the stereoscopic playback is performed by using packet identifier references that are included in the left-eye and right-eye stream entries of a piece of stream registration information corresponding to the current stream number stored in PSR2, among a plurality of pieces of stream registration information in the extension stream selection table. More specifically, the demultiplexing unit is caused to demultiplex TS packets whose packet identifiers are indicated by the packet identifier references that are included in the left-eye and right-eye stream entries of a piece of stream registration information corresponding to the current stream number stored in PSR2.

When the judgment result in step S24 is NO, the playback type is set as "1 plane+offsetPG" (step S26). When the playback type is set as "1 plane+offsetPG", the PG playback in the "1 plane+offset" mode is executed by using an offset sequence indicated by the PG text subtitle stream offset sequence ID reference information in a piece of stream registration information corresponding to the current stream number stored in PSR2, among a plurality of pieces of stream registration information in the extension stream selection table.

Here the offset sequence is explained. A plurality of offset sequences to be used in the "1 plane+offset" mode exist in the video access unit of the dependent-view video stream.

The video access unit of the dependent-view video stream is structured as a sequence of a video access unit delimiter, a sequence parameter set, a picture parameter set, an MVC scalable nesting SEI message, a first view component, a sequence end code, and a stream end code. The MVC scalable nesting SEI message includes a user data container. The user data container is unregistered user data, and falls into three types: closed caption information; GOP structure map; and offset metadata. One of these types is indicated by the "type_indicator" in the user data container.

The offset metadata is a sequence list for the PG plane, IG plane, and BD-J plane, and is used for the offset setting while the presentation graphics, text subtitle, and IG/BD-J plane are played back in the "1 plane+offset" mode. More specifically, the offset metadata indicates the offset control on the PG plane, IG plane, and BD-J plane when the graphics to be overlaid with the picture data is played back in the "1 plane+offset" mode.

The offset metadata should be stored in the MVC scalable nesting SEI message in the starting video component of each GOP in the encoding order of the dependent-view access unit. The offset metadata contains the above-described plurality of offset sequences. The offset sequence is a parameter sequence that indicates control parameters for each frame period in a group of pictures, where the control parameters are used when the graphics are overlaid with each piece of picture data belonging to the group of pictures. The offset sequence is composed of as many control parameters as the number indicated by the "number_of_displayed_frames_in_GOP". The control parameter is composed of plane offset direction information and a plane offset value.

The plane offset direction information ("Plane_offset_direction") indicates the direction of offset in the plane. When the plane offset direction information is set to a value "0", it indicates the front setting in which the plane memory exists between the TV and the viewer, and in the left-view period, the plane is shifted rightward, and in the right-view period, the plane is shifted leftward. When the plane offset direction information is set to a value "1", it indicates the behind setting in which the plane memory exists behind the TV or the screen, and in the left-view period, the plane is shifted leftward, and in the right-view period, the plane is shifted rightward. When the plane offset direction information indicates the front setting, the Z-axis coordinate of the control parameter in the three-dimensional coordinate system is a positive coordinate. When the plane offset direction information indicates the behind setting, the Z-axis coordinate of the control parameter in the three-dimensional coordinate system is a negative coordinate.

The plane offset value ("plane_offset_value") indicates the amount of deviation in the horizontal direction, of the pixels constituting the graphics, and indicates the offset value of the plane in units of pixels.

When the playback type of PG is set as "1 plane+offsetPG", an offset sequence is extracted from the video decoder and the extracted offset sequence is supplied to the shift unit, wherein the offset sequence to be extracted is indicated by the PG text subtitle stream offset sequence ID reference information in a piece of stream registration information corresponding to the current stream number, among a plurality of pieces of stream registration information stored in the SEI message of the dependent-view video stream.

This completes the explanation of the "procedure when playback condition is changed" for the PG text subtitle stream.

Figure 22:
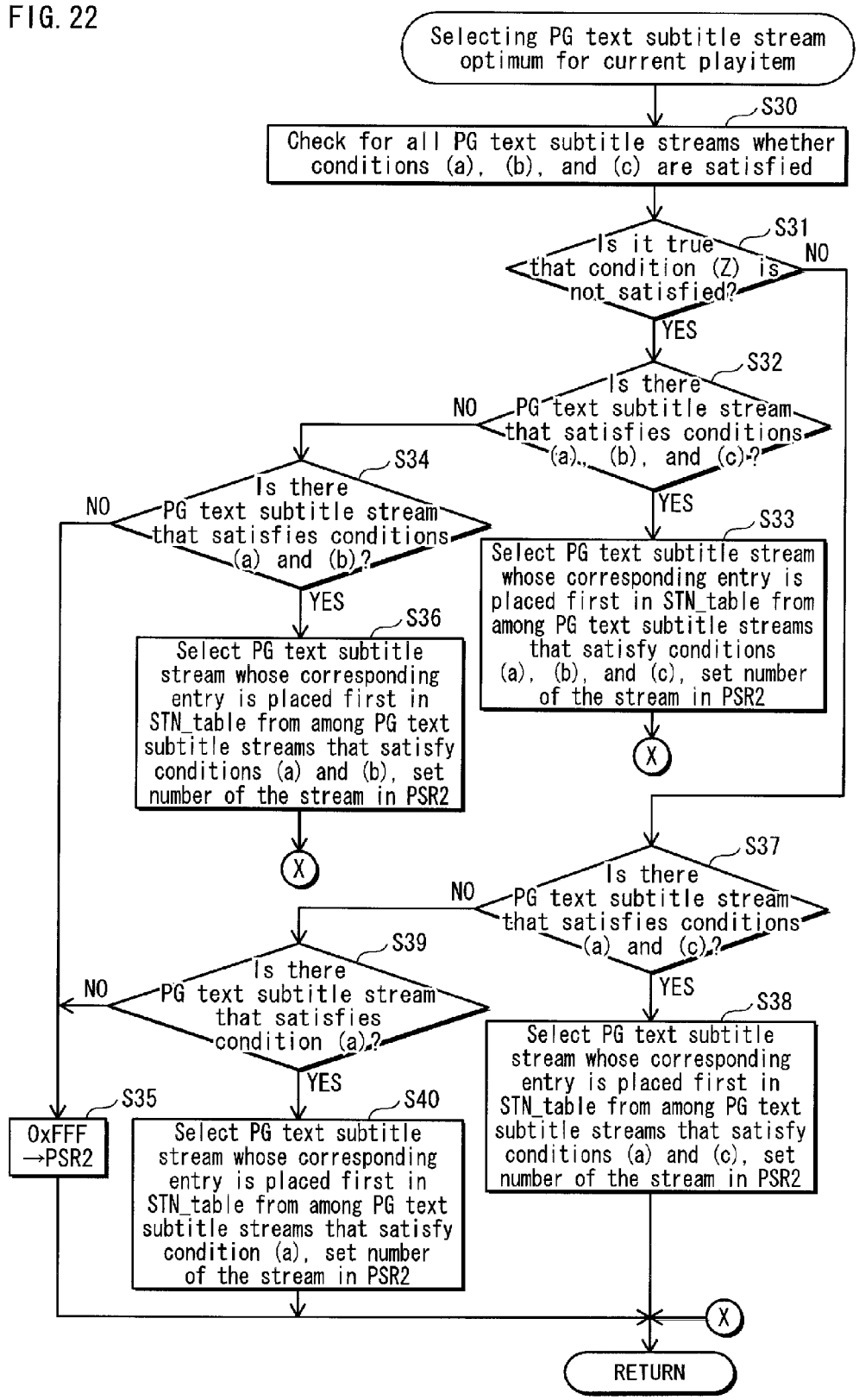
FIG. 22 is a flowchart showing the procedure for selecting a PG text subtitle stream that is optimum for the current playitem.

FIG. 22 is a flowchart showing the procedure for selecting a PG text subtitle stream that is optimum for the current playitem.

In step S30, it is checked for all PG text subtitle streams whether the following conditions (a), (b), and (c) are satisfied.

The conditions (a), (b), and (c) are defined as follows when the check-target PG stream is a PG stream i.

Condition (a): the playback device has the capability to decode the PG stream i.

Condition (b): PG_language_code of the PG stream i matches the language setting in the playback device. Here, the language setting in the playback device is indicated by PSR17 in the register set.

The conditions (a), (b), and (c) are defined as follows when the check-target text subtitle stream is a text subtitle stream i.

Condition (a): the playback device has the capability to extend the character code of the text subtitle stream i into a bit map.

Condition (b): the playback device has the capability to support the language attribute of the text subtitle stream i.

Condition (c): the "textST_language_code" of the text subtitle stream i matches the language setting in the playback device.

After the checking, it is judged in step S31 whether or not the playback device satisfies the condition (Z) described in the previous flowchart (playback of unsupported language). When the playback device does not satisfy the condition (Z), the control goes to step S32 in which it is judged whether or not there is a PG text subtitle stream that satisfies the conditions (a), (b), and (c). When there are PG text subtitle streams that satisfy the conditions (a), (b), and (c), a PG text subtitle stream whose corresponding stream entry is placed first in the stream selection table is selected from among the PG text subtitle streams that satisfy the conditions (a) through (c), and the PG text subtitle stream number of the selected PG text subtitle stream is set in PSR2 (step S33).

When there is no PG text subtitle stream that satisfies the conditions (a), (b), and (c), the control goes to step S34 in which it is judged whether or not there is a PG text subtitle stream that satisfies less conditions. Here the less conditions in this context mean the conditions (a) and (b). Namely, in step S34, it is judged whether or not there is a PG text subtitle stream that satisfies the conditions (a) and (b). When there are PG text subtitle streams that satisfy the conditions (a) and (b), a PG text subtitle stream whose corresponding stream entry is placed first in the Stream selection table is selected among the PG text subtitle streams that satisfy conditions (a) and (b), and the PG text subtitle stream number of the selected PG text subtitle stream is set in PSR2 (step S36).

When there is no PG text subtitle stream that satisfies the conditions (a) and (b), a value 0xFFF as a PG text subtitle stream number is set in PSR2 (step S35). When it is judged in step S31 that the playback device satisfies the condition (Z), the control goes to step S37 in which it is judged whether or not there is a PG text subtitle stream that satisfies another less conditions. Here the "another less conditions" in this context mean the conditions (a) and (c). Namely, in step S37, it is judged whether or not there is a PG text subtitle stream that satisfies the conditions (a) and (c).

When there are PG text subtitle streams that satisfy the conditions (a) and (c), a PG text subtitle stream whose corresponding stream entry is placed first in the stream selection table is selected among the PG text subtitle streams that satisfy conditions (a) and (c), and the PG text subtitle stream number of the selected PG text subtitle stream is set in PSR2 (step S38).

When there is no PG text subtitle stream that satisfies the conditions (a) and (c), the control goes to step S39 in which it is judged whether or not there is a PG text subtitle stream that satisfies the condition (a). When there are PG text subtitle streams that satisfy the condition (a), a PG text subtitle stream whose corresponding stream entry is placed first in the stream selection table is selected among the PG text subtitle streams that satisfy the condition (a), and the PG text subtitle stream number of the selected PG text subtitle stream is set in PSR2

(step S40). When there is no PG text subtitle stream that satisfies the condition (a), a value 0xFFF is set in PSR2 (step S35).

This completes the explanation of the procedure for selecting an optimum PG text subtitle stream.

Figure 23:
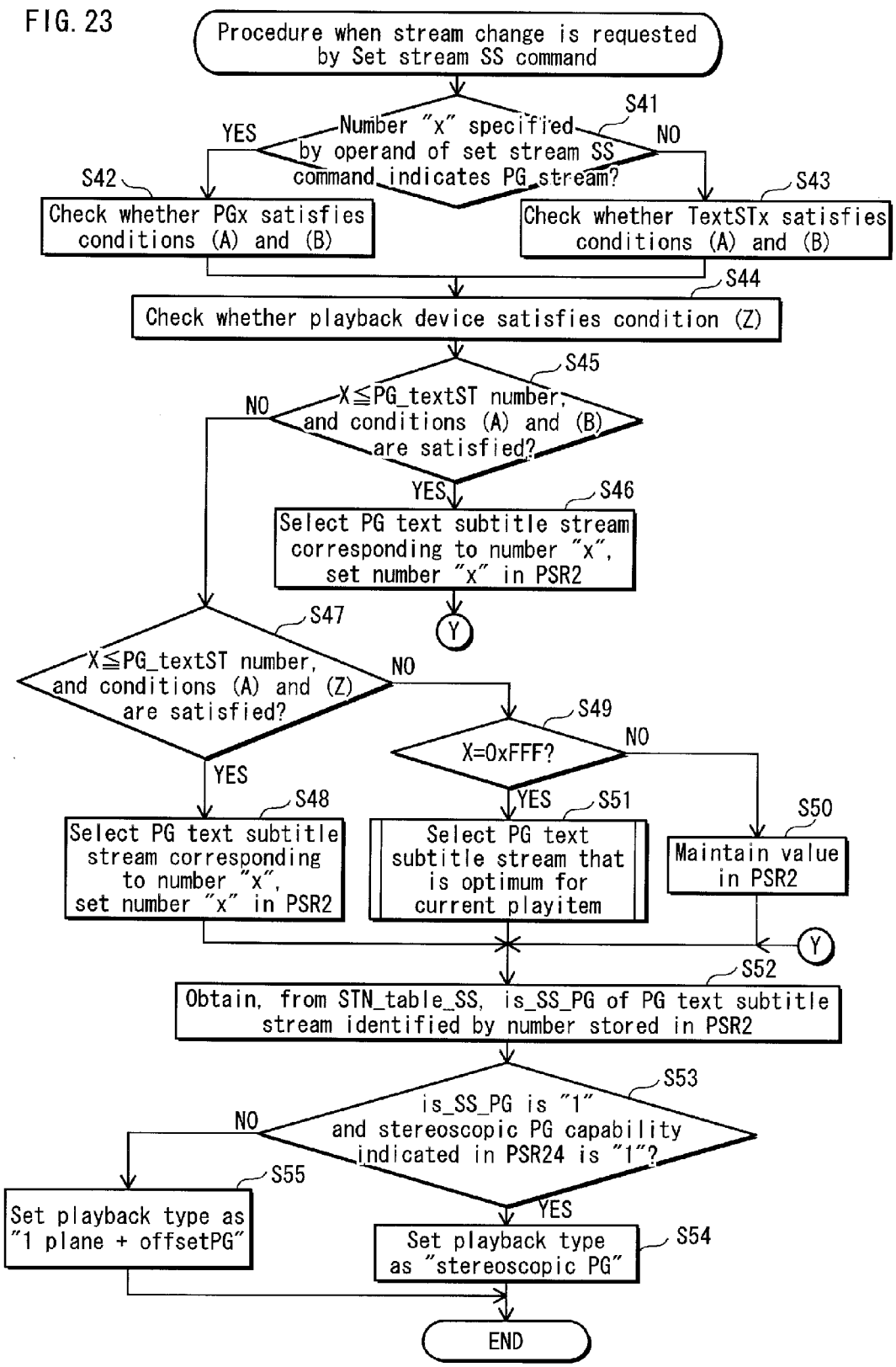
FIG. 23 is a flowchart showing the procedure which is to be executed when a stream change is requested by the set stream stereoscopic command (set stream SS command).

FIG. 23 is a flowchart showing the procedure which is to be executed when a stream change is requested by the set stream stereoscopic command (set stream SS command).

In step S41, it is judged whether the number "x" specified by an operand of the set stream stereoscopic command indicates a stream number of the PG stream (YES) or the text subtitle stream (NO). In step S42, it is checked whether or not the PG stream corresponding to the number "x" (PGx) satisfies the following conditions (A) and (B).

Condition (A): The playback device has a capability to decode a PG stream that is identified by the number x.

Condition (B): The language attribute of the identified PG stream matches the language attribute of the playback device.

In step S42, it is checked whether or not the text subtitle stream corresponding to the number "x" (textSTx) satisfies the following conditions (A) and (B).

Condition (A): The playback device has a capability to extend the character code of the text subtitle stream x into a bit map.

Condition (B): the playback device has the capability to support the language attribute of the text subtitle stream x.

In step S44, it is checked whether or not the playback device satisfies the condition (Z), and then in step S45, it is judged whether or not the number is equal to or lower than the total number of stream entries in the stream selection table and conditions (A) and (B) are satisfied. When the result of judgment in step S45 is affirmative, a PG text subtitle stream with a PG text subtitle stream number corresponding to the number x is selected, and the number x is set in PSR2 (step S46).

When the result of judgment in step S45 is negative, the control proceeds to step S47 in which it is judged whether or not the number is equal to or lower than the total number of stream entries in the stream selection table and conditions (A) and (Z) are satisfied. When the result of judgment in step S47 is affirmative, a PG text subtitle stream with a PG text subtitle stream number corresponding to the number x is selected, and the number x is set in PSR2 (step S48).

When the result of judgment in step S47 is negative, the control proceeds to step S49 in which it is judged whether or not the number x is 0xFFF. When it is judged that the number x is not 0xFFF, the value in PSR2 is maintained since it is determined that the stream selection table indicates that no PG text subtitle stream has been permitted to be played back (step S50).

When it is judged that the number x is 0xFFF, a PG text subtitle stream that is optimum for the current playitem is selected (step S51). This selection of an optimum PG text subtitle stream is performed in a similar manner to the procedure shown in FIG. 22.

The process of subsequent steps S52 to S55 is unique to the 3D output mode. The steps are performed as follows. An "is_SS_PG" of a PG stream x identified by the PG stream number x is obtained from the stream registration information in the extension stream selection table (step S52). It is judged whether or not the obtained "is_SS_PG" flag is "1" and the stereoscopic PG capability in PSR24 is "1" (step S53). When the result of judgment in step S53 is YES, the playback type is set as the stereoscopic PG (step S54). When the result of judgment in step S53 is NO, the playback type is set as "1 plane+offset" (step S55).

FIG. 24 is a flowchart showing the procedure which is to be executed when a stream change is requested by the set stream command or by a user operation requesting a stream number change. In this flowchart, the stream number specified by an operand of the set stream command, or the stream number specified by a user operation requesting a stream number change, is set as the number x, and then the process of steps S41 through S55 is executed. The contents of steps S41 through S55 are the same as those shown in FIG. 23, and thus the same reference numbers are assigned thereto, and description thereof is omitted here.

<Determination of Current IG Stream and Playback Type Thereof>

A current IG stream whose stream number is to be stored in PSR0 is selected based on the output mode in PSR22, stereoscopic PG capability in PSR24, and "is_SS_IG".

Figure 25B:
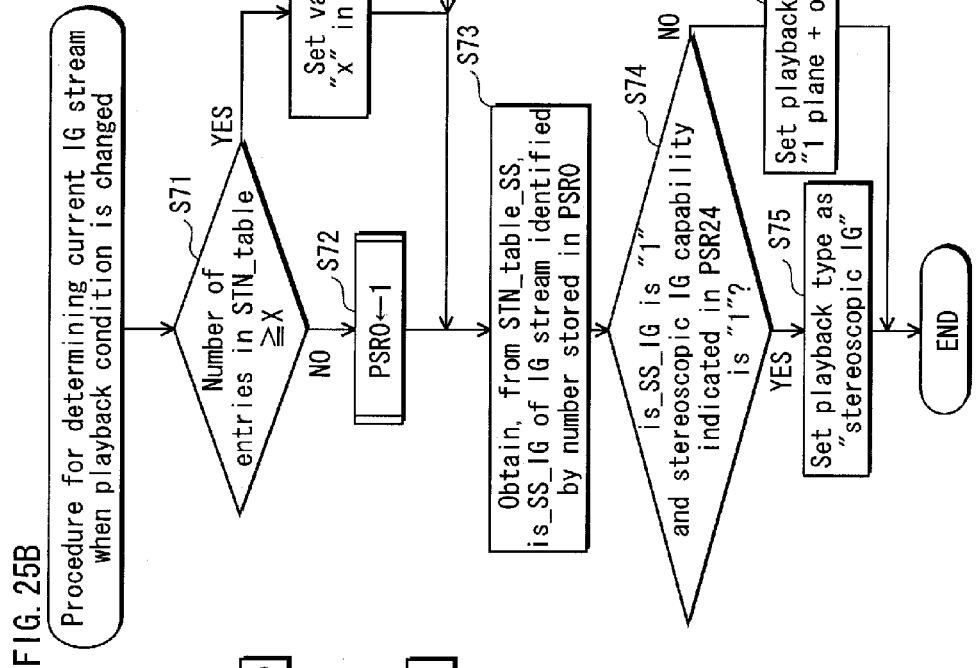
FIGS. 25A and 25B are flowcharts showing the procedures for determining the current IG stream and the playback type thereof.
Figure 25A:
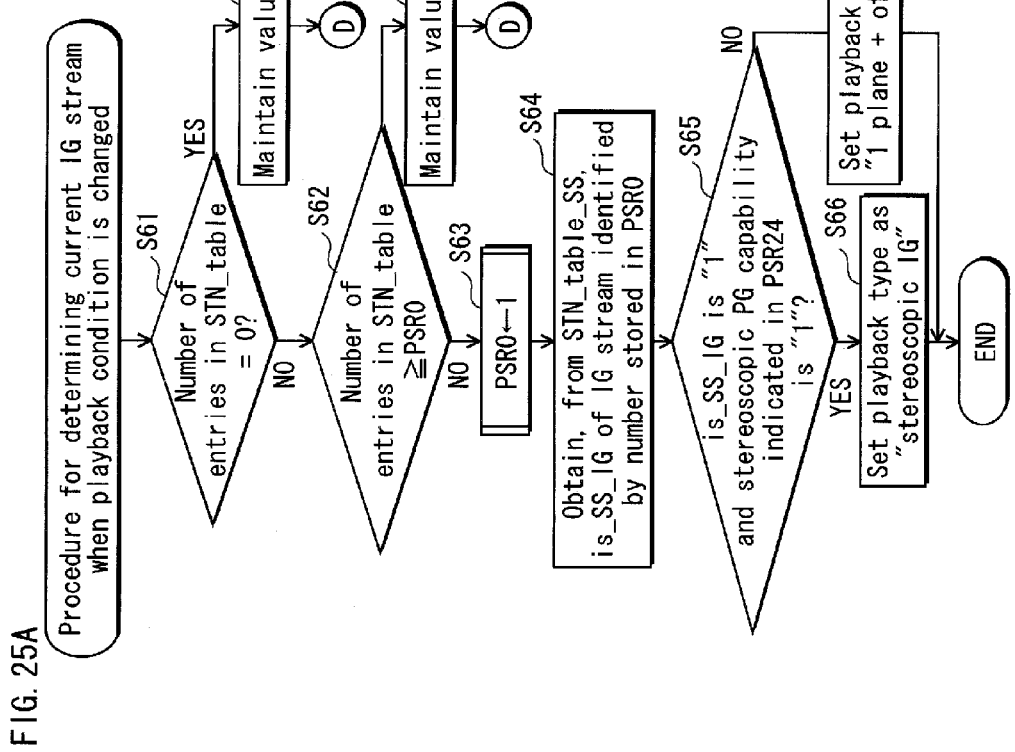

FIGS. 25A and 25B are flowcharts showing the procedures for determining the current IG stream and the playback type thereof.

FIG. 25A is a flowchart showing the procedure for determining the current IG stream when the playitem is changed and the playback condition of the playback device is changed. Among the steps shown in this flowchart, the process of steps S61 to S65 is common to the 3D output mode and the 2D output mode, and the process of steps S64 to S67 is unique to the 3D output mode.

In step S61, it is judged whether or not the number of entries in the stream selection table is "0". When the number is "0", the value in PSR0 is maintained (step S64).

When it is judged in step S61 that the number of entries in the stream selection table is not "0", the control proceeds to step S62 in which it is judged whether or not the number of entries in the stream selection table is equal to or greater than the value in PSR0. When the result of judgment in step S62 is affirmative, the value in PSR0 is maintained (step S65). When it is judged that the value in PSR0 is greater than the number of entries in the stream selection table, value "1" is set in PSR0 (step S63). Steps S64 through S67 that follow step S63 are unique to the 3D output mode. More specifically, steps S64 through S67 in the 3D output mode are performed as follows. An "is_SS_IG" of an IG stream identified by the IG stream number stored in PSR0 is obtained from the stream registration information in the extension stream selection table (step S64). It is judged whether or not the obtained "is_SS_IG" flag is "1" and the stereoscopic IG capability indicated by "b3" in PSR24 is "1" (step S65). When the result of judgment in step S65 is YES, the playback type is set as the stereoscopic IG (step S66). When the playback type is set as the stereoscopic IG, the stereoscopic playback is performed by using packet identifier references that are included in the left-eye and right-eye stream entries of a piece of stream registration information corresponding to the current stream number stored in PSR0, among a plurality of pieces of stream registration information in the extension stream selection table. More specifically, the demultiplexing unit is caused to demultiplex TS packets whose packet identifiers are indicated by the packet identifier references that are included in the left-eye and right-eye stream entries of a piece of stream registration information corresponding to the current stream number stored in PSR0.

When the judgment result in step S65 is NO, the playback type is set as "1 plane+offsetIG" (step S67). When the playback type is set as "1 plane+offsetIG", the IG playback in the "1 plane+offset" mode is executed by using an offset sequence indicated by the stereoscopic IG offset sequence ID reference information in a piece of stream registration information corresponding to the current stream number stored in PSR0, among a plurality of pieces of stream registration information in the extension stream selection table. More specifically, an offset sequence is extracted from the video decoder and the extracted offset sequence is supplied to the shift unit, wherein the offset sequence to be extracted is indicated by the stereoscopic IG offset sequence ID reference information in a piece of stream registration information corresponding to the current stream number, among a plurality of pieces of stream registration information stored in the SEI message of the dependent-view video stream.

FIG. 25B is a flowchart showing the procedure for setting PSR0 which is to be executed when a stream change is requested by the set stream stereoscopic command (set stream SS command), by the set stream command, or by a user operation requesting a stream number change.

When a stream change is requested by the set stream stereoscopic command (set stream SS command), by the set stream command, or by a user operation requesting a stream number change, the stream number specified by an operand of the command, or the stream number specified by a user operation, is set as the number x and the procedure is executed as follows.

In step S71, it is judged whether or not the number of entries in the stream selection table is equal to or greater than the number x. When the result of judgment in step S71 is affirmative, the value is set in PSR0 (step S74). When it is judged that the value x is greater than the number of entries in the stream selection table, value "1" is set in PSR0 (step S72). In the 3D output mode, the procedure is executed as follows. An "is_SS_IG" of an IG stream identified by the IG stream number stored in PSR0 is obtained from the stream registration information in the extension stream selection table (step S73). It is judged whether or not the obtained "is_SS_IG" flag is "1" and the stereoscopic IG capability indicated by PSR24 is "1" (step S74). When the result of judgment in step S74 is YES, the playback type is set as the stereoscopic IG (step S75). When the judgment result in step S74 is NO, the playback type is set as "1 plane+offset" (step S76).

Figures 26A, 26B, 26C:
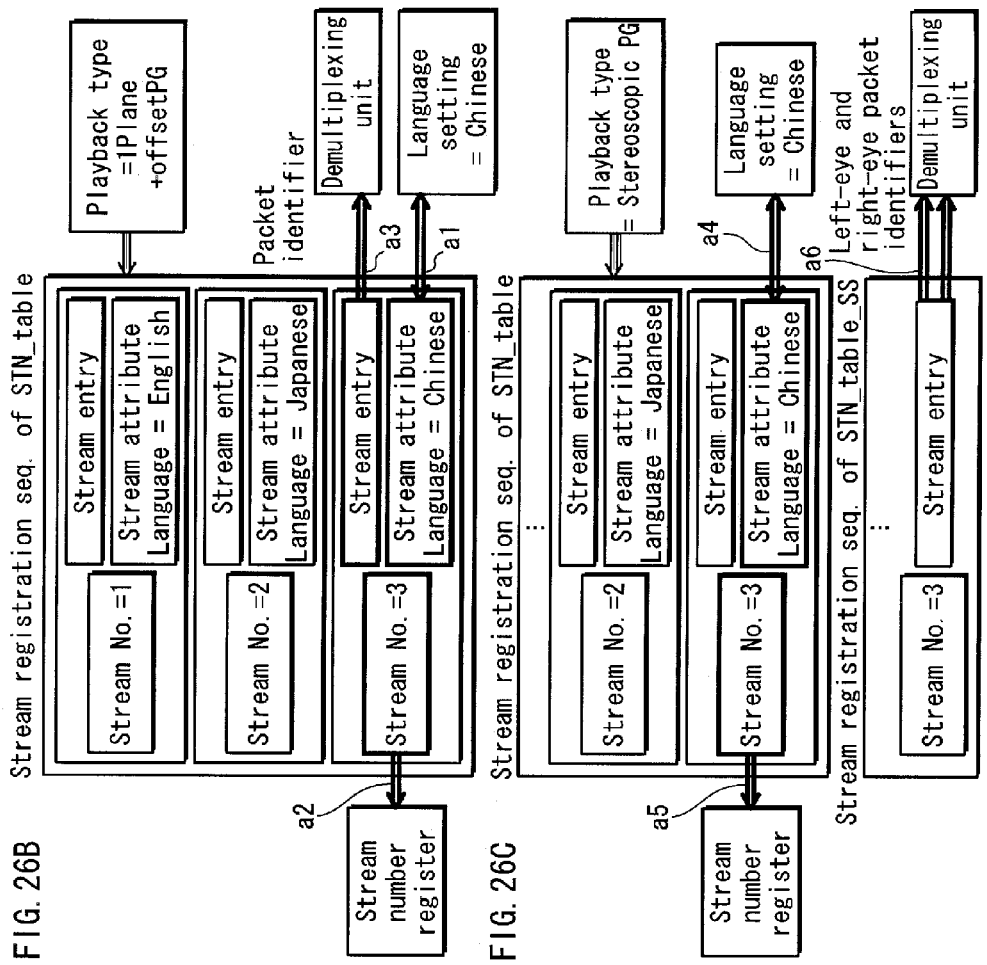
FIGS. 26A through 26C show what packet identifiers are output to the demultiplexing unit by the combined stream registration sequence.

FIGS. 26A through 26C show what packet identifiers are output to the demultiplexing unit by the combined stream registration sequence.

FIG. 26A shows the combined stream registration sequence used in the operation as an example. The combined stream registration sequence is composed of three pieces of stream registration information provided in the basic stream selection table and three pieces of stream registration information provided in the extension stream selection table. The three pieces of stream registration information provided in the basic stream selection table have stream numbers "1", "2", and "3", respectively, and the stream attributes in the three pieces of stream registration information have "English", "Japanese", and "Chinese" as the language attributes, respectively.

The three pieces of stream registration information provided in the extension stream selection table have stream numbers "1", "2", and "3", respectively, and the stream attributes in the three pieces of stream registration information have "English", "Japanese", and "Chinese" as the language attributes, respectively. The stream registration information provided in the basic stream selection table differs in the packet identifier stored in the stream entry, from the stream registration information provided in the extension stream selection table. Also, the stream registration information provided in the extension stream selection table contains (i) a packet identifier for a base-view PG stream for the B-D presentation mode, and (ii) a packet identifier for a dependent-view PG stream.

FIG. 26B shows the setting of a stream number and the outputting of a packet identifier when such a combined stream registration sequence is supplied to playback device in which the language has been set to "Chinese" and the output mode has been set to the 2D output mode.

The arrows identified by signs "a1", "a2", and "a3" schematically indicate (i) the judgment on whether language settings match each other, (ii) the setting of a stream number in the stream number register, and (iii) the output of a packet identifier to the demultiplexing unit, respectively.

In the operation procedure of this example, it is judged whether the language setting of the playback device matches the stream attribute contained in the stream registration information whose stream number is "3", and it is judged that they match. As a result of this, the stream number "3" of this stream registration information is written into the stream number register. Also, the packet identifier written in the stream entry of the basic stream selection table is output to the demultiplexing unit. Following this, a TS packet identified by the packet identifier written in the stream entry of the stream registration information whose stream number is "3" in the basic stream selection table is output to the decoder.

FIG. 26C shows the setting of a stream number and the outputting of a packet identifier when such a combined stream registration sequence is supplied to playback device in which the language has been set to "Chinese" and the output mode has been set to the B-D presentation mode.

The arrows identified by signs "a4", "a5", and "a6" schematically indicate (i) the judgment on whether language settings match each other, (ii) the setting of a stream number in the stream number register, and (iii) the output of a packet identifier to the demultiplexing unit, respectively.

In the operation procedure of this example, it is judged whether the language setting of the playback device matches the stream attribute contained in the stream registration information whose stream number is "3", and it is judged that they match. As a result of this, the stream number "3" of this stream registration information is written into the stream number register. Also, the packet identifier written in the stream entry of the basic stream selection table is output to the demultiplexing unit. Following this, a pair of TS packets identified by a pair of packet identifiers written in the stream entry of the stream registration information whose stream number is "3" in the extension stream selection table are output to the decoder.

Figure 27A:
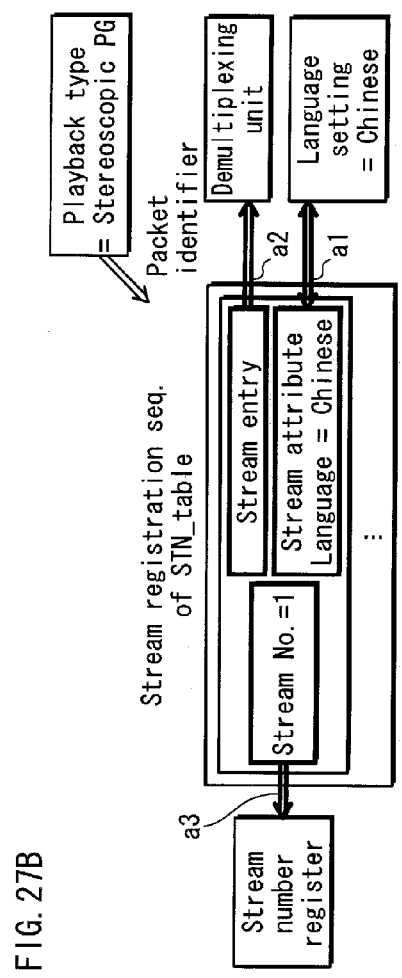
FIGS. 27A through 27C show what packet identifiers are output to the demultiplexing unit by the combined stream registration sequence.
Figure 27B:
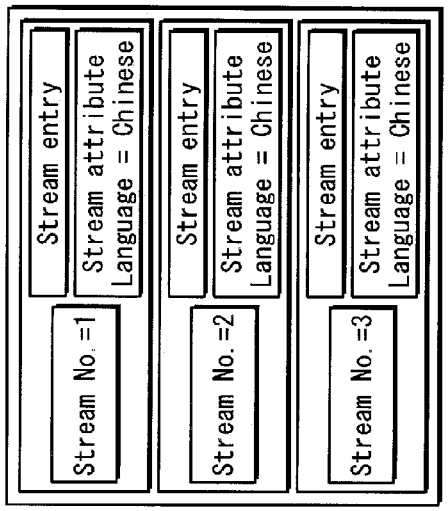
Figure 27C:
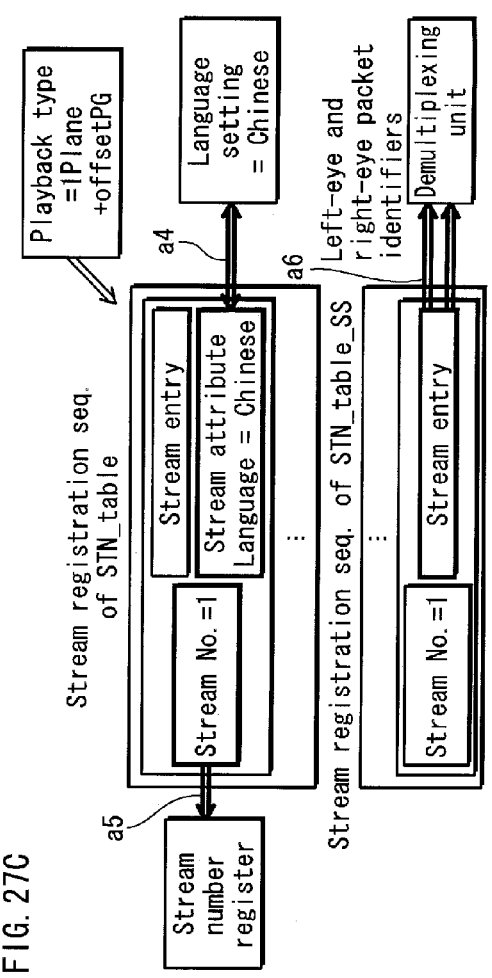

FIGS. 27A through 27C show what packet identifiers are output to the demultiplexing unit by the combined stream registration sequence.

FIG. 27A shows the combined stream registration sequence used in the operation as an example. The combined stream registration sequence is composed of three pieces of stream registration information provided in the basic stream selection table and three pieces of stream registration information provided in the extension stream selection table. The three pieces of stream registration information provided in the basic stream selection table have stream numbers "1", "2", and "3", respectively, and all of the stream attributes in the three pieces of stream registration information have "Chinese" as the language attributes.

The three pieces of stream registration information provided in the extension stream selection table have stream numbers "1", "2", and "3", respectively, and all of the stream attributes in the three pieces of stream registration information have "Chinese" as the language attributes. The stream registration information provided in the basic stream selection table differs in the packet identifier stored in the stream entry, from the stream registration information provided in the extension stream selection table. Also, the stream registration information provided in the extension stream selection table contains (i) a packet identifier for a base-view PG stream for the B-D presentation mode, and (ii) a packet identifier for a dependent-view PG stream.

FIG. 27B shows the setting of a stream number and the outputting of a packet identifier when such a combined stream registration sequence is supplied to playback device in which the language has been set to "Chinese" and the output mode has been set to the 2D output mode.

The arrows identified by signs "a1", "a2", and "a3" schematically indicate (i) the judgment on whether language settings match each other, (ii) the setting of a stream number, and (iii) the output of a packet identifier to the demultiplexing unit, respectively.

In the operation procedure of this example, it is judged whether the language setting of the playback device matches the stream attribute contained in the stream registration information whose stream number is "1", and it is judged that they match. As a result of this, the stream number "1" of this stream registration information is written into the stream number register. Also, the packet identifier written in the stream entry of the basic stream selection table is output to the demultiplexing unit. Following this, a TS packet identified by the packet identifier written in the stream entry of the stream registration information whose stream number is "1" in the basic stream selection table is output to the decoder.

FIG. 27C shows the setting of a stream number and the outputting of a packet identifier when such a combined stream registration sequence is supplied to playback device in which the language has been set to "Chinese" and the output mode has been set to the B-D presentation mode.

The arrows identified by signs "a4", "a5", and "a6" schematically indicate (i) the judgment on whether language settings match each other, (ii) the setting of a stream number in the stream number register, and (iii) the output of a packet identifier to the demultiplexing unit, respectively.

In the operation procedure of this example, it is judged whether the language setting of the playback device matches the stream attribute contained in the stream registration information whose stream number is "1", and it is judged that they match. As a result of this, the stream number "1" of this stream registration information is written into the stream number register. Also, the packet identifier written in the stream entry of the basic stream selection table is output to the demultiplexing unit. Following this, a pair of TS packets identified by a pair of packet identifiers written in the stream entry of the stream registration information whose stream number is "1" in the extension stream selection table are output to the decoder.

As described above, according to the present embodiment, a capability flag is provided to indicate whether or not a graphics stereoscopic effect can be realized, and the capability flag can be used to set whether or not the stereoscopic effect is realized with respect to a graphics stream that is indicated in the extension stream selection table that the graphics stereoscopic effect is available. Accordingly, even if a graphics stream having the stereoscopic effect is recorded on the recording medium, the manufacturer can prohibit the stereoscopic effect of the graphics stream by setting the capability flag as "no capability" to perform instead an offset control that provides an easier quality control.

Such a structure makes it possible to market a plurality of types of playback devices (for example, two types of playback devices: one having a top-of-the-line stereoscopic effect; and the other not having such a stereoscopic effect), thereby expanding the lineup of products.

Embodiment 2

In Embodiment 1, the stream selection procedure is used to determine whether or not a capability to process the stereoscopic IG or PG is present, or to determine the playback type of the IG or PG. In the present embodiment, a mode selection procedure is used to determine the output mode in the playback device.

The above-mentioned mode selection procedure is executed when a title is selected. In the present application document, a title includes at least one operation mode object as an indispensable structural element thereof. The operation mode object is an operation management table that defines details of operation of the playback device when it plays back a title in a mode. The title mentioned here falls into some types such as an HDMV title and a BD-J title.

The "HDMV title" is a title to be played back in the HDMV mode, and is composed of a movie object and playlists (playlist information, clip information, stream file) that are each played back upon issuance of a playback command in the movie object.

The "movie object" is an operation mode object that is associated with a title number of an HDMV title in the index table. In the movie object, a batch program composed of a sequence of navigation commands is associated with a resume flag indicating whether or not a resume is available, a flag indicating whether or not the menu call is masked, and a flag indicating whether or not the title search is masked.

The "BD-J title" is a title to be played back in the BD-J mode, and is composed of class archive files and BD-J objects.

The "class archive file" is a file generated by archiving a file of the class structure of the bytecode application (class file) together with a digital certificate manifest file, a disc signature file, a disc signature encryption key file, and a permission request file. A loading of an application is made by handling the entire class archive file so that the authenticity of the application can be verified by using the digital certificate, disc signature, and disc signature encryption key when the class is loaded. Also, with the presence of the permission request file, it is possible to limit the operation of the application to the for which a predetermined right has been given.

The bytecode application archived in the class archive file is an execution-format program obtained by compiling a class structure being a source code written in an object-oriented programming language. The bytecode application is structured from a code (bytecode) that does not depend on the device. The bytecode application in the present embodiment is event-driven, and the state transfers according to the event. There are four states: "loaded"; "pause"; "active"; and "destroyed". A key event is registered in the bytecode application, wherein the key event is a trigger for operation of the bytecode application. The registration of the key event being a trigger for operation of the bytecode application is performed by an event listener. This completes the explanation of the class archive file.

Next, the BD-J object, which is an operation mode object for the BD-J mode, will be described in detail.

The "BD-J object" defines detailed operations of the playback device in the BD-J mode. More specifically, the detailed operations of the playback device include: (1) class load of application when the corresponding title has become the current title; (2) application signaling when the corresponding title has become the current title; (3) HAVi device configuration when the application started by the application signaling executes the GUI process; (4) playlist access in the current title; (5) Cache In Cache Out of the class archive file when the corresponding title has become the current title; and (6) event assignment in which an event, which is a trigger for the started application, is assigned to a key.

The "class load" is a process of generating an instance of a class file archived in the class archive file into the heap area of the platform. The "application signaling" is a control for defining whether to automatically start an application that is an instance of a class file, or whether to set the life cycle of the application as a title boundary or a disc boundary. Here, the title boundary is a control that erases a thread as an application from the heap area at the same time as a title ends; and the disc boundary is a control that erases a thread as an application from the heap area at the same time as a disc eject. Conversely, a control that does not erase a thread from the heap area even if a disc eject is performed is called a "disc unboundary". The "HAVi device configuration" defines the resolution of the graphics plane, fonts to be used in display of characters and the like when the application executes the GUI process.

The "playlist access" specifies a playlist that the started application can instruct to be played back, and a playlist that is to be played back automatically when a title is selected.

The "Cache In of the class archive file" is a process for reading a class archive file, which is a target of the class load, into the cache preliminarily. The "Cache Out of the class archive file" is a process for deleting a class archive file from the cache. The "event assignment to drive an application" is a process for assigning an event, which has been registered in the event listener of the application, to a key that can be operated by the user.

A bytecode application for which the application signaling is performed by the application management table in the BD-J object is called a "BD-J application".

Here, there are following differences between the HDMV title and the BD-J title. In the HDMV title, the main operating body is a module such as a command interpreter for executing the navigation command or a playback control engine for decoding and playing back a playlist.

On the other hand, in the BD-J title, the main operating body is a group of software including a class loader for the class load, an application manager for the application signaling, a HAVi device, a playback control engine for playing back a playlist by the Java framework, a cache manager for the Cache In Cache Out, and an event manager for the event process, namely, a group of software that resembles a group of software in a multimedia platform terminal for digital broadcasting. Accordingly, when the title is switched from a BD-J title to an HDMV title or from an HDMV title to a BD-J title, the software structure in the playback device changes greatly.

When the current title is selected, the above-described mode selection procedure is executed to perform: a process for checking whether the output mode is optimum for the main operating body of the software after the title is switched; and a process for selecting an output mode that is optimum for the operation mode after the title is switched.

The main operating body of the mode selection procedure is the procedure executing unit in the playback control unit 210. Also, the output mode is stored in the register set 203.

Figure 28:
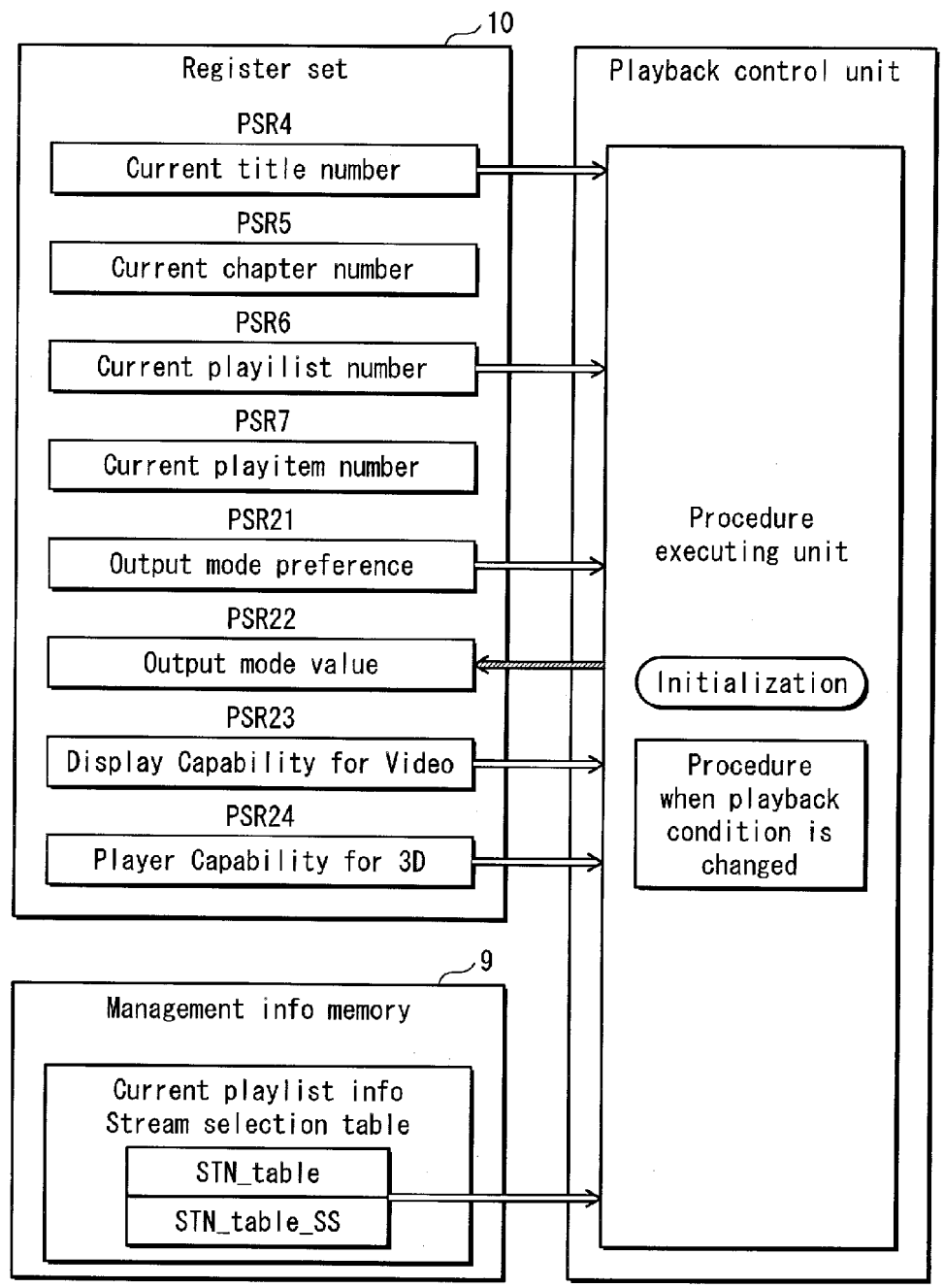
FIG. 28 shows the internal structures of the register set 203 and the playback control unit 210.

FIG. 28 shows the internal structures of the register set 203 and the playback control unit 210. The left-hand side of FIG. 28 shows the internal structure of the register set 203, and the right-hand side shows the internal structure of the playback control unit 210.

The following describes the player status registers and the player setting registers assigned with respective register numbers.

PSR1 is a stream number register for the audio stream, and stores a current audio stream number.

PSR2 is a stream number register for the PG stream, and stores a current PG stream number.

PSR4 is set to a value in the range from "1" through "100" to indicate a current title number.

PSR5 is set to a value in the range from "1" through "999" to indicate a current chapter number; and is set to a value "0xFFFF" to indicate that the chapter number is invalid in the playback device.

PSR6 is set to a value in the range from "0" through "999" to indicate a current playlist number.

PSR7 is set to a value in the range from "0" through "255" to indicate a current playitem number.

PSR8 is set to a value in the range from "0" through "0xFFFFFFFF" to indicate a current playback time point (current PTM) with the time accuracy of 45 KHz.

PSR10 is a stream number register for the IG stream, and stores a current IG stream number.

PSR21 indicates whether or not the user intends to perform the stereoscopic playback.

PSR22 indicates an output mode value.

PSR23 is used for the setting of "Display Capability for Video". This indicates whether or not a display device connected to the playback device has a capability to perform the stereoscopic playback.

PSR24 is used for the setting of "Player Capability for 3D". This indicates whether or not the playback device has a capability to perform the stereoscopic playback.

On the other hand, the procedure executing unit determines an output mode unique to the current playlist by referring to the PSR4, PSR6, PSR21, PSR23 and the stream selection table of the current playlist information in the register set 203. The "Player Capability for 3D" stored in PSR24 means the capability of playback device regarding the 3D playback as a whole. Thus it may be simply denoted as "3D-Capability".

Figure 29:
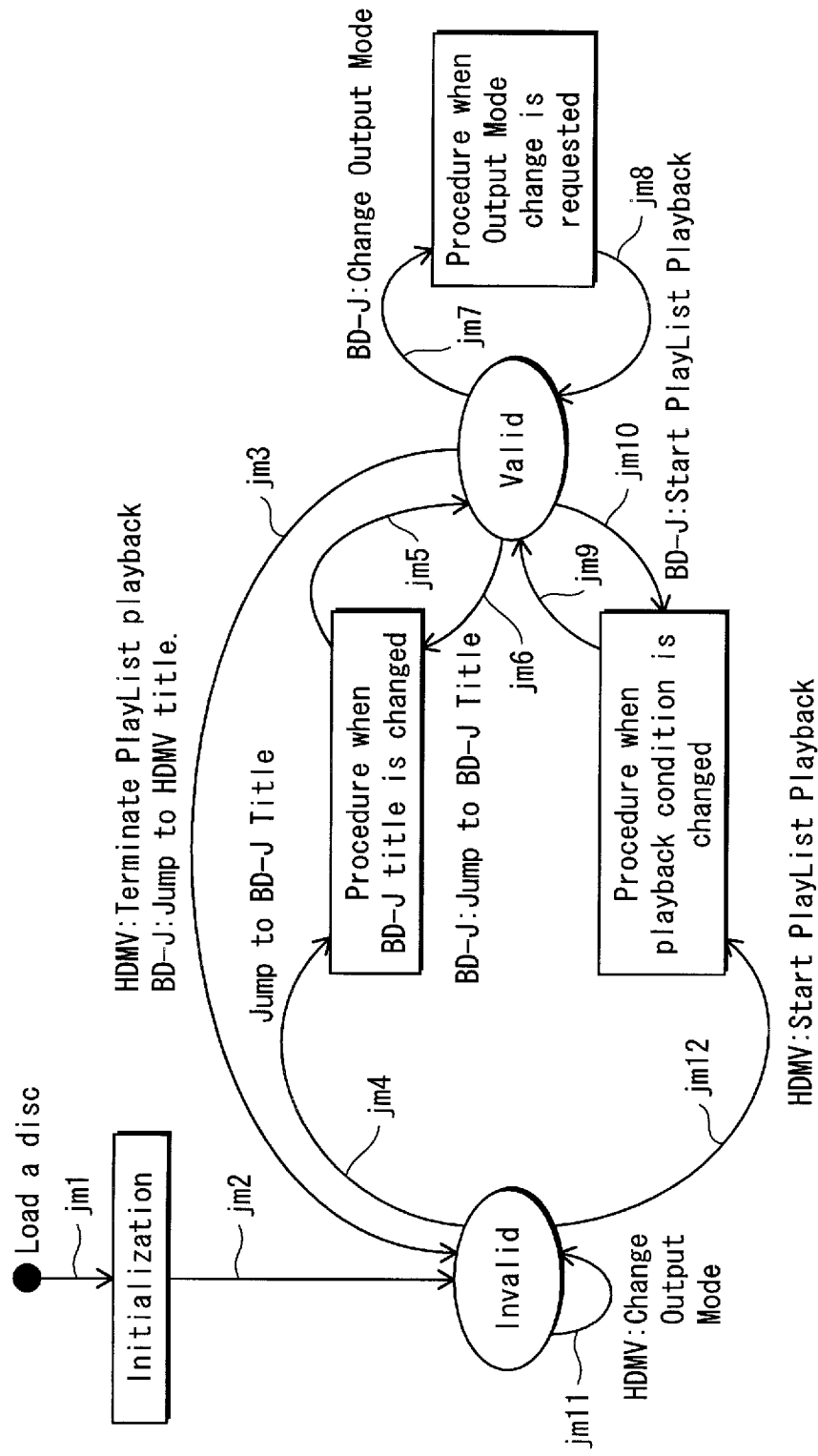
FIG. 29 shows the state transition of the selection model of the output mode.

PSR23 defines the output mode, and the selection model of the state transition is defined as shown in FIG. 29.

FIG. 29 shows the state transition of the selection model of the output mode. There exist two general states in this selection model. The two general states are represented by "invalid" and "valid" in the ovals. The "invalid" indicates that the output mode is invalid, and the "valid" indicates that the output mode is valid.

The general state is maintained unless a state transition occurs. The state transition is caused by a start of playlist playback, a navigation command, an output mode change requested by a BD-J application, or a jump to a BD-J title. When a state transition occurs, a procedure for obtaining a preferable output mode is executed.

The arrows jm1, jm2, jm3, . . . jm12 shown in the drawing represent events that trigger state transitions. The state transitions in the drawing include the following.

The "Load a disc" means the state in which the BD-ROM has been loaded.

The "Start presentation" means to "start playlist playback" in the HDMV mode, while in the BD-J mode, it means to branch to a BD-J title. This is because branching to a BD-J title does not necessarily mean that a playlist starts to be played back since the playlist is not an indispensable structural element of the BD-J title.

The "Jump to BD-J title" means to branch to a BD-J title. More specifically, it indicates that a title (BD-J title), which is associated with a BD-J application in the index table, becomes a current title.

The "Start Playlist Playback" means that a playlist number identifying a playlist is set to a PSR, and the playlist information is read onto the memory as the current playlist information.

The "Change Output Mode" means that the output mode is changed when the BD-J application, which has the right to switch to the 3D output mode, calls the API.

The "Terminate Presentation", in the HDMV mode, means that a playback of a playlist is terminated; and in the BD-J mode, means that a BD-J title jumps to an HDMV title.

When a disc is loaded, the state of the output mode transits to a temporary state "Initialization". After this, the state of the output mode transits to the invalid state.

The output mode selection state is maintained to be "invalid" until the playback start (Start Presentation) is made active. The "Start Presentation", in the HDMV mode, means that a playlist has been started to be played back; and in the BD-J mode, means that a BD-J title has been started to be played back, and some operation of a BD-J application has been started. It does not necessarily mean that a playlist has been started to be played back.

When Start Presentation is made active, the state of the output mode transits to a temporary state "Procedure when playback condition is changed".

The output mode transits to "Valid" depending on the result of "Procedure when playback condition is changed". The output mode transits to "Invalid" when the output mode is effective and Start Presentation is completed.

The navigation command in the movie object should be executed before a playlist starts to be played back because the content provider sets a preferable output mode with the command. When the navigation command in the movie object is executed, the state transits to "invalid" in this model.

The state transition shown in FIG. 29 is realized by a predetermined procedure called "mode selection procedure". The mode selection procedure is composed of "Initialization" and "Procedure when playback condition is changed".

Figure 30:
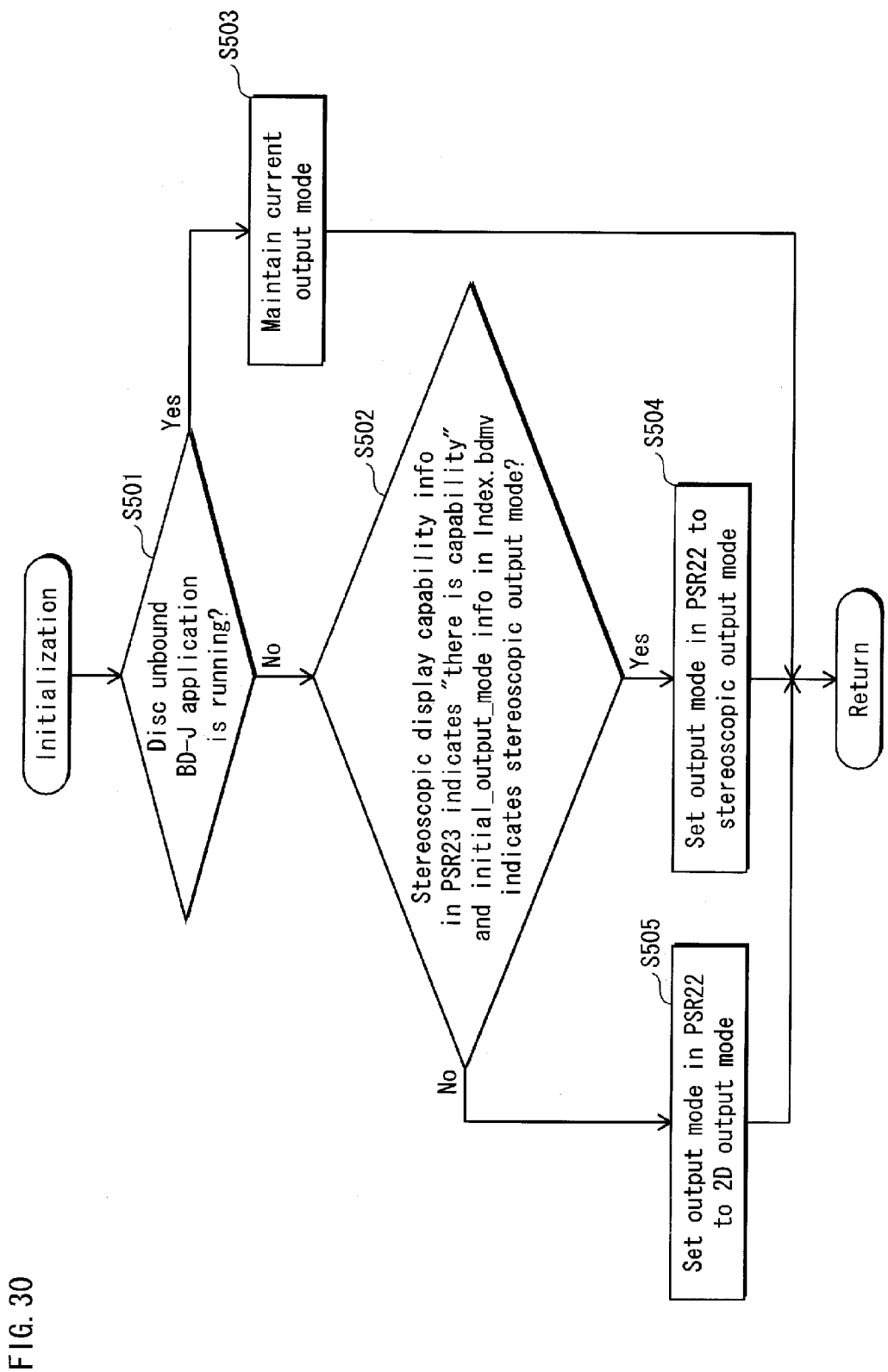
FIG. 30 is a flowchart showing the procedure for the initialization process.

FIG. 30 is a flowchart showing the procedure for the initialization process.

In step S501, it is judged whether or not a disc unbound BD-J application is running. In step S502, it is judged whether or not the stereoscopic display capability information in PSR23 indicates "there is capability" and the initial_output_mode information in the index table (index.bdmv) indicates the "stereoscopic output mode". The data structure of the initial_output_mode information is not related to the subject of the present embodiment, and thus will be described in some subsequent embodiment.

When it is judged YES in step S501, the current output is maintained in step S503. When it is judged NO in step S501 and YES in step S502, the output mode in PSR22 is set to the stereoscopic output mode in step S504. When it is judged NO in step S501 and No in step S502, the output mode in PSR22 is set to the 2D output mode in step S505.

According to the Initialization described above, the playback device enters the 3D output mode as soon as a disc is inserted therein when the initial_output_mode information is ON and the playback device has the capability to perform a playback in the B-D presentation mode. In that case, when the initial_output_mode information is ON, the user can immediately be soaked in the virtual reality by the stereoscopic playback by wearing the 3D glasses immediately after inserting the recording medium into the playback device.

Figure 31:
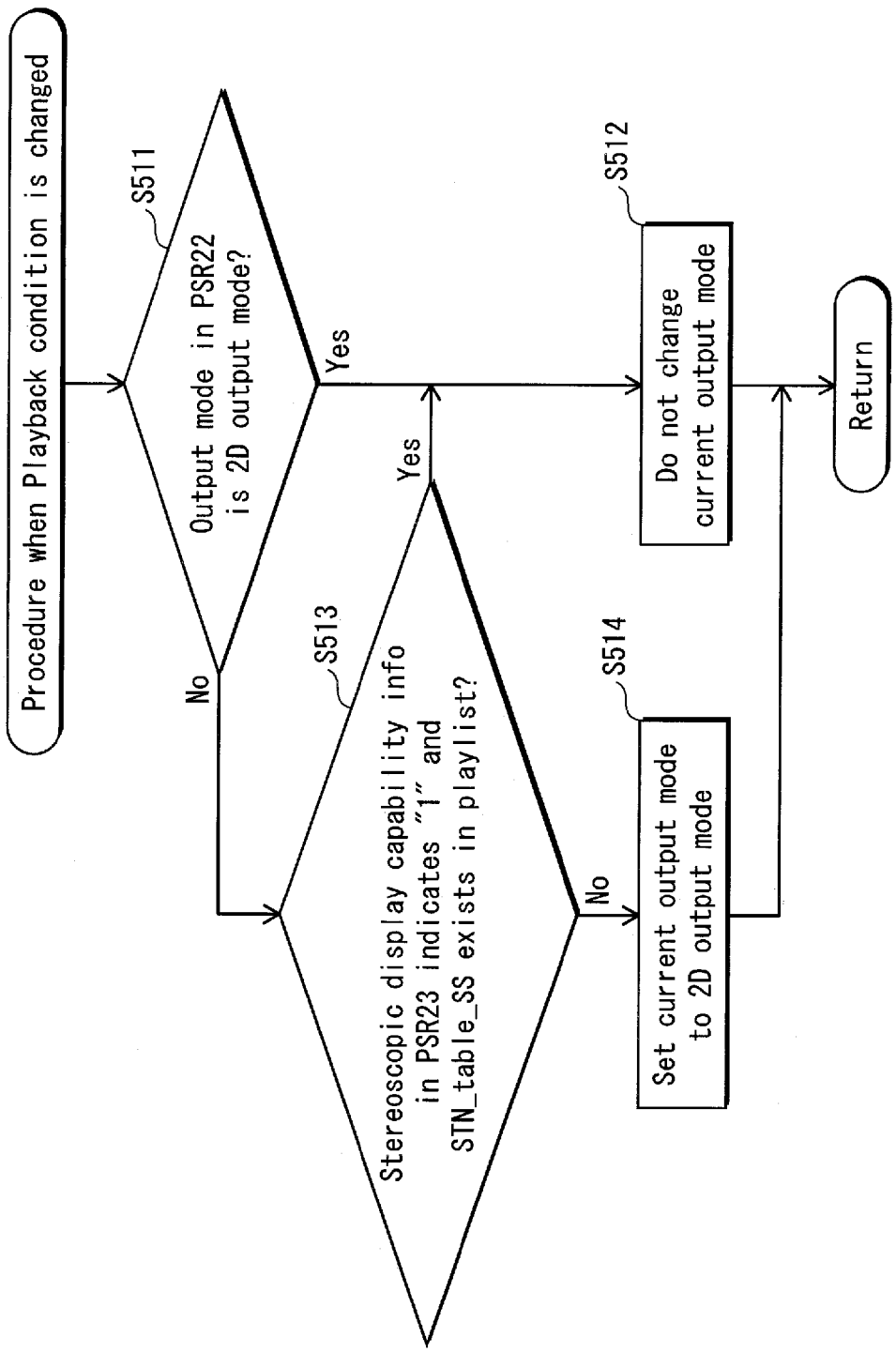
FIG. 31 shows the "Procedure when playback condition is changed".

FIG. 31 shows the "Procedure when playback condition is changed". In step S511, it is judged whether or not the output mode in PSR22 is the 2D output mode. In step S513, it is judged whether or not the stereoscopic display capability information in PSR23 indicates "1" and the extension stream selection table exists in the playlist.

When it is judged YES in step S511, the current output mode is not changed in step S512. When it is judged NO in step S511 and YES in step S513, the current output mode is not changed (step S512). When it is judged NO in step S511 and NO in step S513, the current output mode is set to the 2D output mode (step S514).

Figure 32A:
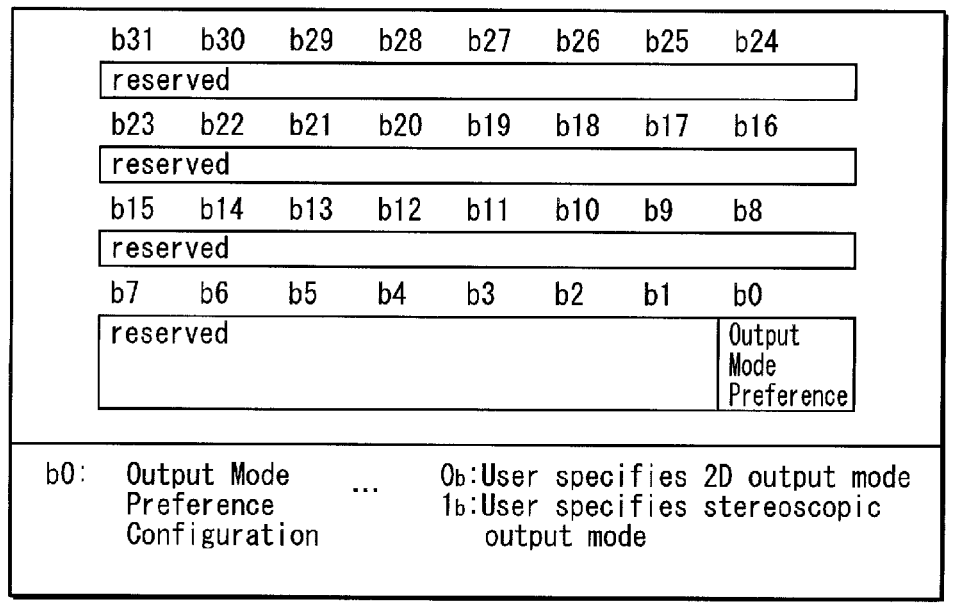
FIGS. 32A and 32B show the bit assignment in the player setting register for realizing the 3D output mode.
Figure 32B:
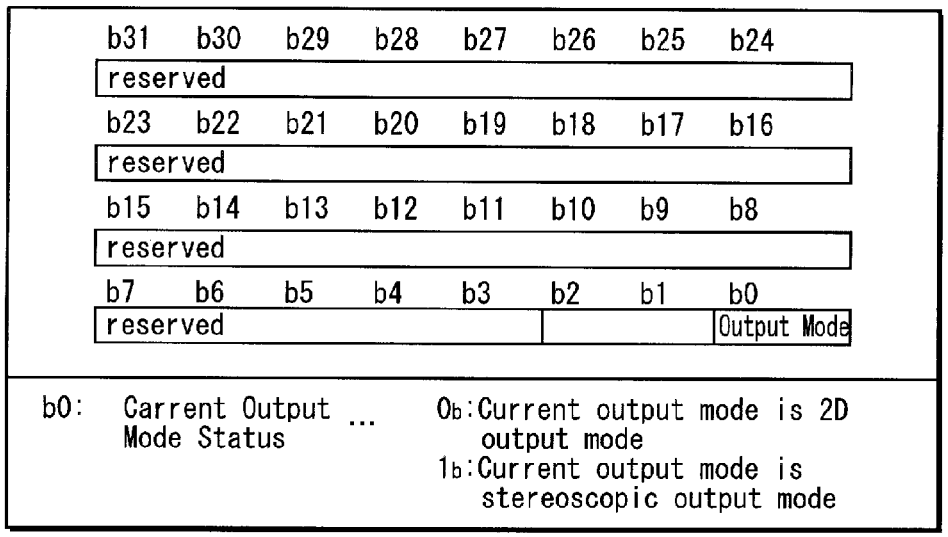

The following describes the bit assignment in the player setting register for realizing the 3D output mode. Registers used for realizing the 3D output mode are PSR21, PSR22, PSR23, and PSR24. FIGS. 32A and 32B show bit assignment in these registers. FIGS. 32A and 32B show the bit assignment in the player setting register for realizing the 3D output mode.

FIG. 32A shows the bit assignment in PSR21. In the example shown in FIG. 32A, the lowest-order bit "b0" represents the output mode preference. When bit "b0" is set to "0b", it indicates the 2D output mode, and when bit "b0" is set to "1b", it indicates the stereoscopic output mode. The navigation command or the BD-J application cannot rewrite the value set in PSR21.

FIG. 32B shows the bit assignment in PSR22. The lowest-order bit "b0" in PSR22 represents the current output mode. When the output mode is changed, the video output of the playback device should be changed in correspondence with it. The value of the output mode is controlled by the selection model.

As described above, according to the present embodiment, the validity of the output mode can be maintained even if the state of the playback is changed, or a request to switch between streams is received from the user.

Embodiment 3

In the previous embodiment, the output mode is determined when the current title is selected. The present embodiment shows how to determine the output mode for the current title after a BD-J title is selected as the current title.

Figure 33:
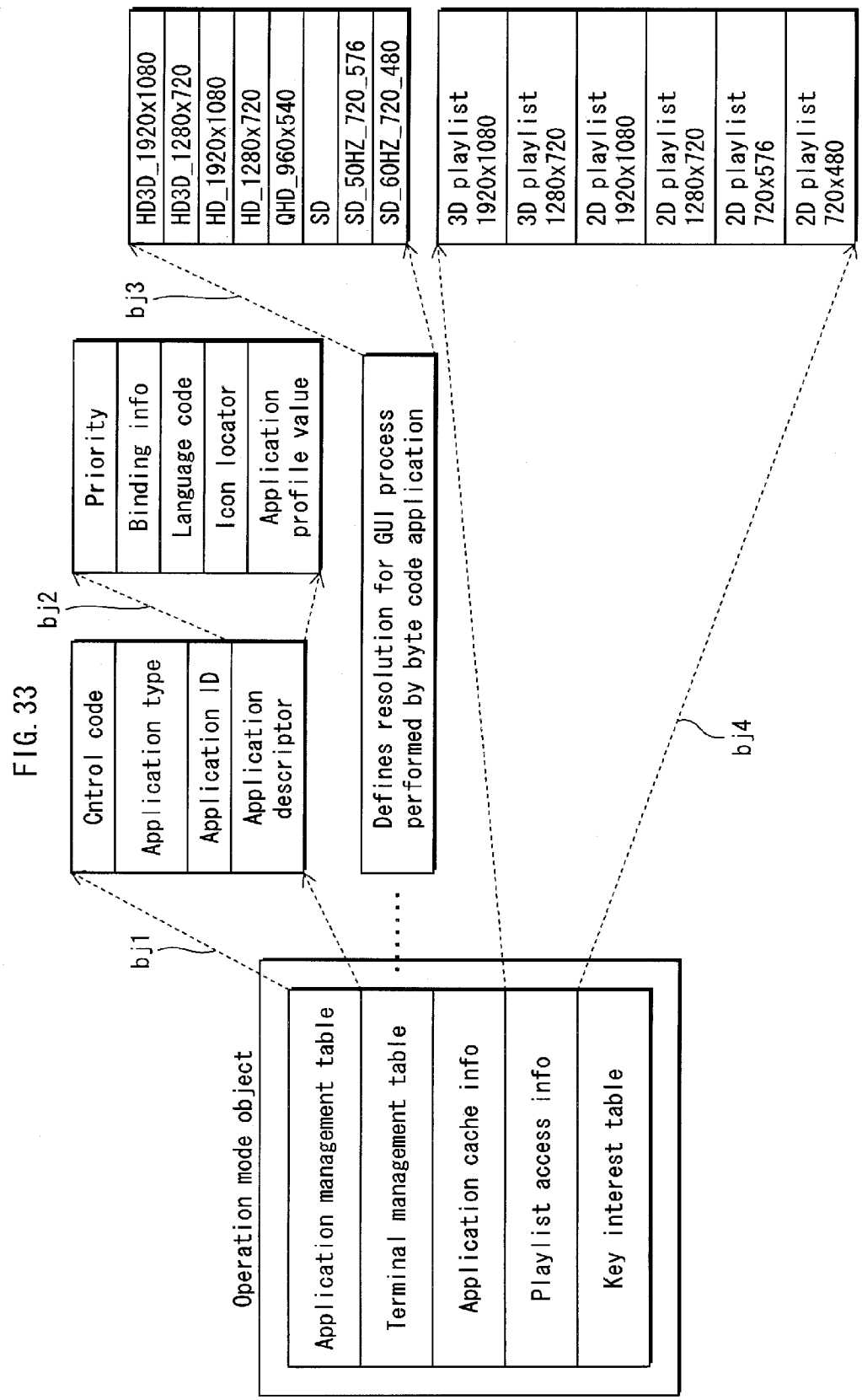
FIG. 33 shows one example of the internal structure of the BD-J object.

The following describes the BD-J object. FIG. 33 shows one example of the internal structure of the BD-J object. As shown in FIG. 33, the BD-J object is composed of "application management table", "terminal management table", "application cache information", "playlist access information", and "key interest table".

The "application management table" is a control table that instructs a title boundary application signaling to the application manager or the class loader. The "terminal management table" is a management table that indicates the HAVi configuration for realizing the GUI, fonts to be used in the GUI, and present/absence of masks of user operations to the multimedia home platform (MHP). The "application cache information" is a control table that indicates the Cache In/Cache Out of the archive file at the title selection to the cache manager. The "playlist access information" is a control table that indicates specification of the automatic playback of a playlist at the title selection to the playback control engine (PCE). The "key interest table" is a control table that indicates correspondence between keys and events to the event manager.

The lead line bj1 indicates the close-up of entries of the application management table. As indicated by the lead line, the application management table includes the following entries: "control code" that indicates how an application should be started in a title, namely whether it should be automatically started (AutoStart) or started upon receiving a call from another application (Present); "application type";

"application ID" that indicates a target application by using a five-digit number representing the file name of the archive file which archived the BD-J application to be started; and "application descriptor". The lead line bj2 indicates the close-up of the internal structure of the entries of the "application descriptor". As indicated by the lead line, the application descriptor stores, for each application, "priority", "binding information", "language code", "icon locator", and "application profile value", wherein the "priority" indicates the priority of the target application when it is loaded, the "binding information" indicates whether or not the target application is title-unbound or disc-bound, the "language code" indicates the language attribute of the target application, and the "icon locator" indicates the location of an icon associated with the target application. The "application profile value" is set as "=5" when the target application supports the 3D output mode. For the stereoscopic content presence flag in the BDMV application information of the index table to be set to "1", the "application profile value" of the application needs to be set as "=5".

The lead line bj3 indicates the close-up of the configuration information in the terminal management table. The configuration information is information that instructs the playback device to ensure the graphics plane. As indicated by the lead line bj3, the terminal management table can be set to one of HD3D_1920×1080, HD3D_1280×720, HD_1920×1080, HD_1280×720, QHD_960×540, SD, SD_50 HZ_720×576, and SD_60 HZ_720×480. As indicated by the lead line bj4, the playlist access information specifies a playlist that is to be played back automatically, which may be one of 3D playlist 1920×1080, 3D playlist 1280×720, 2D playlist 1920×1080, 2D playlist 1280×720, 2D playlist 720×576, and 2D playlist 720×480.

When a title is selected as the current title, the playback device starts, without waiting for a playback instruction from the application, playing back a playlist specified by a piece of playlist access information that corresponds to the selected title, and continues the playback of the playlist when an execution of the BD-J application ends before the playback of the playlist.

With such a preceding playback, even when, during a playback, a loading of classes of application takes time, thus the drawing image cannot be displayed, and the output of the interactive screen is delayed, the playlist is played back and the playback image is output as it is. That is to say, even if a start of an application is apparently delayed, the playback image of the playlist is displayed to be viewed by the user in the meantime. Thus a state in which "something is displayed on the screen" is provided during a starting delay of an application. This gives a sense of assurance to the user.

The APIs that can be used to realize the stereoscopic playback by the BD-J application include a Java2 Micro_Edition (J2ME) Personal Basis Profile (PBP 1.0), and Globally Executable MHP specification (GEM1.0.2) for package media targets. By using these APIs, it is possible to describe a BD-J title to be played back stereoscopically, by the structured programming that uses the method, constructor, interface, and event of classes such as java.net for the network process, java.awt for the GUI process, java.lang for the language process, java.io for the input/output process with the recording medium, java.util which is a utility, and javax.media for the media framework.

An operation that should be performed by default in a BD-J title on a stereoscopic basis, such as an instruction to play back a 3D playlist in the BD-J title, can be created by describing in a source code a program that creates an xlet context that is an instance of an initial xlet class. In such an xlet context, a status change exception event, which indicates a status change when an instance is created, is thrown, then values stored in the player status register and player setting register of the playback device are obtained, and it is judged whether or not the obtained values indicate the presence of the capability to play back in 3D, and if the judgment result is affirmative, the 3D playlist is played back.

The playback of the 3D playlist mentioned above is realized by creating a player instance for playing back the 3D playlist by using a locator that indicates the location of the 3D playlist and "javax.media.Manager.createPlayer" which is a createPlayer method of the manager in javax.media. Also the exception for the case where the player instance cannot be created can be described in a catch statement for catching the javax.media.NoPlayerExeption event. The exception for the case where there is no 3D playlist can be described in a catch statement for catching the java.io.IOExeption event.

Also it is possible to use an extension API for the BD-J mode (called "BD-J extension") to realize a control that uses the data structure for the stereoscopic playback and a unit of playback in the stereoscopic playback that have been described in the embodiments. The extension API includes methods having been inherited from the methods of the following classes: java.net, java.awt, java.lang, java.io, java.util, and javax.media. The interface of these classes is provided as an embedded interface or a super interface. It is therefore possible to create a BD-J title on the stereoscopic basis by an extension of a programming technique using the classes java.net, java.awt, java.lang, java.io, java.util, and javax.media.

For example, the extension API for the BD-J mode includes a setting obtaining class that instructs to set the status of the register set or to obtain the status. The setting obtaining class is composed of a constant field that indicates values held by PSRs, an obtaining method that instructs to obtain a value held by a PSR, and a setting method that instructs to set a value in a PSR.

The methods contained in the setting obtaining class include methods inherited from the java.lang.object class. Also, when an argument in a method call is inauthentic, the java.lang.IllegalArgumentException event, which is an event of the java.lang class, is thrown. Since the class has inherited the methods and events of java.lang.object, the programmer can create a program that uses values stored in the register set as an extension of java.lang.object.

FIGS. 34A and 34B are flowcharts showing the procedures for setting the output mode in the BD-J title.

FIG. 34A is a flowchart showing the "Procedure when BD-J title is changed". In step S521, an output mode is obtained from PSR22. In step S522, the output mode is set to the 2D output mode or the stereoscopic output mode depending on the behavior of the initial HAVi device configuration selection.

FIG. 34B is a flowchart showing the "Procedure when output mode change is requested". In step S523, an output mode is obtained from PSR22. In step S524, the output mode is set to the 2D output mode or the stereoscopic output mode depending on the behavior of changing HAVi device configuration.

FIG. 35 is a flowchart showing one example of the behavior of the initial HAVi device configuration selection. In this flowchart, the process of step S534, S535, or S537 is selectively executed depending on the results of the judgments made in steps S530, S531, S532, S533, and S536.

In step S530, it is judged whether or not there is a playlist to be played back automatically.

In step S531, it is judged whether or not the bit b5 in PSR24 is "1". It should be noted here that when bit b5 in PSR24 is "1", it indicates that processing in the BD-J mode is available in the 3D output mode.

In step S532, it is judged whether or not the previous display mode is 3D.

In step S533, it is judged whether or not the automatically played back playlist of the selected title is 3D playlist 1920×1080 or 3D playlist 1280×720.

When it is judged in step S530 that there is no automatically played back playlist, the control proceeds to judgments in steps S537 and S538.

In step S537, it is judged whether or not the bit b5 in PSR24 is "1". It should be noted here that when bit b5 in PSR24 is "1", it indicates that processing in the BD-J mode is available in the 3D output mode.

In step S538, it is judged whether or not the resolution of the HAVi device configuration in the BD-J object is HD3D_1920×1080 or HD3D_1280×720.

When it is judged YES in step S537 and YES in step S538, the control proceeds to step S535 in which the display mode is set to 3D and the resolution is set to 1920×1080 or 1280×720 depending on the resolution of the HAVi device configuration in the BD-J object. When it is judged NO in step S537 or S538, the control proceeds to step S536 in which the display mode is set to 2D and the resolution is set to the resolution of the HAVi device configuration in the BD-J object.

When it is judged in step S530 that there is an automatically played back playlist, a combination of the following judgments is performed. In step S531, it is judged whether or not the bit b5 in PSR24 is "1". In step S532, it is judged whether or not the previous display mode is 3D. In step S533, it is judged whether or not the automatically played back playlist of the selected title is 3D playlist 1920×1080 or 3D playlist 1280×720. When it is judged NO in one of steps S531 through S533, the control proceeds to step S534 in which the display mode is set to 2D and the resolution is set to the resolution of the automatically played back playlist.

When it is judged YES in step S532 and YES in step S533, the control proceeds to step S535 in which the display mode is set to 3D and the resolution is set to 1920×1080 or 1280×720 depending on the resolution of the automatically played back playlist.

As described above, according to the present embodiment, it is possible to realize the stereoscopic playback by using the resolution defined in the HAVi device configuration based on the BD-J object.

Embodiment 4

The present embodiment relates to an implementation with an improvement of the internal structure of the player setting register so as to indicate more specifically the stereoscopic display capability of the display device connected with the playback device.

FIG. 36 shows the bit assignment in PSR23. PSR23 indicates characteristic values of the display device connected with the playback device. Navigation commands or BD-J applications cannot rewrite the values in PSR23. The values of PSR23 are provided from the display device via the interface and automatically set before a playback is started. When these values are not automatically obtained, they are set by the user.

The bit "b0" in PSR23 represents the stereoscopic display capability of the display device.

When the bit "b0" in PSR23 is set to "0", it indicates that the display device connected with the playback device has neither the capability to display the 1920×1080/23.976 Hz progressive video nor the capability to display the 1920×1080/59.94 Hz progressive video.

When the bit "b0" in PSR23 is set to "1", it indicates that the display device connected with the playback device has the capability to display the 1920×1080/23.976 Hz progressive video or the capability to display the 1920×1080/59.94 Hz progressive video.

The bit "b1" in PSR23 represents the stereoscopic 1280×720 50p video display capability of the display device.

When the bit "b1" as the stereoscopic 1280×720 50p video display capability is set to "0", it indicates that the display device connected with the playback device does not have the capability to display the 1280×720/50 Hz progressive video. When the bit "b1" is set to "1", it indicates that the display device has the capability to display the 1280×720/50 Hz progressive video.

The bit "b2" in PSR23 is a naked-eye stereoscopic display capability flag.

When the naked-eye stereoscopic display capability flag is set to "0", it indicates that, in the TV system connected with the playback device, the user is required to wear 3D glasses to view in the stereoscopic output mode. When the naked-eye stereoscopic display capability flag is set to "1", it indicates that, in the TV system, the user is not required to wear 3D glasses to view in the stereoscopic output mode.

The bits "b6" through "b19" in PSR23 indicate the horizontal display size, namely a horizontal size of the display device connected with the playback device in a unit of "cm". When the value thereof is "0x000", it indicates that the horizontal display size is undefined. The value thereof in the range from "0x001" to "0xFFE" indicates the horizontal size of the display device in a unit of "cm". The value "0xFFE" indicates 4094 cm as the horizontal size of the display device. The value "0xFFF" indicates that the horizontal size of the display device is larger than 4094 cm.

The procedure for judging whether or not the stereoscopic display is available, by using the bit assignment of PSR23 described above, is shown in the flowchart of FIG. 37.

Figure 37:
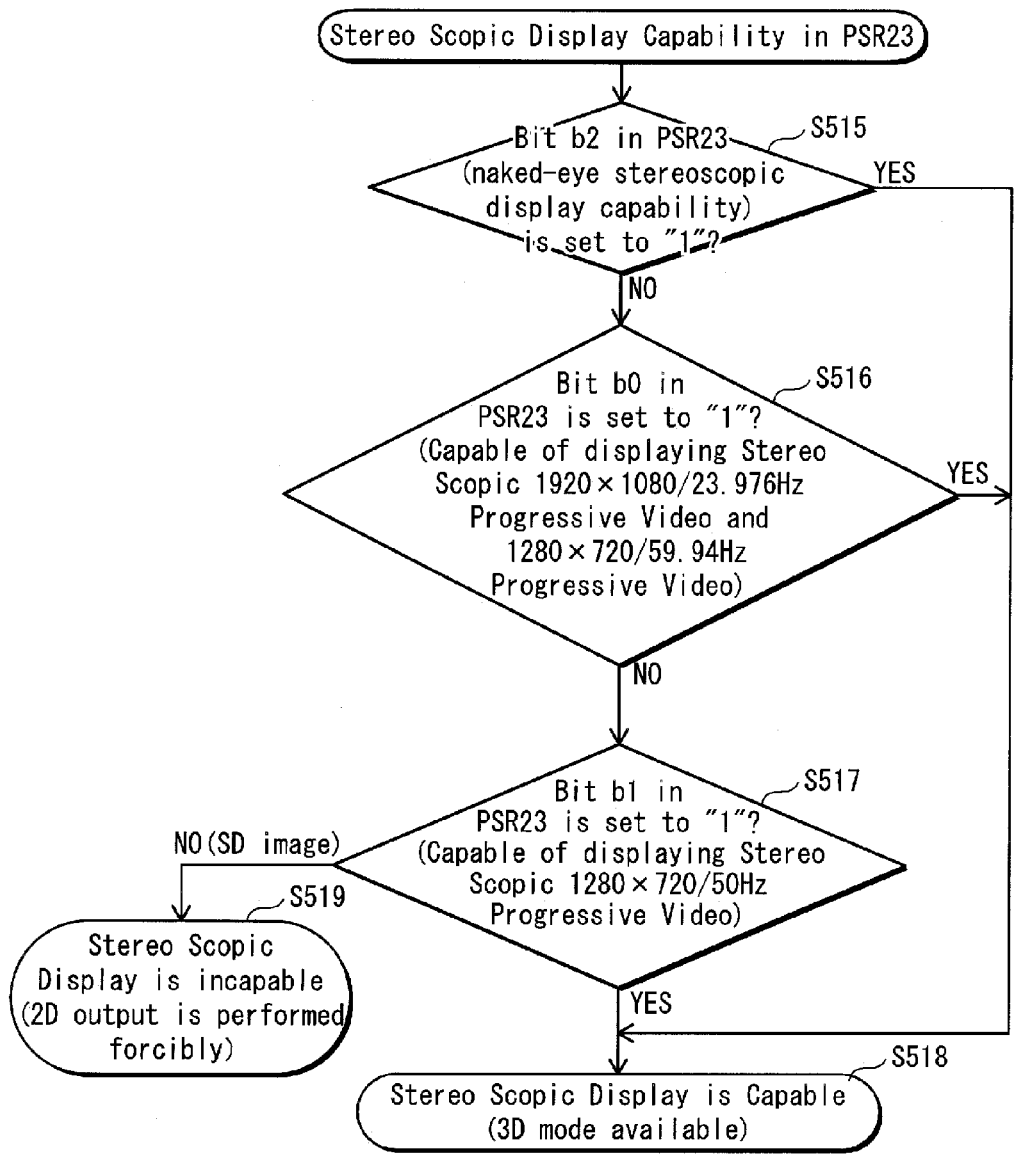
FIG. 37 is a flowchart showing the procedure for judging whether or not the stereoscopic display is available, by checking PSR23.

FIG. 37 is a flowchart showing the procedure for judging whether or not the stereoscopic display is available, by checking PSR23. The flowchart is structured to reach a conclusion on whether or not the stereoscopic display is available, in correspondence with a combination of results of judgments performed in steps S515 through S517. In step S515, it is judged whether or not the bit "b2" in PSR23 is set to "1". In step S516, it is judged whether or not the bit "b0" in PSR23 is set to "1". In step S517, it is judged whether or not the bit "b1" in PSR23 is set to "1". When it is judged in step S515 that the bit "b2" in PSR23 is set to "1", it indicates that the naked-eye stereoscopic display is available for the user without 3D glasses. Accordingly, when it is judged in step S515 that the bit "b2" in PSR23 is set to "1", the judgments in steps S516 and S517 are skipped, and in step S518, it is judged that the stereoscopic display is available. This is because a display device on which a user can watch a stereoscopic display without wearing 3D glasses is a stereoscopic-dedicated display device, and it can be judged, regardless of the resolution, that the stereoscopic display is available.

When it is judged in step S516 that the bit "b0" in PSR23 is set to "1", it indicates that the stereoscopic display of 1920×1080/23.976 Hz or 1920×1080/59.94 Hz is available. Accordingly, even if it is judged NO in step S515, when it is judged YES in step S516, it is judged in step S518 that the stereoscopic display is available.

When it is judged in step S517 that the bit "b1" in PSR23 is set to "1", it indicates that, even if the stereoscopic display of 1920×1080/23.976 Hz or 1920×1080/59.94 Hz is not available, the stereoscopic display of 1280×720/50 Hz is available. Accordingly, even if it is judged NO in steps S515 through S516, when it is judged YES in step S517, it is judged in step S518 that the stereoscopic display is available.

When both bits "b0" and "b1" in PSR23 are set to "0", it indicates that it is an SD image. Accordingly, when it is judged NO in step S517, it is judged that the stereoscopic display is not available, and the 2D output is performed forcibly.

This is because it is impossible for the SD image to realize a stereoscopic display with sufficient quality.

As described above, according to the present embodiment, a pair of an optimum resolution and a frame rate is determined depending on the stereoscopic display capability of the display device connected with the playback device. This makes it possible to realize an optimum data transfer to the display device.

Embodiment 5

Embodiment 5 relates to an improvement of providing optimum frame rate and resolution of the display device. In the embodiments described so far, the resolution is determined based on the terminal management table of the BD-J object or the playlist of the title, and the resolution and the frame rate cannot be determined unless a title is selected. In view of this, in the present embodiment, information of the resolution and the frame rate is embedded in the index table.

The index table is management information of the entire recording medium. The index table is first read by a playback device after the recording medium is inserted into the playback device, so that the recording medium can be uniquely identified by the playback device.

The index table shows correspondence between the operation mode objects (which define the operation modes) and a plurality of title numbers that can be stored in the title number register provided in the playback device. Titles recorded on the recording medium are pairs of (i) an operation mode object identified by a title number and (ii) a playlist played back from that operation mode object. Here, one movie corresponds to one or more titles which can be one or more versions of the movie. That is to say, when a movie has only one version, the relationship between the movie and titles is represented as "movie=title". When a movie has a plurality of versions such as a theatrical version, a director's cut version, and a TV version, each of these versions is provided as one title.

It should be noted here that title numbers that can be stored in the title number register include "0", "1" through "999", and an undefined value "0xFFFF". A title number "0" is a title number of the top menu title. The top menu title is a title that can be called by a menu call operation performed by the user. The title number by the undefined value "0xFFFF" is a title number of the first play title. The first play title is a title that displays a warning to the viewer, a logo of the content provider and so on immediately after the recording medium is loaded.

The index table includes entries (title indexes) in one-to-one correspondence with title numbers. Each title index includes an operation mode object that defines an operation mode. With this structure, the title index table defines in detail how each title operates in a corresponding operation mode.

FIGS. 38A through 38C are illustrations for explanation of the index table. FIG. 38A shows the internal structure of the index table file. As shown in FIG. 38A, the index table file includes a plurality of title indexes and BDMV application information.

FIG. 38B shows the common data structure of the title index. The common data structure includes "object type", "movie object reference", and "object file name information". The "object type" indicates whether the operation mode object associated with the title in concern is a movie object or a BD-J object. The "object file name information" indicates a file name of a BD-J object associated with the title in concern. The "movie object reference" indicates an identifier of a movie object associated with the title in concern.

In the playback device, after a recording medium is loaded therein, the value of the title number register changes in the order of undefined value "0xFFFF"-> any of "1" through "999"->"0". This change in the title number indicates the following. Upon a loading of the recording medium, first the first play title is played back; after the first play title, titles having any of title numbers "1" through "999" specified in the title number register are played back; and after these titles, the top menu title is played back to wait for a selection by the user. A title having a title number currently stored in the title number register among the title numbers "1" through "999" is the current playback target, namely, the "current title". How the numbers to be stored in the title number register are set is determined by the user operation made in response to the top menu title and by the setting of the title number register by the program.

FIG. 38C shows the internal structure of the BDMV application information (AppInfoBDMV). As shown in FIG. 38C, the BDMV application information is composed of "initial output mode preference (initial_output_mode_preference)", "stereoscopic content presence/absence flag (SS_content_exist_flag)", "video format information (video_format)", and "video rate information (video_rate)".

The "initial output mode preference (initial_output_mode_preference)" indicates the preference on the disc initial output mode. When the "initial output mode preference" set to "0", it indicates the 2D output mode; and when it is set to "1", it indicates the stereoscopic output mode. As has been explained in Embodiment 2, when the "initial output mode preference has been set to indicate the "stereoscopic output mode", an insertion of a disc into the playback device causes the device to be set as in the stereoscopic output mode, on the premise that the display device has the capability to provide a stereoscopic display.

The "stereoscopic content presence/absence flag (SS_content_exist_flag)" indicates whether or not the "profile 5" function is used. When any of the following conditions is satisfied, this field is set to "1".

The extension stream selection table has a 3D playlist embedded therein.

In the BD-J application that is currently signaled in the application management table in the BD-J object, the "profile 5" is included in the set of application profile values in the application descriptor of the BD-J application. The "profile 5" is an application profile corresponding to the stereoscopic playback. Therefore even if there is no 3D playlist in a title corresponding to the BD-J object, or there is no playlist itself, the above-described "stereoscopic content presence/absence flag" is set as ON when the BD-J application has the stereoscopic playback capability.

The Stereoscopic Output Mode is Used.

When the stereoscopic content presence/absence flag is set as OFF ("there is no stereoscopic content"), the mode does not switch to the 3D output mode while the corresponding disc is loaded, thus the mode selection procedure in PSR22 is not executed, and PSR22 is fixed to the 2D output mode. On the other hand, the mode selection procedure is executed only when the stereoscopic content presence/absence flag is set as ON ("there is a stereoscopic content").

The "video format information (video_format)" indicates, by a four-bit value, the video format in the high band width digital output function. The video format can be determined by negotiation when a disc is inserted into the playback device. The video format information is valid from the playback of the first play title to the playback of the top menu title, or to the playback of a title specified by a title number in a range of "0" to "999".

This is because, after the playback of the top menu title or a title specified by a title number in a range of "0" to "999", a display resolution of a picture in a playlist in the title or a display resolution of a menu in the title is applied.

The "video rate information (video_rate)" is a four-bit value indicating a video rate in the high band width digital output function. The video format can be determined by negotiation when a disc is inserted into the playback device. Either the video format information or the video frame information can be set to "0". When either of the information is set to "0", the fields of both information are disregarded by the playback device. The "video rate" is a unit indicating the number of frames per second, and is represented by a unit system called FPS (Frame Per Second). Here, when the frame period is considered as a wave length, the frame rate can be represented by a "frequency". Thus a unit "Hz" may be used to indicate the frame rate. The video rate information is valid from the playback of the first play title to the playback of the top menu title, or to the playback of a title specified by a title number in a range of "0" to "999".

This is because, after the playback of the top menu title or a title specified by a title number in a range of "0" to "999", a video rate of a video stream in a playlist in the title is applied.

This completes the explanation of the recording medium. The following describes the playback device in detail. The playback device is novel in that it performs the following procedure when a disc is inserted.

Figure 39:
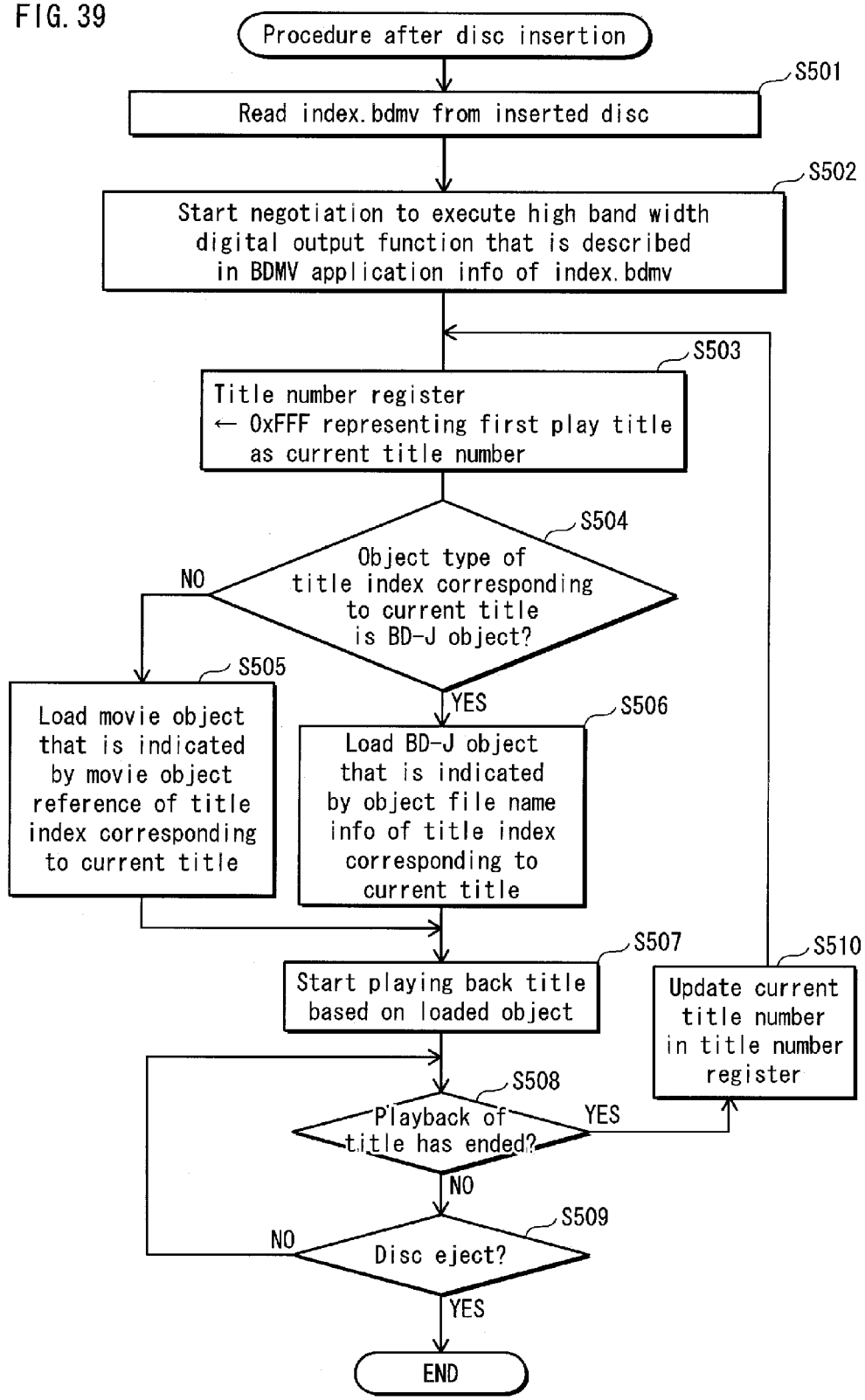
FIG. 39 is a flowchart showing the procedure to be performed after a disc is inserted.

FIG. 39 is a flowchart showing the procedure to be performed after a disc is inserted.

The playback device reads the index table (index.bdmv) from the inserted disc (step S501), and starts a negotiation to execute the high band width digital output function that is described in the BDMV application information of the read index.bdmv (step S502). After this, the process enters a loop composed of steps S503 through S509. The loop is executed as follows. The playback device sets the value "0xFFF" representing the first play title in the title number register to indicate that it is the current title number (step S503). It is judged whether the object type of the title index corresponding to the current title is the BD-J object (step S504). When it is judged that the object type is not the BD-J object, the playback device loads the movie object that is indicated by the movie object reference of the title index corresponding to the current title (step S505). When it is judged that the object type is the BD-J object, the playback device loads the BD-J object that is indicated by the object file name information of the title index corresponding to the current title (step S506), and then starts playing back the title based on the loaded object (step S507). These steps are repeated until it is judged NO in step S508 and YES in step S509.

After a playback of a title is started, the loop composed of steps S503 through S509 transfers to a loop composed of steps S508 and S509. When it is judged in this loop that the playback of the title has ended (YES in step S508), the current title number in the title number register is updated (step S510), and then the control proceeds to step S504.

When the disc is ejected in the loop composed of steps S508 and S509, the process of this flowchart is ended. Since the information of the format rate is present in the index table, the negotiation can be executed prior to the playback of the first play title.

Figure 40A:
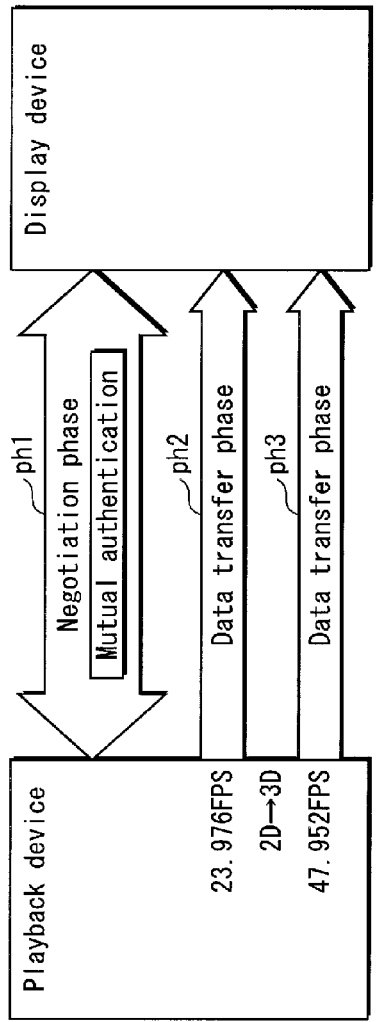
FIGS. 40A and 40B show communications between the display device and the playback device.
Figure 40B:
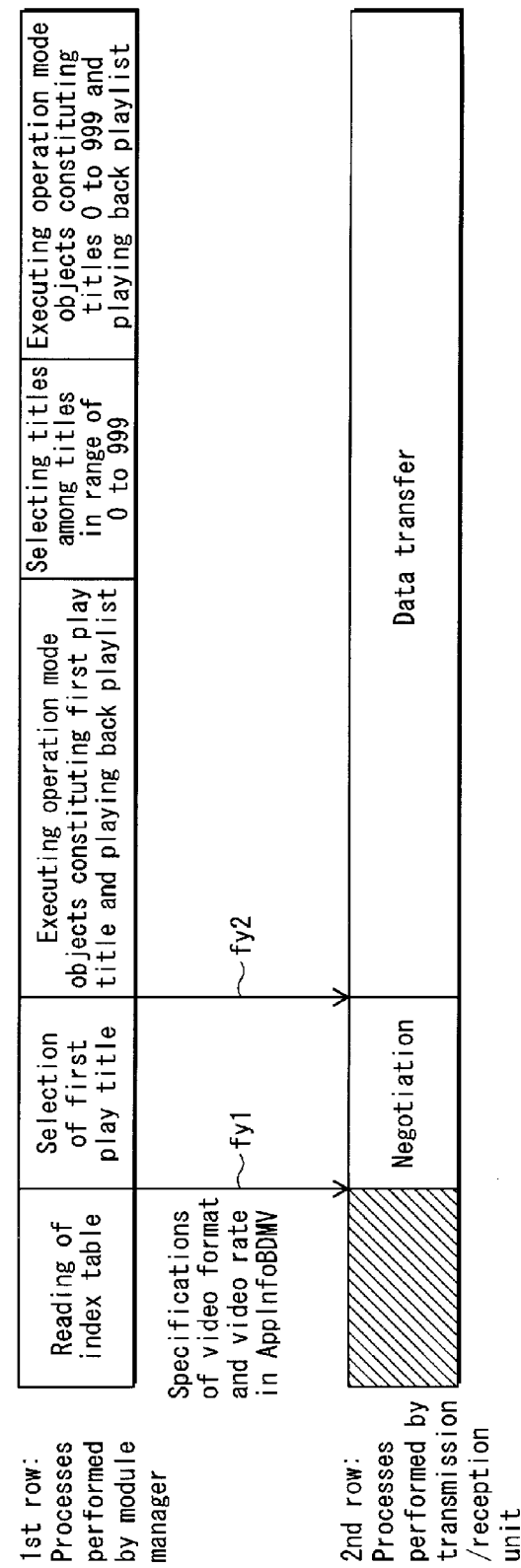

FIGS. 40A and 40B show communications between the display device and the playback device.

FIG. 40A shows the data transfer phase and the negotiation phase. On the left-hand side of the drawing, the playback device is shown, and on the right-hand side of the drawing, the display device is shown. Three arrows are shown between the display device and the playback device. The arrow on top of the others indicates symbolically a negotiation phase ph1. The second arrow from the top symbolically indicates a data transfer phase ph2 with 23.976 FPS. The bottom arrow symbolically indicates a data transfer phase ph3 with 47.954 FPS.

In the 3D output mode, since both the base-view components and dependent-view components are transferred in each frame, the actual display frame is twice as that of 2D output mode. More specifically, when 23.976 FPS is adopted in the 2D output mode, the display frame in the 3D output mode would be 47.954 FPS. However, in the example provided in FIGS. 40A and 40B, the base-view components and the dependent-view components are combined to be transferred in the side-by-side method so that the combined components are transferred in the same frame period as the components in the 2D output mode, and thus the frame rate is not varied. That is to say, even in the 2D output mode, the frame rate is kept to be 23.976 FPS and the data to be transferred is changed to the pair of base-view component and dependent-view component. The structure prevents a change from occurring to the frame rate, and a change in the frame rate does not occur when a switch between the 2D output mode and the 3D output mode occurs.

However, in the negotiation phase immediately after a disc insertion, a mutual authentication is performed, and in the process of the mutual authentication, the frame rate and video format are required. However, information of the frame rate and video format is unique to the video stream, and thus the information cannot be obtained unless a title is selected and a playlist to be played back is determined.

On the other hand, as has been described in the "Initialization" procedure, it is possible to start the 3D playback as soon as a disc is inserted when the initial_output_mode information is ON and the playback device has the capability to perform a playback in the B-D presentation mode. However, if the negotiation by the playback device takes time and display of a stereoscopic image on the display device is delayed, the user, who has prepared for viewing the stereoscopic image by wearing the 3D glasses, will be irritated. That is unfavorable.

In view of this, in the present embodiment, the information of the frame rate and video format is included in the information that is read out first from a disc when the disc is inserted into the playback device, that is to say, in the index table.

FIG. 40B is a timing chart. The first row of the drawing indicates the processes performed by the module manager in a time sequence. The second row indicates the processes performed by the transmission unit in a time sequence.

It is understood from the second row that the transmission unit passes through two phases: negotiation; and data transfer.

According to the first row, it is understood that the module manager passes through five phases: (1) reading out the index table; (2) selecting the first play title; (3) executing operation mode objects constituting the first play title and playing back the playlist; (4) selecting titles among titles in a range of 0 to 999; and (5) executing operation mode objects constituting the titles 0 to 999 and playing back the playlist. The arrows fy1 and fy2 illustrate specifications of format and rate sent from the manager to the transmission unit. These specifications of format and rate are sent to the transmission unit approximately at the same as the first play title is selected, and the negotiation is started in parallel with the process in which the first play title is selected. And accordingly the start of the data transfer has been accelerated greatly.

As described above, according to the present embodiment, the application information is included in the index table in the recording medium, and the application information includes a format rate as a parameter necessary for the authentication. With this structure, after the index table is read out, it is possible to start the authentication with the partner device at the same time as the playback of the first play title is started. Since it is possible to execute the process of playing back the first play title in parallel with the mutual authentication process with the partner device, the start delay can be reduced to approximately half.

Embodiment 6

Embodiment 6 relates to an improvement of the internal structure of the stereoscopic interleaved stream file.

Here, as a premise of the present embodiment, files in the UDF file system will be explained briefly. The UDF file is composed of a plurality of Extents managed by the file entry. The "file entry" includes a "descriptor tag", an "ICB tag", and an "allocation descriptor".

The "descriptor tag" is a tag identifying, as a "file entry", the file entry which includes the descriptor tag itself. The descriptor tag is classified into a file entry descriptor tag, a space bit map descriptor tag, and so on. In the case of a file entry descriptor tag, "261", which indicates "file entry" is written therein.

The "ICB tag" indicates attribute information concerning the file entry itself.

The "allocation descriptor" includes a Logical Block Number (LBN) indicating a recording position of an Extent constituting a low-order file under a directory. The allocation descriptor also includes data that indicates the length of the Extent. The high-order two bits of the data that indicates the length of the Extent are set as follows: "00" to indicate an allocated and recorded Extent; "01" to indicate an allocated and not-recorded Extent; and: "11" to indicate an Extent that follows the allocation descriptor. When a low-order file under a directory is divided into a plurality of Extents, the file entry should include a plurality of allocation descriptors in correspondence with the Extents.

It is possible to detect an address of an Extent constituting a stream file by referring to the allocation descriptor in the file entry described above.

The following describes the files in various types that are used in the present embodiment.

<Stereoscopic Interleaved Stream File (FileSS)>

The stereoscopic interleaved stream file (FileSS) is a stream file (2TS-interleaved file) in which two TSs are interleaved, and is identified by a five-digit integer value and an extension (ssif) indicating an interleave-format file for stereoscopic playback. The stereoscopic interleaved stream file is composed of Extent SS[n]. The Extent SS[n] (also referred as EXTSS[n]) is identified by the index number "n". The index number "n" increments in order starting from the top of the stereoscopic interleaved stream file.

Each Extent SS[n] is structured as a pair of a dependent-view data block and a base-view data block.

The dependent-view data block and base-view data block constituting the Extent SS[n] are a target of cross reference by the file 2D, file base, and file dependent. Note that the cross reference means that a piece of data recorded on a recording medium is registered as an Extent of a plurality of files in the file entries thereof. In the present embodiment, the starting addresses and continuation lengths of the dependent-view data block and base-view data block are registered in the file entries of the file 2D, file base, and file dependent.

<File Base (FileBase)>

The file base (FileBase) is a virtual stream file that is presumed to "store" a main TS specified by the Extent start point information in the clip information corresponding to the file 2D. The file base (FileBase) is composed of at least one Extent 1[i] (also referred to as EXT 1[i]). The Extent 1[i] is the $i^{th}$ Extent in the file base, where "i" is an index number of the Extent and is incremented starting from "0" at the top of the file base. The file base is a virtual stream file used to treat the stereoscopic interleaved stream file, which is a 2TS-file, as a 1TS-file. The file base is generated in a virtual manner by building its file entry in the memory of the playback device.

In the actual reading, the file base is identified by performing a file open using a file name of the stereoscopic interleaved stream file. More specifically, when the file open using a file name of the stereoscopic interleaved stream file is called, the middleware of the playback device generates, in the memory, a file entry identifying an Extent in the file base, and opens the file base in a virtual manner. The stereoscopic interleaved stream file can be interpreted as "including only one TS", and thus it is possible to read a 2TS stereoscopic interleaved stream file from the recording medium as a 1TS file base.

When only a base-view data block is to be read in the B-B presentation mode, only the Extents constituting the file base become the target of the reading. Even if the mode is switched from the B-B presentation mode to the B-D presentation mode, both the dependent-view data block and the base-view data block can be read by extending the reading range from the Extents constituting the file base to the Extents constituting the stereoscopic interleaved stream file. Thus, with this arrangement, the efficiency of the file reading is not decreased.

<File Dependent (FileDependent)>

The file dependent (FileDependent) is a stream file that is presumed to "store" a sub-TS, and is composed of Extent 2[i] (also referred to as EXT2[i]). The Extent 2[i] is the $i^{th}$ Extent in the file dependent, where "i" is an index number of the Extent and is incremented starting from "0" at the top of the file dependent. The file dependent is a virtual stream file used to treat the stereoscopic interleaved stream file, which is a 2TS-file, as a 1TS-file storing the sub-TS. The file dependent is generated in a virtual manner by building its file entry in the memory of the playback device.

The dependent-view video stream is attached with and accessed with use of a file name that is represented by a number generated by adding "1" to the five-digit integer representing the file name of the stereoscopic interleaved stream file. The recording medium stores a dummy file, and the "number generated by adding 1", namely, the identification number of the dependent-view video stream, is attached to the dummy file. Note that the dummy file is a file that stores no Extent, namely, substantial information, but is attached with only a file name. The dependent-view video stream is treated as being stored in the dummy file.

<File 2D (File2D)>

The file 2D (File2D) is a 1TS stream file storing a main TS that is played back in the 2D output mode, and is composed of the Extent 2D. The file 2D is identified by a five-digit integer value and an extension (ssif) indicating an interleave-format file for stereoscopic playback.

FIG. 41 shows the correspondence between the file 2D/file base and the file dependent.

In FIG. 41, the first row shows a file 2D/file base 00001.m2ts and a file dependent 00002.m2ts. The second row shows Extents that store dependent-view data blocks and base-view data blocks. The third row shows a stereoscopic interleaved stream file 00001.ssif.

The dotted arrows h1, h2, h3, and h4 show the files to which Extents EXT1[i] and EXT2[i] belong, the belongingness being indicated by the allocation identifiers. According to the belongingness guided by the arrows h1 and h2, Extents EXT1 [i] and EXT1[i+1] are registered as Extents of the file base 00001.m2ts.

According to the belongingness guided by the arrows h3 and h4, Extents EXT2[i] and EXT2[i+1] are registered as Extents of the file dependent 00002.m2ts.

According to the belongingness guided by the arrows h5, h6, h7, and h8, Extents EXT1[i], EXT2[i], EXT1[i+1], and EXT2[i+1] are registered as Extents of 00001.ssif. As understood from this, Extents EXT1[i] and EXT1[i+1] have the duality of belonging to 00001.ssif and 00001.m2ts. The extension "ssif" is made of capital letters of StereoScopic Interleave File, indicating that the file is in the interleave format for stereoscopic playback.

Here, a pair of an Extent constituting the file base and an Extent constituting the file dependent that are both identified by the same Extent identifier is called an "interleave Extent unit". In the example shown in FIG. 41, a pair of EXT1[i] and EXT2[i] that are both identified by an Extent identifier "i" is an interleave Extent unit [i]. Also, a pair of EXT1[i+1] and EXT2[i+1] that are both identified by an Extent identifier "i+1" is an interleave Extent unit [i+1]. In a random access to a stereoscopic interleaved stream file, it is necessary to ensure that an interleave Extent unit identified by the Extent identifier is read from the recording medium completely at once.

FIGS. 42A through 42C show the correspondence between the interleaved stream file and file 2D/file base.

The third row in FIG. 42A shows the internal structure of the interleaved stream file. As shown in FIG. 42A, the stereoscopic interleaved stream file is composed of Extents EXT1 [1] and EXT1[2] storing base-view data blocks and EXT2[1] and EXT2[2] storing dependent-view data blocks, wherein they are arranged alternately in the interleave format.

The first row in FIG. 42A shows the internal structure of the file 2D/file base. The file 2D/file base is composed of only Extents EXT1[1] and EXT1[2] storing base-view data blocks, among the Extents constituting the interleaved stream file shown in the third row. The file 2D/file base and the interleaved stream file have the same name, but different extensions.

The second row in FIG. 42A shows the internal structure of the file dependent. The file dependent is composed of only Extents EXT2[1] and EXT2[2] storing dependent-view data blocks, among the Extents constituting the interleaved stream file shown in the third row. The file name of the file dependent is a value higher by "1" than the file name of the interleaved stream file, and they have different extensions.

Not all playback devices necessarily support the 3D playback system. Therefore, it is preferable that even an optical disc including a 3D image supports a 2D playback. It should be noted here that the playback devices supporting only the 2D playback do not identify the data structure extended for the 3D. The 2D playback devices need to access only the 2D playlists and 2D streams by using a conventional identification method provided to the 2D playback devices. In view of this, the base-view video streams are stored in a file format that can be recognized by the 2D playback devices.

According to the first method, the main TS is assigned with the same file name as that in the 2D playback system so that the above-described referencing of playlist information can be realized, that is to say, so that the main TS can be used in the 2D playback as well, and stream files in the interleave format have a different extension. FIG. 42B shows that files "00001.m2ts" and "00001.ssif" are coupled with each other by the same file name "00001", although the former is in the 2D format and the latter is in the 3D format.

In a conventional 2D playback device, the playlist refers to only the AV clips the main TS, and therefore the 2D playback device plays back only the file 2D. On the other hand, in a 3D playback device, although the playlist refers to only the file 2D storing the main TS, when it finds a file that has the same identification number and a different extension, it judges that the file is a stream file in the interleave format for the 3D image, and outputs the main TS and sub-TS.

The second method is to use different folders. The main TSs are stored in folders with conventional folder names (for example, "STREAM"), but sub-TSs are stored in folders with folder names unique to 3D (for example, "SSIF"), with the same file name "00001". In the 2D playback device, the playlist refers to only files in the "STREAM" folder, but in the 3D playback device, the playlist refers to files having the same file name in the "STREAM" and "SSIF" folders simultaneously, making it possible to associate the main TS and the sub-TS.

The third method uses the identification numbers. That is to say, this method associates the files based on a predetermined rule regarding the identification numbers. For example, when the identification number of the file 2D/file base is "00001", the file dependent is assigned with identification number "00002" that is made by adding "1" to the identification number of the file 2D, as shown in FIG. 42C. However, the file system of the recording medium treats the file dependent, which is assigned with a file name according to the rule, as a non-substantial dummy file. This is because the file dependent is, in the actuality, the stereoscopic interleaved stream file. The file names having been associated with each other in this way are written into (i) the stream registration information in the basic stream selection table and (ii) the sub-clip entry ID reference (ref_to_STC_id[0]) in the stream registration information in the extension stream selection table. On the other hand, the playback device recognizes a file name, which is a value higher by "1" than the file name written in the sub-clip entry ID reference, as the file name of the dummy file, and performs the process of opening the file dependent in a virtual manner. This ensures that the stream selection procedure reads, from the recording medium, the file dependent that is associated with other files in the above-described manner.

The clip information files are identified by the same rule as above.

This completes the description of the file 2D, file base, and file dependent.

The following explains the data blocks in detail.

<Base-View Data Block>

The base-view data block (B[i]) is the $i^{th}$ data in the main TS. Note that the main TS is a TS specified as the main element of the main path by the clip information file name information of the current playitem information. The "i" in B[i] is an index number that is incremented starting from "0" corresponding to the data block at the top of the file base.

The base-view data blocks fall into those shared by the file base and the file 2D, and those not shared by the file base and the file 2D.

The base-view data blocks shared by the file base and the file 2D and the base-view data blocks unique to the file 2D become the Extents of the file 2D, and they are set to have a length that does not cause a buffer underflow in the playback device. The starting sector address of the base-view data blocks is written in the allocation descriptor in the file entry of the file 2D.

The base-view data blocks unique to the file base, which are not shared by the file 2D, do not become the Extents of the file 2D, and thus they are not set to have a length that does not cause an underflow in a single buffer in the playback device. The base-view data blocks are set to have a smaller size, namely, a length that does not cause an underflow in a double buffer in the playback device.

The starting sector addresses of the base-view data block unique to the file base are not written in the allocation descriptor in the file entry. Instead of this, the starting source pocket in the base-view data block is pointed to by the Extent start point information in the clip information of the clip information file corresponding to the main TS. Therefore, the starting sector address of a base-view data block unique to the file base needs to be obtained by using (i) the allocation descriptor in the file entry of the stereoscopic interleaved stream file and (ii) the Extent start point information in the clip information.

<Dependent-View Data Block>

The dependent-view data block (D[i]) is the $i^{th}$ data in the sub-TS. Note that the sub-TS is a TS specified as the main element of the sub-path by the stream entry in the stream registration sequence in the extension stream selection table corresponding to the current playitem information. The "i" in D[i] is an index number that is incremented starting from "0" corresponding to the data block at the top of the file dependent.

The dependent-view data blocks become the Extents of the file dependent, and are set to have a length that does not cause an underflow in a double buffer in the playback device.

Also, in the continuous areas in the recording medium, a dependent-view data block is disposed before a base-view data block that is played back in the same playback time together the dependent-view data block. For this reason, when the stereoscopic interleaved stream file is read, the dependent-view data block is read before the corresponding base-view data block, without fail.

The starting sector addresses of the dependent-view data blocks are not written in the allocation descriptor in the file entry of the file 2D since the dependent-view data blocks are not shared by the file 2D. Instead of this, the starting source pocket in the dependent-view data block is pointed to by the Extent start point information in the clip information. Therefore, the starting sector address of a dependent-view data block needs to be obtained by using (i) the allocation descriptor in the file entry of the file 2D and (ii) the Extent start point information in the clip information.

<Classification of Extent>

As described above, the Extents of the file 2D fall into those shared by the file base, and those not shared by the file base.

Suppose here that the Extents of the file 2D are B[0], B[1], B[2], B[3]2D, and B[4]2D, and that the Extents of the file base are B[0], B[1], B[2], B[3]ss, and B[4]ss. Of these, B[0], B[1], and B[2] are base-view data blocks shared by the file base. B[3]2D and B[4]2D are base-view data blocks unique to the file 2D, not shared by the file base.

Also, B[3]ss and B[4]ss are base-view data blocks unique to the file base, not shared by the file 2D.

The data of B[3]2D is bit-for-bit same as data of B[3]ss. The data of B[4]2D is bit-for-bit same as data of B[4]ss.

The data blocks B[2], B[3]2D, and B[4]2D in the file 2D constitute Extents (big Extents) having a large continuation length immediately before a position at which a long jump is caused. In this way, big Extents can be formed immediately before a long jump in the file 2D. Accordingly, even when a stereoscopic interleaved stream file is played back in the 2D output mode, there is no need to worry an occurrence of an underflow in the read buffer.

The file 2D and the file base have sameness, although being partially different in Extents. Therefore, the file 2D and the file base are generically called "file 2D/file base".

Figure 43:
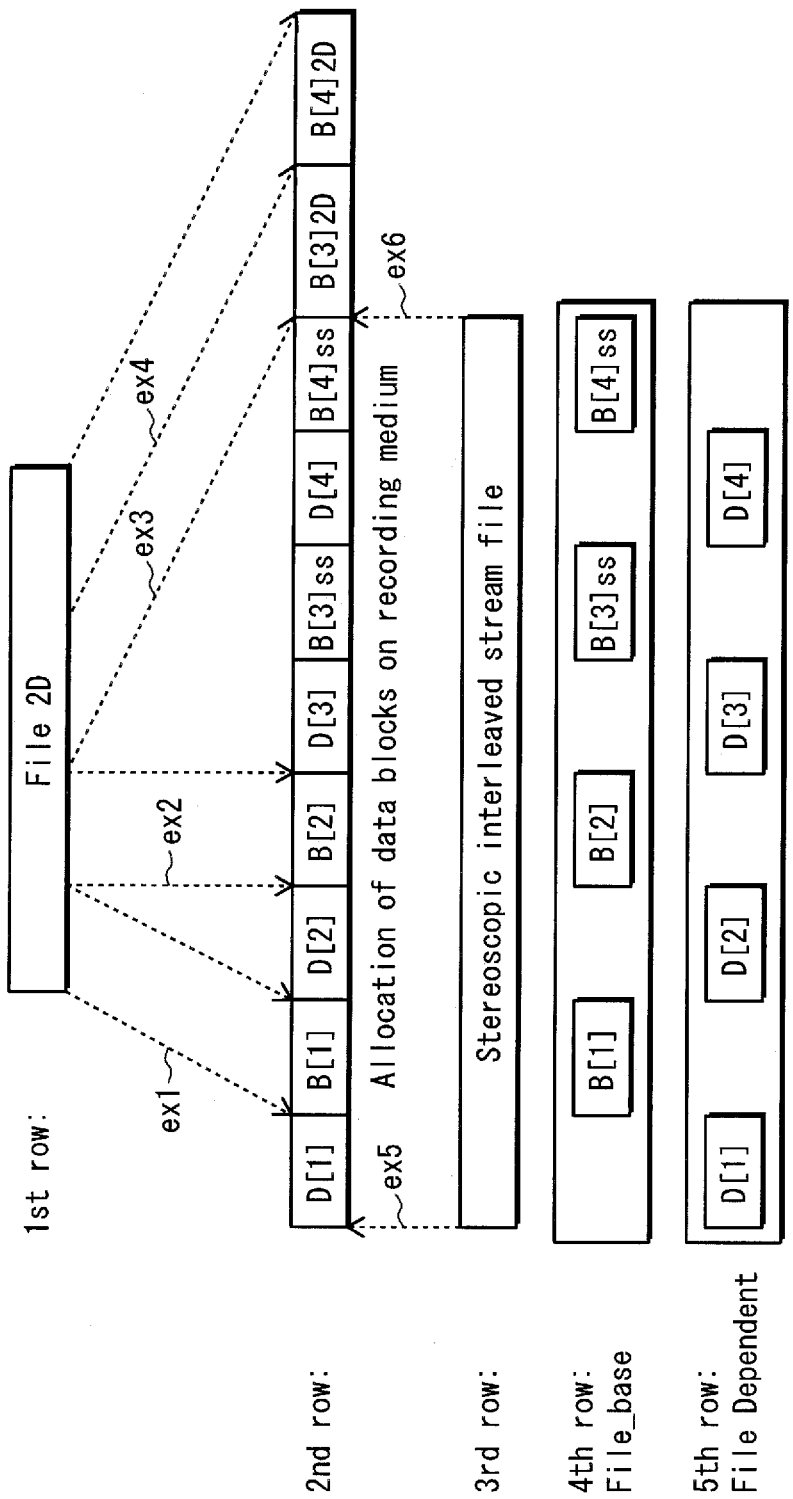
FIG. 43 shows correspondence among the stereoscopic interleaved stream file, file 2D, file base, and file dependent.

FIG. 43 shows correspondence among the stereoscopic interleaved stream file, file 2D, file base, and file dependent. The first row in FIG. 43 shows the file 2D, the second row shows data blocks recorded on the recording medium, the third row shows the stereoscopic interleaved stream file, the fourth row shows the file base, and the shows the file dependent.

The data blocks shown in the second row are D[1], B[1], D[2], B[2],D[3], B[3]ss, D[4], B[4]ss, B[3]2D, and B[4]2D. The arrows ex1, ex2, ex3, and ex4 show the belongingness in which, among these data blocks, data blocks B[1], B[2], B[3]2D, and B[4]2D constitute the Extents of the file 2D.

The arrows ex5 and ex6 show the belongingness in which D[1], B[1],D[2], B[2],D[3], B[3]ss, D[4], and B[4]ss constitute the Extents of the stereoscopic interleaved stream file.

The fourth row shows that, among these data blocks constituting the stereoscopic interleaved stream file, B[1], B[2], B[3]ss, and B[4]ss constitute the Extents of the file base. The fifth row shows that, among the data blocks constituting the stereoscopic interleaved stream file, D[1], D[2], D[3], and D[4] constitute the Extents of the file dependent.

Figure 44:
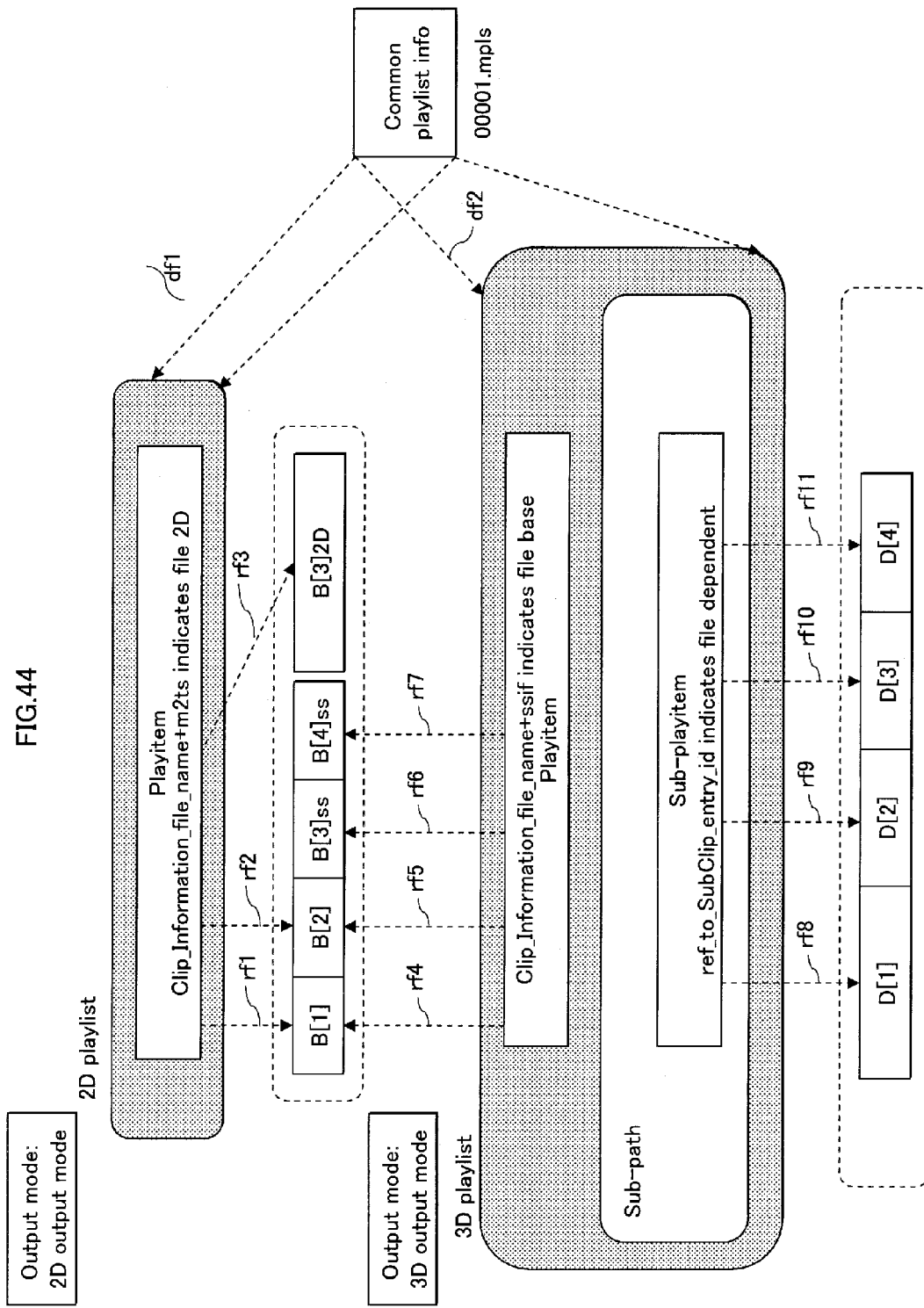
FIG. 44 shows the 2D playlist and 3D playlist.

FIG. 44 shows the 2D playlist and 3D playlist. The first row shows the 2D playlist information. The second row shows the base-view data blocks. The third row shows the 3D playlist. The fourth row shows the dependent-view data blocks.

The arrows rf1, rf2, and rf3 show a playback path generated by combining the extension "m2ts" and a file name "00001" described in "clip_information_file_name" in the playitem information of the 2D playlist information. In this case, the playback path on the base-view side is constituted from data blocks B[1], B[2], and B[3]2D.

The arrows rf4, rf5, rf6, and rf7 show a playback path specified by the playitem information of the 3D playlist information. In this example, the playback path on the base-view side is constituted from data blocks B[1], B[2], B[3]ss, and B[4]ss.

The arrows rf8, rf9, rf10, and rf11 show a playback path specified by the sub-playitem information of the 3D playlist information. In this example, the playback path on the dependent-view side is constituted from data blocks D[1], D[2], D[3], and D[4]. These data blocks constituting the playback paths specified by the playitem information and the sub-playitem information can be read by opening files that are generated by combining the extension "ssif" and file names written in "clip_information_file_name" in the playitem information.

As shown in FIG. 44, the clip information file name information in the 3D playlist and the clip information file name information in the 2D playlist have file names in common. Accordingly, the playlist information can be written to include description that is common to the 3D playlist and the 2D playlist (see as signs df1 and df2 indicate) so as to define the 3D playlist and the 2D playlist. Accordingly, once playlist information for realizing the 3D playlist is written: the playlist information functions as the 3D playlist when the output mode of the playback device is the stereoscopic output mode; and the playlist information functions as the 2D playlist when the output mode of the playback device is the 2D output mode. The 2D playlist and the 3D playlist shown in FIG. 44 have in common a piece of playlist information, which is interpreted as the 2D playlist or the 3D playlist depending on the output mode of the playback device that interprets the piece of playlist information. This reduces the amount of time and effort made by a person in charge of authoring.

When main TSs and sub-TSs are stored in the stereoscopic interleaved stream file, a file name of the file 2D is written in "clip_information_file_name" in the playitem information of the 2D playlist, and a file name of the file base is written in "clip_information_file_name" in the playitem information of the 3D playlist. Since the file base is a virtual file and its file name is the same as that of the stereoscopic interleaved stream file, the file name of the stereoscopic interleaved stream file can be written in "clip_information_file_name" in the playitem information. A file name of the file dependent is written in "ref_to_subclip_entry_id" in the stream registration information in the extension stream selection table. The file name of the file dependent is created by adding "1" to the identification number of the stereoscopic interleaved stream file.

As described above, base-view and dependent-view data blocks are stored in one stereoscopic interleaved stream file, and the stereoscopic interleaved stream file can be opened as a file of any of the file 2D, file base, and file dependent. With this structure, the decoder can treat the stereoscopic interleaved stream file in the same manner as a regular stream file. Thus the storage method of the base-view and dependent-view video streams can be positively used for the storage of the stereoscopic interleaved stream file.

Next, the internal structure of the clip information file will be described in detail.

FIGS. 45A through 45D show the internal structure of the clip information file.

FIG. 45A shows the clip information file for 2D. FIG. 45B shows the clip information file for 3D. These clip information files include "clip information", "sequence information", "program information", and "characteristic point information".

The "clip information" is information indicating, for each ATC sequence, what type of AV clip each source packet sequence stored in the stream file is.

The "sequence information" indicates, for each ATC sequence, information (ATC sequence information) that indicates what type of ATC sequence one or more source packet sequences stored in the stream file are. The ATC sequence information includes: information indicating, by the source packet number, where the source packet being the start point of the ATC exists; offsets between the STC sequence identifiers and the ATC sequence identifiers; and STC sequence information corresponding to each of a plurality of STC sequences. Each piece of STC sequence information includes: a packet number of a source packet storing the PCR of the STC sequence in concern; information indicating where in the STC sequence the source packet being the start point of the STC sequence exists; and the playback start time and the playback end time of the STC sequence.

The "program information" indicates the program structures of the main TS and sub-TSs managed as "AV clips" by the clip information file. The program information indicates what types of ESs are multiplexed in the AV clip. More specifically, the program information indicates what types of packet identifiers the ESs multiplexed in the AV clip have, and indicates the encoding method. Thus the program information indicates the encoding method, such as MPEG2-video or MPEG4-AVC, that is used to compress-encode the video stream.

The "characteristic point information" is information indicating, for each ES, where the characteristic points of a plurality of ESs multiplexed in the AV clip exist. The information indicating the characteristic point for each ES is called "basic entry map".

What becomes the characteristic point is different for each type of stream. In the case of the base-view and dependent-view video streams, the characteristic point is the access unit delimiter that indicates the I-picture-type view component that is located at the start of the open GOP and closed GOP. In the case of the audio stream, the characteristic point is the access unit delimiter indicating the start positions of the audio frames that exist at regular intervals, for example, every one second. In the case of the PG and IG streams, the characteristic point is the access unit delimiter indicating the start positions of the display sets (display set of epoch start, display set of acquisition point) that are provided with all the functional segments necessary for the display, among the display sets of the graphics streams.

The ATC sequence and the STC sequence differ in how they represent the characteristic point. The ATC sequence represents the characteristic point by the source packet number. The STC sequence represents the characteristic point by using the PTS that indicates the time point on the STC time axis.

In view of the above-described differences, the basic entry map for each ES is composed of a plurality of entry points. More specifically, in each entry point constituting the entry map, a source packet number that indicates the location of the characteristic point in the ATC sequence is associated with a PTS that indicates the location of the characteristic point in the STC sequence. Each entry point further includes: a flag ("is_angle_change" flag) that indicates whether an angle change to the characteristic point is available; and information (I_size) that indicates the size of the intra picture located at the start of GOP. Since an angle change is available at the source packet located at the start of the interleave unit constituting the multi-angle section, the "is_angle_change" flag in the entry point indicating the starting source packet of the interleave unit is always set ON. Also, the entry point indicating the starting source packet of the interleave unit is associated with In_Time in the playitem information by the entry point.

The entry map for each ES indicates the source packet numbers of the characteristic points for respective stream types in correspondence with the PTSs. Accordingly, by referencing this entry map, it is possible to obtain, from an arbitrary time point in the ATC sequence, source packet numbers that indicate locations of the characteristic points for the ESs that are closest to the arbitrary time point.

This completes the explanation of the clip information file for 2D. Next is a detailed explanation of the clip information file for 3D. FIG. 45B shows the internal structure of clip information file for 3D. The clip information file for 3D includes: "clip dependent information (dependent-view management information)" which is clip information for the file dependent; and "clip base information (base-view management information)" which is clip information for the file base, as well as the "clip information for file 2D" that is regular clip information (management information). The reason is as follows. As described above, the stereoscopic interleaved stream file is stored in a directory that is different from the directory in which the regular stream files are stored, to prevent them from mixing each other. Accordingly, the clip information files cannot be associated with the stereoscopic interleaved stream file. Thus the clip dependent information and the clip base information are stored in the clip information file for 2D.

The clip dependent information and the clip base information differ from the clip information file for 2D in that the clip dependent information and the clip base information include metadata that has the Extent start point sequence.

As shown in FIG. 45B, the clip dependent information includes the Extent start point sequence, and the clip base information also includes the Extent start point sequence. The characteristic point information includes an entry map, and the extension data includes an extension entry map.

In the 3D output mode, the clip information file is divided into a clip base information file and a clip dependent information file.

FIG. 45C shows the clip base information file. The clip base information file includes clip base information and a basic entry map. The clip base information includes an Extent start point information table.

FIG. 45D shows the clip dependent information file. The clip dependent information file includes clip dependent information and an extension entry map. The clip dependent information includes an Extent start point information table.

A clip information file for the 2D output mode is stored under the directory for the clip information file (CLPI directory). The clip base information file is generated from the clip information file in the 3D output mode, and is treated to be stored in the clip information file for the 2D output mode.

A dummy clip information file is stored under the directory for the clip information file (CLPI directory). The dummy clip information file is assigned with a file name that is represented by a number corresponding to the file dependent, namely, a number generated by adding "1" to the identification number of the file 2D/file base. The clip dependent information file is generated in the 3D output mode from the clip information file corresponding to the file 2D, and is treated to be stored in the dummy clip information file. Suppose here that the clip information file in the 2D output mode is 00001.clpi, then the clip base information file in the 3D output mode is treated to be stored in 00001.clpi, and the clip dependent information file in the 3D output mode is treated to be stored in 00002.clpi.

<Extent Start Point>

The following explains the Extent start point.

As described above, the stereoscopic interleaved stream file is composed of two clip AV streams (BDAV MPEG2 transport stream). The pair of Extent start point information tables enables the stereoscopic interleaved stream file to be divided into two AV streams. The Extent start point information tables are supplied as follows.

(1) An Extent start point information table is supplied, to the playback device, in a piece of clip information that is referenced by a playitem of a playlist which includes a sub-path of "sub-path type=8". It should be noted here that the sub-path of "sub-path type=8" is an out-of-MUX dependent-view video stream playback path of an on-disc type.

(2) Another Extent start point information table is supplied, to the playback device, in a piece of clip information that is referenced by a sub-playitem of a playlist which includes a sub-path of "sub-path type=8".

When a flag in the playitem information ("is_multiangle" flag), which indicates whether a multi-angle section exists, is set ON, the Extent start point information tables in a pair are supplied to the playback device, one in a piece of clip information that is referenced by an angle ID value, and the other in a piece of clip information that is referenced by a sub-clip entry ID value.

The Extent start point information table in the clip information file has the following data structure. The ID1 value and ID2 value in the extension data in ext_data_entry( ) should be set to 0x0002 and 0x0004, respectively.

The clip information file including the Extent start point information tables needs to satisfy the following two conditions.

(a) The clip information file needs to be referenced by a playitem of a playlist which includes a sub-path of "sub-path type=8".

(b) The clip information file needs to be referenced by a sub-playitem in a sub-path of "sub-path type=8". Note that the sub-path of "sub-path type=8" is an out-of-MUX dependent-view video stream playback path of an on-disc type.

Figure 46:
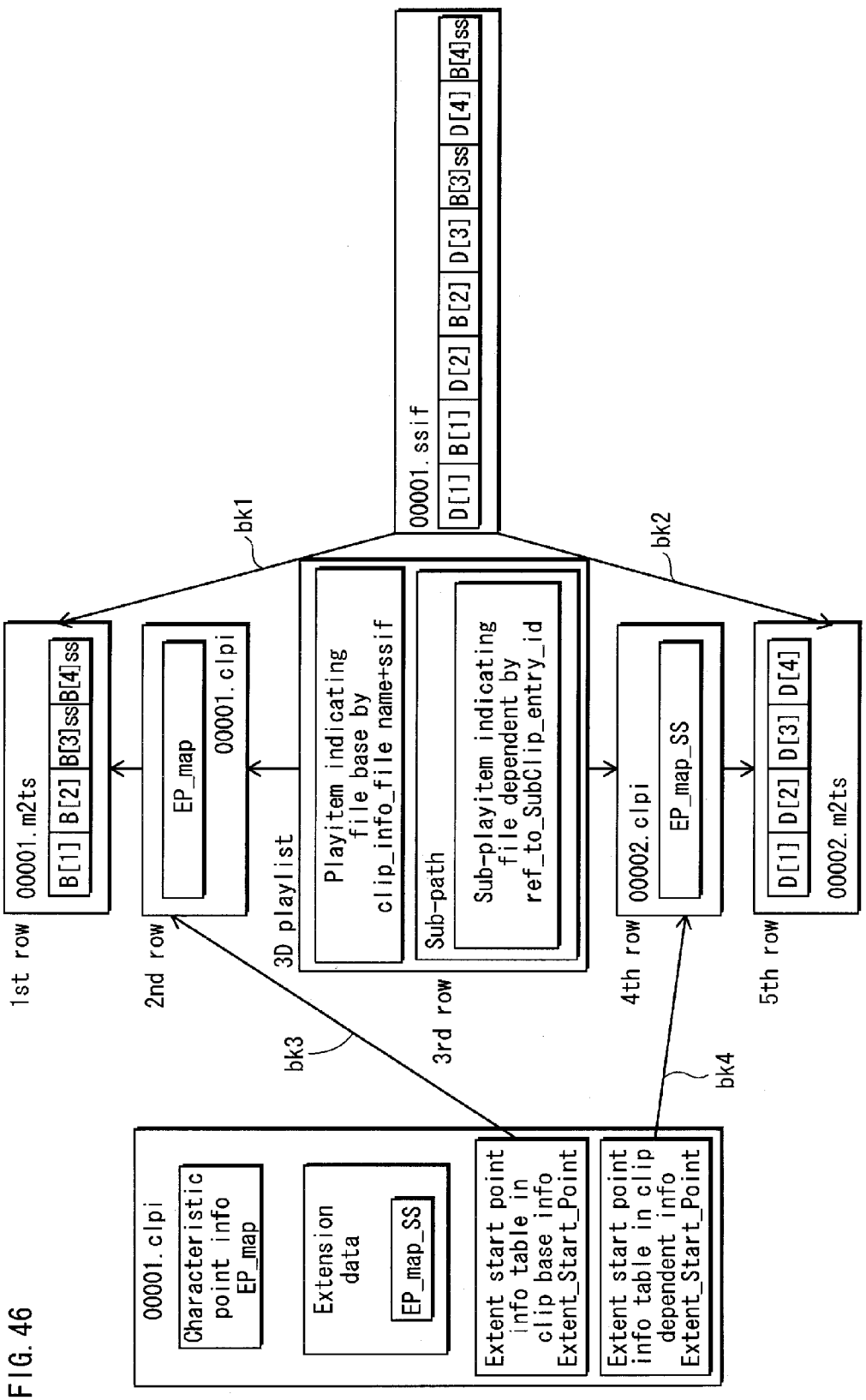
FIG. 46 shows the correspondence among the clip information file, playlist, and stereoscopic interleaved stream file.

FIG. 46 shows the correspondence among the clip information file, playlist, and stereoscopic interleaved stream file. On the right-hand side of FIG. 46, the stereoscopic interleaved stream file is shown, and on the left-hand side of FIG. 46, the clip information file is shown. In the middle of FIG. 46, the first row shows the file base, the second row shows the clip base information file, the third row shows the 3D playlist, the fourth row shows the clip dependent information file, and the fifth row shows the clip dependent.

The arrows bk1 and bk2 indicate that the file base and the file dependent are obtained respectively by dividing the stream file shown on the right-hand side of the drawing.

The clip information file shown on the left-hand side of FIG. 46 includes characteristic point information, extension data, clip base information, and clip dependent information. The arrows bk3 and bk4 indicate that the Extent start point information tables in the clip base information and the clip dependent information enable the stereoscopic interleaved stream file to be divided.

Figure 47A:
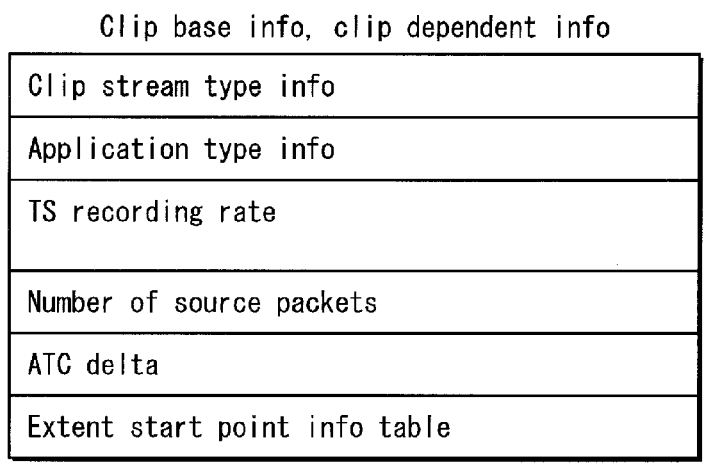
FIGS. 47A and 47B show the internal structure of the clip base information and the clip dependent information.
Figure 47B:
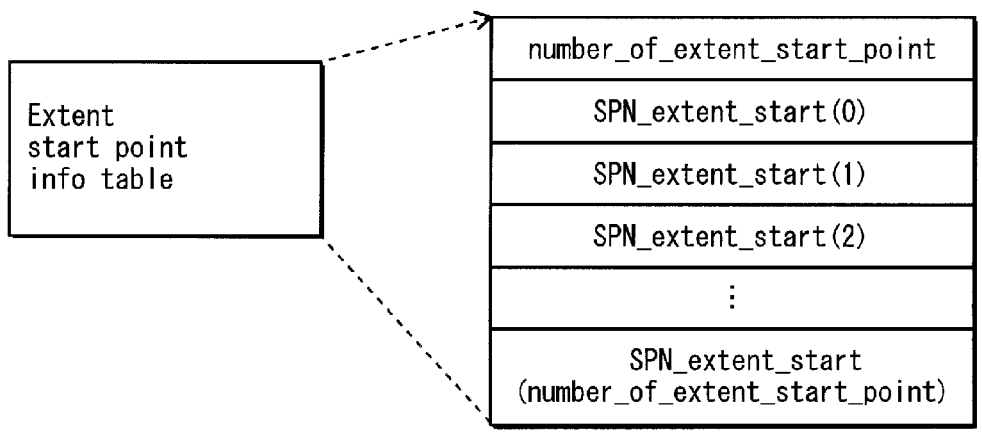

FIGS. 47A and 47B show the internal structure of the clip base information and the clip dependent information. As shown in FIG. 47A, the clip base information and the clip dependent information include: "clip stream type information" indicating the stream type to which the corresponding AV clip belongs; "application type information" indicating the type to which the application composed of the corresponding AV clip belongs, such as a movie application, a time-base slide-show application, or a browsable slide-show application; "TS recording rate" indicating a transfer rate at which the TS packets in the AV clip are transferred in the playback device after the source packets pass through the source packet depacketizer; "number of source packets" indicating the number of source packets constituting the corresponding AV clip; "ATC delta" indicating a difference in ATC from the ATC sequence constituting the preceding AV clip; and "Extent start point information table".

FIG. 47B shows the internal structure of the Extent start point information table. As shown in FIG. 47B, the Extent start point information table includes "number_of_extent_start_point", and as many "SPN_extent_start_point" as the number indicated by the "number_of_extent_start_point".

The "number_of_extent_start_point" indicates the number of Extents that belong to the related AV stream file. The Extent start point information tables in the clip base information and the clip dependent information in the same pair have the same value in the "number_of_extent_start_point".

The number of "SPN_extent_start"s (SPN_extent_start[0] through SPN_extent_start [number_of_extent_start_point]) is "number_of_extent_start_point+1". Each SPN_extent_start is specified by the Extent identifier [extent_id], and is a 32-bit value that indicates a source packet number of the source packet that corresponds to the extent_id$^{th}$ Extent in the AV stream file.

The following explains the extension data of the clip information file. The extension data includes an extension entry map. The extension entry map, as is the case with the basic entry map, is composed of a plurality of entry points. More specifically, in each entry point constituting the entry map, a source packet number that indicates the location of the characteristic point in the ATC sequence is associated with a PTS that indicates the location of the characteristic point in the STC sequence. Each entry point further includes: a flag ("is_angle_change" flag) that indicates whether an angle change to the characteristic point is available; and information (I_size) that indicates the size of the intra picture located at the start of GOP. The extension entry map differs from the basic entry map in that the following restrictions are imposed thereon.

When the extension entry map includes entries for the MPEG4-MVC view components, the extension entry map should also include entries for view components in correspondence with the PTSs in the extension entry map.

When there are two clip information files whose respective application types are "1" and "8" and which correspond to a stereoscopic interleaved stream file, the following conditions should be satisfied. That is to say, when an Extent identified by an Extent ID value of clip information with "application type=1" (clip information of an application type for the primary video stream) includes a source packet that is to be referenced by PTS_EP_Start of the base-view video stream, an Extent identified by the same Extent ID value of clip information with "application type=8" should include a source packet that is to be referenced by the same PTS_EP_Start value of the dependent-view video stream.

FIG. 48 shows the basic entry map and the extension entry map. In FIG. 48, the fifth row shows a plurality of pairs of a dependent-view data block and a base-view data block. The fourth row shows a sequence of source packets that constitute the dependent-view data blocks and the base-view data blocks. The first row shows the view components that are identified by the PTSs. The second row shows the basic entry map. The third row shows the extension entry map.

When Extent[1] specified by the Extent start point with "Extent ID=1" has a source packet [n1] with "SPN=n1" that is referenced by an entry with "PTS_EP_Start=t1" of the base-view video stream, Extent[1] specified by the Extent start point with "Extent ID=1", which is the same Extent ID of the clip information with "application type=8", includes a source packet [n11] with "SPN=n11" that is referenced by an entry with "PTS_EP_Start=t1", which is an entry having the same value in the dependent-view video stream.

As apparent from this, when a source packet located at the start of GOP(i) of the base-view video stream and a source packet located at the start of GOP(i) of the dependent-view video stream belong to the same interleave Extent unit, entries pointing to the source packet located at the start of GOP(i) of the base-view video stream and the source packet located at the start of GOP(i) of the dependent-view video stream are added into each of the basic entry map and the extension entry map. Accordingly, by using both the basic entry map and the extension entry map, it is possible to ensure the continuous reading of the GOP(i) of the base-view video stream and the GOP(i) of the dependent-view video stream.

FIG. 49 shows entries that are not permitted in the extension entry map.

It is presumed here that a source packet [x] with "SPN=x" that is referenced by an entry with "PTS_EP_Start=x" of the base-view video stream exists at the start of a file base Extent that is referenced by an Extent ID=x, and that a source packet [y] with "SPN=y" that is referenced by an entry with "PTS_EP_Start=x" exists at the start of a file dependent Extent that is referenced by an Extent ID=j, wherein "i" and "j" are different from each other.

It cannot be said that Extent [i] specified by the Extent start point of the clip dependent with "Extent ID=i" includes a source packet with "SPN=x" that is referenced by an entry with "PTS_EP_Start=x", which is an entry of the base-view video stream having the same value. Therefore an entry with "PTS_EP_Start=x" cannot be added into the extension entry map.

When a source packet located at the start of GOP(i) of the base-view video stream and a source packet located at the start of GOP(i) of the dependent-view video stream belong to different interleave Extent units, an entry pointing to the source packet located at the start of GOP(i) is not added into any of the basic entry map and the extension entry map. In this case, GOP(i) of the base-view video stream and GOP(i) of the dependent-view video stream are excluded from the access destination of the random access. This prevents the access performance from being degraded.

Figure 50:
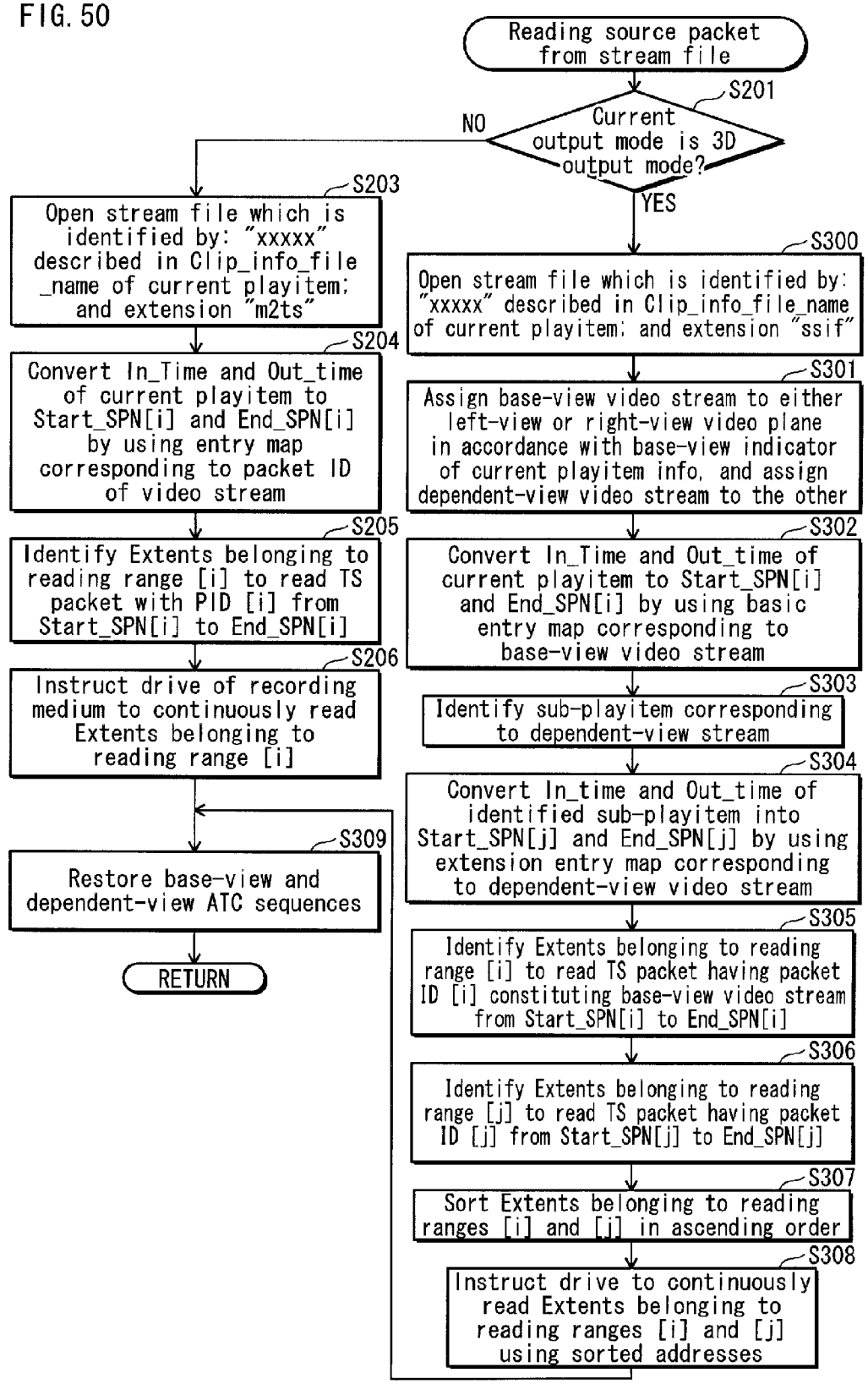
FIG. 50 is a flowchart showing the playitem playback procedure.

FIG. 50 is a flowchart showing the playitem playback procedure.

In step S201, it is judged whether or not the current output mode is the 3D output mode. When the current output mode is the 2D output mode, a loop constituted from steps S203 through S206 is performed.

In step S203, the stream file, which is identified by: "xxxxx" described in Clip_information_file_name of the current playitem; and extension "m2ts", is opened. In step S204, the "In_time" and "Out_time" of the current playitem are converted into "Start_SPN[i]" and "End_SPN[i]" by using the entry map corresponding to the packet ID of the video stream.

In step S205, the Extents belonging to the reading range [i] are identified to read the TS packet with PID [i] from the Start_SPN[i] to the End_SPN[i]. In step S206, the drive of the recording medium is instructed to continuously read the Extents belonging to the reading range [i].

When the current output mode is the stereoscopic output mode, a loop constituted from steps S300 through S308 is performed.

In step S300, the stream file, which is identified by: "xxxxx" described in the Clip_information_file_name of the current playitem; and extension "ssif", is opened. In step S301, the base-view video stream is assigned to either the left-view or right-view video plane in accordance with the base-view indicator of the current playitem information, and the dependent-view video stream is assigned to the other, namely the left-view or right-view video plane that has not been assigned to the base-view video stream.

In step S302, the "In_time" and "Out_time" of the current playitem are converted to "Start_SPN[i]" and "End_SPN[i]" by using the basic entry map corresponding to the base-view video stream.

In step S303, the sub-playitem corresponding to the dependent-view stream is identified. In step S304, the "In_time" and "Out_time" of the identified sub-playitem are converted into "Start_SPN[j]" and "End_SPN[j]" by using the extension entry map corresponding to the dependent-view video stream.

The Extents belonging to the reading range [i] are identified to read the TS packet having the packet ID [i] constituting the base-view video stream from "Start_SPN[i]" to "End_SPN[i]" (step S305). The Extents belonging to the reading range [j] are identified to read the TS packet having the packet ID [j] from "Start_SPN[j]" to "End_SPN[j]" (step S306). Following this, in step S307, the Extents belonging to the reading ranges [i] and [j] are sorted in the ascending order. In step S308, the drive is instructed to continuously read the Extents belonging to the reading ranges [i] and [j] using the sorted addresses. After this, when the source packet sequence is read, in step S309, the base-view and dependent-view ATC sequences are restored and supplied to the PID filters for the base view and dependent view.

As described above, according to the present embodiment, when GOPs of the main TS and sub-TS are to be recorded onto the above-described recording medium, entries of the extension entry map point to only dependent-view picture data pieces that correspond to base-view picture data pieces pointed to by entries of the basic entry map as those that are to be played back at the same playback times as the dependent-view picture data pieces.

The picture data pieces pointed to by entries of the basic entry map and the picture data pieces pointed to by entries of the extension entry map make pairs in Extents. Accordingly, when an Extent is accessed via the basic entry map and the extension entry map, it is possible to play back each set of GOPs of the base view and dependent view corresponding to each other as one unit. This makes it possible to solve the problem of playback start delay.

Embodiment 7

The present embodiment relates to an improvement to realize an application of a stereoscopic slide show.

The slide show is composed of still pictures, and thus the random accesses thereto should have higher accuracy than those to a movie. The random access with higher accuracy means that it is performed in a unit of a picture, such as an access to a picture that is ahead of a certain position by one picture, or to a picture that is ahead of a certain position by ten pictures. The entry map of a video stream has a time accuracy of approximately one second, such as being arranged at an interval of one second. Approximately 20 to 30 pictures may be included in the time interval of one second. Accordingly, when an attempt is made to realize a random access with the picture accuracy by using the above-described entry map, referencing of the entry map is not sufficient enough, but an analysis of the stream is required.

It should be noted here that the "analysis of the stream" is a process for reaching a recording position of a desired picture by repeating a plurality of times a process of extracting the header of a picture from an entry position written in the entry map, reading the size of the picture from the header thereof, and determining the recording position of the next picture based on the read size. In such an analysis, the stream needs to be accessed frequently, and thus even reading a picture that is ahead of an entry position by three or five pictures takes a lot of time. Since the random access with the picture accuracy takes a lot of time, if a function to display pictures before and after a certain picture in response to a user operation, or a function to display, for example, 10 pictures in response to a user operation is added to the slide show, the added function does not provide as much usability as the producer side expects.

The entry points for the slide show indicate the entry address of each picture in the video stream in correspondence with the playback time. The playlist mark information specifies each piece of picture data.

With this structure in which each piece of picture data is specified by an entry point and a piece of playlist mark information, it is possible, to realize a random access with the picture accuracy without analyzing the video stream even if a random access with the picture accuracy, such as a random access to a picture that is ahead of a position by one or three pictures, is requested.

Since it is possible to determine a recording position in a video stream from an arbitrary point on a time axis, and it is possible to realize a random access with the picture accuracy, such as a random access to a picture that is ahead of a position by one or three pictures, it is possible to create an application that can display pictures before and after a certain picture or display several pictures in response to a user operation.

According to the embodiments so far, the video stream that can be played back in the stereoscopic mode has the interleave format. With such interleave format, picture data pieces constituting the slide show are arranged, for example, in the order of L-L-L and R-R-R. When the picture data constituting the slide show are arranged as described above and each piece of picture data is specified by the entry point, the entry points will be arranged in the order of 00:00->00:01->00:02->00:00->00:01->00:02.

There is a restriction that the entry points in the entry map should be arranged in the ascending order of the playback time. The above-indicated arrangement of the entry points does not comply with this restriction. In view of this, a unique restriction is imposed on the case where the application type of the AV clip is slide show. The unique restriction is that one TS should include both the picture data constituting the left-view stream and the picture data constituting the right-view stream. With this restriction, it is possible to arrange the picture data constituting the left-view stream and the picture data constituting the right-view stream in the order of L-R-L-R-L-R, and to arrange the entry points of the picture data so that the playback times at the entry points are in the order of 00:00->00:00->00:01->00:01->00:02->00:02->00:03->00:03.

With this structure in which a plurality of pieces of picture data constituting one slide are arranged in the time order and then the pieces of picture data are multiplexed, a group of multiplexed pieces of picture data are recorded in continuous areas in the recording medium.

In a transport stream in which the base-view still-picture data and the dependent-view still-picture data are multiplexed, an access unit delimiter which is located at the start of picture data of a base-view still-picture precedes picture data of a dependent-view still-picture, and the end of the picture data of the dependent-view still-picture precedes an access unit delimiter which is located at the start of picture data of a base-view still-picture that is to be played back next to the first base-view still-picture. Also, source packets storing the access unit delimiters located at the starts of the picture data of the base-view and dependent-view still pictures do not contain picture data other than that of their own. That is to say, the picture data representing the base-view and dependent-view still pictures are arranged in the completed state in the order of base-view-dependent-view-base-view-dependent-view in the recording areas.

The picture data of the left-view and the right-view are multiplexed for the following reasons. When the picture data is recorded as one Extent onto the recording medium, its length falls short of the minimum Extent length. For the picture data to have at least the minimum Extent length, a plurality of pieces of picture data are arranged in the time order as described above, then they are multiplexed, and the TS multiplexed with them is recorded onto the recording medium. With this structure, it is possible to record a TS by dividing it into blocks which each have at least the minimum Extent length.

Since each piece of data has relatively a small size, the data for displaying each still picture may be arranged as a block to increase the efficiency of data reading.

This completes the description of the improvement on the stream files when a slide show is to be provided. The following describes an improvement on the entry maps in detail.

Entries of the extension entry map point to only dependent-view picture data pieces that correspond to base-view picture data pieces pointed to by entries of the basic entry map as those that are to be played back at the same playback times as the dependent-view picture data pieces. In the slide show, the entry map is set so that all pictures in the base-view video stream are specified. Therefore, due to the above-described restriction, all the pictures in the dependent-view video stream are specified by the extension entry map.

In this way, playback time points of picture data in the base-view video stream are specified as entry times by the basic entry map, and playback time points of picture data in the dependent-view video stream are specified as entry times by the extension entry map. With this structure, even if either picture data constituting the base-view video stream or picture data constituting the dependent-view video stream is selected as a target of a random access, there is no passing through of a preceding IDR picture, thus no overhead due to the roundabout occurs.

As described above, according to the present embodiment, it is possible, without analyzing the stream, to read an arbitrary pair of picture data of left-eye image and picture data of right-eye image, and cause them to be played back. This makes it possible to realize with ease a slide show application that can access arbitrary picture data by random access in accordance with a skip operation input by the user.

Embodiment 8

Figure 51:
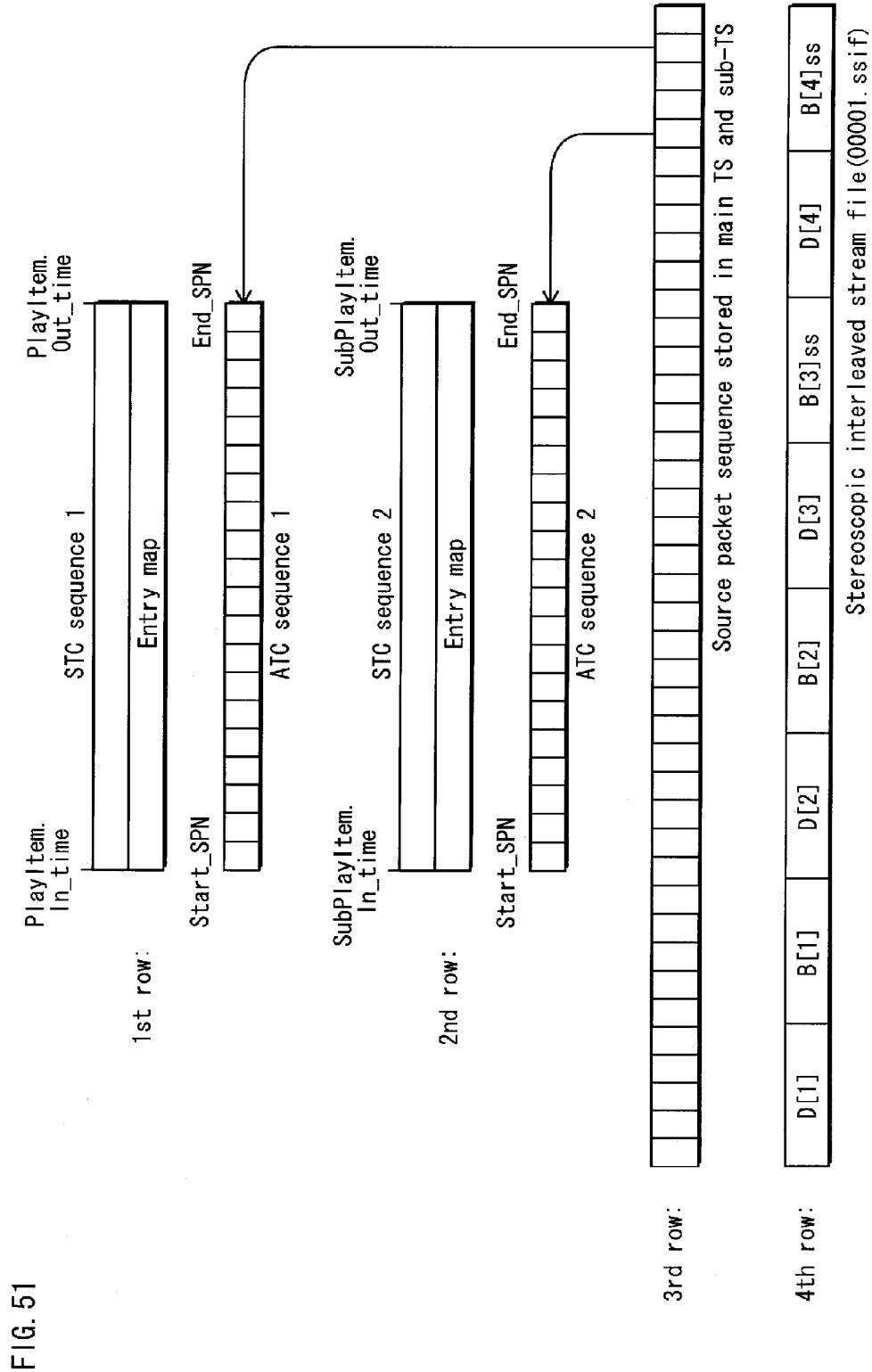
FIG. 51 shows how the ATC sequence is restored from the data blocks constituting the stereoscopic interleaved stream file.

The present embodiment relates to an improvement for restoring the ATC sequence from the data blocks that constitute the stereoscopic interleaved stream file. FIG. 51 shows how the ATC sequence is restored from the data blocks constituting the stereoscopic interleaved stream file.

The fourth row of FIG. 51 shows a plurality of data blocks that constitute the stereoscopic interleaved stream file. The third row shows the source packet sequence multiplexed in the main TS and the sub-TS.

The second row shows a set of STC sequence 2 constituting the dependent view, an entry map, and ATC sequence 2 constituting the dependent view. The first row shows a set of STC sequence 1 constituting the dependent view, an entry map, and ATC sequence 1 constituting the dependent view. The arrows extending from the third row to the first and the second rows schematically show that the ATC sequences 1 and 2 are restored from the data blocks of the two TSs (main TS and sub-TS) interleaved in the stereoscopic interleaved stream file. These ATC sequences are associated with the STC sequences by the entry map in the clip information.

This completes the description of the recording medium in the present embodiment. The following describes the playback device in detail.

The playback device in the present embodiment has a structure in which the reading unit receives inputs of source packets from two recording mediums. For this purpose, the reading unit includes two drives and two read buffers. The two drives are used to access the two recording mediums, respectively. The two read buffers are used to temporarily store the source packets input from the two drives and output them to the decoder. An ATC sequence restoring unit is provided between the two drives and the two read buffers. The ATC sequence restoring unit separates the ATC sequence constituting the base-view stream and the ATC sequence constituting the dependent-view stream, from the source packets in the interleaved stream file read from one recording medium, and writes the two ATC sequences into the two read buffers, respectively. With this structure, the playback device can process the ATC sequence constituting the base-view video stream and the ATC sequence constituting the dependent-view video stream as if they have been read from different recording mediums, respectively.

FIGS. 52A and 52B show how the ATC sequence is restored. FIG. 52A shows the internal structure of the reading unit provided with the ATC sequence restoring unit. As described above, the ATC sequence restoring unit is provided between the two drives and the two read buffers. The arrow B0 symbolically indicates the input of the source packet from one drive. The arrow B1 schematically indicates the writing of the ATC sequence 1 constituting the base-view video stream. The arrow D1 schematically indicates the writing of the ATC sequence 2 constituting the dependent-view video stream.

FIG. 52B shows how the two ATC sequences obtained by the ATC sequence restoring unit are treated. In the middle part of FIG. 52B, the PID filters provided in the demultiplexing unit are shown. On the left-hand side of the figure, the two ATC sequences obtained by the ATC sequence restoring unit are shown. The right-hand side of the figure shows the base-view video stream, dependent-view video stream, left-eye PG stream, right-eye PG stream, base-view IG stream, and dependent-view IG stream, which are obtained by demultiplexing the two ATC sequences.

FIGS. 53A through 53D show one example of the Extent start point information table in the base-view clip information and one example of the Extent start point information table in the dependent-view clip information. FIG. 53A shows the Extent start point information table in the base-view clip information and the Extent start point information table in the dependent-view clip information.

FIG. 53B shows base-view data blocks B[0], B[1], B[2], . . . B[n] constituting the ATC sequence 1, and dependent-view data blocks D[0], D[1], D[2], . . . D[n] constituting the ATC sequence 2. FIG. 53C shows the number of source packets in the dependent-view data block and the number of source packets in the base-view data block.

FIG. 53D shows a plurality of data blocks included in the stereoscopic interleaved stream file.

As shown in FIG. 53B, when the ATC sequence 2.is composed of the dependent-view data blocks D[0], D[1], D[2], . . . D[n], the source packet numbers 0, b1, b2, b3, b4, . . . bn, which are relative to the dependent-view data blocks D[0], D[1], D[2], . . . D[n] constituting the ATC sequence 2, are written in the SPN_extent_start in the Extent start point information table of the file dependent.

When the ATC sequence 1.is composed of the base-view data blocks B[0], B[1], B[2], . . . B[n], the number of source packets 0, a1, a2, a3, a4, . . . an, which are relative to the base-view data blocks B[0], B[1], B[2], . . . B[n] constituting the ATC sequence 1, are written in the SPN_extent_start in the Extent start point information table of the file base.

FIG. 53C shows the number of source packets in an arbitrary dependent-view data block D[x] and the number of source packets in an arbitrary base-view data block B[x]. When the starting source packet number of the dependent-view data block D[x] is bx and the starting source packet number of the dependent-view data block D[x+1] is bx+1, the number of source packets constituting the dependent-view data block D[x] is "(bx+1)−bx".

Similarly, when the starting source packet number of the base-view data block B[x] is ax and the starting source packet number of the base-view data block B[x+1] is ax+1, the number of source packets constituting the base-view data block B[x] is "(ax+1)−ax".

When the starting source packet number of the last base-view data block B[n] in the stereoscopic interleaved stream file is "an" and the number of source packets constituting the ATC sequence 1 is "number_of_source_packet1", the number of source packets constituting the base-view data block B[n] is "number_of_source_packet1−an".

When the starting source packet number of the last dependent-view data block D[n] in the stereoscopic interleaved stream file is "bn" and the number of source packets constituting the ATC sequence 2 is "number_of_source_packet2", the number of source packets constituting the dependent-view data block D[n] is "number_of_source_packet2−bn".

FIG. 53D shows the starting source packet numbers of the dependent-view data blocks and the base-view data blocks in the present example.

In the stereoscopic interleaved stream file, the starting SPN of D[0] is "0" and the starting SPN of B[0] is "b1".

The starting SPN of D[1] is "b1+a1", representing the sum of b1 (the number of source packets in the preceding dependent-view data block D[0]) and a1 (the number of source packets in the preceding base-view data block B[0]).

The starting SPN of B[1] is "b2+a1" (=b1+a1+b2−b1), representing the sum of b1 (the number of source packets in the preceding dependent-view data block D[0]) and a1 (the number of source packets in the preceding base-view data block B[0]) and "b2−b1" (the number of source packets in the preceding dependent-view data block D[1]).

The starting SPN of D[2] is "b2+a2" (=b1+a1+b2−b1+a2−a1), representing the sum of b1 (the number of source packets in the preceding dependent-view data block D[0]) and a1 (the number of source packets in the preceding base-view data block B[0]) and "b2−b1" (the number of source packets in the preceding dependent-view data block D[1]) and "a2−a1" (the number of source packets in the preceding base-view data block B[1]).

The starting SPN of B[2] is "b3+a2" (=b1+a1+b2−b1+a2−a1+b3−b2), representing the sum of b1 (the number of source packets in the preceding dependent-view data block D[0]) and a1 (the number of source packets in the preceding base-view data block B[0]) and "b2−b1" (the number of source packets in the preceding dependent-view data block D[1]) and "a2−a1" (the number of source packets in the preceding base-view data block B[1]) and "b3−b2" (the number of source packets in the preceding dependent-view data block D[2]).

FIGS. 54A through 54C are illustrations provided for explanation of the source packet numbers of arbitrary data blocks in ATC sequences 1 and 2.

Suppose that an attempt is made to obtain a source packet number in a stereoscopic interleaved stream file in D[x] with a source packet number "bx", in the ATC sequence 2 shown in FIG. 54A. In this case, the starting source packet number of D[x] is "bx+ax", representing the sum of source packet numbers which are relative to data blocks D[0], B[0], D[1], B[1], D[2], B[2], . . . D[x−1], B[x−1], as shown in FIG. 54B.

Suppose that an attempt is made to obtain a source packet number in a stereoscopic interleaved stream file in B[x] with a source packet number "ax", in the ATC sequence 1 shown in FIG. 54A. In this case, the starting source packet number of B[x] is "bx+1+ax", representing the sum of source packet numbers which are relative to data blocks D[0], B[0], D[1], B[1], D[2], B[2], . . . D[x−1], B[x−1], D[x], as shown in FIG. 54B.

FIG. 54C shows a file base and a file dependent, wherein the Extents constituting the file base are the above-described base-view data blocks and the Extents constituting the file dependent are the above-described dependent-view data blocks.

The starting LBN and continuous length of EXT1[x] and EXT2[x] are obtained as follows, wherein EXT1[x] is an Extent of a file base corresponding to B[x], and EXT2[x] is an Extent of a file dependent corresponding to D[x].

The LBN can be obtained from the starting source packet number of D[x] by converting the source packet into the LBN by performing a calculation ((bx+ax)*192/2048). Similarly, the LBN can be obtained from the starting source packet number of B[x] by converting the source packet into the LBN by performing a calculation ((bx+1+ax)*192/2048). Here, the number "192" indicates the number of bytes representing the source packet size, and the number "2048" indicates the number of bytes representing the sector size (logical block size). The LBN of an Extent in the stereoscopic interleaved stream file that is closest to these LBNs can be obtained by using these converted LBNs as "file_offset" that is an argument of a function "SSIF_LBN(file_offset)". The function SSIF_LBN is a function that returns an LBN corresponding to the file_offset after tracing the allocation descriptors of the SSIF starting with the file_offset.

Accordingly, the starting LBN of EXT2[x] is represented as "SSIF_LBN((bx+ax)*192/2048)". Also, the starting LBN of EXT1[x] is represented as "SSIF_LBN((bx+1+ax)*192/2048)".

On the other hand, the continuous length of EXT2[x] is represented as "SSIF_LBN((bx+1+ax)*192/2048)−SSIF_LBN((bx+ax)*192/2048)". Also, the continuous length of EXT1[x] is represented as "SSIF_LBN((bx+1+ax+1)*192/2048)−SSIF_LBN((bx+1+ax)*192/2048)". When file entries indicating these starting LBNs and continuous lengths are generated on a memory, it is possible to obtain file bases and file dependents virtually.

Figure 55:
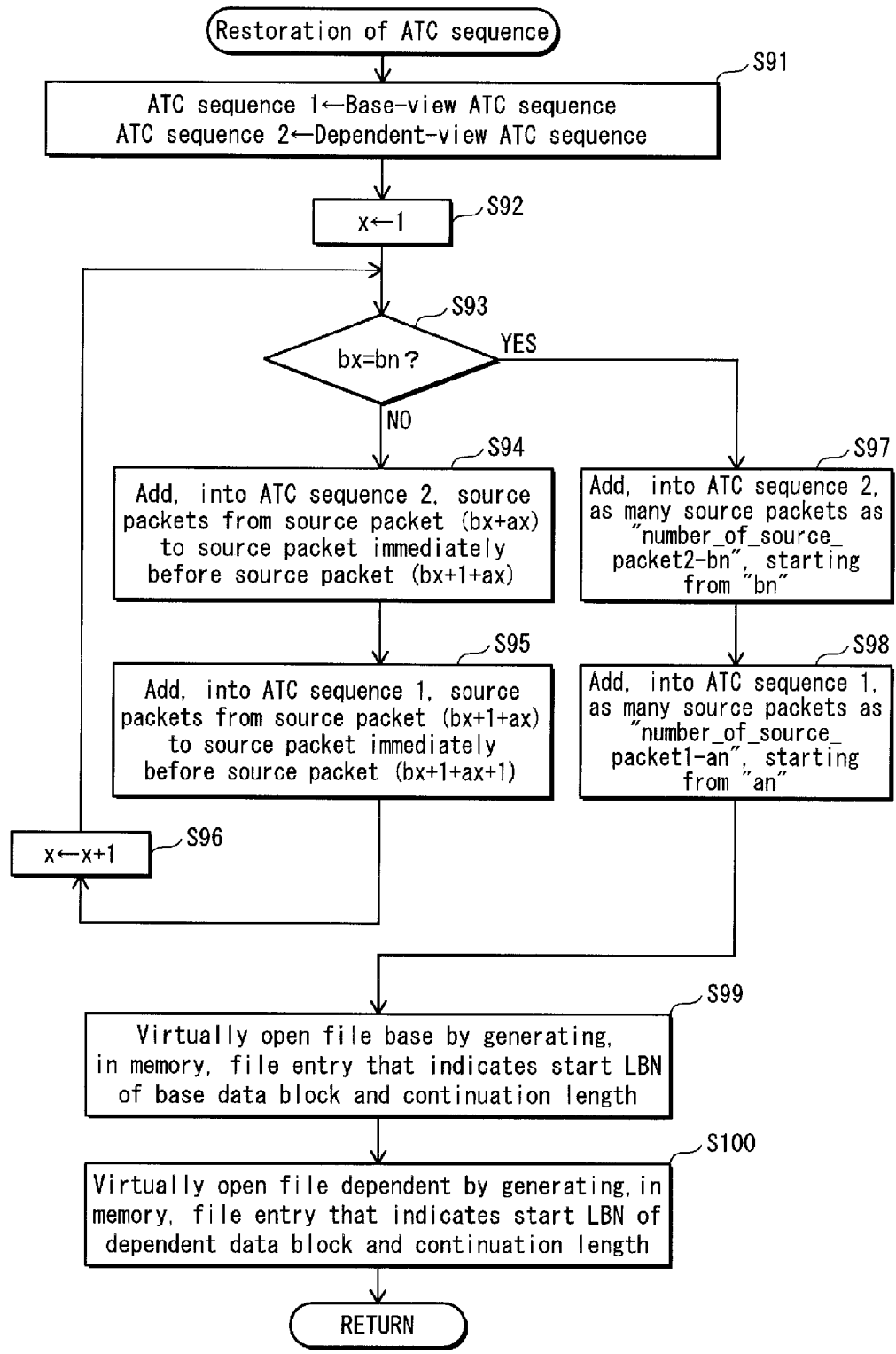
FIG. 55 shows the procedure for restoring the ATC sequence.

The demultiplexing performed by the two ATC sequences is based on the basic stream selection table and the extension stream selection table described in Embodiment 1. The ATC sequence restoring unit is realized by creating a program that causes the hardware resource to perform the process shown in FIG. 55. FIG. 55 shows the procedure for restoring the ATC sequence.

In step S91, the ATC sequence for base-view is set as the ATC sequence 1, and the ATC sequence for dependent-view is set as the ATC sequence 2. In step S92, the variable "x" is initialized to "1". The variable "x" specifies a base-view data block and a dependent-view data block. After this, the control enters a loop in which steps S94 through S96 are repeatedly performed as follows.

It is judged whether or not a source packet number bx specified by the variable "x" is equal to a source packet number bn specified by the last numeral "n" of the base-view data block (step S93). When the result of the judgment is in the negative (No in step S93), the source packets from the source packet (bx+ax), which is specified by the source packet number "bx+ax", to the source packet immediately before the source packet ($b_{x+1}$+ax) specified by the source packet number "$b_{x+1}$+ax" are added into the ATC sequence 2 (step S94). Then, the source packets from the source packet (bx+1+ax) to the source packet immediately before the source packet (bx+1+ax+1) are added into the ATC sequence 1 (step S95). And then the variable "x" in incremented (step S96). These steps are repeated until it is judged Yes in step S93.

When it is judged Yes in step S93, as many source packets as the number specified by "number_of_source_packet2−bn" starting from the source packet number "bn" are added into the ATC sequence 2 (step S97). And as many source packets as the number specified by "number_of_source_packet1−bn" starting from the source packet number "an" are added into the ATC sequence 1 (step S98).

After the ATC sequences 1 and 2 are restored through the above-described steps, the file base is virtually opened by generating, in the memory, the file entry that indicates the start LBN of the base-view data block and the continuation length (step S99). Similarly, the file dependent is virtually opened by generating, in the memory, the file entry that indicates the start LBN of the dependent-view data block and the continuation length (step S100).

<Technical Meaning of Opening File Base>

When a random access from an arbitrary time point is to be performed, a sector search within a stream file needs to be performed. The sector search is a process for identifying a source packet number of a source packet corresponding to the arbitrary time point, and reading a file from a sector that contains a source packet of the source packet number.

Since the size of one Extent constituting the stereoscopic interleaved stream file is large, the sector search requires a wide range of searching. In that case, when a random access from an arbitrary time point is performed, it may take a long time to identify the reading-target sector.

This is because, in the interleaved stream file, data blocks constituting the base-view video stream and the dependent-view video stream are disposed in the interleaved manner to constitute one long Extent, and the allocation descriptor of the file entry of the interleaved stream file merely indicates the start address of the long Extent.

In contrast, the file base is composed of a plurality of short Extents, and the start address of each Extent is written in the allocation descriptor. As a result, the sector search requires a narrow range of searching. Thus, when a random access from an arbitrary time point is performed, the reading-target sector can be identified in a short time.

That is to say, since the data blocks constituting the base-view video stream are managed as Extents of the file base, and the start address of each data block is written in the allocation descriptor in the file entry corresponding to the file base, it is possible to quickly reach the sector including the source packet at the target random access position, by starting the sector search from the start address of the Extent that contains the target random access position.

With the above-described structure in which the data blocks constituting the base-view video stream are managed as Extents of the file base, and the start address of each Extent and the continuation length are written in the allocation descriptor in the file entry corresponding to the file base, it is possible to perform a random access from an arbitrary time point in the base-view video stream at a high speed.

More specifically, the sector search is performed as follows. First, the entry map corresponding to the base-view video stream is used to detect a source packet number that is the random access position corresponding to the arbitrary time point.

Next, the Extent start point information in the clip information corresponding to the base-view video stream is used to detect an Extent that contains the source packet number that is the random access position.

Further, the allocation descriptor in the file entry corresponding to the file base is referenced to identify the start sector address of the Extent that contains the source packet number that is the random access position. Then a file read is performed by setting a file pointer to the start sector address, and a packet analysis is executed onto the read source packet to identify the source packet with the source packet number that is the random access position. Then the identified source packet is read. With this procedure, the random access to the main TS is executed efficiently. This also applies to the sub-TS.

As described above, according to the present embodiment, Extents of the base-view video stream and the dependent-view video stream in the interleaved stream file are supplied to the demultiplexing unit and the decoder after they are rearranged based on the Extent start point information. Thus the decoder and program can treat, as the files virtually existing on the recording medium, the file base storing the base-view video stream and the file dependent storing the dependent-view video stream.

In this structure, the base-view video stream and the dependent-view video stream for the stereoscopic viewing are recorded on the recording medium, while the base-view video stream and the dependent-view video stream can be accessed separately. With this structure, the processing efficiency of the playback device is improved.

Embodiment 9

The present embodiment describes the production of the recording mediums described in the embodiments so far, namely, the production act of the recording medium.

The recording method of the present embodiment can be realized as a real-time recording in which AV files (stream files) and non-AV files (files other than the stream files) are generated in real time, and are written directly into the AV data recording area and the non-AV data recording area provided in the recording medium. However, not limited to this, the recording method of the present embodiment can be realized as a pre-format recording in which bit streams to be recorded into the volume area are generated in advance, a master disc is generated based on the bit streams, and the master disc is pressed, thereby making possible a mass production of the optical disc. The recording method of the present embodiment is applicable to either the real-time recording or the pre-format recording.

When the recording method is to be realized by the real-time recording technology, the recording device for performing the recording method creates an AV clip in real time, and stores the AV clip into the BD-RE, BD-R, hard disk, or semiconductor memory card.

In this case, the AV clip may be a transport stream that is obtained as the recording device encodes an analog input signal in real time, or a transport stream that is obtained as the recording device partializes a digital input transport stream. The recording device for performing the real-time recording includes: a video encoder for obtaining a video stream by encoding a video signal; an audio encoder for obtaining an audio stream by encoding an audio signal; a multiplexor for obtaining a digital stream in the MPEG2-TS format by multiplexing the video stream, audio stream and the like; and a source packetizer for converting TS packets constituting the digital stream in the MPEG2-TS format into source packets. The recording device stores an MPEG2 digital stream having been converted into the source packet format, into an AV clip file, and writes the AV clip file into the BD-RE, BD-R, or the like. When the digital stream is written, the control unit of the recording device performs a process of generating the clip information and the playlist information in the memory. More specifically, when the user requests a recording process, the control unit creates an AV clip file and an AV clip information file in the BD-RE or the BD-R.

After this, when the starting position of GOP in the video stream is detected from the transport stream which is input from outside the device, or when the GOP of the video stream is created by the encoder, the control unit of the recording device obtains (i) the PTS of the intra picture that is positioned at the start of the GOP and (ii) the packet number of the source packet that stores the starting portion of the GOP, and additionally writes the pair of the PTS and the packet number into the entry map of the clip information file, as a pair of EP_PTS entry and EP_SPN entry. After this, each time a GOP is generated, a pair of EP_PTS entry and EP_SPN entry is written additionally into the entry map of the clip information file. In so doing, when the starting portion of a GOP is an IDR picture, an "is_angle_change" flag having been set to "ON" is added to a pair of EP_PTS entry and EP_SPN entry. Also, when the starting portion of a GOP is not an IDR picture, an "is_angle_change" flag having been set to "OFF" is added to a pair of EP_PTS entry and EP_SPN entry.

Further, the attribute information of a stream in the clip information file is set in accordance with the attribute of the stream to be recorded. After the clip and the clip information are generated and written into the BD-RE or the BD-R, the playlist information defining the playback path via the basic entry map in the clip information is generated and written into the BD-RE or the BD-R. When this process is executed with the real-time recording technology, a hierarchical structure composed of the AV clip, clip information, and playlist information is obtained in the BD-RE or the BD-R.

This completes the description of the recording device for performing the recording method by the real-time recording. Next is a description of the recording device for performing the recording method by the pre-format recording.

The recording method by the pre-format recording is realized as a manufacturing method of an optical disc including an authoring procedure.

Figure 56A:
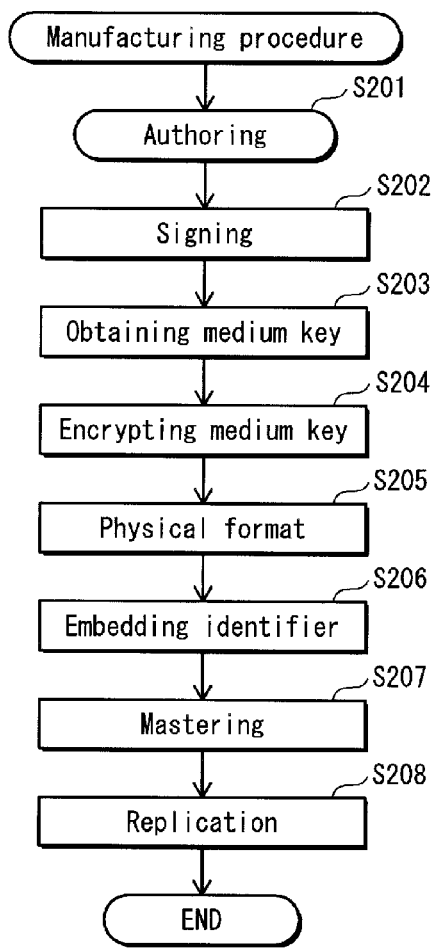
FIGS. 56A and 56B show the manufacturing method of an optical disc.
Figure 56B:
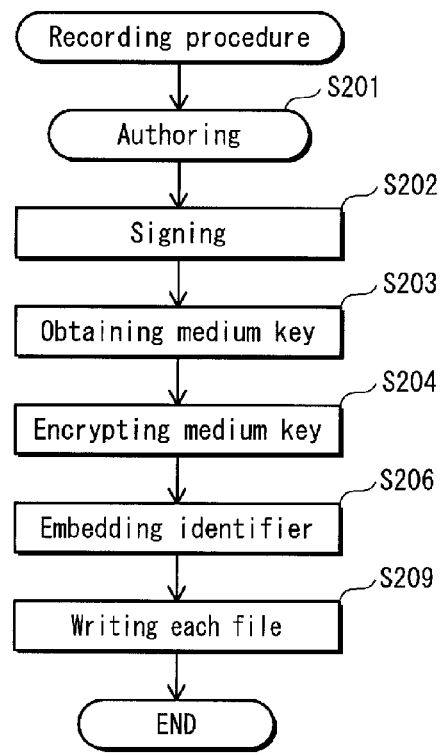

FIGS. 56A and 56B show the recording method and manufacturing method of an optical disc. FIG. 56A is a flowchart of the recording method by the pre-format recording and shows the procedure of the optical disc manufacturing method. The optical disc manufacturing method includes the authoring step, signing step, medium key obtaining step, medium key encrypting step, physical format step, identifier embedding step, a mastering step, and replication step.

In the authoring step S201, a bit stream representing the whole volume area of the optical disc is generated.

In the signing step S202, a request for signature is made to the AACS LA to manufacture the optical disc. More specifically, a portion is extracted from the bit stream is sent to the AACS LA. Note that the AACS LA is an organization for managing the license of the copyrighted work protection technologies for the next-generation digital household electric appliances. The authoring sites and mastering sites are licensed by the AACS LA, where the authoring sites perform authoring of optical discs by using authoring devices, and the mastering sites execute mastering by using mastering devices. The AACS LA also manages the medium keys and invalidation information. The AACS LA signs and returns the portion of the bit stream.

In the medium key obtaining step S203, a medium key is obtained from the AACS LA. The medium key provided from the AACS LA is not fixed. The medium key is updated to a new one when the number of manufactured optical discs reaches a certain number. The update of the medium key makes it possible to exclude certain makers or devices, and to invalidate an encryption key by using the invalidation information even if the encryption key is cracked.

In the medium key encrypting step S204, a key used for encrypting a bit stream is encrypted by using the medium key obtained in the medium key obtaining step.

In the physical format step S205, the physical formatting of the bit stream is performed.

In the identifier embedding step S206, an identifier, which is unique and cannot be detected by ordinary devices, is embedded, as electronic watermark, into the bit stream to be recorded on the optical disc. This prevents mass production of pirated copies by unauthorized mastering.

In the mastering step S207, a master disc of the optical disc is generated. First, a photoresist layer is formed on the glass substrate, a laser beam is radiated onto the photoresist layer in correspondence with desired grooves or pits, and then the photoresist layer is subjected to the exposure process and the developing process. The grooves or pits represent values of the bits constituting the bit stream that has been subjected to the eight-to-sixteen modulation. After this, the master disc of the optical disc is generated based on the photoresist whose surface has been made uneven by the laser cutting in correspondence with the grooves or pits.

In the replication step S208, copies of the optical disc are produced by a mass production by using the master disc of the optical disc.

FIG. 56B shows the procedure of the recording method by the pre-format recording when a general user records any of the various files described in the embodiment so far onto a recording medium such as BD-R or BD-RE by using a personal computer, not when the optical disc is mass-produced. Compared with FIG. 56A, in the recording method shown in FIG. 56B, the physical format step S205 and the mastering step S207 have been omitted, and each file writing step S209 has been added.

Next, the authoring step is explained.

Figure 57:
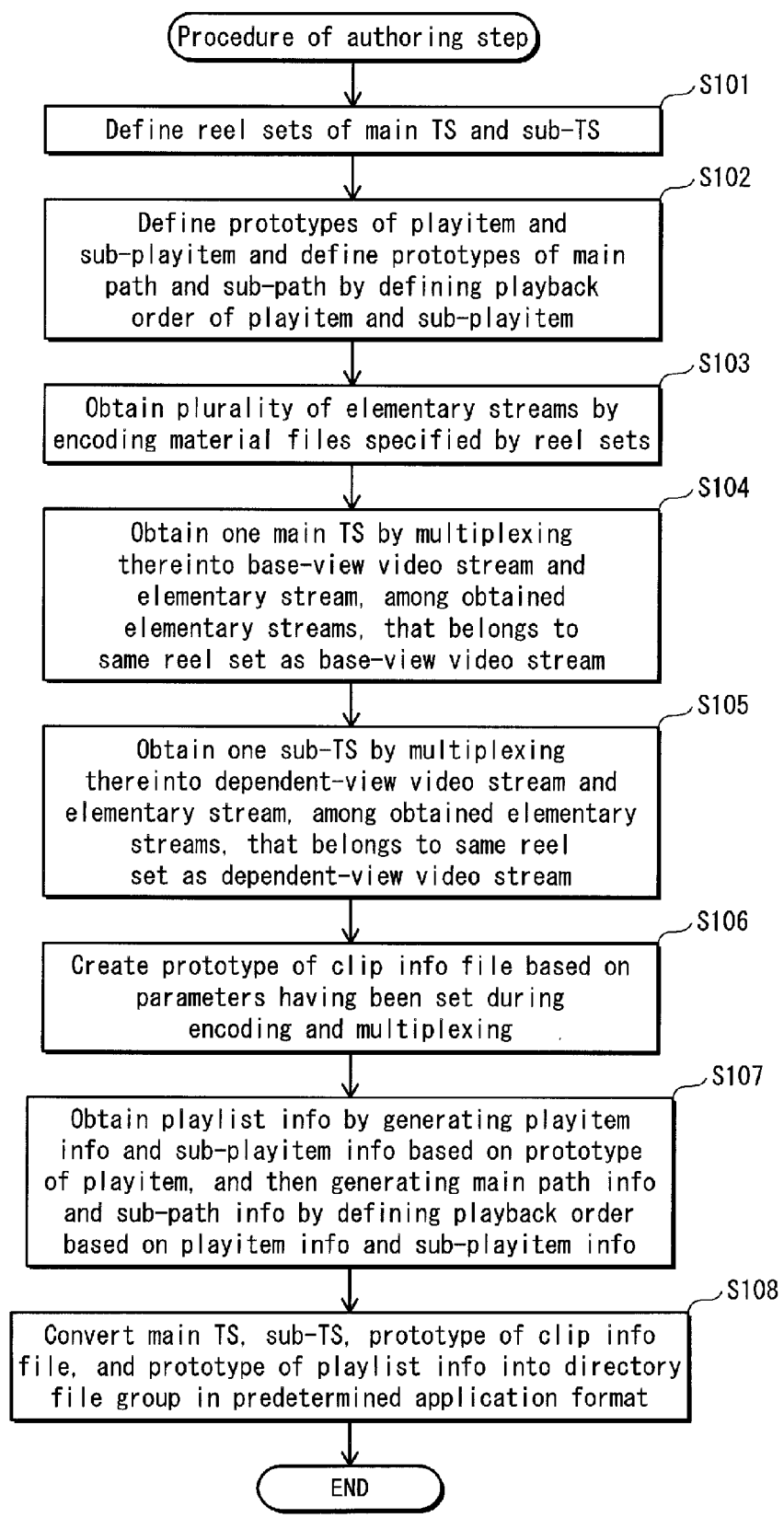
FIG. 57 is a flowchart showing the procedure of the authoring step.

FIG. 57 is a flowchart showing the procedure of the authoring step.

In step S101, the reel sets of the main TS and sub-TS are defined. A "reel" is a file which stores the material data of an elementary stream. In the authoring system, the reels exist on a drive on a local network. The reels are data representing, for example, L and R images shot by a 3D camera, audio recorded at the shooting, audio recorded after the shooting, subtitles for each language, and menus. A "reel set" is a group of links to the material files, representing a set of elementary streams to be multiplexed into one transport stream. In this example, a reel set is defined for each of the main TS and the sub-TS.

In step S102, the prototypes of playitem and sub-playitem are defined, and the prototypes of the main path and sub-path are defined by defining a playback order of playitem and sub-playitem. The prototype of the playitem can be defined by receiving, via a GUI, a specification of a reel that is permitted to be played back by a targeted playitem in the monoscopic output mode, and a specification of In_Time and Out_Time. The prototype of the sub-playitem can be defined by receiving, via a GUI, a specification of a reel that is permitted to be played back by a playitem corresponding to a targeted sub-playitem in the stereoscopic output mode, and a specification of In_Time and Out_Time.

For the specification of a reel to be permitted to be played back, a GUI is provided to make it possible to check a check box corresponding to, among the links to the material files in the reel set, a link to a material file permitted to be played back. With this GUI, numeral input columns are displayed in correspondence with the reels. With use of the numeral input columns, the priority of each reel is received, and based on this, the priorities of the reels are determined. With the setting of the reels permitted to be played back and the setting of the priorities, the stream selection table and the extension stream selection table are generated.

The specification of In_Time and Out_Time is performed when the recording device executes the process in which the time axis of the base-view video stream or the dependent-view video stream is displayed as a graphic on the GUI, a slide bar is moved on the graphic of the time axis, and specification of a positional setting of the slide bar is received from the user.

The definition of the playback order of the playitem and the sub-playitem is realized by the following process: a picture at In_Time of the playitem is displayed as a thumbnail on the GUI, and the recording device receives from the user an operation made onto the thumbnail to set the playback order.

In step S103, a plurality of elementary streams are obtained by encoding the material files specified by the reel sets. The plurality of elementary streams include the base-view video stream and the dependent-view video stream, and the audio stream, PG stream, and IG stream that are to be multiplexed with the base-view video stream and the dependent-view video stream.

In step S104, one main TS is obtained by multiplexing thereinto the base-view video stream and an elementary stream which, among the elementary streams obtained by the encoding, belongs to same reel set as the base-view video stream.

In step S105, one sub-TS is obtained by multiplexing thereinto the dependent-view video stream and an elementary stream which, among the elementary streams obtained by the encoding, belongs to the same reel set as the dependent-view video stream.

In step S106, the prototype of the clip information file is created based on the parameters having been set during the encoding and multiplexing.

In step S107, the playlist information is defined by generating the playitem information and the sub-playitem information based on the prototype of the playitem, and then generating the main path information and the sub-path information by defining the playback order based on the playitem information and the sub-playitem information.

In the generation of the playitem information, the stream selection table is generated in the playitem information so that, among the elementary streams multiplexed in the main TS, elementary streams that are defined, in the basic structure of the playitem, to be played back in the monoscopic output mode are set to "playable". Also, to define the playback section in the base-view video stream, the In_Time and Out_Time having been defined by the above-described editing are written in the playitem information.

In the generation of the sub-playitem information, the extension stream selection table is generated in the extension data of the playlist information so that, among the elementary streams multiplexed in the sub-main TS, elementary streams that are defined, in the basic structure of the playitem, to be played back in the stereoscopic output mode are set to "playable". The playitem information and the sub-playitem information are defined based on information in the clip information file, and thus are set based on the prototype of the prototype of the clip information file.

In step S108, the main TS, sub-TS, prototype of the clip information file, and prototype of the playlist information are converted into a directory file group in a predetermined application format.

Through the above-described processes, the main TS, sub-TS, clip information, playitem information, and sub-playitem information are generated. Then the main TS and the sub-TS are converted into respective independent stream files, the clip information is converted into the clip information file, and the playitem information and the sub-playitem information are converted into the playlist information file. In this way, a set of files to be recorded onto the recording medium are obtained.

After this, when the video stream encoding step is executed, the plane offset value and the offset direction information obtained the above-described conversion are written into the metadata of each GOP. In this way, the offset sequence can be generated in the encoding process.

Figure 58:
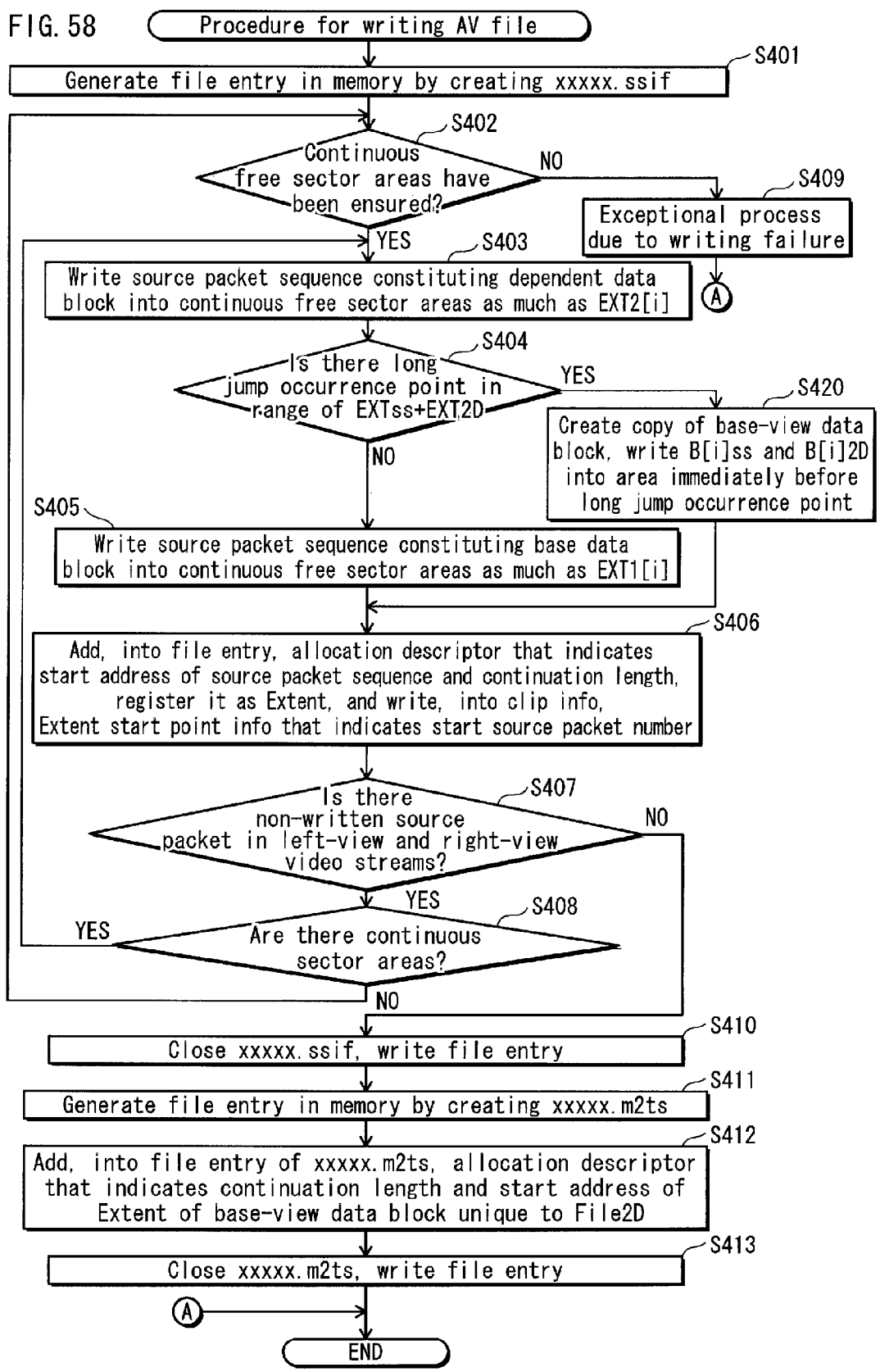
FIG. 58 is a flowchart showing the procedure for writing the AV file.

FIG. 58 is a flowchart showing the procedure for writing the AV file. The AV files are written according to this flowchart when the recording method by the real-time recording or the recording method including the mastering or replication is implemented.

In step S401, the recording device generates the file entry in the memory of the recording device by creating "xxxxx.ssif". In step S402, it is judged whether the continuous free sector areas have been ensured. When the continuous free sector areas have been ensured, the control proceeds to step S403 in which the recording device writes the source packet sequence constituting the dependent-view data block into the continuous free sector areas as much as EXT2[i]. After this, steps S404 through S408 are executed. When it is judged in step S402 that the continuous free sector areas have not been ensured, the control proceeds to step S409 in which the exceptional process is performed, and then the process ends.

The steps S404 through S408 constitute a loop in which the process of steps S404-S406 and S408 is repeated until it is judged "NO" in step S407.

In step S405, the recording device writes the source packet sequence constituting the base-view data block into the continuous free sector areas as much as EXT1[i]. In step S406, it adds, into the file entry, the allocation descriptor that indicates the start address of the source packet sequence and continuation length, and registers it as an Extent. In connection with this, it writes, into the metadata in the clip base information and the clip dependent information, the Extent start point information that indicates the start source packet number thereof.

The step S407 defines the condition for ending the loop. In step S407, it is judged whether or not there is a non-written source packet in the base-view and dependent-view data blocks. When it is judged that there is a non-written source packet, the control proceeds to step S408 to continue the loop. When it is judged that there is no non-written source packet, the control proceeds to step S410.

In step S408, it is judged whether or not there are continuous sector areas. When it is judged that there are continuous sector areas, the control proceeds to step S403. When it is judged that there are no continuous sector areas, the control returns to step S402.

In step S410, "xxxxx.ssif" is closed and the file entry is written onto the recording medium. In step S411, "xxxxx.m2ts" is created and the file entry of "xxxxx.m2ts" is generated in the memory. In step S412, the allocation descriptor that indicates the continuation length and the start address of Extent of the base-view data block unique to the file 2D is added into the file entry of "xxxxx.m2ts". In step S413, "xxxxx.m2ts" is closed and the file entry is written.

In step S404, it is judged whether or not there is a long jump occurrence point in the range of "EXTss+EXT2D". In the present example, it is presumed that the long jump occurrence point is a boundary between layers. When it is judged that there is a long jump occurrence point in the range of "EXTss+

EXT2D", the control proceeds to step S420 in which a copy of the base-view data block is created, and base-view data blocks B[i]ss and B[i]2D are written into the area immediately before the long jump occurrence point, and then the control proceeds to step S406. These become Extents of the file 2D and Extents of the file base.

The following explains specific values of EXT2D, EXT1[n], EXT2[], and EXTss[n]

The lowermost value of EXT2D is determined so that, when a playback in the 2D output mode is performed, a buffer under flow does not occur in the read buffer of the playback device during a jump period from each base-view data block to the next base-view data block.

The lowermost value of EXT2D is represented by the following expression for Condition 1, when it takes Tjump2D(n) of time when a jump from the $n^{th}$ base-view data block to the $(n+1)^{th}$ base-view data block is made, each base-view data block is read into the read buffer at a speed of Rud2D, and the base-view data block is transferred from the read buffer to the video decoder at an average speed of Rbext2D.

[Lowermost value of EXT2D]≥(Rud2D+Rbext2D)/
(Rud2D−Rbext2D)×Tjump2D($n$))   <Condition 1>

It is presumed here that an Extent corresponding to a base-view data block B[n]ss is represented as EXT1[n]. In this case, the lowermost value of EXT1[n] is determined so that, when a playback in the B-D presentation mode is performed, a buffer under flow does not occur in the double buffer during a jump period from each base-view data block to the next dependent-view data block, and during a jump period from said dependent-view data block to the next base-view data block.

In the present example, the double buffer is composed of a read buffer 1 and a read buffer 2. The read buffer 1 is the same as the read buffer provided in the 2D playback device.

It is presumed here that, when a playback in the B-D presentation mode is performed, it takes Tfjump3D(n) of time when a jump from the $n^{th}$ base-view data block to the $p^{th}$ dependent-view data block is made, and it takes TBjump3D(n) of time when a jump from the $p^{th}$ dependent-view data block to the $(n+1)^{th}$ base-view data block is made.

It is further presumed that, each base-view data block is read into the read buffer 1 at a speed of Rud3D, each dependent-view data block is read into the read buffer 2 at the speed of Rud3D, and the base-view data block is transferred from the read buffer 1 to the video decoder at an average speed of Rbext3D. Then the lowermost value of EXT1[n] is represented by the following expression for Condition 2. The continuation length of the big Extents is set to a value that is equal to or higher than the lowermost value.

[Lowermost value of EXT1[$n$]]≥(Rud3D×Rbext3D)/
(Rud3D−Rbext3D)×(TFjump3D($n$)+EXT2[$n$]/
(Rud3D+TBjump3D($n$)))   <Condition 2>

The lowermost value of EXT2 is determined so that, when a playback in the B-D presentation mode is performed, a buffer under flow does not occur in the double buffer of the playback device during a jump period from each dependent-view Extent to the next base-view data Extent, and during a jump period from said base-view Extent to the next dependent-view Extent.

The lowermost value of EXT2[n] is represented by the following expression for Condition 3, when it takes Tfjump3D(n+1) of time when a jump from the $(n+1)^{th}$ base-view data block to the $(p+1)^{th}$ dependent-view data block is made, and the dependent-view data block is transferred from the read buffer 2 to the decoder at an average speed of Rdext3D.

[Lowermost value of EXT2[$n$]]≥(Rud3D+Rbext3D)/
(Rud3D−Rdext3D)×(TBjump3D($n$)+EXT2[$n$+1]/
(Rud3D+TFjump3D($n$+1)))   <Condition 3>

<Specific Values of EXTSS>

When a jump from a reading of an Extent to the next Extent is to be made, the buffer should be occupied by a sufficient amount of data immediately before the jump. Accordingly, when a stereoscopic interleaved stream file is to be read, the read buffer needs to store one Extent, and occurrence of a buffer under flow should be avoided.

However, the "EXTSS" needs to be determined based not only on "Tjump", a time period taken when a jump from an Extent to another Extent, but on "Tdiff". It should be noted here that the "Tdiff" represents a delay time that occurs in connection with a preloading of dependent-view data blocks in EXTss and a preloading of dependent-view data blocks in EXTssnext. The following further explains the meaning of Tdiff. When a stereoscopic interleaved stream file is read while the starting dependent-view data block is being preloaded.

In EXTss, the playback is delayed as much as the time period required for preloading the dependent-view data block. Here, the time period required for preloading the starting dependent-view data block in EXTss is referred to as "delay period" because the playback is delayed as much as the period.

On the other hand, in EXTssnext, immediately after a jump from EXTss to EXTssnext is made, the starting dependent-view data block is preloaded. Thus the playback by the video decoder is allowed to be delayed for the period of the preloading. Therefore the time period in which the starting dependent-view data block is preloaded in the playback of EXTssnext is referred to as "grace period" because the start of playback by the video decoder is allowed to be delayed for the period.

In view of this, a value of Tdiff is obtained by subtracting the delay period from the grace period of the dependent-view data block. More specifically, the value Tdiff is calculated using the following expression.

Tdiff=ceil[((S1stEXT1[$i$]EXTSSnext)−S1stEXT1[$i$]
EXTSS)×1000×8]/Rud72]

In the above expression, Tdiff means a difference between the time period for reading S1$st$EXT2[i]EXTss and the time period for reading S1$st$EXT2[i]EXTSSnext; S1$st$EXT2[i]EXTss represents the size of EXT2[i] which is located at the start of EXTss; S1$st$EXT2[i]EXTssnext represents the size of EXT2[i] which is located at the start of EXTssnext. EXTssnext is an Extent in the stereoscopic interleaved stream file, is located immediately after EXTss, and is played back seamlessly with EXTss.

With use of Tdiff and Tjump, which is a time period required for jump to EXTssnext, Sextss, which is the minimum Extent size based on the average bit rate in each Extent, is calculated as a value satisfying the following Condition 4.

SextSS[Byte]≥ceil[(Tjump+Tdiff×Rud72)/(1000×8)]×
(Rextss×192)/(Rud72×188−Rextss×192)]   <Condition 4>

In the above Condition 4, Rud72 represents a data rate in transfer from the BD-ROM drive in the stereoscopic output mode.

Rextss represents an average bit rate in EXTss and is obtained using the following expressions.

$$Rextss = ceil[Nsp \times 188 \times 8 / (ATCDextss/27000000)]$$

$$ATCDext = ATCstart\_EXTssnext - ATCstart\_EXTss$$

$$ATCDextss = ATClast\_EXTss - ATCstart\_EXT\ ss + ceil\\ (27000000 \times 188 \times 8 / min(Rts1, Rts2))$$

In the above expressions, ATCDextss represents the ATC period of EXTss.

ATCstart_EXTss represents the minimum ATC value specified by the ATC field of the source packet sequence in EXTss.

ATCstart_EXTssnext represents the minimum ATC value specified by the ATC field of the source packet sequence in EXTssnext.

ATClast_EXTss represents the maximum ATC value specified by the ATC field of the source packet sequence in EXTss.

Nsp represents the number of source packets which are included in the main TS and sub-TS and have ATC values corresponding to ATCs in the range of ATCDexss.

Rts1 represents a value of the TS recording rate in the main TS, and its maximum value is 48 Mbps.

Rts2 represents a value of the TS recording rate in the sub-TS, and its maximum value is 48 Mbps.

When two playitems are to be played back continuously, EXTss includes the first byte of data in the ATC sequence that is used by the previous playitem (Playitem 1).

EXTss has a size equal to or more than the minimum Extent size defined in Condition 4.

When EXTss is the first byte of data in the ATC sequence that is used by the previous playitem, the connection condition information of the previous playitem is not set to "5" or "6". In this case, it is not necessary to satisfy the size of EXTss.

EXTss includes byte of data in the ATC sequence that is used by the current playitem (Playitem 2).

EXTss has a size equal to or more than the minimum Extent size defined in Condition 4.

When EXTss is the last byte of data in the ATC sequence that is used by the Playitem 2, the connection condition information of Playitem 2 is not set to "5" or "6". In this case, it is not necessary to satisfy the size of EXTss.

<Detailed Recording of Base-View Data Blocks and Dependent-View Data Blocks>

When GOPs of the main TS and sub-TS are to be recorded onto a recording medium, entries of the extension entry map point to only dependent-view picture data pieces that correspond to base-view picture data pieces pointed to by entries of the basic entry map as those that are to be played back at the same playback times as the dependent-view picture data pieces.

To realize such pointing, the recording process is performed as follows.

In the recording process, an attempt is made so that a boundary between a dependent-view data block and a base-view data block matches a boundary between a dependent-view GOP and a base-view GOP. More specifically, in this attempt, the access unit delimiter of the starting video access unit of GOP(i) in the sub-TS is divided as a boundary between dependent-view data blocks, and the access unit delimiter of the starting video access unit of GOP(i) in the main TS is divided as a boundary between base-view data blocks. In this division, the restriction on the Extent length described earlier should be satisfied.

In this division, when either a base-view data block or a dependent-view data block does not satisfy the restriction that the Extent should have a length that does not cause an underflow in a double buffer in the playback device, a padding packet is inserted either into immediately before the access unit delimiter of the starting video access unit of GOP(i) in the sub-TS, or into immediately before the access unit delimiter of the starting video access unit of GOP(i) in the main TS, and then the above-described attempt is made again so that the boundaries match.

When the boundaries match successfully by the above-described method, an entry pointing to a source packet number of a source packet storing the access unit delimiter of the starting access unit of the dependent-view GOP is added into the extension entry map. Also, an entry pointing to a source packet number of a source packet storing the access unit delimiter of the starting access unit of the base-view GOP is added into the base entry map, as well.

When the boundaries do not match even if the padding packet is inserted, and the source packet storing the access unit delimiter of the starting access unit of the dependent-view GOP is in the middle of the dependent-view data block, an entry pointing to the source packet is not added into the extension entry map. Similarly, when the source packet storing the access unit delimiter of the starting access unit of the base-view GOP is in the middle of the base-view data block, an entry pointing to the source packet is not added into the extension entry map.

When such entries are excluded from the extension entry map in this way, it is ensured that pairs of a base view and a dependent view are pointed to by the entries of the basic entry map and the extension entry map.

The process of recording base-view data blocks and dependent-view data blocks and then generating the entry maps is realized by a process in which the starts of GOPs are detected from the recorded stereoscopic interleaved stream file, and entries pointing to the detected starts of GOPs are added into the entry maps. The following describes the procedure for generating the basic and extension entry maps by detecting the starts of GOPs and adding the entries, with reference to FIG. 59.

Figure 59:
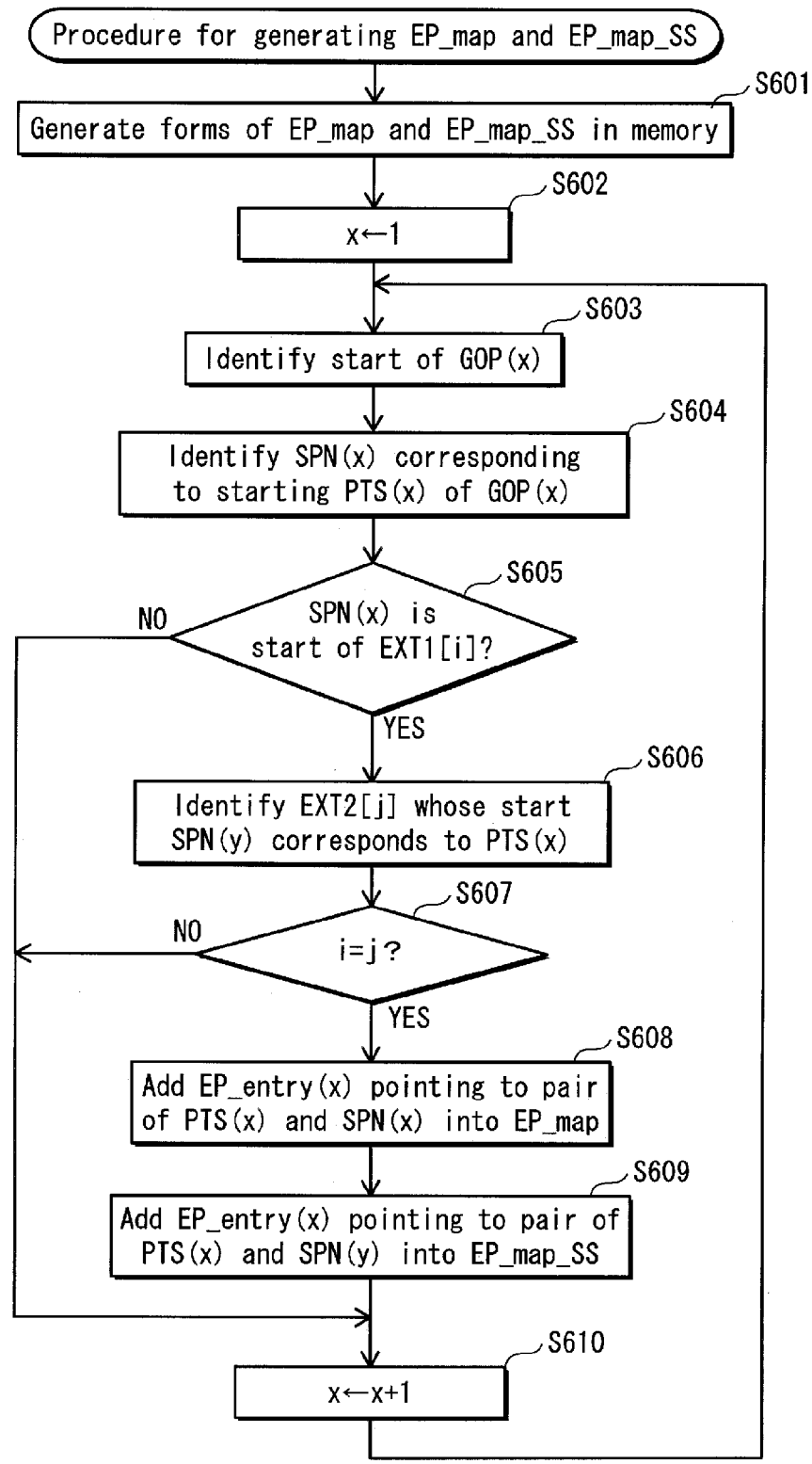
FIG. 59 is a flowchart showing the procedure for generating the basic entry map and the extension entry map.

FIG. 59 is a flowchart showing the procedure for generating the basic entry map and the extension entry map.

In step S601, forms of the basic entry map and the basic entry map are generated in the memory, and the control proceeds to a loop composed of steps S602 through S610. In this loop, the variable x identifies a GOP. The loop is executed as follows. The variable x is initialized to 1 (step S602). The start of GOP(x) is identified (step S603). An SPN(x) corresponding to the starting PTS(x) of the GOP is identified (step S604). After this, judgments are performed in steps S605 and S607. In step S605, it is judged whether or not SPN(x) is the start of EXT1[i]. When it is judged that SPN(x) is not the start of EXT1[i], steps S606 through S609 are skipped. When it is judged that SPN(x) is the start of EXT1[i], the control proceeds to step S606 in which EXT2[j], whose start SPN(y) corresponds to PTS(x), is identified.

In step S607, it is judged whether or not variable "i" that identifies EXT1[i] matches variable "j" that identifies EXT2[j]. When it is judged that variable "i" does not match variable "j", the steps after this are skipped. When it is judged that variable "i" matches variable "j", EP_entry(x) pointing to a pair of PTS(x) and SPN(x) is added into the basic entry map (step S608), and EP_entry(x) pointing to a pair of PTS(x) and SPN(y) is added into the extension entry map (step S609).

In step S610, it is judged whether or not variable x specifies the last GOP. When it is judged that variable x does not specify the last GOP, variable x is incremented, and the control moves to step S603.

<Creation of Index Table>

The index table described in Embodiment 6 can be created in the following manner. When the base-view video stream, dependent-view video stream, clip information file, and playlist information file are generated in accordance with the flowchart shown in FIG. 55, the display frequencies of playlists to be recorded on the recording medium are identified. Of these display frequencies, the resolution/display frequency of the playlist to be used in the first play title, or the resolution/display frequency of the playlist of the title specified by the title number in the range from 0 to 999 is set in the video format information and the frame rate information in the BDMV application information in the index table. With this structure, the resolution/display frequency to be applied to the display of the playlist is set in the index table.

Figure 60:
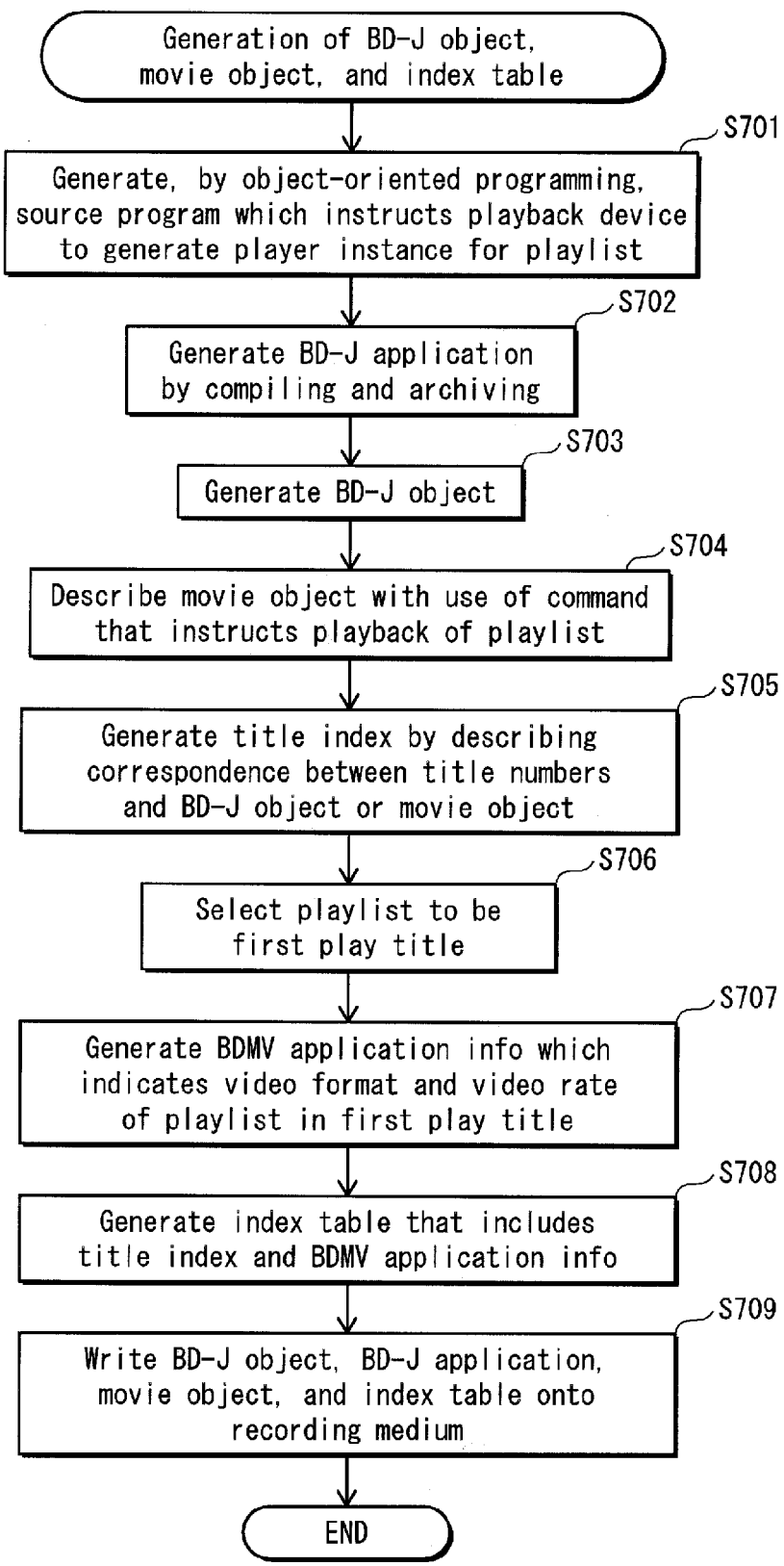
FIG. 60 is a flowchart showing the procedure for generating the BD-J application, BD-J object, movie object, and index table.

FIG. 60 is a flowchart showing the procedure for generating the BD-J application, BD-J object, movie object, and index table. In step S701, a source program, which instructs the playback device to generate a player instance for a playlist, is generated by the object-oriented programming. In step S702, a BD-J application is generated by compiling and archiving the generated source program.

In step S703, a BD-J object is generated. In step S704, a movie object is described with use of a command that instructs a playback of a playlist. In step S705, an index table is generated by describing correspondence between title numbers and BD-J object or movie object. In step S706, a playlist to be the first play title is selected. In step S707, BDMV application information, which indicates the video format and video rate of the playlist in the first play title, is generated. In step S708, an index table that includes the title index and the BDMV application information is generated. In step S709, BD-J object, the BD-J application, movie object, and index table are written onto the recording medium.

The following explains the recording medium that is generated by the above-described recording.

Figure 61:
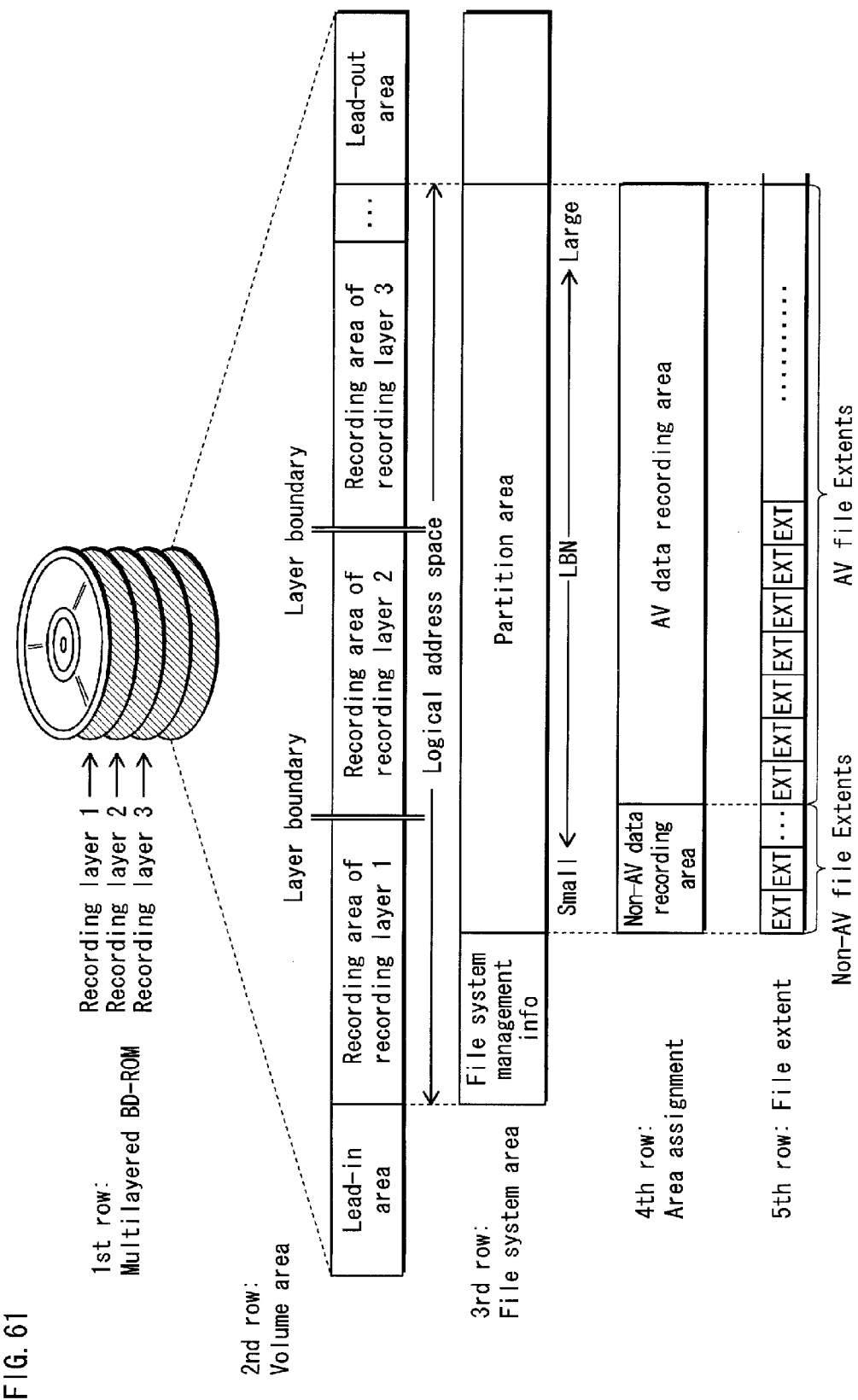
FIG. 61 shows an internal structure of a multi-layered optical disc.

FIG. 61 shows an internal structure of a multi-layered optical disc.

The first row of FIG. 61 shows one example of a multi-layered optical disc. The second row shows tracks in the horizontally extended format though they are in reality formed spirally in the recording layers. These spiral tracks in the recording layers are treated as one continuous volume area. The volume area is composed of a lead-in area, recording layers of recording layers 1 through 3, and a lead-out area, where the lead-in area is located at the inner circumference, the lead-out area is located at the outer circumference, and the recording layers of recording layers 1 through 3 are located between the lead-in area and the lead-out area. The recording layers of recording layers 1 through 3 constitute one consecutive logical address space.

The volume area is sectioned into units in which the optical disc can be accessed, and serial numbers are assigned to the access units. The serial numbers are called logical addresses. A data reading from the optical disc is performed by specifying a logical address. Here, in the case of a read-only disc such as the BD-ROM, basically, sectors with consecutive logical addresses are also consecutive in the physical disposition on the optical disc. That is to say, data stored in the sectors with consecutive logical addresses can be read without performing a seek operation. However, at the boundaries between recording layers, consecutive data reading is not possible even if the logical addresses are consecutive. It is thus presumed that the logical addresses of the boundaries between recording layers are registered in the recording device preliminarily.

In the volume area, file system management information is recorded immediately after the lead-in area. Following this, a partition area managed by the file system management information exists. The file system is a system that expresses data on the disc in units called directories and files. In the case of the BD-ROM, the file system is a UDF (Universal Disc Format). Even in the case of an everyday PC (personal computer), when data is recorded with a file system called FAT or NTFS, the data recorded on the hard disk under directories and files can be used on the computer, thus improving usability. The file system makes it possible to read logical data in the same manner as in an ordinary PC, using a directory and file structure.

The fourth row shows how the areas in the file system area managed by the file system are assigned. As shown in the fourth row, a non-AV data recording area exists on the innermost circumference side in the file system area; and an AV data recording area exists immediately following the non-AV data recording area. The fifth row shows the contents recorded in the non-AV data recording area and the AV data recording area. As shown in the fifth row, Extents constituting the AV files are recorded in the AV data recording area; and Extents constituting non-AV files, which are files other than the AV files, are recorded in the non-AV data recording area.

Figure 62:
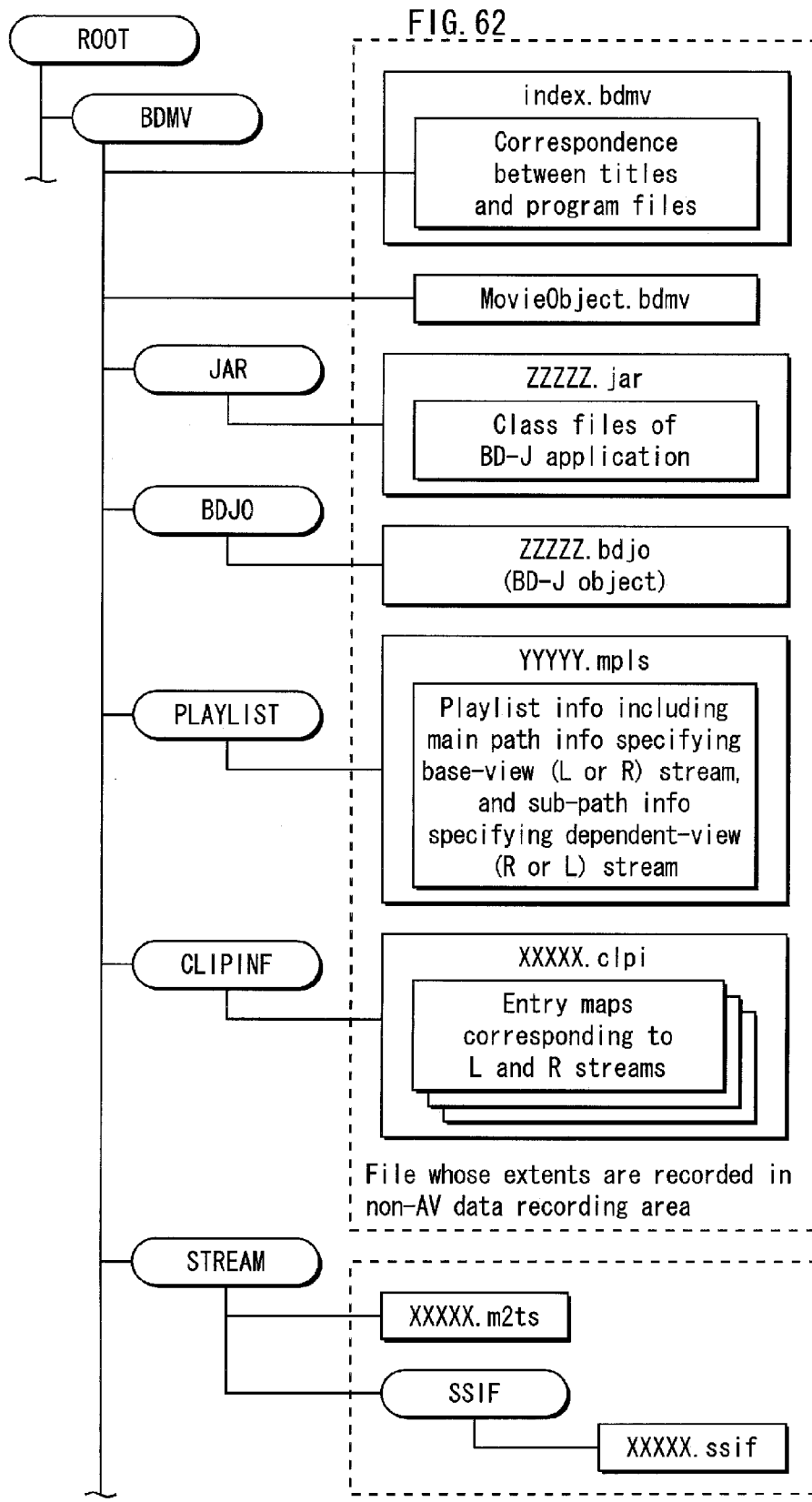
FIG. 62 shows the application format of the optical disc based on the file system.

FIG. 62 shows the application format of the optical disc based on the file system.

The BDMV directory is a directory in which data such as AV content and management information used in the BD-ROM are recorded. Five sub-directories called "PLAYLIST directory," "CLIPINF directory," "STREAM directory," "BDJO directory," "JAR directory," and "META directory" exist below the BDMV directory. Also, two types of files (i.e. index.bdmv and MovieObject.bdmv) are arranged under the BDMV directory.

A file "index.bdmv" (the file name "index.bdmv" is fixed) stores an index table.

A file "MovieObject.bdmv" (the file name "MovieObject.bdmv" is fixed) stores one or more movie objects. The movie object is a program file that defines a control procedure to be performed by the playback device in the operation mode (HDMV mode) in which the control subject is a command interpreter. The movie object includes one or more commands and a mask flag, where the mask flag defines whether or not to mask a menu call or a title call when the call is performed by the user onto the GUI.

A program file (XXXXX.bdjo-"XXXXX" is variable, and the extension "bdjo" is fixed) to which an extension "bdjo" is given exists in the BDJO directory. The program file stores a BD-J object that defines a control procedure to be performed by the playback device in the BD-J mode.

A substance of such a Java™ application is a Java™ archive file (YYYYY.jar) stored in the JAR directory under the BDMV directory.

An application may be, for example, a Java™ application that is composed of one or more xlet programs having been loaded into a heap memory (also called work memory) of a virtual machine. The application is constituted from the xlet programs having been loaded into the work memory, and data.

In the "PLAYLIST directory", a playlist information file ("xxxxx.mpls"-"XXXXX" is variable, and the extension "mpls" is fixed) to which an extension "mpls" is given exists.

In the "CLIPINF directory", a clip information file ("xxxxx.clpi"-"XXXXX" is variable, and the extension "clpi" is fixed) to which an extension "clpi" is given exists.

The Extents constituting the files existing in the directories explained up to now are recorded in the non-AV data area.

The "STREAM directory" is a directory storing a transport stream file. In the "STREAM directory", a transport stream file ("xxxxx.m2ts"-"XXXXX" is variable, and the extension "m2ts" is fixed) to which an extension "m2ts" is given exists. The above-described files are formed on a plurality of sectors that are physically continuous in the partition area. The partition area is an area accessed by the file system and includes an "area in which file set descriptor is recorded", "area in which end descriptor is recorded", "ROOT directory area", "BDMV directory area", "JAR directory area", "BDJO directory area", "PLAYLIST directory area", "CLIPINF directory area", and "STREAM directory area". The following explains these areas.

The "file set descriptor" includes a logical block number (LBN) that indicates a sector in which the file entry of the ROOT directory is recorded, among directory areas. The "end descriptor" indicates an end of the file set descriptor.

Next is a detailed description of the directory areas. The above-described directory areas have an internal structure in common. That is to say, each of the "directory areas" is composed of a "file entry", "directory file", and "file recording area of lower file".

The "file entry" includes a "descriptor tag", "ICB tag", and "allocation descriptor".

The "descriptor tag" is a tag that indicates the entity having the descriptor tag is a file entry.

The "ICB tag" indicates attribute information concerning the file entry itself.

The "allocation descriptor" includes a logical block number (LBN) that indicates a recording position of the directory file. Up to now, the file entry has been described. Next is a detailed description of the directory file.

The "directory file" includes a "file identification descriptor of lower directory" and "file identification descriptor of lower file".

The "file identification descriptor of lower directory" is information that is referenced to access a lower directory that belongs to the directory file itself, and is composed of identification information of the lower directory, the length of the directory name of the lower directory, a file entry address that indicates the logical block number of the block in which the file entry of the lower directory is recorded, and the directory name of the lower directory.

The "file identification descriptor of lower file" is information that is referenced to access a file that belongs to the directory file itself, and is composed of identification information of the lower file, the length of the lower file name, a file entry address that indicates the logical block number of the block in which the file entry of the lower file is recorded, and the file name of the lower file.

The file identification descriptors of the directory files of the directories indicate the logical blocks in which the file entries of the lower directory and the lower file are recorded. By tracing the file identification descriptors, it is therefore possible to reach from the file entry of the ROOT directory to the file entry of the BDMV directory, and reach from the file entry of the BDMV directory to the file entry of the PLAYLIST directory. Similarly, it is possible to reach the file entries of the JAR directory, BDJO directory, CLIPINF directory, and STREAM directory.

The "file recording area of lower file" is an area in which the substance of the lower file that belongs to a directory. A "file entry" of the lower entry and one or more "Extents" are recorded in the "file recording area of lower file".

The stream file that constitutes the main feature of the present application is a file recording area that exists in the directory area of the directory to which the file belongs. It is possible to access the transport stream file by tracing the file identification descriptors of the directory files, and the allocation descriptors of the file entries.

Embodiment 10

The present embodiment describes the internal structure of a 2D/3D playback device that has integrated functions of the playback devices having been described in the embodiments so far.

Figure 63:
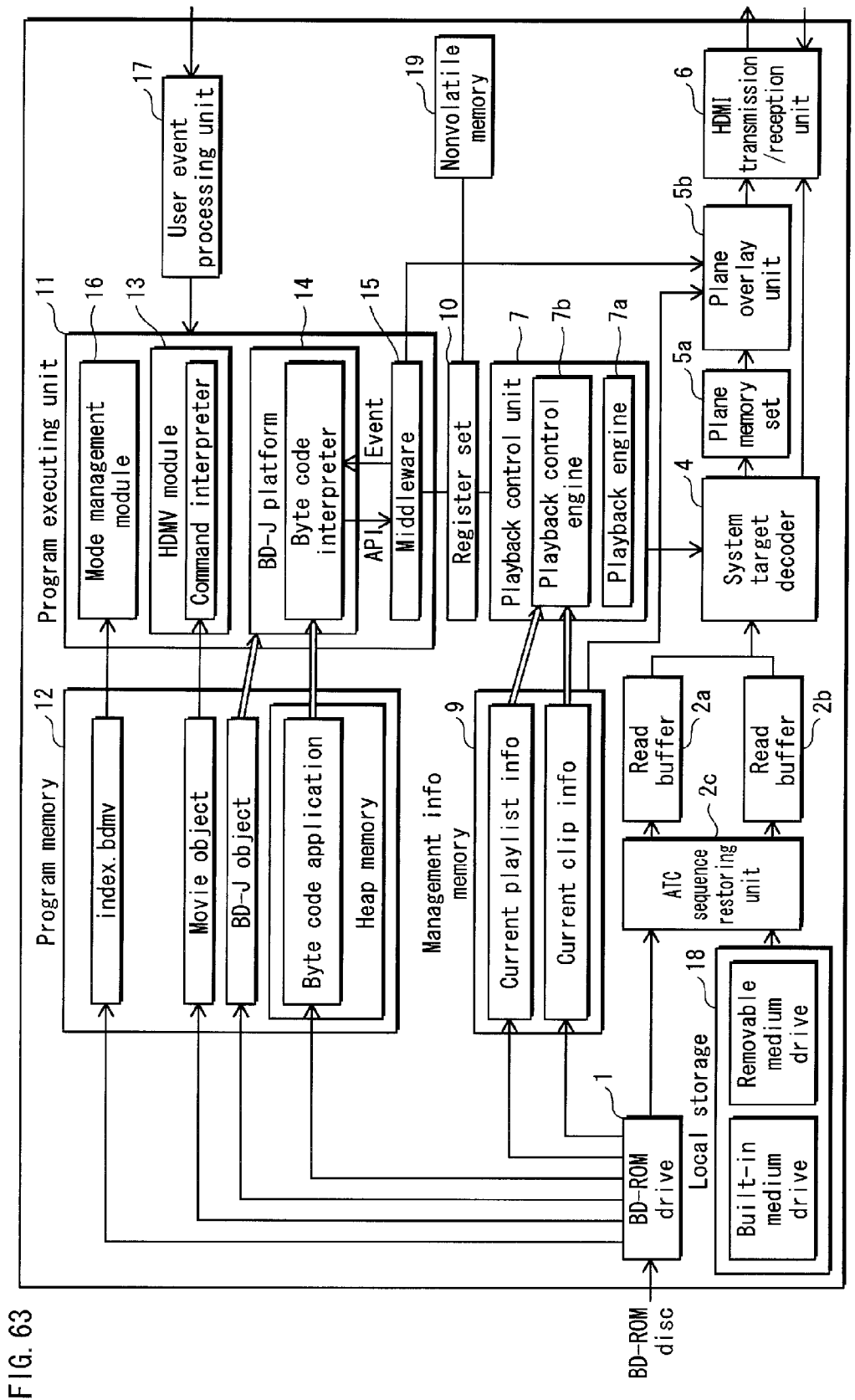
FIG. 63 shows the structure of a 2D/3D playback device.

FIG. 63 shows the structure of a 2D/3D playback device. The 2D/3D playback device includes a BD-ROM drive 1, a read buffer 2a, a read buffer 2b, a switch 3, a system target decoder 4, a plane memory set 5a, a plane overlay unit 5b, an HDMI transmission/reception unit 6, a playback control unit 7, a memory, a register set 203, a program executing unit 11, a program memory 12, an HDMV module 13, a BD-J platform 14, a middleware 15, a mode management module 16, a user event processing unit 17, a local storage 18, and a non-volatile memory 19.

The BD-ROM drive 1, like a 2D playback device, reads out data from a BD-ROM disc based on a request from the playback control unit 7. AV clips read from the BD-ROM disc are transferred to the read buffer 2a or 2b.

When a 3D image is to be played back, the playback control unit 7 issues a read request that instructs to read the base-view data block and the dependent-view data block alternately in units of Extents. The BD-ROM drive 1 reads out Extents constituting the base-view data block into the read buffer 2a, and reads out Extents constituting the dependent-view data block into the read buffer 2b. When a 3D image is to be played back, the BD-ROM drive 1 should have a higher reading speed than the BD-ROM drive for a 2D playback device, since it is necessary to read both the base-view data block and the dependent-view data block simultaneously.

The read buffer 2a is a buffer that may be realized by, for example, a dual-port memory, and stores the data of the base-view data blocks read by the BD-ROM drive 1.

The read buffer 2b is a buffer that may be realized by, for example, a dual-port memory, and stores the data of the dependent-view data blocks read by the BD-ROM drive 1.

The switch 3 is used to switch the source of data to be input into the read buffers, between the BD-ROM drive 1 and the local storage 18.

The system target decoder 4 decodes the streams by performing the demultiplexing process onto the source packets read into the read buffer 2a and the read buffer 2b.

The plane memory set 5a is composed of a plurality of plane memories. The plane memories include those for storing a left-view video plane, a right-view video plane, a secondary video plane, an interactive graphics plane (IG plane), and a presentation graphics plane (PG plane).

The plane overlay unit 5b performs the plane overlaying explained the embodiments so far. When the image is to be output to the television or the like, the output is conformed to the 3D system. When it is necessary to play back the left-view image and the right-view image alternately by using the shutter glasses, the image is output as it is. When the image is to be output to, for example, the lenticular television, a temporary buffer is prepared, the left-view image is first transferred into the temporary buffer, and the left-view image and the right-view image are output simultaneously after the right-view image is transferred.

The HDMI transmission/reception unit 6 executes the negotiation phase described in Embodiment 1 in conformance with, for example, the HDMI standard, where HDMI stands for High Definition Multimedia Interface. In the negotiation phase, the HDMI transmission/reception unit 6 can receive, from the television, (i) information indicating whether or not it supports a stereoscopic display, (ii) information regarding resolution for a monoscopic display, and (iii) information regarding resolution for a stereoscopic display.

The playback control unit 7 includes a playback engine 7a and a playback control engine 7b. When it is instructed from the program executing unit 11 or the like to play back a 3D playlist, the playback control unit 7 identifies a base-view data block of a playitem that is the playback target among the 3D playlist, and identifies a dependent-view data block of a sub-playitem in the 3D sub-path that should be played back in synchronization with the playitem. After this, the playback control unit 7 interprets the entry map of the corresponding clip information file, and requests the BD-ROM drive 1 to alternately read the Extent of the base-view data block and the Extent of the dependent-view data block, starting with the playback start point, based on the Extent start type that indicates which of an Extent constituting the base-view video stream and an Extent constituting the dependent-view video stream is disposed first. When the playback is started, the first Extent is read into the read buffer 2a or the read buffer 2b completely, and then the transfer from the read buffer 2a and the read buffer 2b to the system target decoder 4 is started.

The playback engine 7a executes AV playback functions. The AV playback functions in the playback device are a group of traditional functions succeeded from CD and DVD players. The AV playback functions include: Play, Stop, Pause On, Pause Off, Still Off, Forward Play (with specification of the playback speed by an immediate value), Backward Play (with specification of the playback speed by an immediate value), Audio Change, Picture Data Change for Secondary Video, and Angle Change.

The playback control engine 7b performs playlist playback functions in response to function calls from the command interpreter which is the main operating body in the HDMV mode, and from the Java platform which is the main operating body in the BD-J mode. The playlist playback functions mean that, among the above-described AV playback functions, the Play and Stop functions are performed in accordance with the current playlist information and the current clip information, where the current playlist information constitutes the current playlist.

The memory is a memory for storing the current playlist information and the current clip information. The current playlist information is a piece of playlist information that is currently a target of processing, among a plurality of pieces of playlist information that can be accessed from the BD-ROM, built-in medium drive, or removable medium drive. The current clip information is a piece of clip information that is currently a target of processing, among a plurality of pieces of clip information that can be accessed from the BD-ROM, built-in medium drive, or removable medium drive.

The register set 10 is a player status/setting register set that is a set of registers including a general-purpose register for storing arbitrary information that is to be used by contents, as well as the playback status register and the playback setting register having been described in the embodiments so far.

The program executing unit 11 is a processor for executing a program stored in a BD program file. Operating according to the stored program, the program executing unit 11 performs the following controls: (1) instructing the playback control unit 7 to play back a playlist; and (2) transferring, to the system target decoder, PNG/JPEG that represents a menu or graphics for a game so that it is displayed on the screen. These controls can be performed freely in accordance with construction of the program, and how the controls are performed is determined by the process of programming the BD-J application in the authoring process.

The program memory 12 stores a current dynamic scenario which is provided to the command interpreter that is an operator in the HDMV mode, and to the Java™ platform that is an operator in the BD-J mode. The current dynamic scenario is a current execution target that is one of Index.bdmv, BD-J object, and movie object recorded in the BD-ROM. The program memory 12 includes a heap memory.

The heap memory is a stack region for storing byte codes of the system application, byte codes of the BD-J application, system parameters used by the system application, and application parameters used by the BD-J application.

The HDMV module 13 is provided with a command interpreter, and controls the HDMV mode by decoding and executing the navigation command which constitutes the movie object.

The BD-J platform 14 is a Java™ platform that is an operator in the BD-J mode, and is fully implemented with Java2 Micro_Edition (J2ME) Personal Basis Profile (PBP 1.0), and Globally Executable MHP specification (GEM1.0.2) for package media targets. The BD-J platform 14 is composed of a class loader, a byte code interpreter, and an application manager.

The class loader is one of system applications, and loads a BD-J application by reading byte codes from the class file existing in the JAR archive file, and storing the byte codes into the heap memory.

The byte code interpreter is what is called a Java™ virtual machine. The byte code interpreter converts (i) the byte codes constituting the BD-J application stored in the heap memory and (ii) the byte codes constituting the system application, into native codes, and causes the MPU to execute the native codes.

The application manager is one of system applications, and performs application signaling for the BD-J application based on the application management table in the BD-J object, such as starting or ending a BD-J application. This completes the internal structure of the BD-J platform.

The middleware 15 is an operating system for the embedded software, and is composed of a kernel and a device driver. The kernel provides the BD-J application with a function unique to the playback device, in response to a call for the Application Programming Interface (API) from the BD-J application. The middleware 15 also realizes controlling the hardware, such as starting the interruption handler by sending an interruption signal.

The mode management module 16 holds Index.bdmv that was read from the BD-ROM, built-in medium drive, or removable medium drive, and performs a mode management and a branch control. The management by the mode management is a module assignment to cause either the BD-J platform or the HDMV module to execute the dynamic scenario.

The user event processing unit 17 receive a user operation via a remote control, and causes the program executing unit 11 or the playback control unit 7 to perform a process as instructed by the received user operation. For example, when the user presses a button on the remote control, the user event processing unit 17 instructs the program executing unit 11 to execute a command included in the button. For example, when the user presses a fast forward/rewind button on the remote control, the user event processing unit 17 instructs the playback control unit 7 to execute the fast forward/rewind process onto the AV clip of the currently played-back playlist.

The local storage 18 includes the built-in medium drive for accessing a hard disc, and the removable medium drive for accessing a semiconductor memory card, and stores downloaded additional contents, data to be used by applications, and other data. An area for storing the additional contents is divided into as many small areas as BD-ROMs. Also, an area for storing data used by applications is divided into as many small areas as the applications.

The nonvolatile memory 19 is a recording medium that is, for example, a readable/writable memory, and is a medium such as a flash memory or FeRAM that can preserve the recorded data even if a power is not supplied thereto. The nonvolatile memory 19 is used to store a backup of the register set 203.

Embodiment 11

The present embodiment is an embodiment for implementing an invention that is the same as the invention (hereinafter referred to as "present invention") recited in the description and the drawings attached to a request for a patent application which is a basis of the priority declaration of the present application.

Firstly, of the implementation acts of the recording medium of the present invention, an embodiment of a usage act is described. FIG. 64A shows the embodiment of a usage act of a recording medium relating to the present invention. A BD-ROM 101 in FIG. 64A is a recording medium pertaining to the present invention. The BD-ROM 101 is used to supply movies to a home theater system composed of a playback device 102, a television 103, and a remote control 104.

This completes the description of the usage act of the recording medium relating to the present invention.

The following describes the data structure of a BD-ROM (i.e., the recording medium of the present invention) for recording 2D images.

FIG. 64B shows the structure of the BD-ROM.

The fourth row in FIG. 64B shows the BD-ROM 101, and the third row shows a track on the BD-ROM. Although the track is usually formed to extend spirally from an inner circumference to an outer circumference, the track is drawn in a laterally expanded manner in the present figure. As with other optical discs such as DVDs and CDs, the BD-ROM 101 has a recording area that spirals from the inner circumference to the outer circumference of the BD-ROM 101. The BD-ROM 101 also has a volume area in which logical data can be recorded, between the lead-in on the inner circumference side and the lead-out on the outer circumference side. The volume area is divided into a plurality of access units to which serial numbers are assigned in order. These serial numbers are called logical addresses. Data is read out from the optical disc by specifying logical addresses. It is defined here that the logical addresses also indicate physically consecutive areas on the optical disc. That is to say, data with consecutive logical addresses can be read without a seek operation. There is a special area called BCA (Burst Cutting Area) provided at a place more inner than the lead-in. Since it can be read only by a drive, not by an application, the BCA is often used by the copyright protection technology.

At the head of the volume area, volume information of a file system is recorded, followed by application data such as video data. The file system is a system that expresses data on the disc in units of directories and files. In the BD-ROM 101, the file system is recorded in a format called UDF (Universal Disc Format). Even in the case of an everyday PC (Personal Computer), when data is recorded with a file system called FAT or NTFS, the data recorded on the hard disk under directories and files can be used on the computer, thus improving usability. The file system makes it possible to read logical data in the same manner as in an ordinary PC, using a directory and file structure.

The directory and file structure on the BD-ROM 101 is as follows. A BDMV directory is provided directly below a root directory (ROOT). Data such as AV contents and management information on the BD-ROM 101 is recorded in the BDMV directory. Provided below the BDMV directory are an index file (index.bdmv) defining an index table constituting a title, a PLAYLIST directory, a CLIPINF directory, a STREAM directory, a BDJO directory, and a JAR directory. Provided below the STREAM directory, CLIPINF directory and PLAYLIST directory are: an AV clip (XXX.M2TS) storing AV contents such as video and audio that are multiplexed together; a clip information file (XXX.CLPI) storing AV clip management information; a playlist file (YYY.MPLS) defining logical playback paths of AV clips; and a BD program file (AAA.PROG) storing a program that defines a dynamic scenario.

The following describes the data structure of the files that are stored under the BDMV directory.

The index file (Index.bdmv) is described first. The index file has the index table shown in FIG. 64C. The index table is a table that is provided in the highest layer and defines the title structure of the top menu, FirstPlay, and all titles stored on the BD-ROM. The index table specifies program files to be executed first from each title, the top menu, and the FirstPlay. Each time a title or a menu is called, a BD-ROM player refers to the index table, to execute a predetermined BD program file. Here, FirstPlay is set by a content provider, and indicates a BD program file to be executed automatically when the disc is loaded into a BD-ROM player. The top menu specifies a movie object or a BD-J object which is to be called when a command "Return to the menu" is executed according to a user operation via a remote controller.

The BD program file (AAA.PRG) stores a plurality of programs to be specified and executed from each title. Different prefixes (e.g., AAA) are used to identify corresponding files. Although interpreter-approach programs with unique specifications are used to generate programs for Blu-ray Disc, the programs to be used may be written in a general-purpose programming language such as Java or JavaScript. The programming language is not essential to the present invention. The programs specify playlists to be played back.

A description is now given on the AV clip (XXX.M2TS) and the clip information file (XXX.CLPI).

The AV clip is a digital stream having an MPEG-2 transport stream format.

Figure 65A:
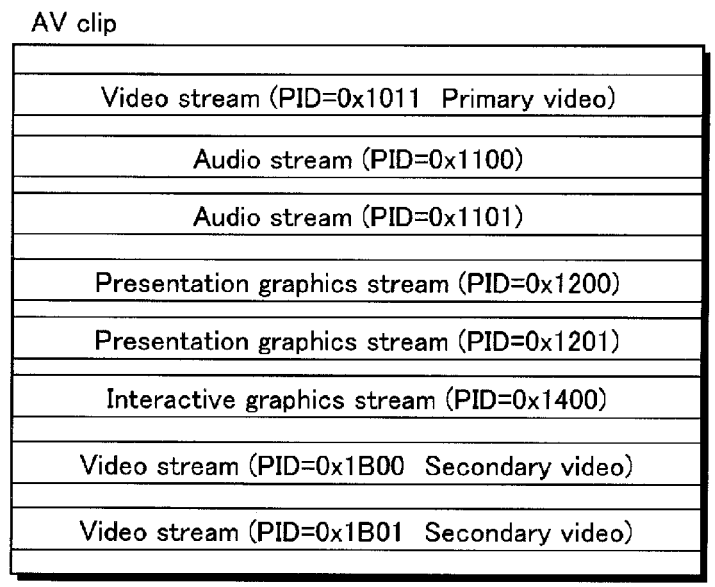
FIG. 65A and FIG. 65B show the structure of an AV clip and how each stream is multiplexed in the AV clip.

FIG. 65A shows the structure of an AV clip. As shown in FIG. 65A, an AV clip is obtained by multiplexing one or more of the video stream, audio stream, presentation graphics stream (PG), and interactive graphics stream (IG). The video stream represents the primary and secondary videos of a movie. The audio stream represents the primary audio of the movie and the secondary audio to be mixed with the primary audio. The presentation graphics stream represents subtitles for the movie. Note that the primary video is an ordinary video displayed on the screen, and the secondary video is displayed in a small screen provided within display of the primary video. The interactive graphics stream represents an interactive screen created by disposing GUI components on a screen. The video stream is encoded by an encoding method such as MPEG-2, MPEG-4 AVC, or SMPTE VC-1 before it is recorded. The audio stream is compress-encoded by a method such as Dolby AC-3, Dolby Digital Plus, MLP, DTS, DTS-HD, or linear PCM before it is recorded.

Described below is the structure of the video stream. When a video compression/encoding technique such as MPEG-2, MPEG-4 AVC and SMPTE VC-1 is used, data is compressed in size by taking advantage of spatial and temporal redundancy of the video. One method that takes advantage of temporal redundancy of the video is inter-picture predictive encoding. According to the inter-picture predictive encoding, when encoding a certain picture, another picture to be displayed before or after said certain picture along the display time axis is designated as a reference picture. After detecting a motion amount by which data of said certain picture differs from data of the reference picture, the data of said certain picture is compressed in size by removing the spatial redundancy, which is obtained by subtracting said certain picture (target of encoding) from the motion-compensated reference picture.

An I-picture is a picture that is encoded by inter-picture predictive encoding—i.e., by only using information present in itself without referring to a reference picture. It should be noted that a "picture" is a unit of encoding and denotes both of a frame and a field. A P-picture is a picture that is encoded by inter-picture predictive encoding—more specifically, by referring to another picture that has already been processed. A B-picture is a picture that is encoded by inter-picture predictive encoding—more specifically, by simultaneously referring to other two pictures that have already been processed. A B-picture that is referred to by another picture is called a Br-picture. A frame (in the case of the frame structure) and a field (in the case of the field structure) are called video access units.

Each stream in the AV clip is identified by a PID. For example, an alignment 0x1011 is allocated to a video stream used as the video of the movie, alignments 0x1100 to 0x111F are allocated to the audio streams, alignments 0x1200 to 0x121F are allocated to the presentation graphics, alignments 0x1400 to 0x141F are allocated to the interactive graphics streams, alignments 0x1B00 to 0x1B1F are allocated to the video streams used as secondary video of the movie, and alignments 0x1A00 to 0x1A1F are allocated to the audio stream used as secondary audio mixed with the primary audio.

Figure 65B:
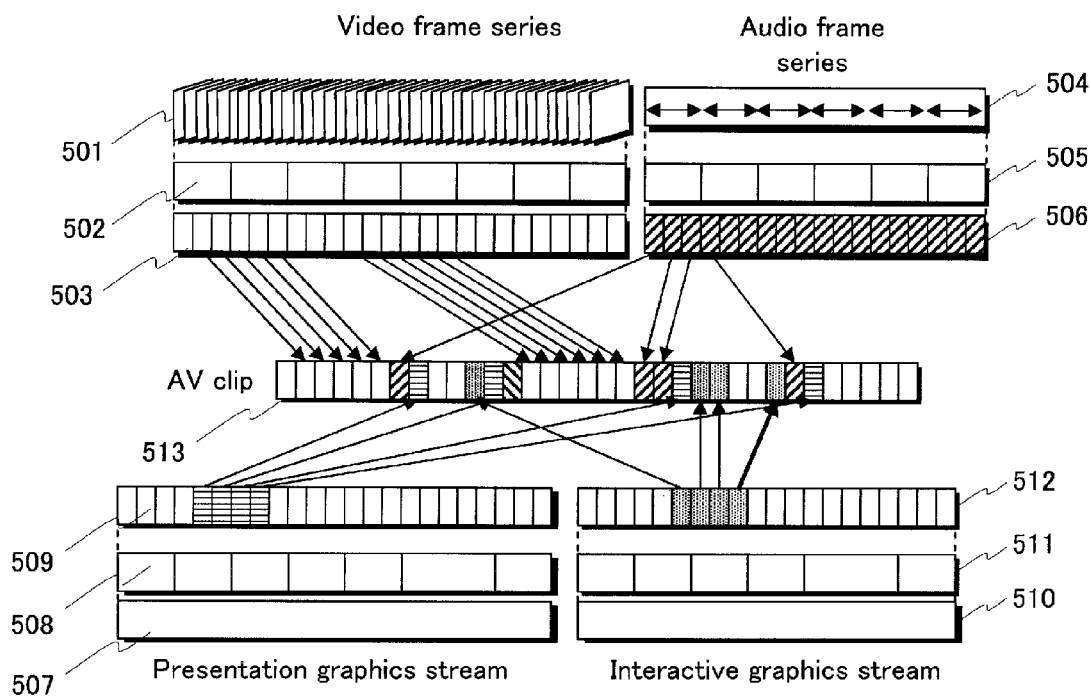

FIG. 65B schematically shows how the AV clip is multiplexed. Firstly, a video stream 501 composed of a plurality of video frames and an audio stream 504 composed of a plurality of audio frames are converted into a PES packet series 502 and a PES packet series 505, respectively. The PES packet series 502 and 505 are converted into TS packets 503 and 506, respectively. Similarly, data pieces of a presentation graphics stream 507 and interactive graphics 510 are converted into a PES packet series 508 and a PES packet series 511, respectively, and the PES packet series 508 and 511 are converted into TS packets 509 and 512, respectively. An AV clip 513 is composed of the TS packets 503, 506, 509, and 512 multiplexed on one stream.

Figure 66A:
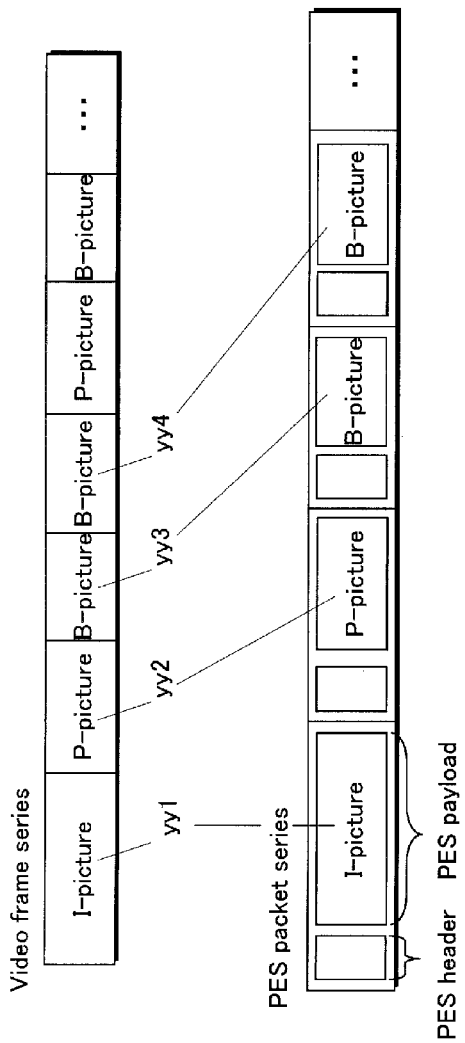
FIGS. 66A and 66B illustrate in detail how the video stream is stored in the PES packet series, and show the TS packets and source packets in the AV clip.

FIG. 66A illustrates in more detail how the video stream is stored in the PES packet series. The first row shows a video frame series of the video stream. The second row shows a PES packet series. As shown by arrows yy1, yy2, yy3 and yy4, the video stream is composed of a plurality of video presentation units (I-picture, B-picture, P-picture). The video stream is divided up into the individual pictures, and each picture is stored in the payload of a PES packet. Each PES packet has a PES header storing a PTS (Presentation Time-Stamp) that indicates a display time of the picture stored in the payload of the PES packet, and a DTS (Decoding Time-Stamp) that indicates a decoding time of the picture stored in the payload of the PES packet.

Figure 66B:
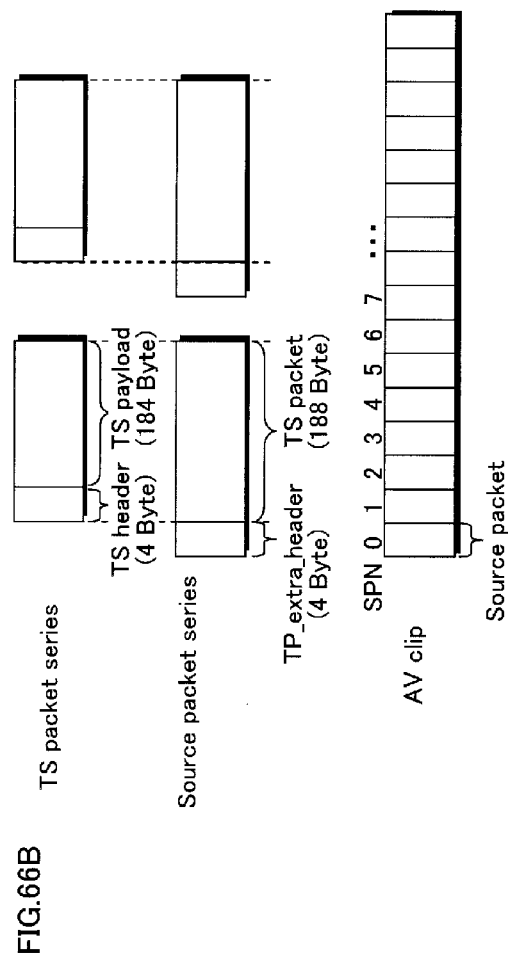

FIG. 66B shows the format of the TS packets ultimately written in the AV clip. Each TS packet is a fixed-length, 188-byte packet composed of a 4-byte TS header carrying information such as a PID identifying the stream, and a 184-byte TS payload storing data. The PES packets are stored in the divided form in the TS payloads. In the case of BD-ROM, each TS packet is attached a 4-byte TP_Extra_Header, thus constituting a 192-byte source packet. The source packets are written in the AV clip. The TP_Extra_Header stores information such as an ATS (Arrival_Time_Stamp). The ATS shows a transfer start time at which the TS packet is to be transferred to a PID filter of a system target decoder 1503, which will be described later. The source packets are arranged in the AV clip as shown on the lower row in FIG. 66B. The numbers incrementing from the head of the AV clip are called SPNs (Source Packet Numbers).

In addition to TS packets of audio, video, subtitles and the like, the AV clip also includes TS packets of a PAT (Program Association Table), a PMT (Program Map Table) and a PCR (Program Clock Reference). The PAT shows a PID of a PMT used in the AV clip. The PID of the PAT itself is registered as "0". The PMT stores the PIDs in the streams of video, audio, subtitles and the like, and attribute information corresponding to the PIDs. The PMT also has various descriptors relating to the AV clip. The descriptors have information such as copy control information showing whether copying of the AV clip is permitted or not permitted. The PCR stores STC time information corresponding to an ATS showing when the PCR packet is transferred to a decoder, in order to achieve synchronization between an ATC (Arrival Time Clock) that is a time axis of ATSs, and an STC (System Time Clock) that is a time axis of PTSs and DTSs.

Figure 67A:
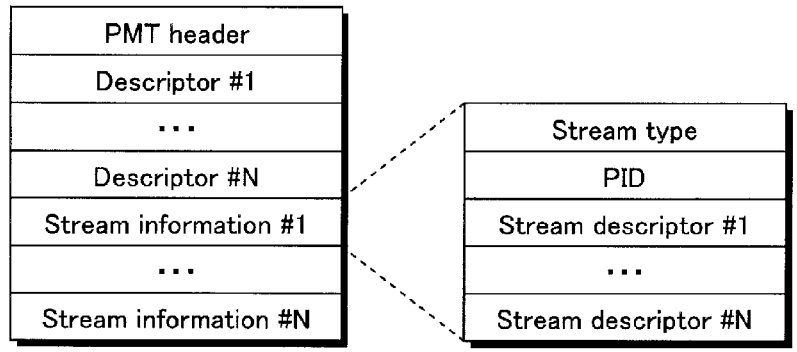
FIG. 67A and FIG. 67B show the data structure of the PMT and the internal structure of the clip information file.

FIG. 67A explains the data structure of the PMT in detail. A PMT header is disposed at the top of the PMT. Information written in the PMT header includes the length of data included in the PMT to which the PMT header is attached. A plurality of descriptors relating to the AV clip is disposed after the PMT header. Information such as the described copy control information is listed in the descriptors. After the descriptors is a plurality of pieces of stream information relating to the streams included in the AV clip. Each piece of stream information is composed of stream descriptors, each listing information such as a stream type for identifying the compression codec of the stream, a stream PID, or stream attribute information (such as frame rate or aspect ratio). The number of stream descriptors is equal to that of streams in the AV clip.

Figure 67B:
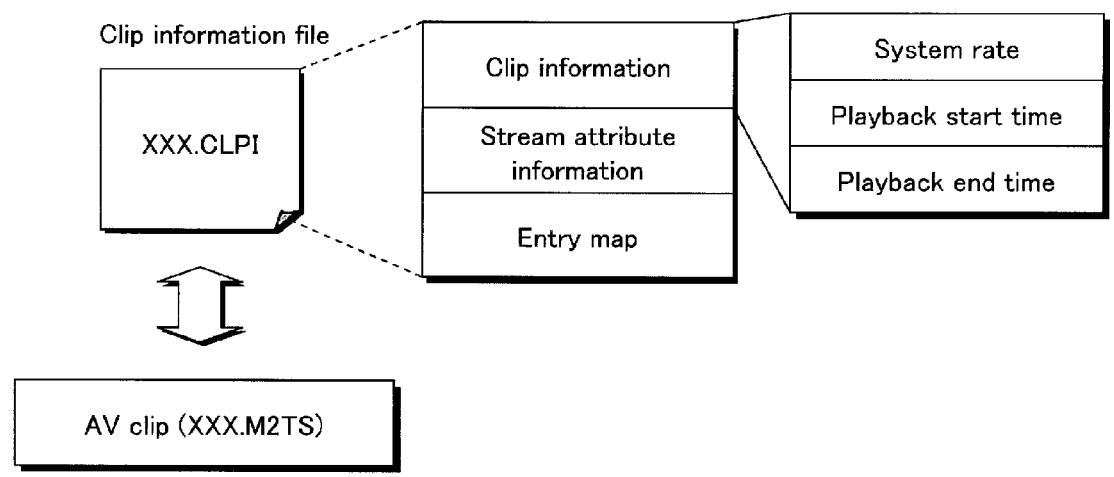

As shown in FIG. 67B, each piece of clip information file is management information for an AV clip. The clip information files are in one to one correspondence with the AV clips, and are each composed of clip information, stream attribute information, and entry map.

As shown in FIG. 67B, clip information is composed of a system rate, a playback start time, and a playback end time. The system rate represents a maximum transfer rate at which the AV clip is transferred to the PID filter of the system target decoder, which will be described later. The interval between the ATSs in the AV clip is equal to or lower than the system rate. The playback start time is the PTS of the first video frame in the AV clip. The playback end time is obtained by adding a per-frame playback interval to the PTS of the last video frame in the AV clip.

Figure 68A:
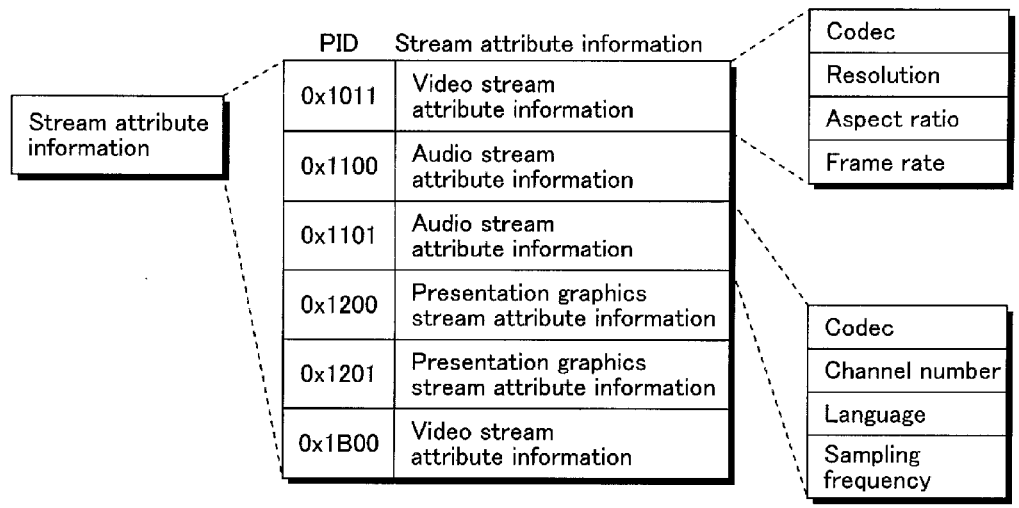
FIG. 68A and FIG. 68B show the internal structure of the stream attribute information and the internal structure of the entry map.

As shown in FIG. 68A, a piece of attribute information is registered for each PID of each stream in the AV clip. Each piece of attribute information has different information depending on whether the corresponding stream is a video stream, an audio stream, a presentation graphics stream, or an interactive graphics stream. Each piece of video stream attribute information carries information including what kind of compression codec the video stream was compressed with, and the resolution, aspect ratio and frame rate of the pieces of picture data that compose the video stream. Each piece of audio stream attribute information carries information including what kind of compression codec the audio stream was compressed with, how many channels are included in the audio stream, how many languages the audio stream supports, and the sampling frequency. The information in the video stream attribute information and the audio stream attribute information is used for purposes such as initialization of a decoder before the player performs playback.

Figure 68B:
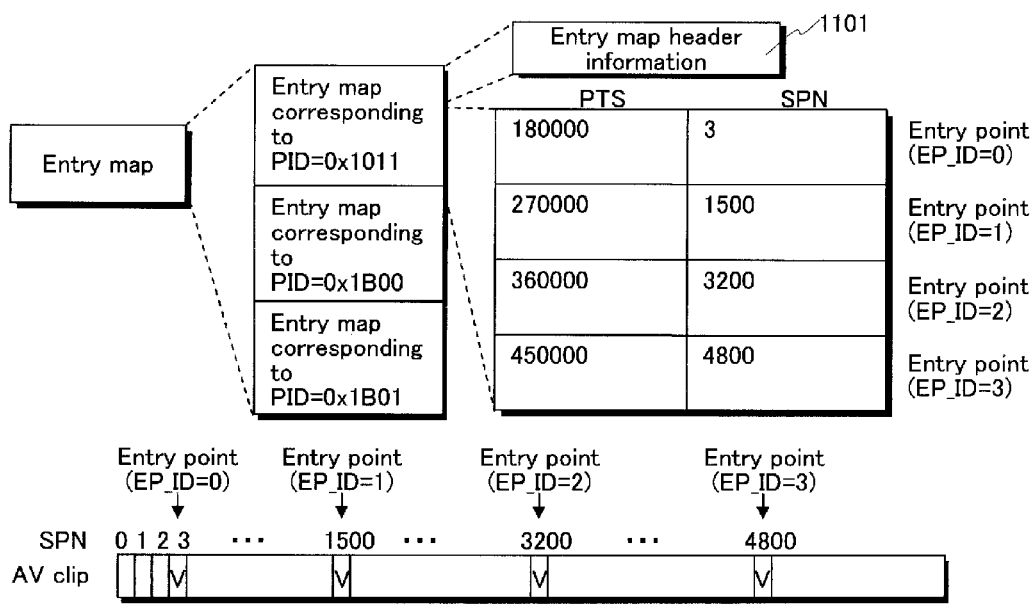

As shown in FIG. 68B, the entry map is table information that shows entry map header information 1101, PTSs, and SPNs. Each PTS shows a display time of each I-picture in the video stream in the AV clip. Each SPN is the SPN of the AV clip that is started with an I-picture. Here, a pair of a PTS and an SPN shown in a same row in the table is called an entry point. Each entry point has an entry point ID (hereinafter also referred to as an EP_ID). Starting with the top entry point, which has an entry point ID 0, the entry points have successively incremented entry point IDs. Using the entry map, the player can specify the location of a file of an AV clip corresponding to an arbitrary point on the playback axis of the video stream. For instance, when performing special playback such as fast forward or rewind, the player can perform processing efficiently without analyzing the AV clip, by specifying, selecting and playing back an I-picture registered in the entry map. An entry map is created for each video stream multiplexed in the AV clip. The entry maps are managed according to PIDs. The entry map header information 1101 is stored at the head of each entry map. The entry map header information 1100 carries information such as the PID of the corresponding video stream and the number of entry points.

A description is now given of the playlist file (YYY.MPLS).

Figure 69A:
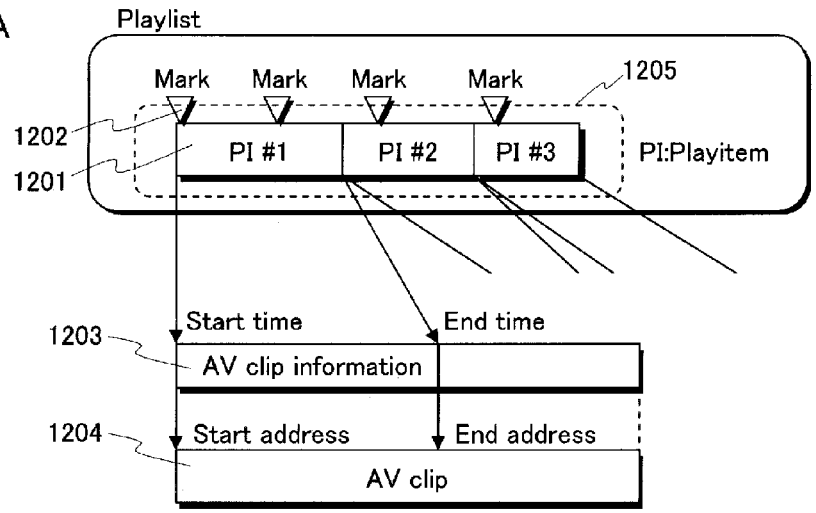
FIGS. 69A through 69C show the internal structure of the playlist and the internal structure of the playitem.

A playlist indicates the playback path of an AV clip. As shown in FIG. 69A, a playlist is composed of one or more playitems 1201. Each playitem shows a playback segment with respect to an AV clip. The playitems 1201 are each identified by a respective playitem ID, and are written in the order in which they are to be played in the playlist. Furthermore, the playlist includes an entry mark 1202 showing a playback start point. The entry mark 1202 can be assigned in the playback segments defined in the playitem. As shown in FIG. 69A, entry marks 1202 are assigned to positions that are potential playback start positions in playitems, and used for cued playback. In the case of a Movie title, for instance, the entry marks 1202 may be assigned to the head of each chapter, thus making chapter playback possible. It should be noted that the playback path of a series of playitems is defined as a main path 1205 in the present example.

Figure 69B:
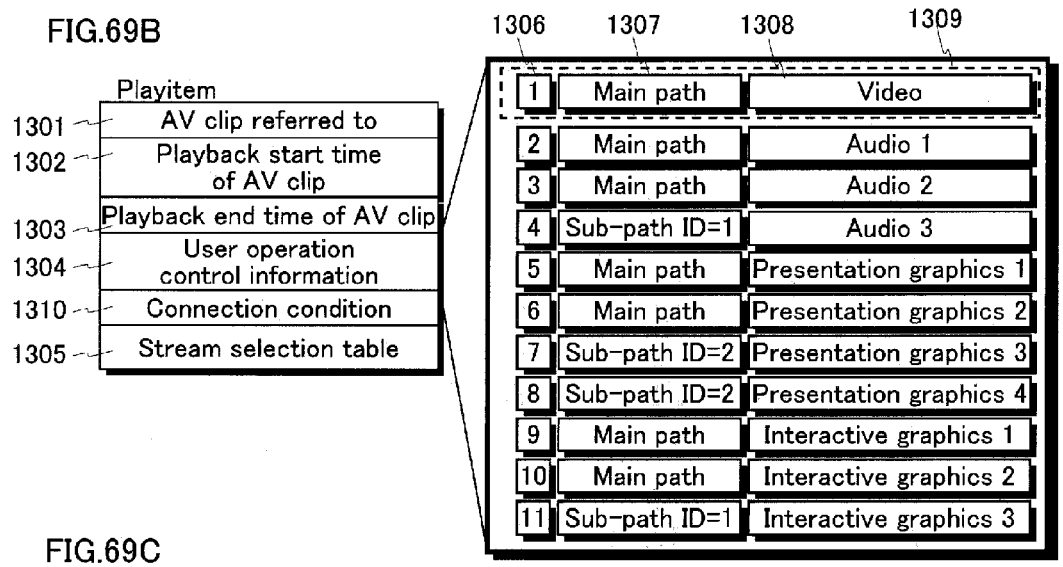

The content of the playitems is now described with reference to FIG. 69B. A playitem includes clip information 1301 of the clip to be played back, a playback start time 1302, a playback end time 1303, a connection condition 1310, and a stream selection table 1305. Since the playback start time and the playback end time are time information, the player refers to the entry map of the clip information file, acquires an SPN corresponding to the designated playback start time and playback end time, and designates a read start position, to perform playback processing.

The connection condition 1310 shows a previous playitem and a connection type. When the connection condition 1310 of a playitem is "1", it is not guaranteed that the AV clip indicated by this playitem is seamlessly connected with another AV clip indicated by a previous playitem that precedes this playitem. When the connection condition 1310 of a playitem is "5" or "6", it is guaranteed that the AV clip indicated by this playitem is seamlessly connected with another AV clip indicated by a previous playitem that precedes this playitem. When the connection condition 1310 is "5", an STC of one playitem and an STC of another payitem need not be continuous with each other. That is to say, the video display start time of a start of an AV clip indicated by a post-connection playitem may not be continuous from the video display start time of an end of an AV clip indicated by a pre-connection playitem. However, in the case where the AV clip indicated by the pre-connection playitem and the AV clip indicated by the post-connection playitem are input to the PID filter of the system target decoder 1503 and sequentially played back, these AV clips should not crash the decoding ability of the system target decoder 1503. Also, there are several conditions that must be met. For example, the last frame of the audio in the AV clip indicated by the pre-connection playitem must overlap the first frame of the audio in the AV clip indicated by the post-connection playitem on the playback time axis. Also, in the case where the connection condition 1310 is "6", when the AV clips indicated by the pre-connection and post-connection playitems are combined together, they must be playable as a single AV clip. In other words, an STC and ATC of the AV clip indicated by the pre-connection playitem are continuous, and an STC and ATC of the AV clip indicated by the post-connection playitem are continuous.

The stream selection table 1305 is composed of a plurality of stream entries 1309. Each stream entry 1309 is composed of a stream selection number 1306, stream path information 1307 and stream identification information 1308. The stream selection numbers 1306 are numbers that increment in order from the first stream entry 1309 included in the stream selection table. The stream selection numbers 1306 are used for stream identification in the player. The stream path information 1307 is information showing which AV clip the stream shown by the stream identification information 1308 is multiplexed on. For example, if the stream path information 1307 shows "main path", this indicates the AV stream of the playitem. If the stream path information 1307 shows "sub-path ID=1", this indicates an AV clip of a sub-playitem corresponding to a playback segment of the playitem. Specifics of the sub-path will be described in the next section. The stream identification information 1308 is information such as PIDs, and shows streams multiplexed on the AV clip being referred to. Furthermore, stream attribute information is also recorded in the stream entries 1309. Each stream attribute information is a piece of information showing a property of a stream, and for instance includes a language attribute in the case of audio, presentation graphics, or interactive graphics.

Figure 69C:
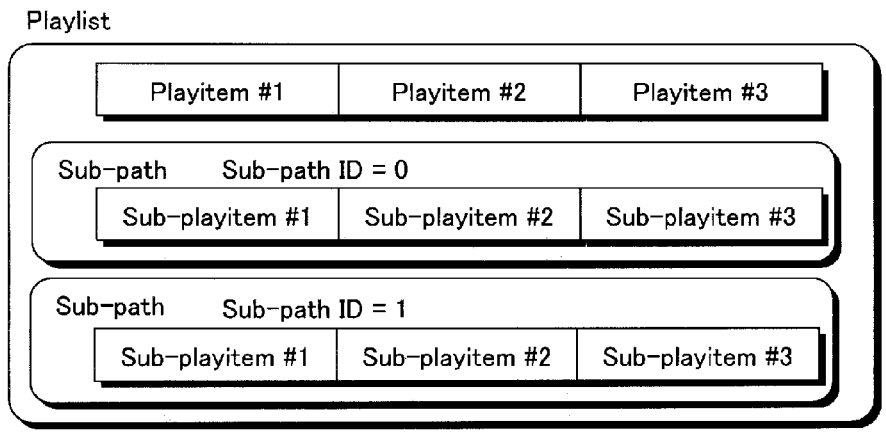

As shown in FIG. 69C, a playlist may have one or more sub-paths. The sub-paths are assigned IDs in the order they are registered in the playlist. These IDs are used as sub-path IDs for identifying the sub-paths. Sub-paths are a series of playback paths played back in synchronization with a main path. As with a playitem, a sub-playitem has the clip information 1301 of the clip to be played back, the playback start time 1302, and the playback end time 1303. The playback start time 1302 and the playback end time 1303 of the sub-playitem are expressed using the same time axis as the main path. For example, if a certain stream entry 1309 registered in the stream selection table 1305 of the playitem #2 shows sub-path ID=0 and presentation graphics 1, the presentation graphics 1 multiplexed on the AV clip of the sub-playitem #2 played back in synchronization with the playback segment of the playitem #2, among the sub-paths of sub-path ID=0, will be played back in the playitem #2 playback segment. Furthermore, a sub-playitem includes a field called an SP connection condition, which has the same meaning as a connection condition of a playitem. An AV clip on a border between sub-playitems whose SP connection conditions are "5" or "6" needs to meet the conditions that the stated playitems whose connection conditions are "5" or "6" need to meet.

This concludes the description of the data structure of the BD-ROM (i.e., a recording medium relating to the present invention) for recording thereon 2D images.

A description is now given of a playback device (2D playback device) relating to the present invention, the playback device playing back a BD-ROM having 2D images recorded thereon.

FIG. 70A shows the structure of a 2D playback device 1500. The 2D playback device 1500 is composed of a BD-ROM drive 1501, a read buffer 1502, a system target decoder 1503, a program memory 1504, a management information memory 1505, a program execution unit 1506, a playback control unit 1507, a player variable 1508, a user event processing unit 1509, and a plane adder 1510.

The BD-ROM drive 1501 reads data from a BD-ROM disc based on a request from the playback control unit 1507. An AV clip read from the BD-ROM disc is transferred to the read buffer 1502. An index file, a playlist file, and a clip information file read from the BD-ROM disc are transferred to the management information memory 1505. A movie object file read from the BD-ROM disc is transferred to the program memory 1504.

The read buffer 1502 is a buffer constituted from a memory or the like that stores data read using a BD-ROM drive. The management information memory 1505 is a buffer constituted from a memory or the like that stores management information on the index file, playlist file and clip information file. The program memory 1504 is a buffer constituted from a memory or the like that stores the movie object file.

The system target decoder 1503 performs (i) demultiplexing processing on source packets read into the read buffer 1502 and (ii) processing to decode streams. Information necessary to decode streams included in an AV clip, such as codec types and stream attributes, is transferred from the playback control unit 1507. The system target decoder 1503 writes the decoded primary video stream, secondary video stream, interactive graphics stream, and presentation graphics stream in their plane memories, namely a primary video plane, a secondary video plane, an interactive graphics plane (IG plane), and a presentation graphics plane (PG plane), respectively. The system target decoder 1503 also mixes the decoded primary audio stream with the decoded secondary audio stream, and outputs the mixed streams to a speaker or the like. The system target decoder 1503 also performs processing to decode graphics data such as JPEG and PNG (transferred from the program execution unit 1506) for display of a menu or the like, and to write the decoded graphics data to an image plane. Details of the system target decoder 1503 are given later.

The user event processing unit 1509 requests processing by the program execution unit 1506 or the playback control unit 1507 in response to a user operation made through the remote control. For instance, when a button on the remote control is pressed, the user event processing unit 1509 makes a request to the program execution unit 1506 to execute a command included in the button. As another example, when a fast forward or rewind button in the remote control is pressed, the user event processing unit 1509 instructs the playback control unit 1507 to execute fast forward or rewind processing of the AV clip of the playlist currently being played back.

The playback control unit 1507 has the function of controlling playback of the AV clip by controlling the BD-ROM drive 1501 and the system target decoder 1503. The playback control unit 1507 also controls playback processing of an AV clip by interpreting playlist information based on a playback instruction from the program execution unit 1506 or notification by the user event processing unit 1509. Furthermore, the playback control unit 1507 also performs setting and referencing of the player variable 1508, and performs playback operations.

The player variable 1508 includes system parameters (SPRM) indicating the status of the player, and general parameters (GPRM) for general use.

FIG. 70B is a list of the system parameters (SPRM).
SPRM (0): Language Code
SPRM (1): Primary audio stream number
SPRM (2): Subtitle stream number
SPRM (3): Angle number
SPRM (4): Title number
SPRM (5): Chapter number
SPRM (6): Program number
SPRM (7): Cell number
SPRM (8): Selected key information
SPRM (9): Navigation timer
SPRM (10): Playback time information
SPRM (11): Mixing mode for Karaoke
SPRM (12): Country information for parental management
SPRM (13): Parental level
SPRM (14): Player configuration value (video)
SPRM (15): Player configuration value (audio)
SPRM (16): Language code for audio stream
SPRM (17): Language code extension for audio stream
SPRM (18): Language code for subtitle stream
SPRM (19): Language code extension for subtitle stream
SPRM (20): Player region code
SPRM (21): User's preferential selection of 2D/3D output
SPRM (22): Current 2D/3D output mode
SPRM (23): 3D video output capability of display
SPRM (24): 3D image playback capability
SPRM (25): Reserved
SPRM (26): Reserved
SPRM (27): Reserved
SPRM (28): Reserved
SPRM (29): Reserved
SPRM (30): Reserved
SPRM (31): Reserved The SPRM (10) is updated every time picture data belonging to an AV clip is displayed. In other words, if the playback device causes a new piece of picture data to be displayed, the SPRM (10) is updated to show the display time (PTS) of the new picture. The current playback point can be known by referring to the SPRM (10).

The language code for the audio stream of the SPRM (16) and the language code for the subtitle stream of the SPRM (18) are items that can be set in the OSD of the player or the like, and show default language codes of the player. For example, the BD program file may have the following function. Namely, if the language code for audio stream SPRM (16) is English, when a playlist is played back, a stream entry having the same language code is searched for in the stream selection table of the playitem, and the corresponding audio stream is selected and played back.

Furthermore, the playback control unit 1507 checks the status of the system parameter while playback is performed. The SPRM (1), SPRM (2), SPRM (21) and SPRM (22) show the audio stream number, subtitle stream number, secondary video stream number and secondary audio stream number, respectively. These values correspond to the stream selection number 606. As one example, the audio stream number SPRM (1) may be changed by the program execution unit 1506. The playback control unit 1507 compares the stream section number 606 from among the stream selection table 605 of the playitem currently being played back, refers to the matching stream entry 609, and switches playback of the audio stream. In this way, switches can be made between which audio, subtitle or secondary video stream is played back or not.

The program execution unit 1506 is a processor for executing a program stored in the BD program file. The program execution unit 1506 performs operations in accordance with the stored program, and performs control as follows. (1) The program execution unit 1506 instructs the playback control unit 1507 to perform playlist playback. (2) The program execution unit 1506 transfers PNG/JPEG for graphics for a menu or a game to the system target decoder, for display on a screen. These operations can be performed flexibly in accordance with the makeup of the programs. What kind of control is performed is determined according to programming procedure of the BD program file in the authoring procedure.

The plane adder instantaneously superimposes data pieces written in the primary video plane, the secondary video plane, the interactive graphics plane, the presentation graphics plane and the image plane, and displays the resultant superimposed data on the screen of a television or the like.

Figure 71:
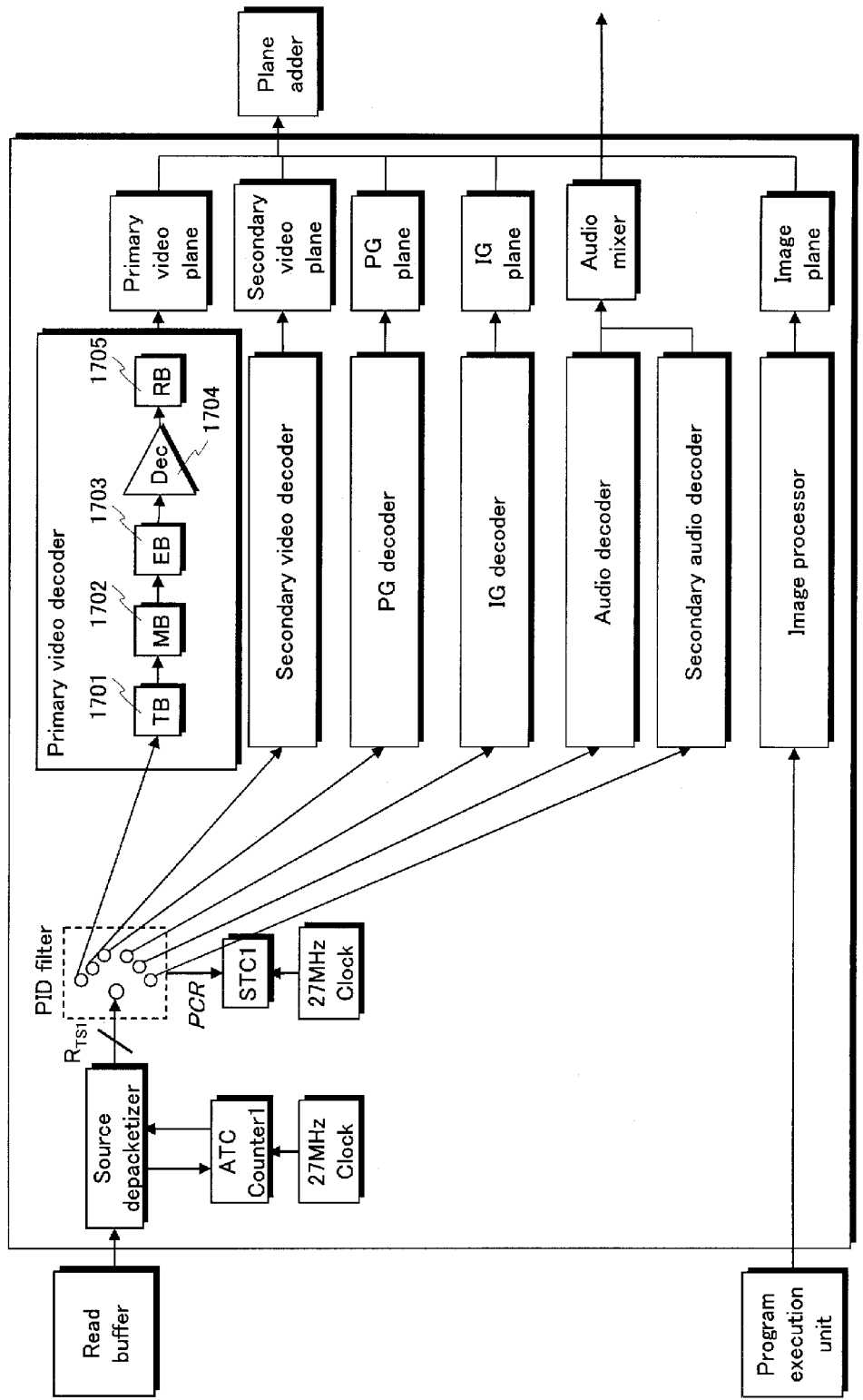
FIG. 71 shows the internal structure of the system target decoder.

A description of the system target decoder 1503 is now given with reference to FIG. 71.

The source depacketizer interprets a source packet transferred to the system target decoder 1503, extracts the TS packet, and sends the TS packet to the PID filter. In sending the TS packet, the source depacketizer adjusts the time of input into the decoder in accordance with the ATS of the source packet. More specifically, in accordance with the rate of storing an AV clip, the source depacketizer transfers the TS packet to the PID filer at the instant that the value of the ATC generated by the ATC counter and the value of the ATS of the source packet become identical.

The PID filters transfer TS packets output from the source depacketizers. More specifically, the PID filters transfer TS packets having a PID that matches a PID required for playback to the primary video decoder, the secondary video decoder, the IG decoder, the PG decoder, the audio decoder or the secondary audio decoder, depending on the PID of the TS packet. For instance, in the case of the BD-ROM, a TS packet having a PID 0x1011 is transferred to the primary video decoder, TS packets having PIDs 0x1B00 to 0x1B1F are transferred to the secondary video decoder, TS packets having PIDs 0x1100 to 0x111F are transferred to the primary audio decoder, TS packets having PIDs 0x1A00 to 0x1A1F are transferred to the secondary audio decoder, TS packets having PIDs 0x1200 to 0x121F are transferred to the PG decoder, and TS packets having PIDs 0x1400 to 0x141F are transferred to the IG decoder.

The primary video decoder is composed of a TB (Transport Stream Buffer) 1701, an MB (Multiplexing Buffer) 1702, an EB (Elementary Stream Buffer) 1703, a compressed video decoder 1704, and a DPB (Decoded Picture Buffer) 1705.

The TB 1701 is a buffer that, when a TS packet including a video stream is output from the PID filter 1702, temporarily stores the TS packet as it is.

The MB 1702 is a buffer that, when a video stream is output from the TB 1701 to the EB 1703, temporarily stores PES packets. When data is transferred from the TB 1701 to the MB 1702, the TS header of each TS packet is removed.

The EB 1703 is a buffer that stores a picture in an encoded state (I-picture, B-picture and P-picture). When data is transferred from the MB 1702 to the EB 1703, the PES header is removed.

The compressed video decoder 1704 creates a frame/field image by decoding each video access unit in a video elementary stream at respective predetermined decode times (DTS). Possible compression encoding formats of the video stream multiplexed on the AV clip include MPEG2, MPEG4AVC, and VC1, and therefore the decoding scheme used by the compressed video decoder 1704 can be changed in accordance with stream attributes. The compressed video decoder 1704 transfers each of the decoded frame/field images to the DPB 1705, and writes each of the decoded frame/field images in the primary video plane at respective display times (PTS).

The DPB 1705 is a buffer that temporarily stores the decoded frame/field images. The compressed video decoder 1704 makes use of the DPB 1705 to, when decoding the video access units (e.g., a P-picture and a B-picture encoded by the inter-picture predictive encoding), refer to pictures that have already been decoded.

The secondary video decoder has the same structure as the primary video decoder. The secondary video decoder performs decoding of an input secondary video stream, and writes resultant pictures to the secondary video plane in accordance with respective display times (PTS).

The IG decoder extracts and decodes an interactive graphics stream from the TS packets input from source packetizers, and writes the resultant decompressed graphics data to the IG plane in accordance with respective display times (PTS).

The PG decoder extracts and decodes a presentation graphics stream from the TS packets input from the source packetizers, and writes the resultant decompressed graphics data to the PG plane in accordance with respective display times (PTS).

The primary audio decoder has a buffer. While accumulating data in the buffer, the primary audio decoder extracts information such as a TS header and a PES header, and performs audio stream decode processing to obtain decompressed LPCM-state audio data. The primary audio decoder outputs the obtained audio data to the audio mixer in accordance with the respective playback time (PTS). Possible compression encoding formats of the audio stream multiplexed on the AV clip include AC3 and DTS, and therefore the decoding scheme used to decode the compressed audio is changed in accordance with stream attributes.

The secondary audio decoder has the same structure as the primary audio decoder. The secondary audio decoder performs decoding of an input secondary audio stream, and outputs resultant decompressed LPCM-state audio data to the audio mixer in accordance with respective display times. Possible compression encoding formats of the audio stream multiplexed on the AV clip include Dolby Digital Plus and DTS-HD LBR, and therefore the decoding scheme used to decode the compressed audio is changed in accordance with stream attributes.

The audio mixer mixes (superimposes) the decompressed audio data output from the primary audio decoder and the decompressed audio data output from the secondary audio decoder with each other, and outputs the resultant audio to a speaker or the like.

The image processor decodes graphics data (PNG and JPEG) transferred from the program execution unit, and outputs the resultant decoded graphics data to the image plane in accordance with a display time designated by the program execution unit.

This concludes the description of the structure of the 2D playback device relating to the present invention.

(Principle of 3D Playback)

With reference to FIG. 92, the following describes the principle of enabling stereoscopic viewing on a home-use screen. There are two major methods to enable the stereoscopic viewing: a method that utilizes holography; and a method that utilizes parallax images.

The first method utilizing the holography is characterized in that it can create 3D images of an object in such a manner that a human viewer recognizes the three-dimensionality of the created 3D images in the same way as he/she recognizes the three-dimensionality of the actual object. However, although a technical theory has already been established in the field of holography, when it comes to playback of a video, it is extremely difficult to create holograms of a video with the current holography technique, because doing so requires use of (i) a computer that can perform an enormous amount of operations to create holograms of the video in real time, and (ii) a display device whose resolution is high enough to be able to draw thousands of linear materials in a distance of 1 mm. For this reason, there are almost no practical examples of holography that are commercially used.

The second method utilizing the parallax images is characterized in that, after right-eye images and left-eye images are separately prepared, it enables stereoscopic viewing by making the right-eye images and the left-eye images only visible to the right eye and the left eye, respectively. FIG. 92 shows a user looking at a relatively small cube that is on a straight line connecting the center of the user's face and the center of the cube, as viewed from above. The top right view exemplarily shows the cube as seen by the left eye of the user. The bottom right view exemplarily shows the cube as seen by the right eye of the user.

The merit of the second method is that it can realize the stereoscopic viewing merely by preparing right-eye images and left-eye images separately. As there are several technical ways to make the right-eye and left-eye images only visible to the right eye and left-eye, respectively, the second method has already been practically implemented as different techniques.

One technique is called "sequential segregation" method, with which the user views the left-eye and right-eye images, which are displayed alternately in the time axis direction on a screen, while wearing stereoscopic glasses (with liquid-crystal shutters). At this time, to the user's eyes, a left-eye image and a corresponding right-eye image look superimposed over each other due to the afterimage effect. Accordingly, the user's eyes recognize that the pair of the left-eye image and the corresponding right-eye image is a 3D image. To be more specific, while a left-eye image is being displayed on the screen, the stereoscopic glasses make the left-eye liquid-crystal shutter transparent and the right-eye liquid-crystal shutter dark. Conversely, while a right-eye image is being displayed on the screen, the stereoscopic glasses make the right-eye liquid-crystal shutter transparent and the left-eye liquid-crystal shutter dark. As stated earlier, this technique (alternate-frame sequencing) displays right-eye and left-eye images alternately in the time axis direction. Thus, unlike an ordinary 2D movie that is displayed at 24 frames-per-second, this technique needs to display a total of 48 left-eye and right-eye images per second. Therefore, the alternate-frame sequencing is suitable for use in a display device that can rewrite the screen at a relatively high speed. The alternate-frame sequencing can also be used in any display device that can rewrite the screen for a predetermined number of times per second.

As opposed to the aforementioned sequential segregation method that outputs the left-eye and right-eye pictures alternately in the time axis direction, there is another technique that simultaneously displays, on a single screen, a left-eye picture and a right-eye picture horizontally next to each other. Here, with the aid of a lenticular lens that is semicircular in shape and attached to the surface of the screen, pixels constituting the left-eye picture and pixels constituting the right-eye picture are only presented to the left eye and the right eye, respectively. In the above manner, this technique can create the illusion of 3D images by presenting parallax pictures to the left eye and the right eye. Note, the lenticular lens may be replaced with another device (e.g., liquid crystal elements) that has the same function as the lenticular lens. Also, a vertical polarizing filter and a horizontal polarizing filter may be provided for left-eye pixels and right-eye pixels, respectively. Here, stereoscopic viewing can be realized by the viewer viewing the screen through polarizing glasses composed of a vertical polarizing filter (for the left eye) and a horizontal polarizing filter (for the right eye).

This stereoscopic viewing technique utilizing the parallax images has been commonly used for attractions of amusement parks and the like, and has already been established. Hence, this technique may be the closest form of technology that could be practically implemented for home use. It should be mentioned that many other methods/techniques have been suggested to realize such stereoscopic viewing utilizing the parallax images, such as a two-color separation method. Although the alternate-frame sequencing and the polarization glass technique are explained in the present embodiment as examples of methods/techniques to realize the stereoscopic viewing, the stereoscopic viewing may be realized using other methods/techniques other than the aforementioned two techniques, as long as it is realized using parallax images.

In the present embodiment, a description is given of a method for recording, on an information recording medium, parallax images used for stereoscopic viewing. Hereafter, an image for the left eye is referred to as a "left-eye image", an image for the right eye is referred to as a "right-eye image", and a pair of the left-eye image and the corresponding right-eye image is referred to as a "3D image".

(Switching Between 2D and 3D Displays)

Described below is the data structure of the BD-ROM, which is a recording medium pertaining to the present invention, for storing 3D images.

Basic parts of the data structure are the same as those of the data structure for recording 2D video images. Therefore, the following description focuses on extended or different parts of such data structure. The following description will be given under the assumption that 3D images are recorded on a BD-ROM. Hereafter, a playback device that can only play back 2D images is referred to as a 2D playback device, and a playback device that can play back both of 2D images and 3D images is referred to as a 2D/3D playback device.

Figure 72:
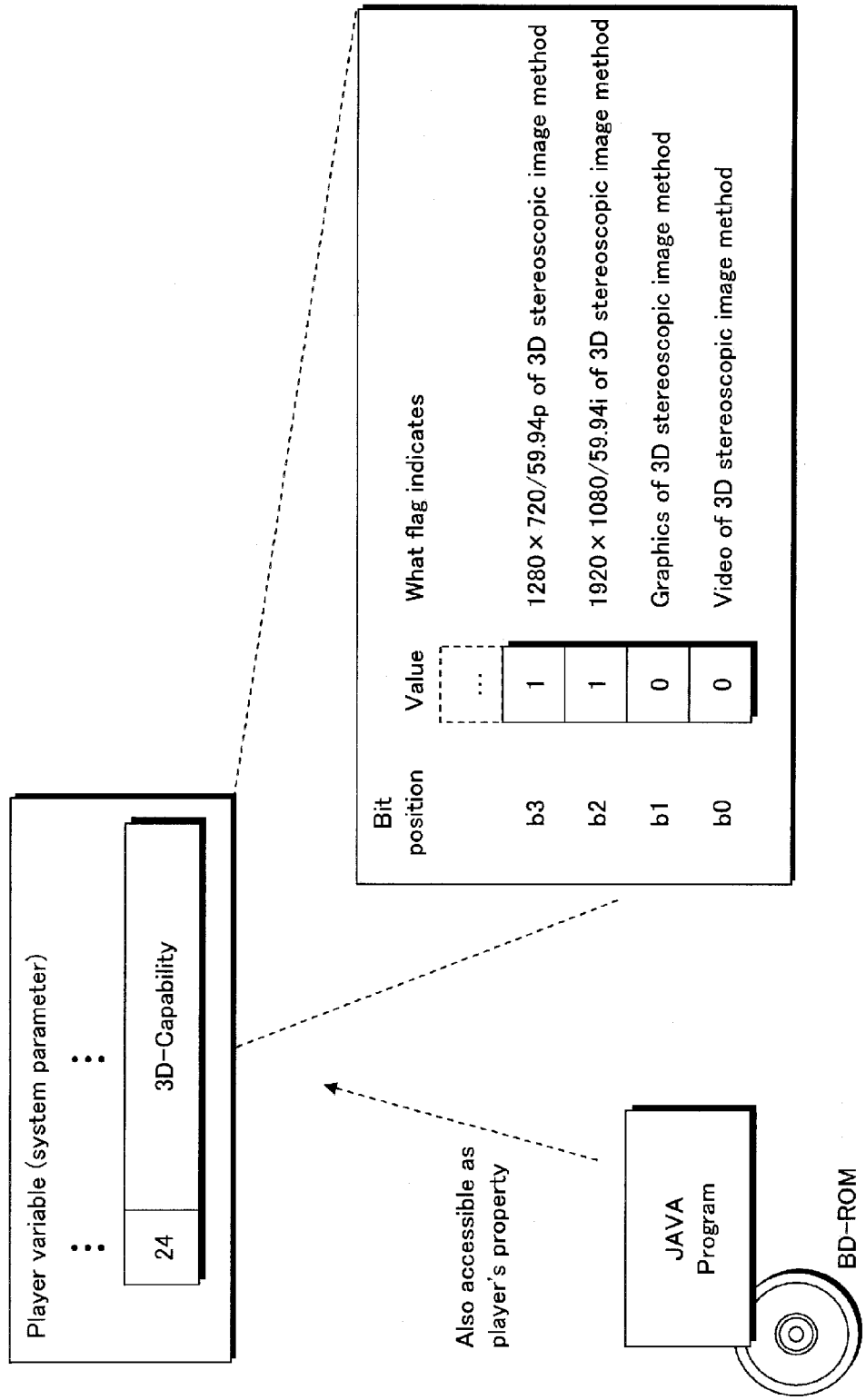
FIG. 72 shows a system parameter identifying the corresponding 3D method.

A system parameter (SPRM) indicating the status of the playback device has flags for identifying whether the playback device is a 2D playback device or a 2D/3D playback device. With reference to the example shown in FIG. 72, the following describes the SPRM (24) as a group of 3D-Capability parameters indicating the 3D-Capability of the player.

The 3D-Capability parameters allow determining the 3D video display capability and the 3D graphics display capability. The 3D video display capability is a capability to sequentially decode, in the stereoscopic image method, left-eye images and right-eye images, and display the decoded images. The 3D graphics display capability is a capability to sequentially decode left-eye graphics and right-eye graphics separately, and render the decoded graphics in corresponding planes.

Regarding the 3D video display capability, the parameters may represent the display ability in more details on both resolution and frame rate bases. If 3D display capabilities for individual videos having various video formats, such as 1920×1080/59.94i, are identifiable, the program may detect supportable 3D display methods according to the LSI capability.

When values of system parameters are accessed from a Java program on the BD-ROM, they can be accessed as system properties of the player.

Figure 73:
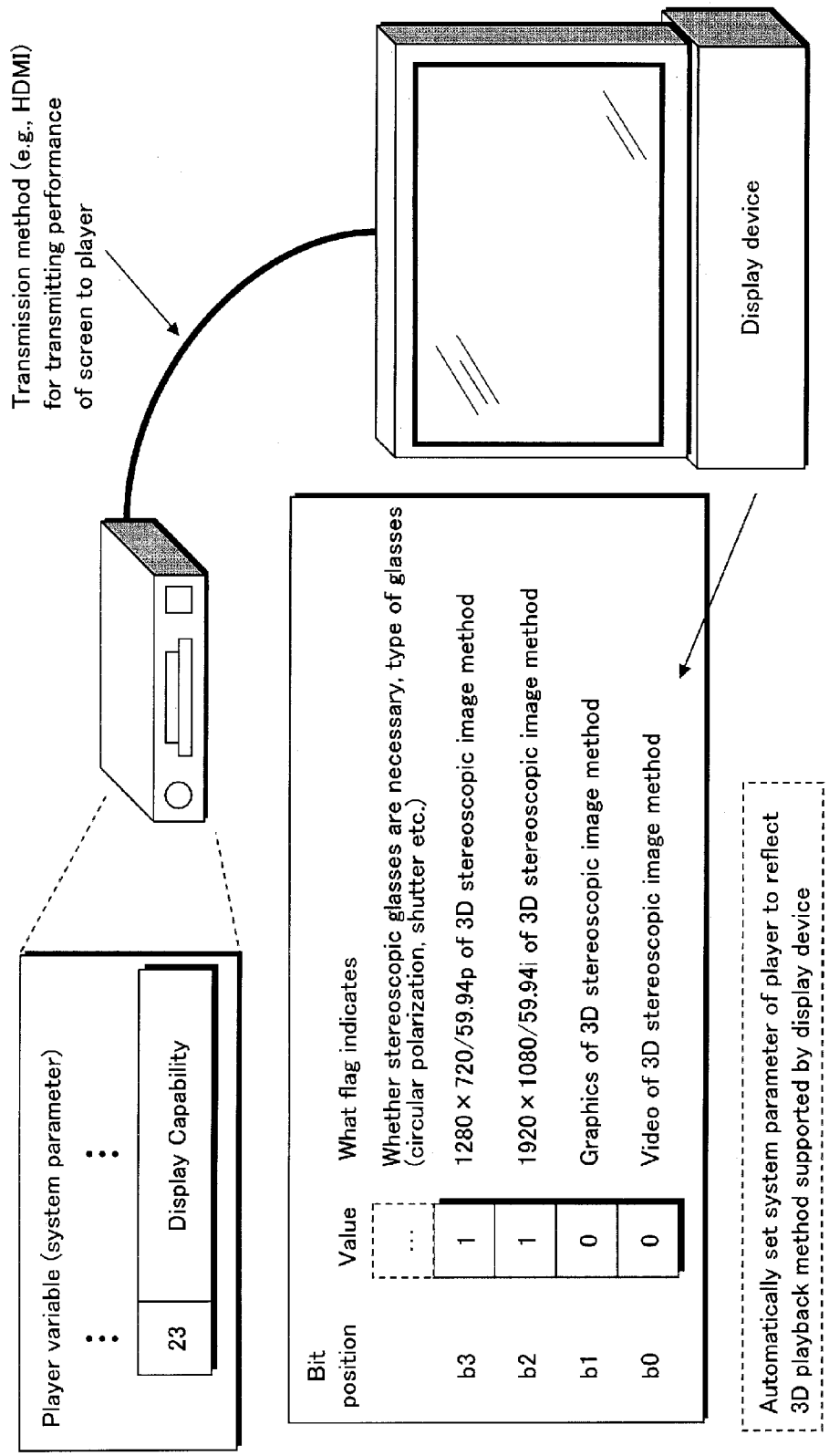
FIG. 73 shows how the system parameter identifying the corresponding 3D method is automatically obtained.

Furthermore, as shown in FIG. 73, when the display device and the player are connected to each other using a transmission method (e.g., HDMI) in which the performance and supported methods of the display device can be transmitted to the player, the 3D coverage supported by the display device may be automatically registered in the SPRM (25). When the performance of the display device cannot be transmitted in the above manner, the user may manually register the performance of the display device in the SPRM (25).

When the supported methods of the display device can be obtained, other information pieces that could affect 3D play (such as a screen size, a screen resolution, and a distance between the screen and the viewer) may additionally be obtained. By storing these information pieces in system parameters, they can be used when selecting the most appropriate playback method executed by a program, which will be described later.

Figure 74:
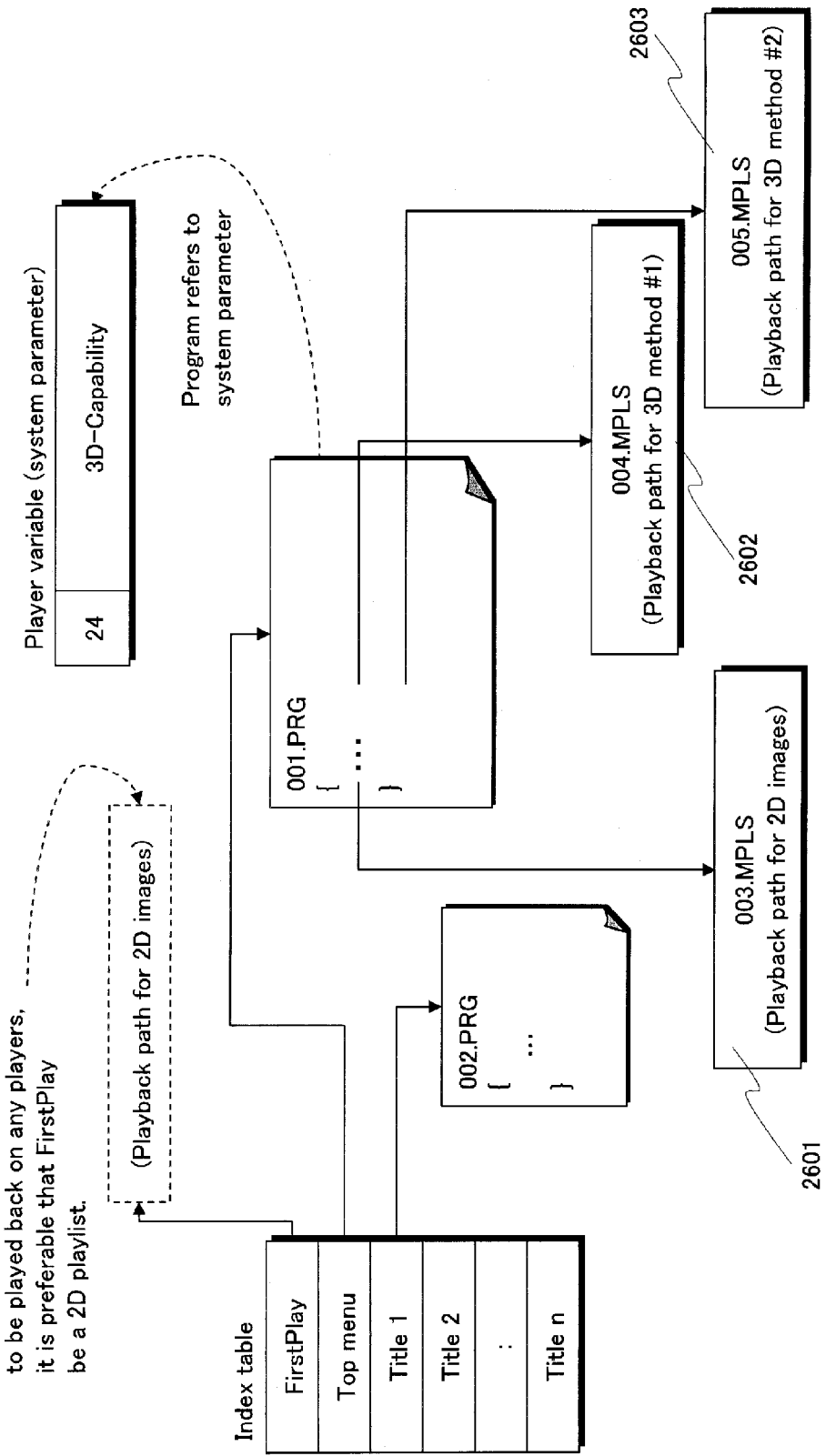
FIG. 74 shows the data structure for switching between a 2D playlist and a 3D playlist to be played back.

FIG. 74 shows a relationship between the index file (Index-.bdmv) and the BD program file (001.PRG). In addition to 3D images, the BD-ROM has also recorded thereon: a 2D playlist 2601 showing a playback path of 2D images; a 3D playlist 2602 showing a playback path of 3D images to be played back using a 3D method #1; and a 3D playlist 2603 showing a playback path of 3D images to be played back using a 3D method #2. Once a title is selected by the user, the BD program file is executed. The BD program file checks, in the program, whether the playback device supports playback of 3D images. When the playback device supports playback of 3D images, the BD program file further checks whether the user has selected playback of 3D images. The BD program file then switches to a playlist to be played back. In a case where there is a plurality of 3D playback methods, a plurality of 3D playlists should be prepared in advance in one-to-one correspondence with the 3D playback methods. When the player supports at least one of the 3D playlists on the BD-ROM, the at least one of the 3D playlists is selected. When the player does not support any of the 3D playlists on the BD-ROM, a 2D playlist is selected.

For example, assume a case that the 3D method #1 is a two-screen stereoscopic playback method and the 3D method #2 is a side-by-side method. If the player only supports the side-by-side method, then the program will select and play back a playlist that is playable on the player, namely a 3D playlist 005.MPLS corresponding to the side-by-side method.

Note, the program stored on the BD-ROM was made on the authoring side. When the player supports a plurality of 3D methods, which one of the 3D playback methods is preferentially selected is determined at the discretion of the authoring side.

For safety reasons, it is preferable that the first playlist to be played back upon loading of the disc (e.g., FirstPlay) be always composed of 2D images, which are playable on any player.

Figure 75:
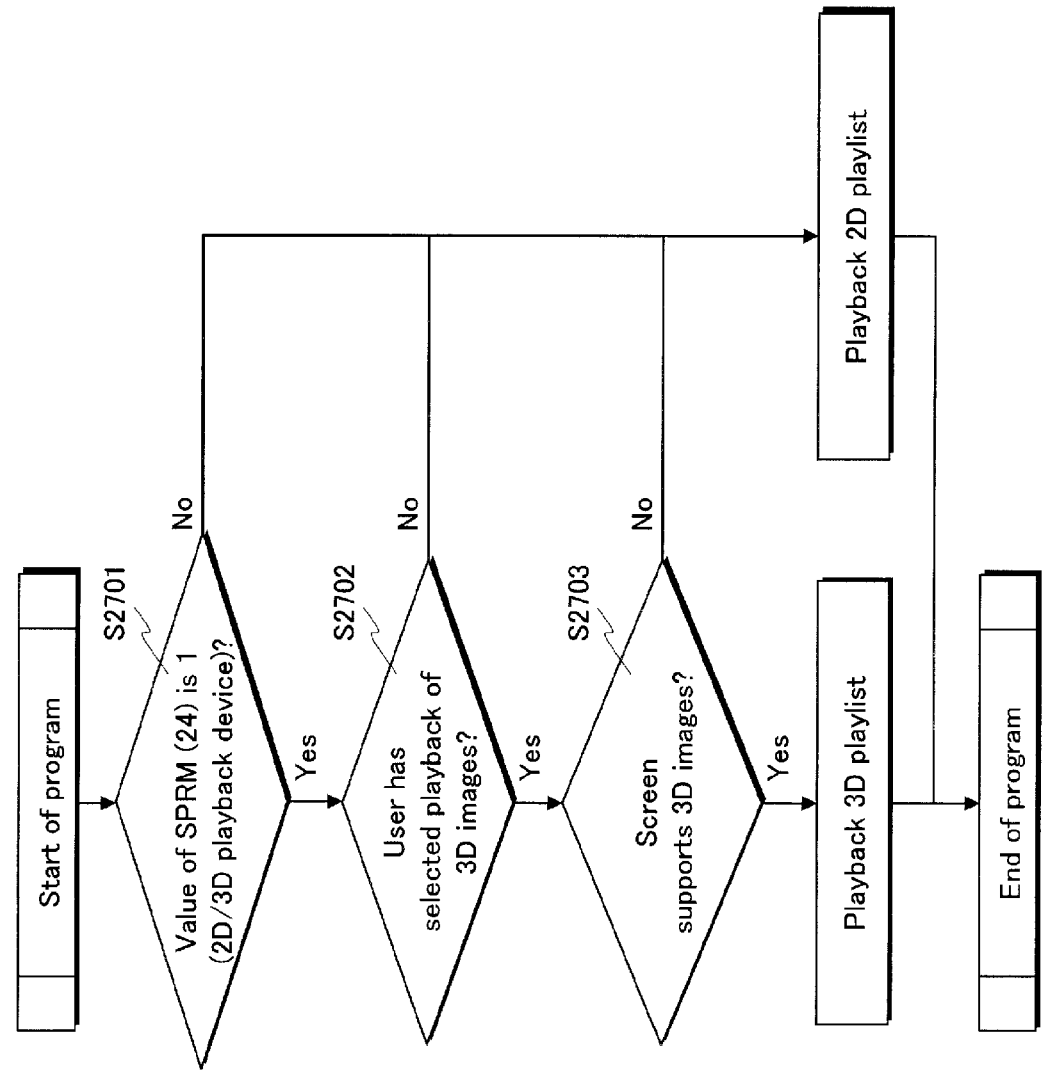
FIG. 75 is a flowchart for switching between a 2D playlist and a 3D playlist to be played back.

FIG. 75 is a flowchart showing how a 2D playlist and a 3D playlist are selected by the program of the BD program file.

In S2701, the program checks the value of the SPRM (24). When the value is "0", it indicates that the playback device is a 2D playback device, and the program plays back a 2D playlist. When the value is "1", the control proceeds to S2702.

In S2702, the program makes an inquiry to the user as to whether he/she requests playback of 2D images or playback of 3D images, by displaying a menu screen. Upon user's selection through a remote control or the like, the program plays back a 2D playlist when the user has requested playback of 2D images. When the user has requested playback of 3D images, the control proceeds to S2702.

In S2703, the program checks whether the display device supports playback of 3D images. For example, after the playback device is connected to the display device using HDMI, the playback device makes an inquiry to the display device as to whether the display device supports playback of 3D images. When the display device does not support playback of 3D images, the playback device plays back a 2D playlist. At this time, the playback device may display, on a menu screen or the like, a notification that informs the user that the television is not ready for the playback. When the display device supports playback of 3D images, the playback device plays back a 3D playlist.

Figure 76:
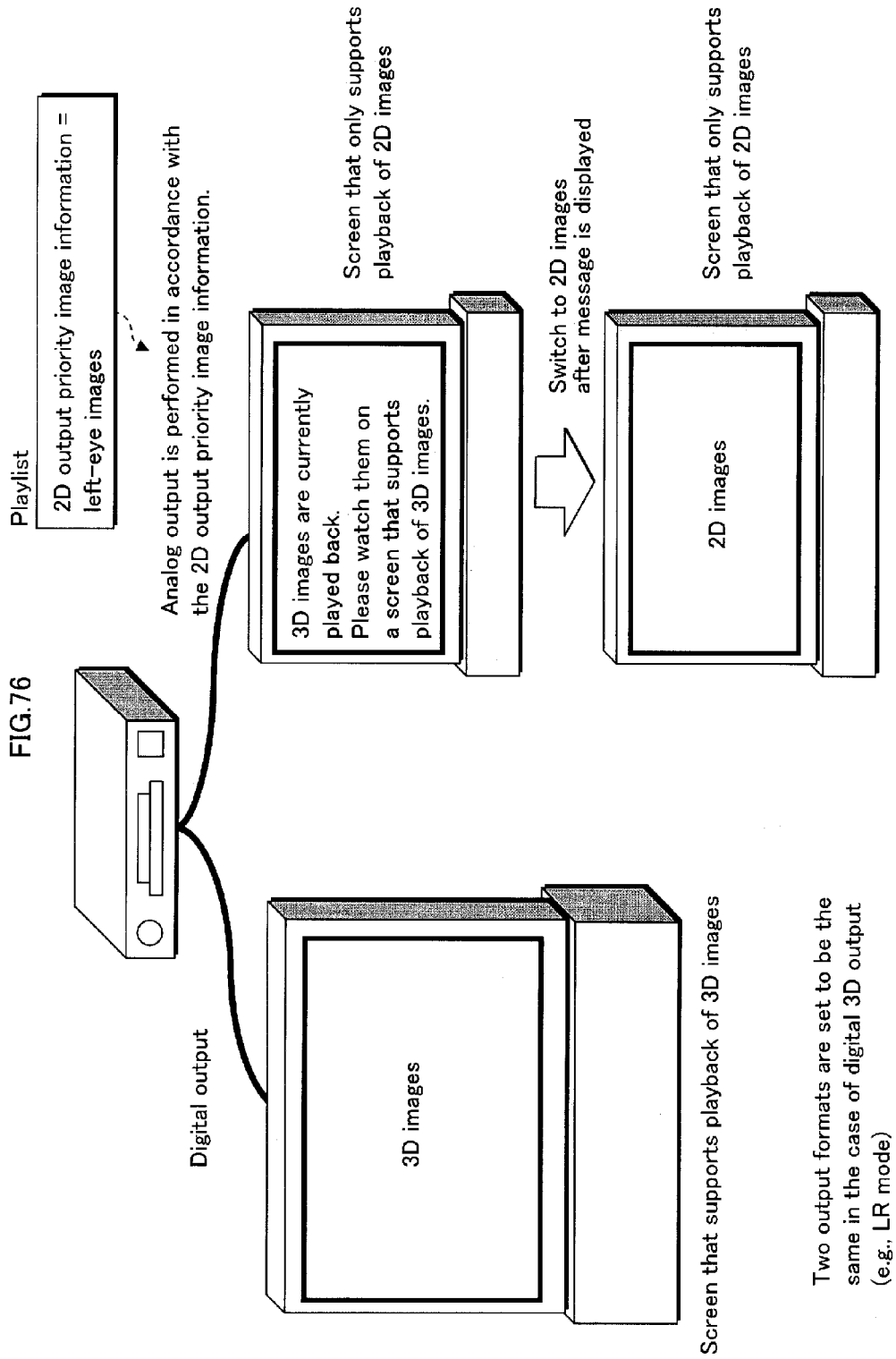
FIG. 76 illustrates a simultaneous output of a 3D image and a 2D image.

As a conventional analog method does not support playback of 3D images, the 3D images cannot be output using the convention analog method. As shown in FIG. 76, while the player is playing back 3D images, the player displays, via the analog output, a message such as "3D images are currently played back. Please watch them on a display device that supports playback of 3D images". This way, the user is informed that the display device is connected to an improper terminal, or that the display device connected to the player does not support display of the images to be output from the player.

When the player is only connected to a 2D display device, the player may automatically switch to playback of a 2D playlist. When the player is connected to both of a 2D display device and a 3D display device and simultaneously outputs images thereto, the player outputs either a 3D left-eye image or a 3D right-eye image on the 2D display device. The player decides which one of the 3D left-eye image set and the 3D right-eye image set should be output via the analog output in accordance with 2D output priority image information stored in a playlist or the like. When simultaneously outputting 2D and 3D images, this mechanism allows simultaneously outputting the 2D and 3D images to the display devices without (i) simultaneously decoding the 2D and 3D images or (ii) managing 2D and 3D playlists individually.

Similarly, when displaying an OSD (a menu built in the system), the player displays a 3D OSD on a 3D display device; however, for a 2D output such as the analog output, the player outputs one of (a) a dedicated 2D image and (b) only a left-eye image or a right-eye image.

When it is difficult to perform the 3D output and the 2D output in the above manner, the 3D and 2D images may instead be output to a sub-display provided on the remote control.

Figure 77:
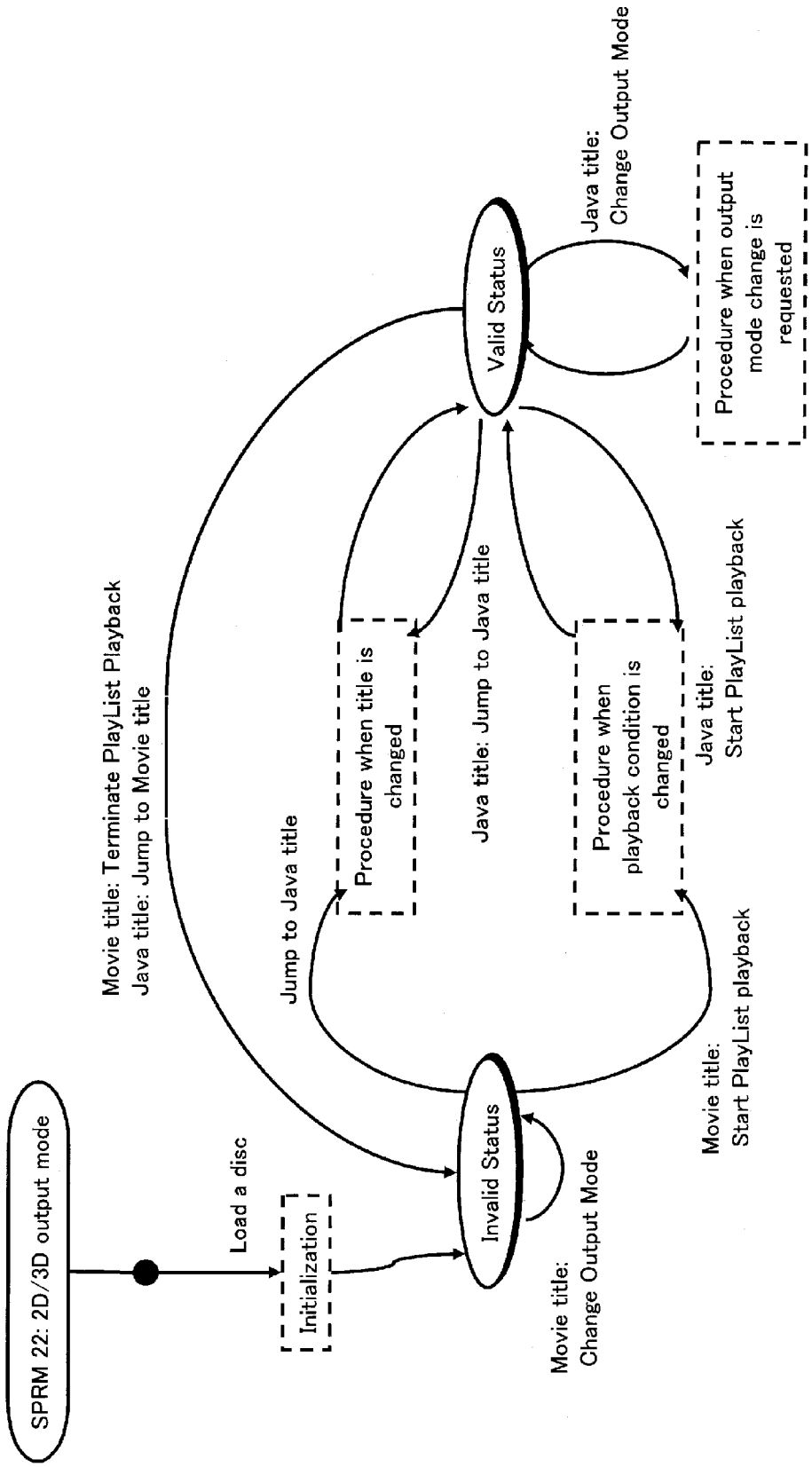
FIG. 77 shows the status transition of the system parameter indicating the 2D/3D display format.

FIG. 77 illustrates a program for avoiding a situation where an incorrect value is set in the system parameter and images are not displayed properly. In the figure, quadrangles in a broken line each show processing, ovals each show the state of the system parameter after the program started to run, and arrows each show the timing at which the program starts to run.

At the timings of load of the disc, switching of the title, switching of the playlist, and switching of the display mode in response to a user's request, the program ensures that the values of the system parameters are not changed to invalid values. The program does so according to determining logics corresponding to the respective timings. The program is built into each player.

There are two types of the title. One is a Movie title. An application program associated with the title is valid only during the playback of a playlist. The other is a Java title that allows writing the display device via a Java program even when a playlist is not being played back.

As indicated by the arrows in the figure, each program is allowed to run (i) during the playback of the Movie title, (ii) during the playback of the Java title, and (iii) regardless of the type of the title.

When the system parameter has an "invalid" value, this means that the value of the system parameter does not affect the output. In this case, even a change in the value of the system parameter does not cause switching of 2D/3D output mode. Here, an operation to be performed may be left unfixed.

In contrast, when the system parameter has a "valid" value, this means that the value of the system parameter affects the output. When the system parameter indicates 2D the output mode is 2D, and when the system parameter indicates 3D the output mode is 3D. Meanwhile, since the switching of the output mode involves HDMI re-authentication, there may be some time lag from the change in the value of the system parameter to the switching of the output mode.

Figure 78:
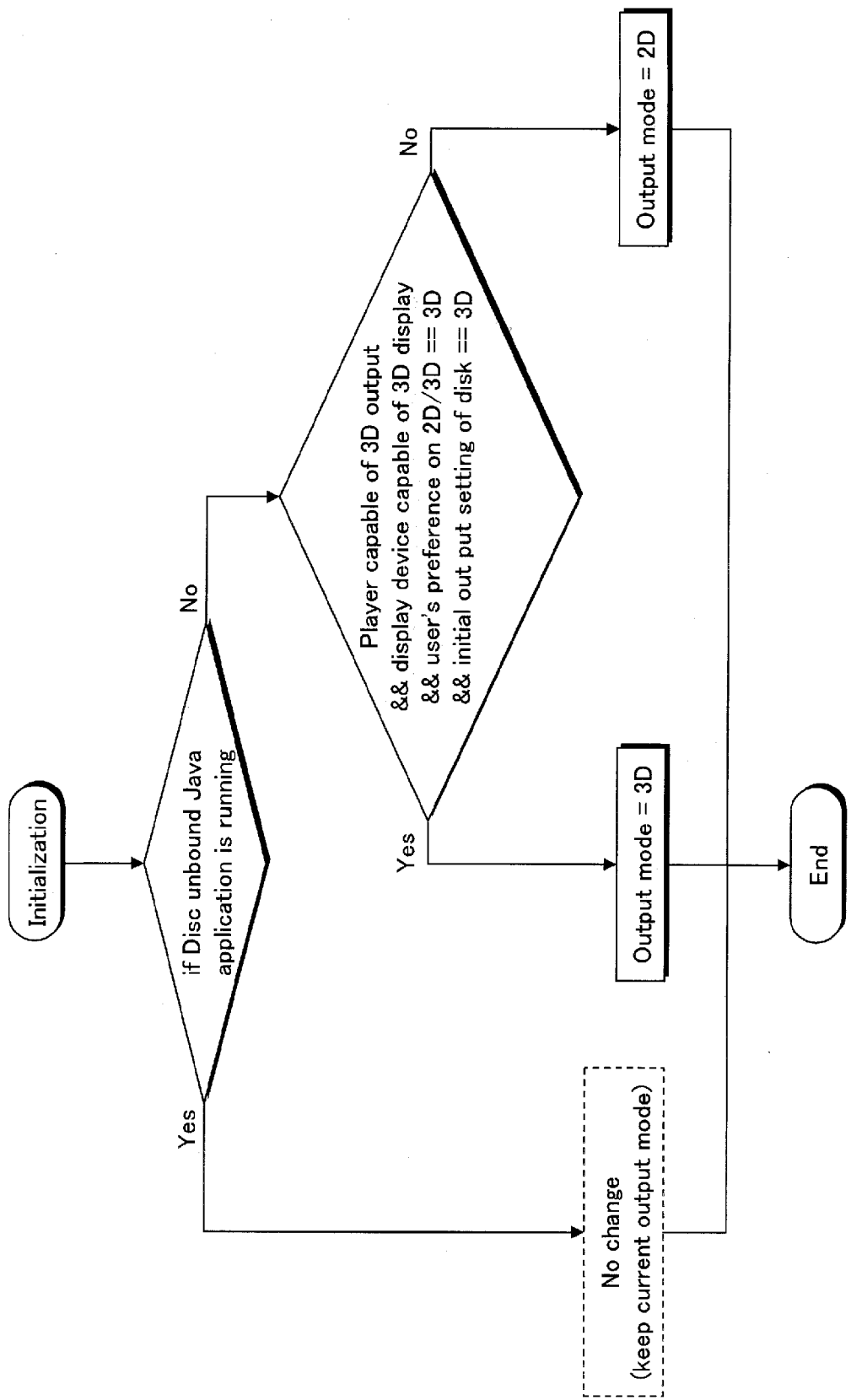
FIG. 78 is a flowchart showing initialization of the status transition of the system parameter indicating the 2D/3D display format.
Figure 91:
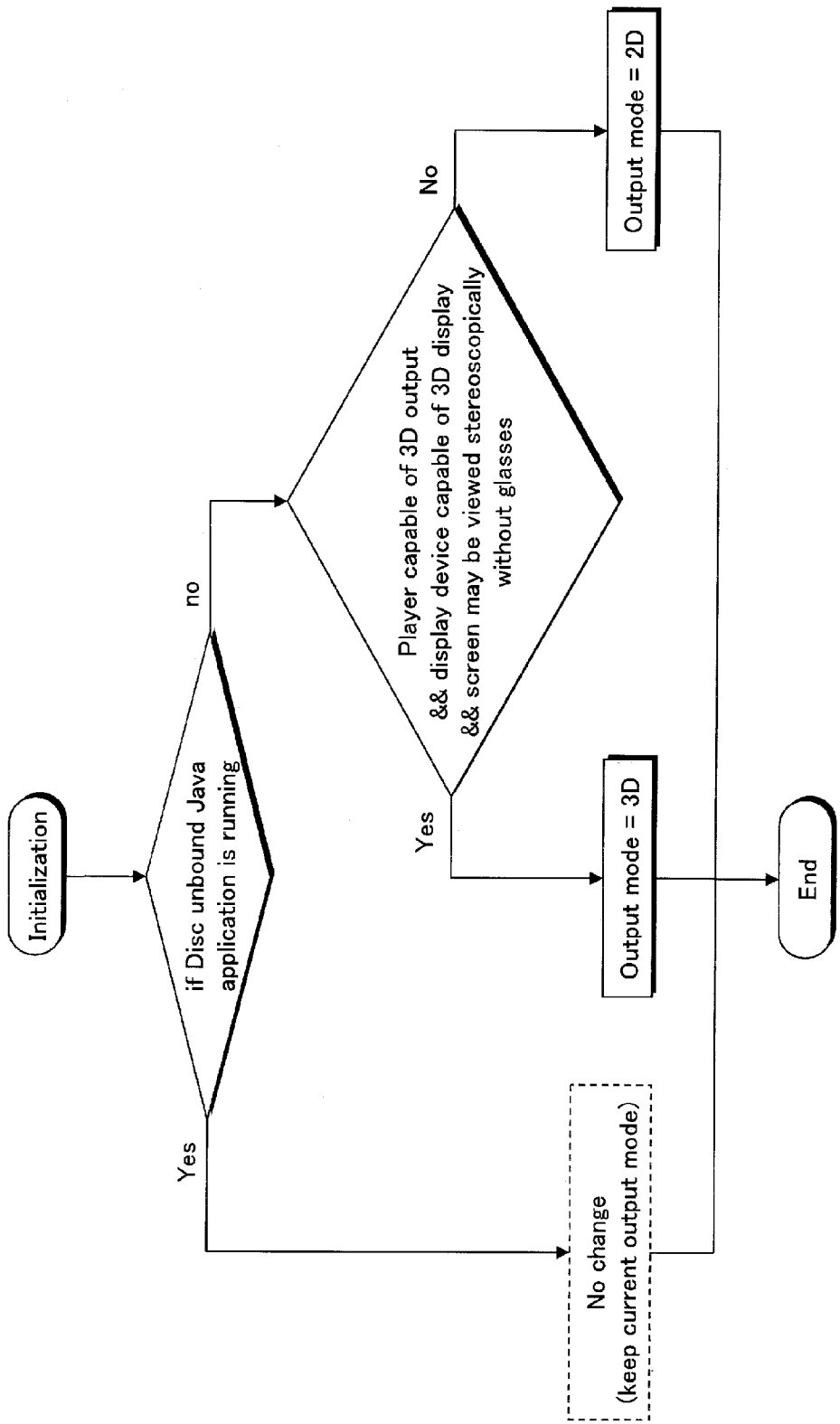
FIG. 91 is a flowchart showing initialization of the status transition of the system parameter indicating the 2D/3D display format.

When the disc is loaded, the program shown as "initialization" in FIGS. 78 and 91 is processed. If the user is able to view the display device stereoscopically without wearing glasses (e.g. a lenticular display), the output mode may be set to 3D automatically.

Figure 79A:
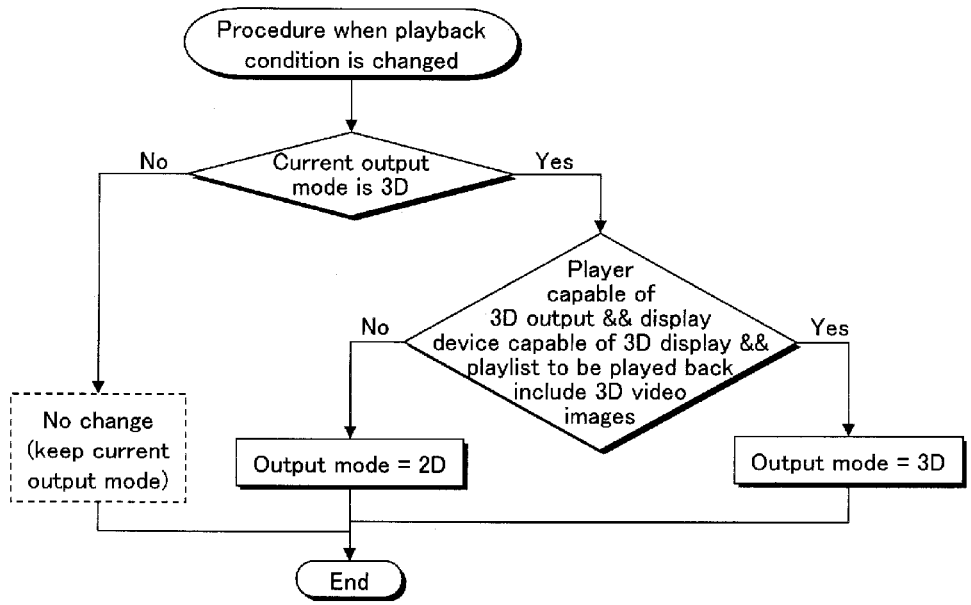
FIGS. 79A and 79B are flowcharts showing a procedure when playback condition is changed in the status transition of the system parameter indicating the 2D/3D display format, and a procedure when title is changed in the status transition of the system parameter indicating the 2D/3D display format.
Figure 79B:
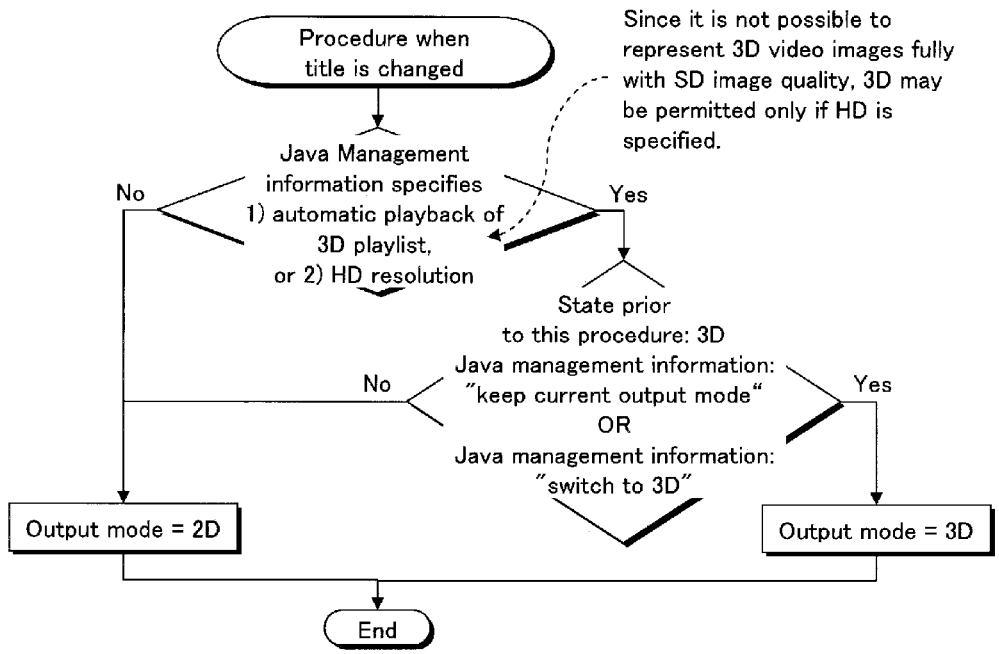

When the title is switched to the Java title, the program shown as "procedure when title is changed" in FIG. 79B is processed. Since it is not possible to represent stereoscopic images fully with a SD quality, when the Java management information sets resolution to be SD the output mode may be switched to 2D automatically.

When the playback of the playlist is started, the program shown as "procedure when playback condition is changed" in FIG. 79A is processed.

Figure 80:
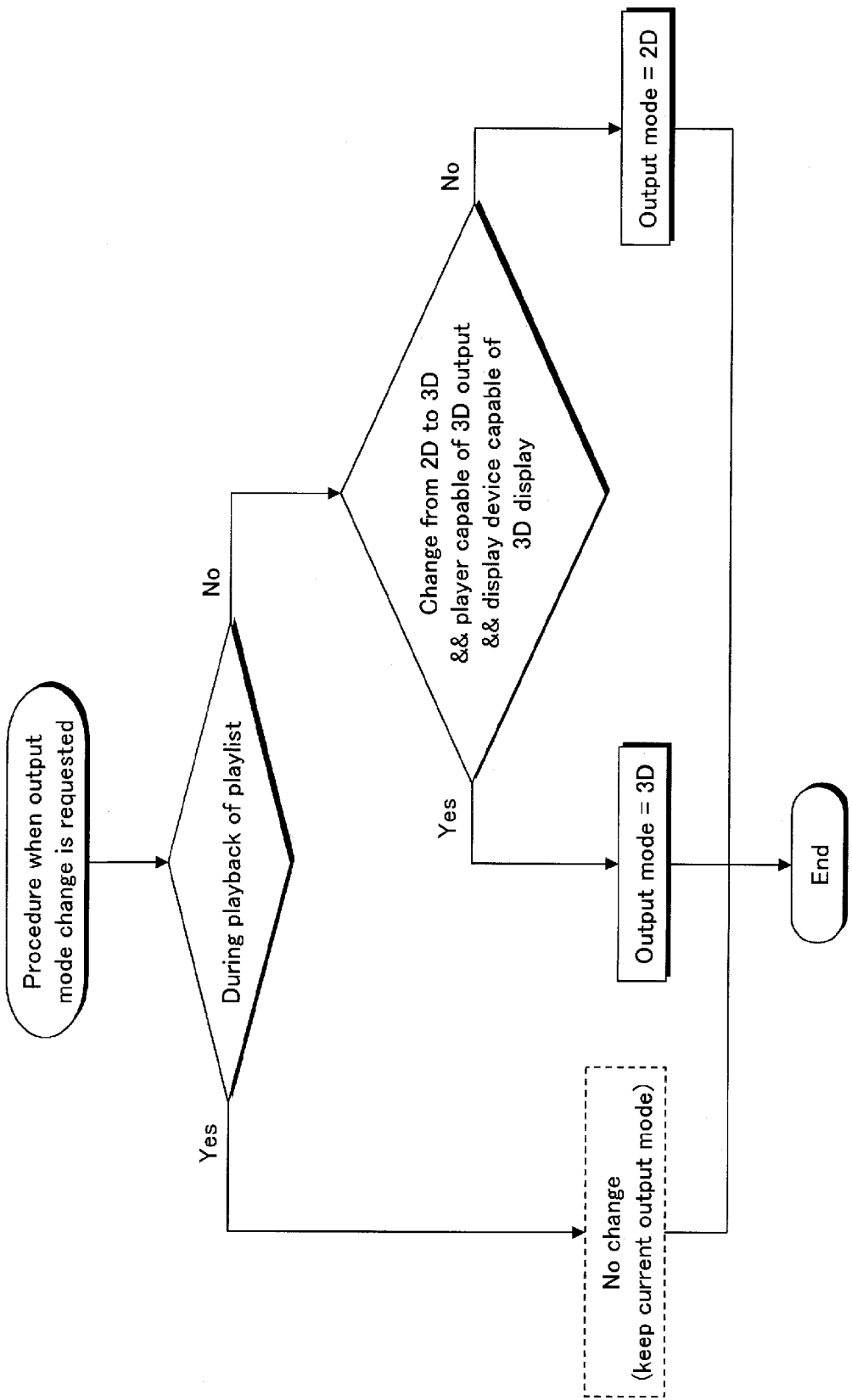
FIG. 80 is a flowchart for switching between 2D and 3D in the status transition of the system parameter indicating the 2D/3D display format.

When the 2D/3D output is switched, the program shown as "procedure when output mode change is requested" in FIG. 80 is processed.

Figure 81:
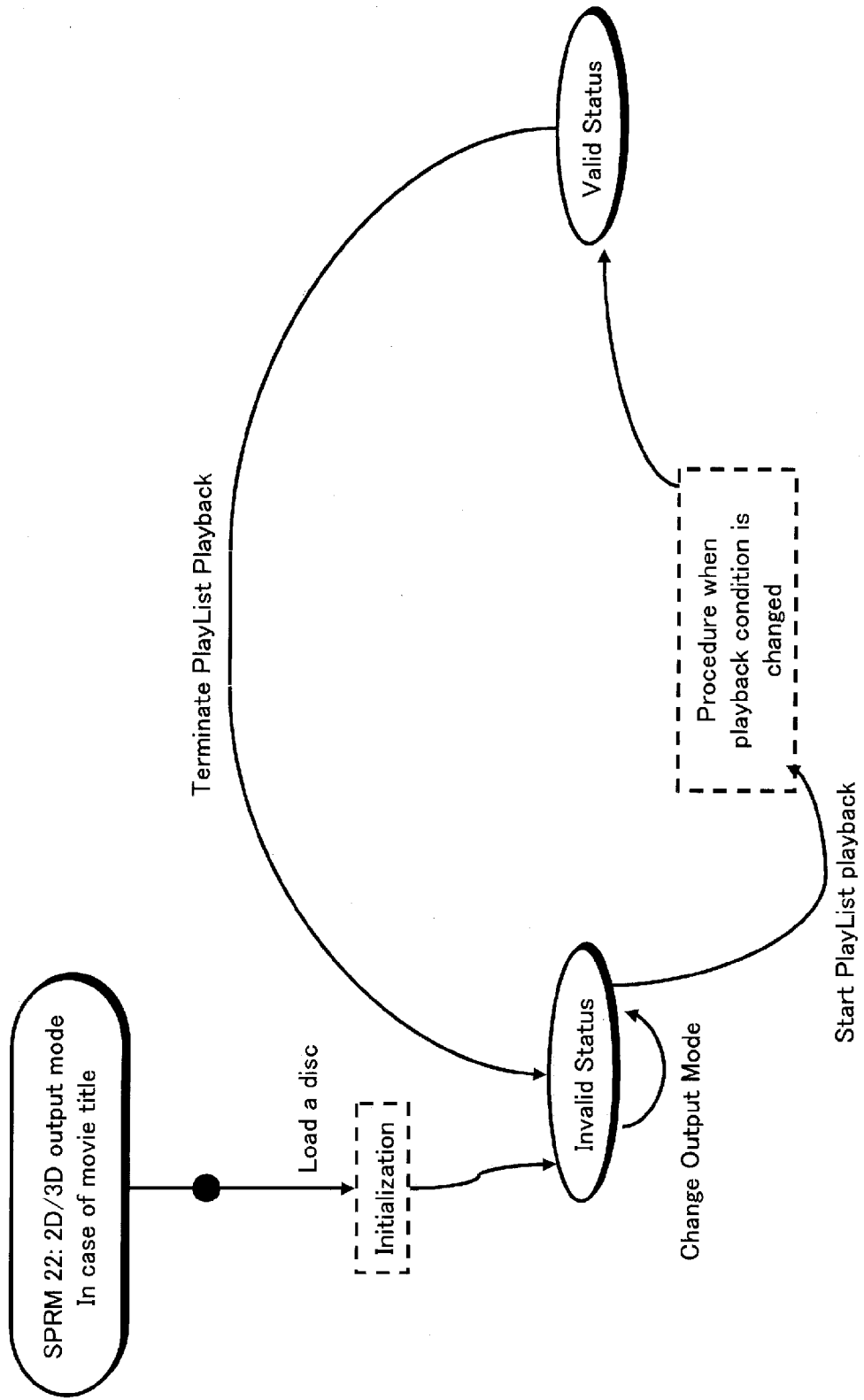
FIG. 81 is a flowchart in the case of the movie title in the status transition of the system parameter indicating the 2D/3D display format.

FIG. 81 extracts operations in the case of the Movie title as illustrated in FIG. 77.

Figure 82:
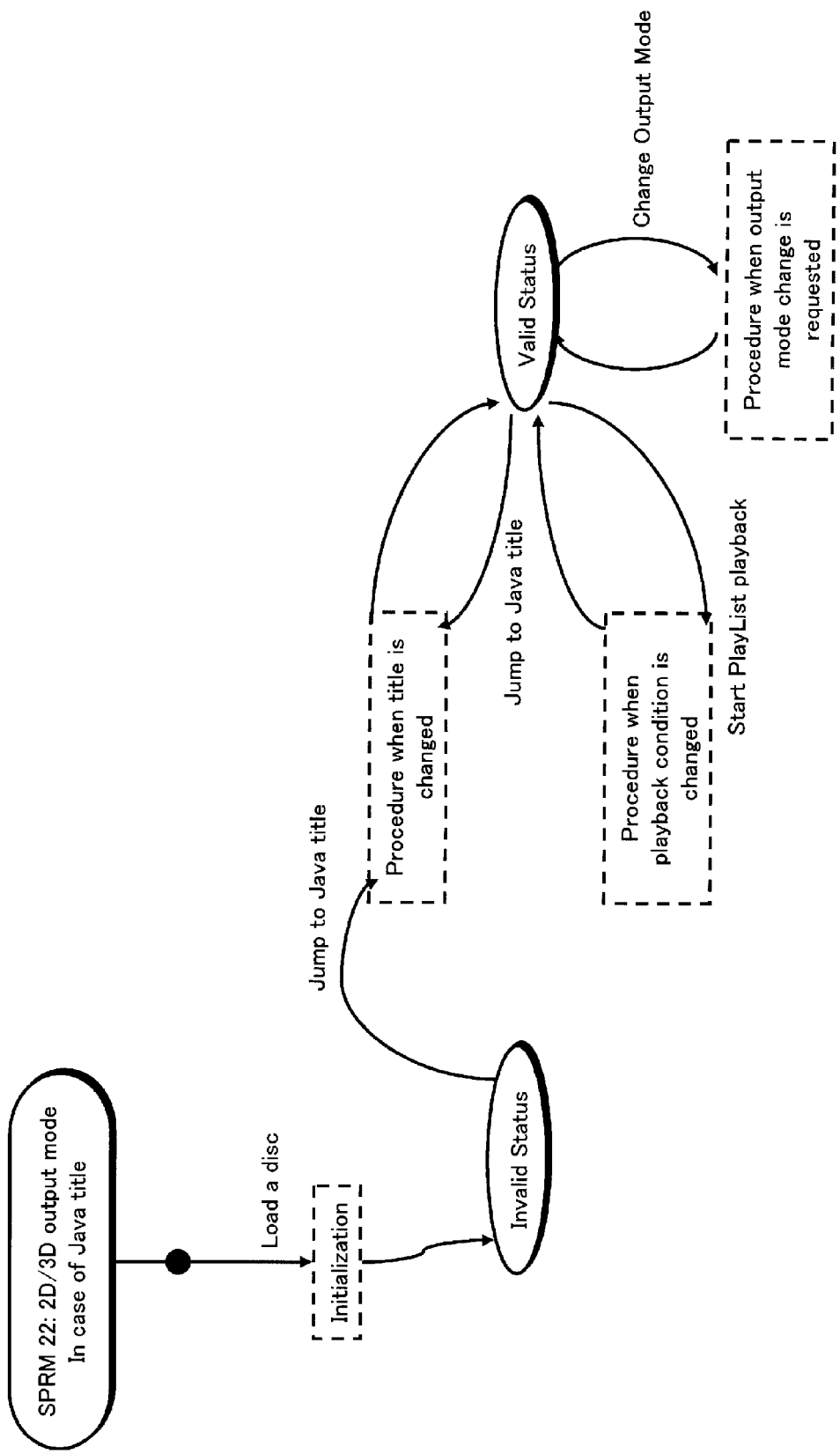
FIG. 82 is a flowchart in the case of the Java title in the status transition of the system parameter indicating the 2D/3D display format.

FIG. 82 extracts operations in the case of the Java title as illustrated in FIG. 77.

Figure 83:
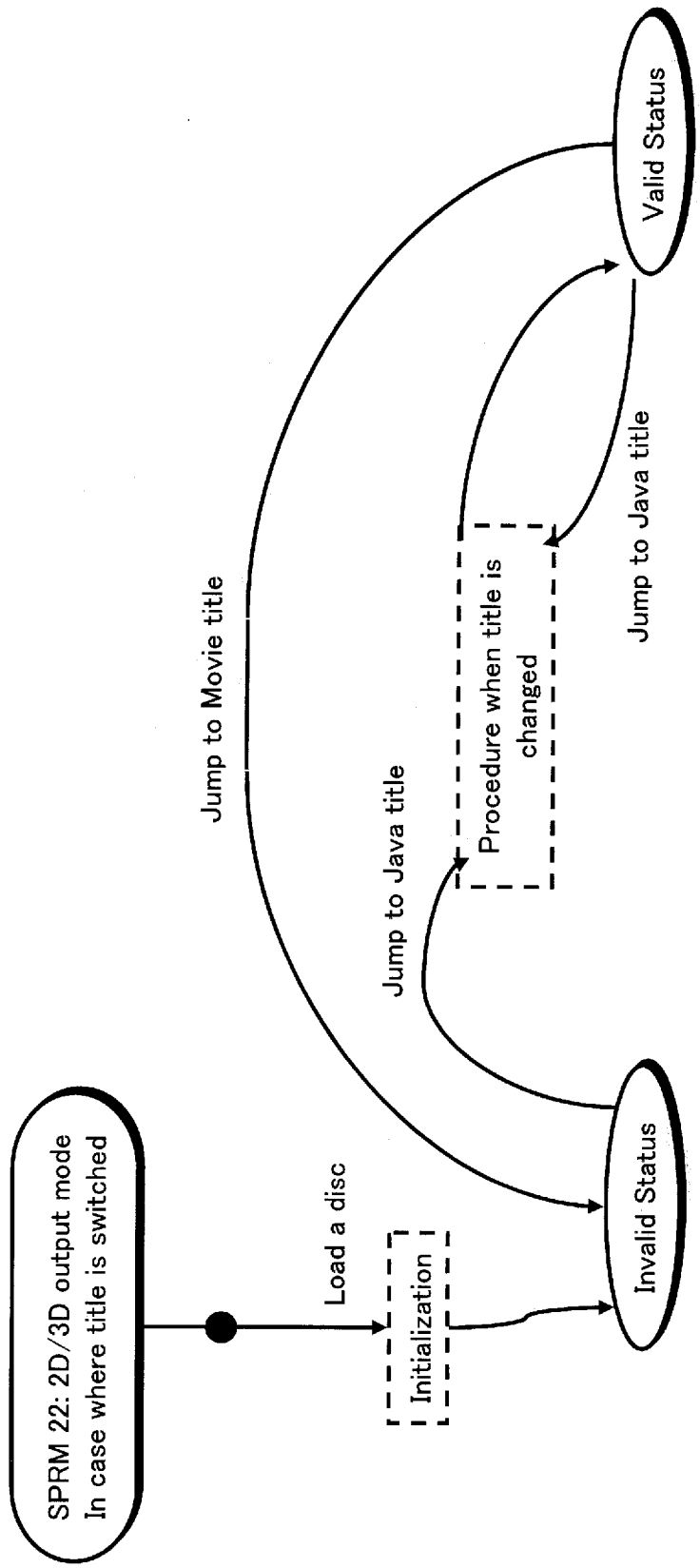
FIG. 83 is a flowchart in the case of the title switch in the status transition of the system parameter indicating the 2D/3D display format.

FIG. 83 extracts operations in the case where the title is switched as illustrated in FIG. 77.

(Pre-Processing of the HDMI Authentication)

FIGS. 84A and 84B show how to shorten the time elapsed before a video image is displayed at playback start.

The following steps are performed at the playback start immediately after the disc is loaded to the player: waiting until the preparation for AV playback and the boot of a program execution environment are completed, selecting the playlist to be played back according to the program so that the video stream to be played back is determined, detecting the resolution and the frame rate of the video and perform the HDMI authentication to establish a connection with the TV, and start the playback of the AV.

Since the HDMI authentication takes time, there is a risk that the user is kept waiting for a very long time before the playback starts.

In order to address the above risk, the following arrangement may be made. Prior to the determination of the playlist to be played back, the information required for the HDMI authentication, such as the resolution and the frame rate of the video, is recorded as a part of the navigation data that is read out first from the disc, as shown in FIG. 84A. Then, as shown in FIG. 84B, the HDMI authentication is performed in parallel with preparing for playing back the AV and the booting into the program execution environment, so that playback may be started right after the playlist is selected.

In the case of a BD-ROM which stores the content authored and created in advance, the resolution and the frame rate of the video contained in the playlist during the disk playback may be recorded as a part of the navigation data. Thus, the HDMI authentication may be completed prior to the playback start of the playlist, and so an advantageous effect may be achieved that the waiting time for the playback start is shortened.

Further, even if some playlists contain videos with various resolutions and frame rates of video, the advantageous effect may still be achieved that the waiting time for the playback start is shortened. This is possible because, at the time of authoring the content, the playlist to be played back at the beginning and the playlists in the main part of the content may be grapsed. With the resolutions and the frame rates of the video contained in one of those playlists, the HDMI authentication is completed in advance.

(Reading of Video Data in Trick Play Playback)

Figure 85:
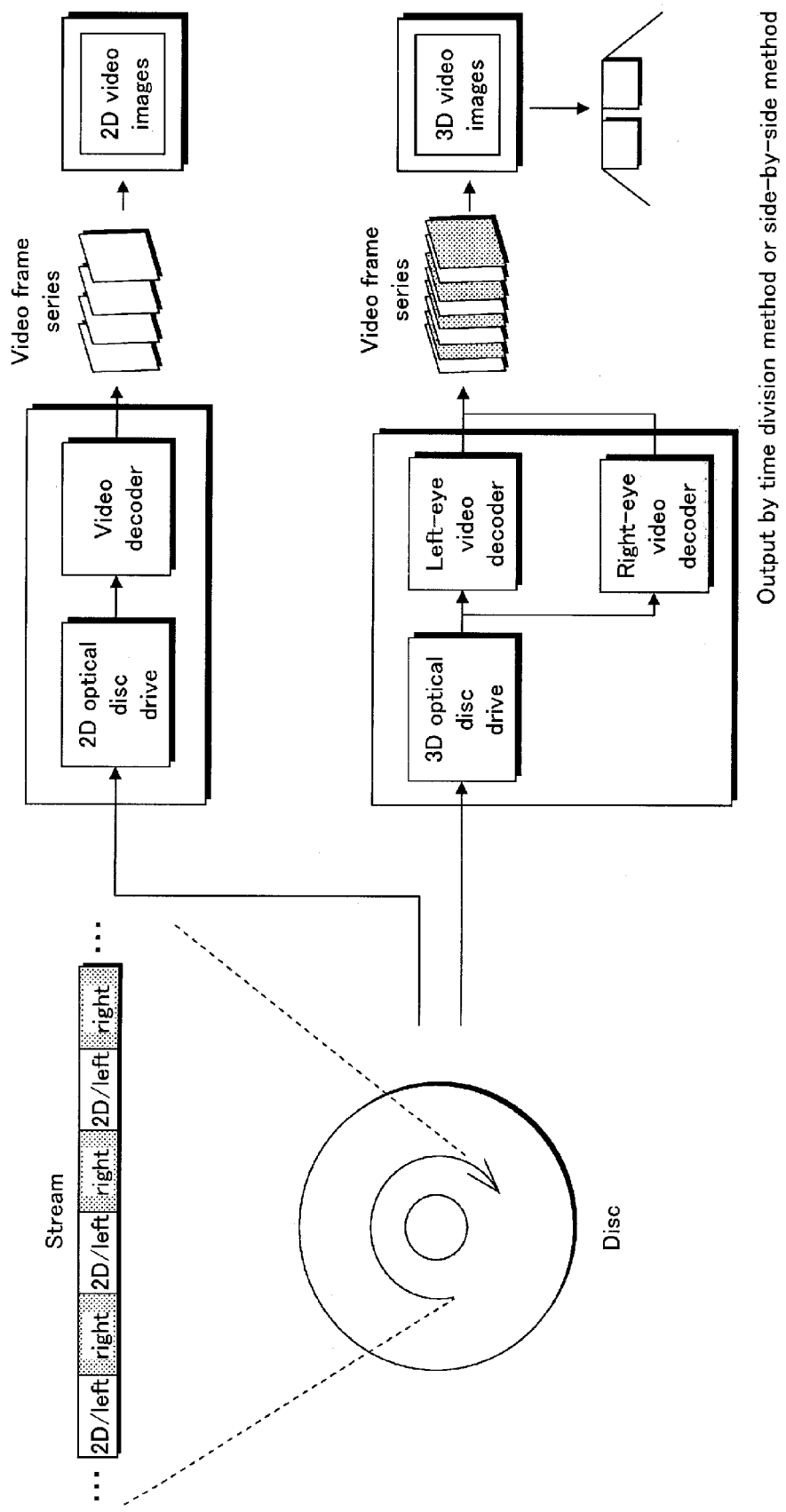
FIG. 85 shows a playback of a 3D image by a 2D/3D playback device.

FIG. 85 shows an example of a conventional method for a playback device to ensure 2D/3D playback compatibility in playing back a disc carrying 3D images. The disc stores a 2D/left-eye video stream containing the images for the left eye and a right-eye video stream containing the images for the right-eye.

Each AV stream is divided into a plurality of extents, and the extents of the 2D/left-eye AV stream and the extents of the right-eye AV stream are alternately arranged on the optical disc. In order to consecutively play back these extents, an adjacent pair of an extent in the 2D/left-eye AV stream and an extent in the right-eye AV stream has the same playback time. The extent in the 2D/left-eye AV stream and the extent in the right-eye AV stream are either interleaved in separate streams or multiplexed in the same stream.

The extents of the 2D/left-eye AV stream are arranged according to the seek performance and read-in speed of the disc, so that they are seamlessly displayed when consecutively played back. When the disc is loaded in a 2D playback device, the 2D/left-eye AV is played back and output as 2D images. On the other hand, when the disc is loaded in a 2D/3D playback device and the user selects 3D playback, the 2D/left-eye AV stream and the right-eye AV stream are alternately read in units of extents. Stated another way, the 2D/left-eye AV stream and the right-eye AV stream are consecutively read, so the drive would not have to perform the seek processing. The 2D/left-eye video stream in the read 2D/left-eye AV stream is input to the left-eye video decoder, and the right-eye video stream in the read right-eye AV stream is input to the right-eye video decoder. After these two streams are decoded, left-eye images and right-eye images are alternately output to a television display device or the like. When these output images are viewed through 3D glasses that alternately block the left-eye and right-eye views of the viewer at a switch rate of 1/48 second, the output images look as if they are 3D images to the viewer. In the above manner, 3D images recorded on a disc can be played back as 2D images on a 2D playback device, and as 3D images on a 2D/3D playback device.

In a normal playback, it is sufficient for the playback device to designate the stream file to be played back, and read the designated stream file consecutively from the beginning. In reading the stream file at a high-speed (ex. fast forward playback of some of the video), however, navigation information showing reading positions is required. In a high-speed fast forward playback in particular, the processing is repeated in which an I picture alone is read and another I picture is sought that is to be displayed subsequently. In this case, the navigation information is required for seeking the positions of each I picture effectively.

Figure 86:
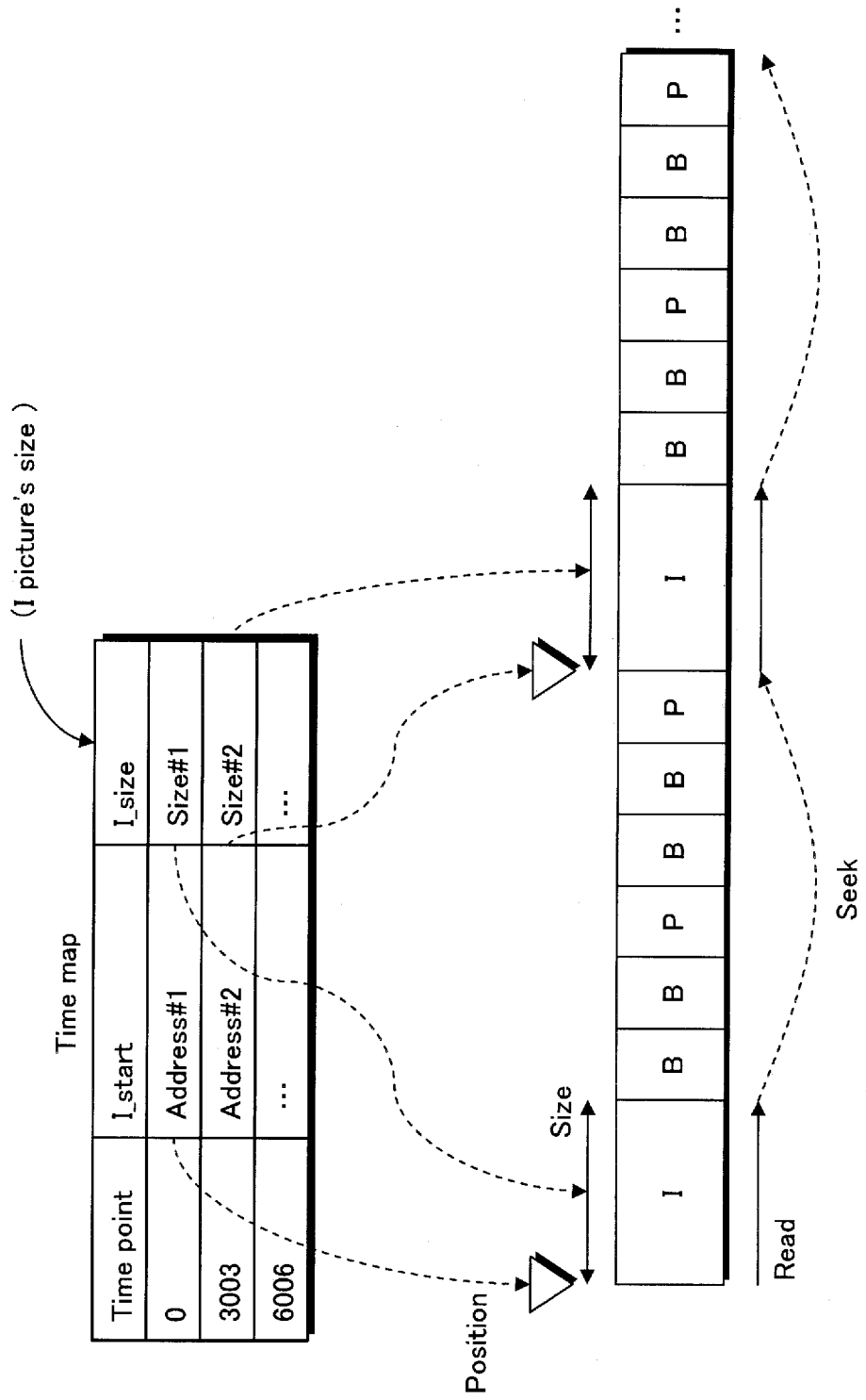
FIG. 86 shows a time map in the case a 2D image stream.

FIG. 86 shows the navigation information in a case where the stream to be read is a 2D video stream. The navigation information corresponds to the time map that stores the starting address and size of each I picture.

When the 2D/left-eye stream and the right-eye stream are multiplexed in separate files or separate transport streams, it is sufficient for the 2D/left-eye stream and the right-eye stream to have separate time maps. In the fast forward playback in this case, the playback device simply reads images corresponding to the same time point with reference to the respective time maps of the 2D/left-eye stream and the right-eye stream, and display the read images.

Figure 87:
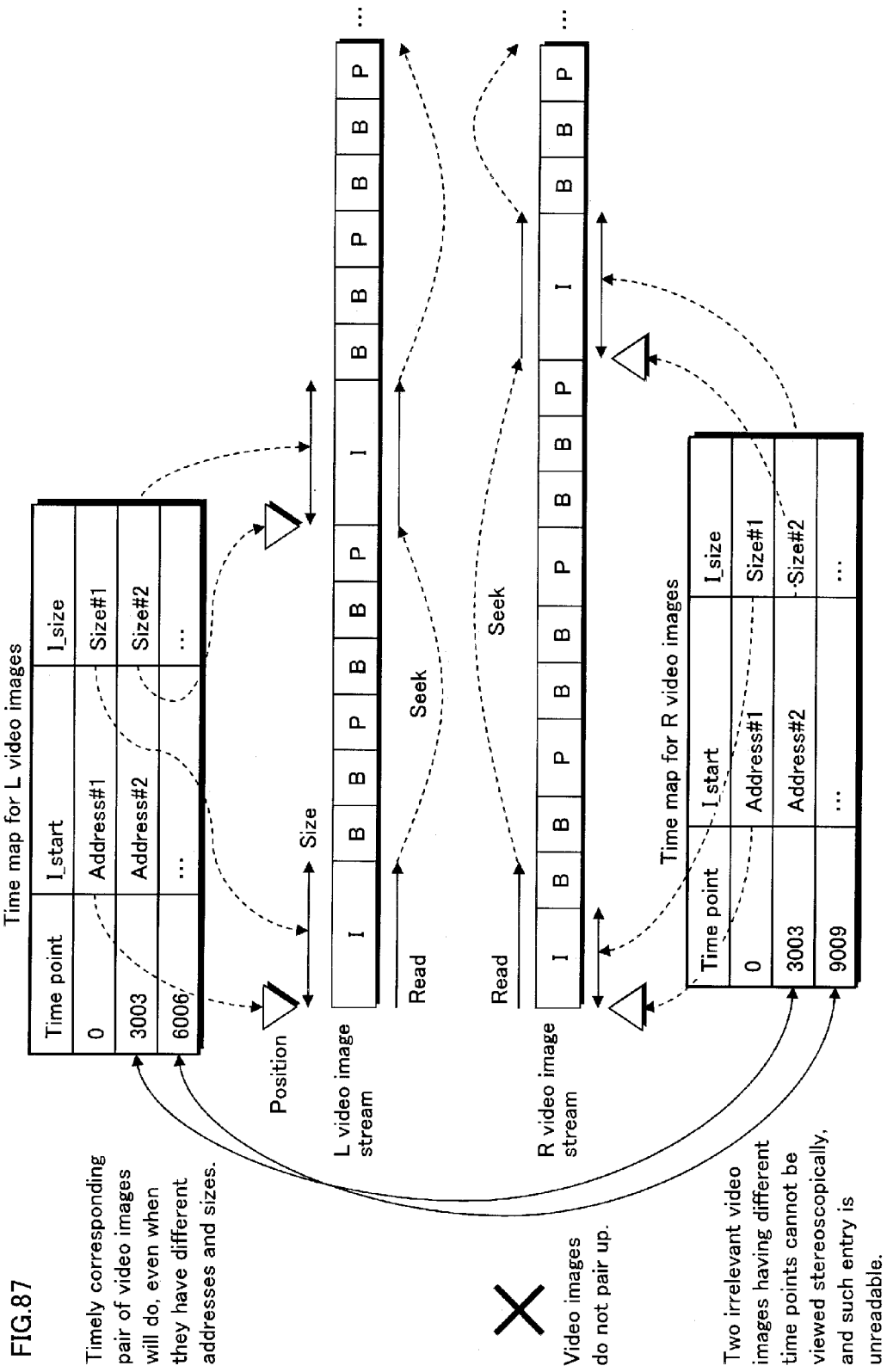
FIG. 87 shows a time map in the case where a 3D image stream is composed of two independent streams.

Meanwhile, as shown in FIG. 87, even when performing a trick play playback, such as the fast forwarding playback, the left-eye video images and the right-eye video images need to be processed in a pair in order to be viewed stereoscopically. It is necessary to read images corresponding to the same time point with reference to the respective time maps of the left-eye images and the right-eye images. This means that when the left-eye video images and the right-eye video images have time maps having different time points, the stereoscopic display of the images during the high-speed skip is difficult. Accordingly, the time maps for the left-eye video images and the right-eye video images need to be consistent with each other.

On the other hand, when the 2D/left-eye stream and the right-eye stream are multiplexed in a single transport stream, there are two methods for making the time map. One is to make separate time maps for the left-eye video images and the right-eye video images. The other is to make a single time map for each pair of the left-eye video images and the right-eye video images.

Figure 88:
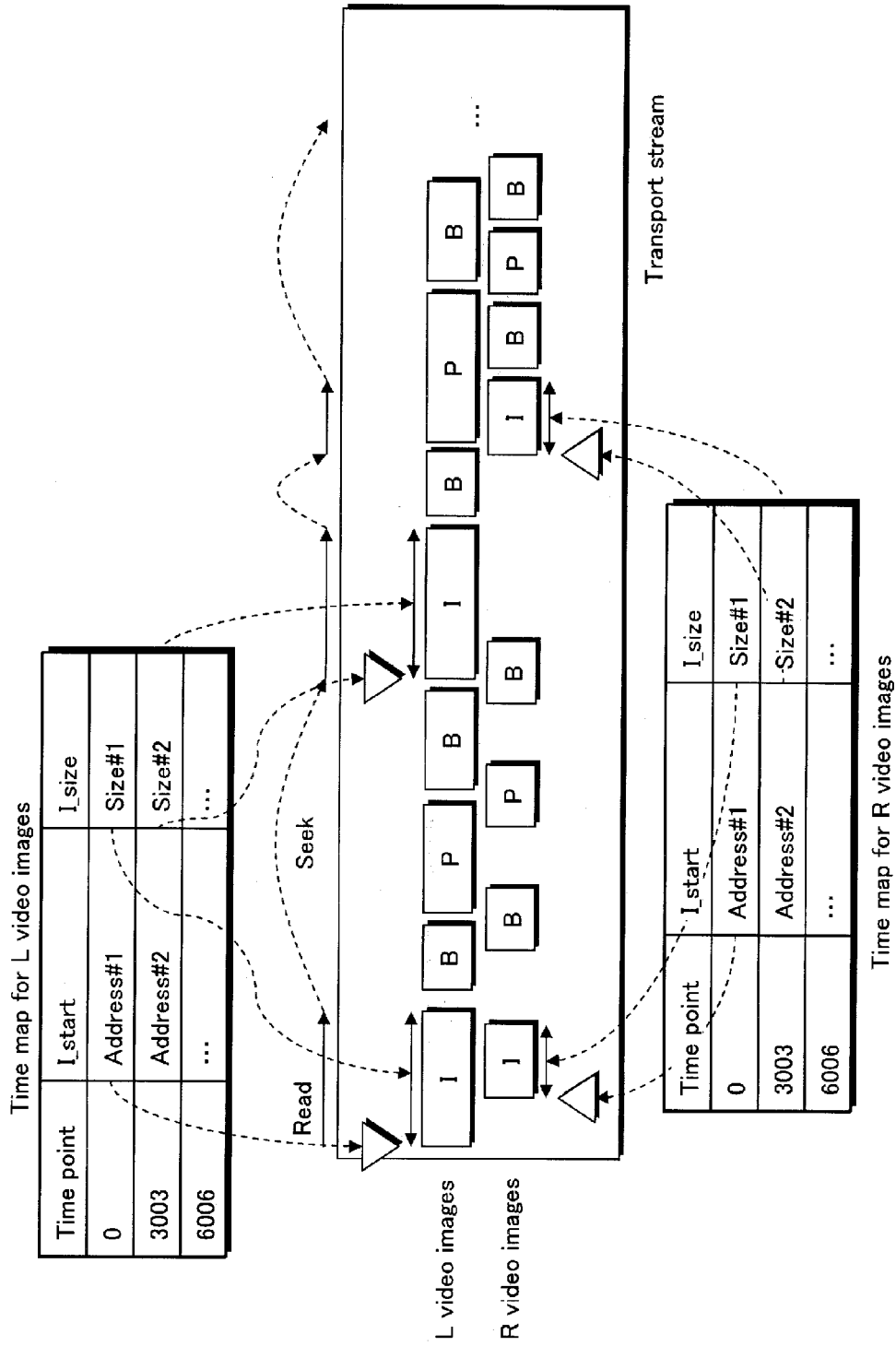
FIG. 88 shows a time map in the case where a 3D image stream is composed of one transport stream.

FIG. 88 shows a case where the left-eye images and the right-eye images each have a separate time map. The left-eye video images and the right-eye video images are multiplexed in a single transport stream, but can be read in the same manner as a case where they are in separate transport streams. If the left-eye and right-eye images are located in same read area, some ingenuity is required to read the read area twice successively.

Figure 89:
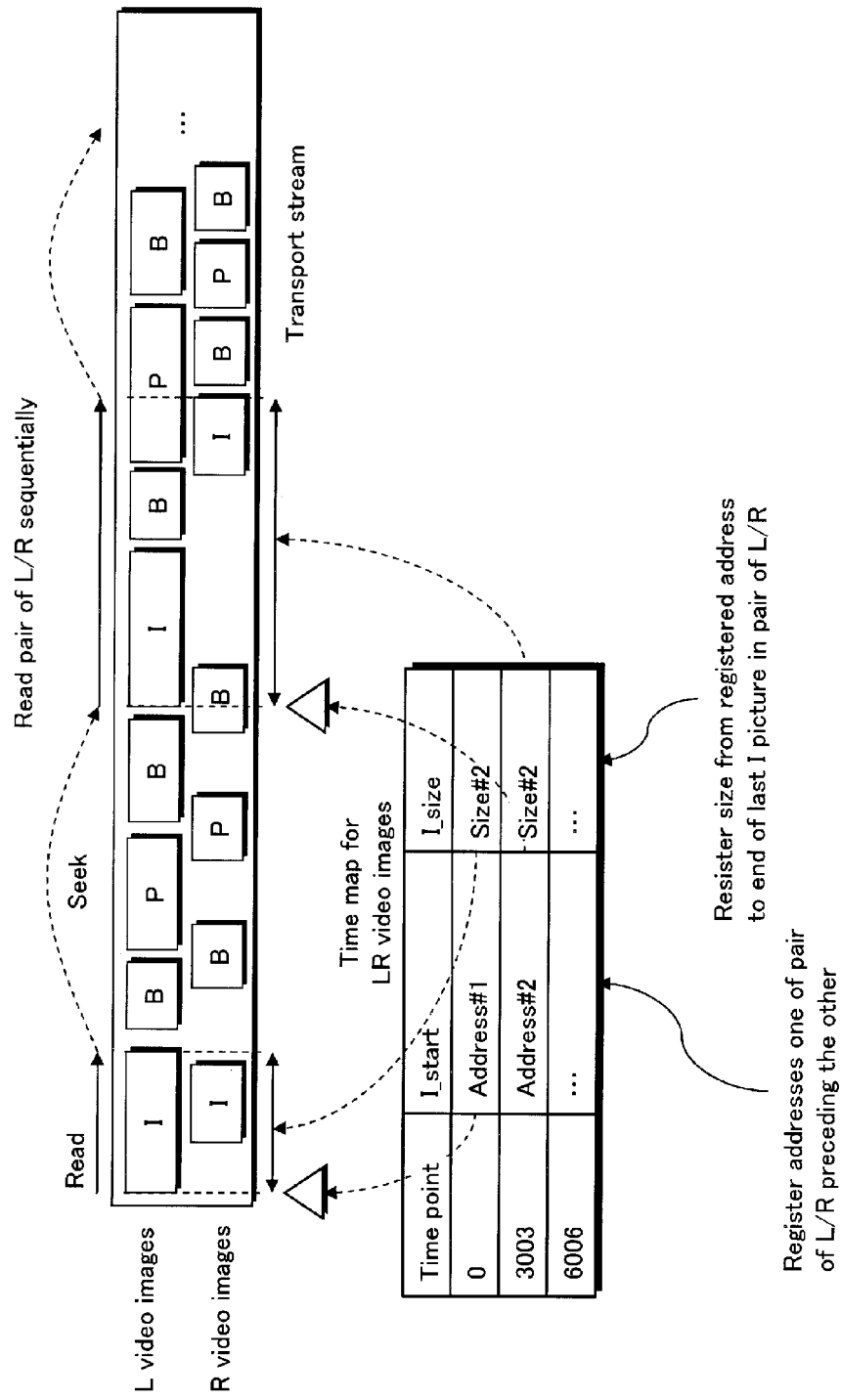
FIG. 89 shows a time map in the case where a 3D image stream is composed of one transport stream.

FIG. 89 shows a case where a single time map is made for each pair of the left-eye and right-eye images. Since a single entry is registered for each pair, the left-eye and right-eye I pictures are located at the same time point. Each entry has a start address and a size. As the start address, the start address of one of the left-eye or right-eye I pictures preceding the other is registered. As the size, a distance from the registered start address to an end address of one of the left-eye or right-eye I pictures preceded by the other is registered. In this method, the left-eye and right-eye pictures are always in pairs, which is advantageous in reading one of the entries. Yet, there is also a possibility if distances between each of I pictures are long that non-I pictures are present therebetween, thereby causing unrequired reading processing. Nevertheless, sometimes it is more effective in terms of time to read unrequired data and delete it than spending time in seeking. In such a case, the method can be more effective.

(Overlaying Subtitles/Graphics).

Figure 90:
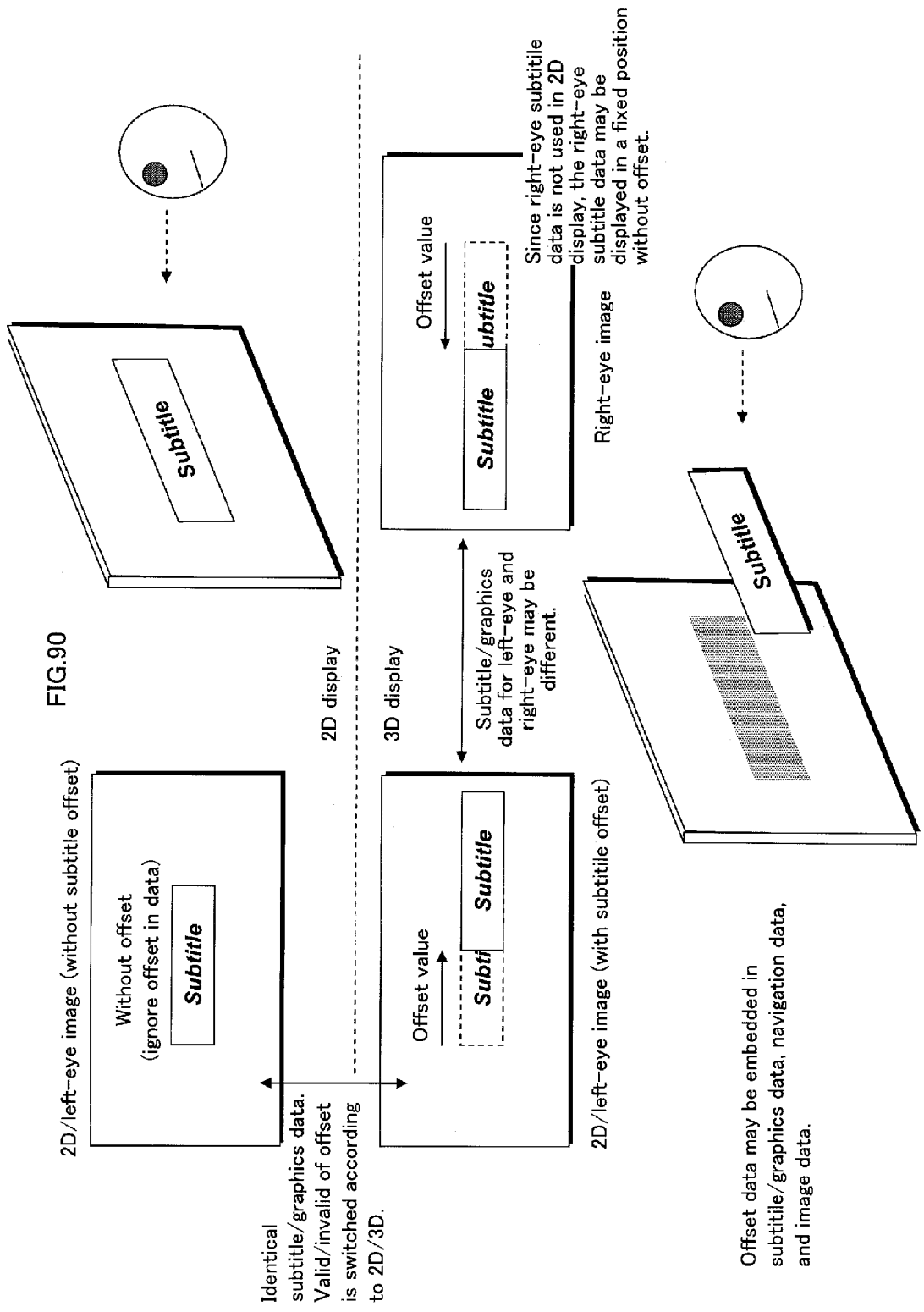
FIG. 90 shows subtitle/graphics offset information and switching between valid and invalid.

FIG. 90 shows how the subtitles and the graphics data are used.

When 2D subtitle data, 3D/left-eye subtitle data, and 3D/right-eye subtitle data are different from one another, the volume of the graphics data is approximately three times the volume of the 2D subtitle data, thus occupying a large portion of the disk volume. To address this, there are at least two methods as follows. One method is to use the 2D subtitle data as the 3D/left-eye subtitle data and the 3D/right-eye subtitle data. In doing so, each data is displayed in a different display position to create parallax so that the displayed images appear to be floating or concave. The other method is to display only one of the 3D/left-eye subtitle data and the 3D/right-eye subtitle data in the 2D display mode. The former method allows reducing the data volume to a size almost equal to the 2D graphics data, and the latter method allows reducing the data volume to twice the size of the 2D graphics data.

In either method, the 3D/left-eye subtitle data and the 2D subtitle data are identical graphics. The data is displayed without offset in the 2D display mode, and is displayed with offset in the 3D display mode.

Meanwhile, the offset information data may be provided in the subtitle/graphics data, given by the navigation information, or embedded in the video data in such a manner that an offset information piece is provided for each frame or GOP.

Embodiment 13

The present embodiment describes an example structure of a playback device for playing back the data of the structure described in an earlier embodiment, which is realized by using an integrated circuit 803.

Figure 93:
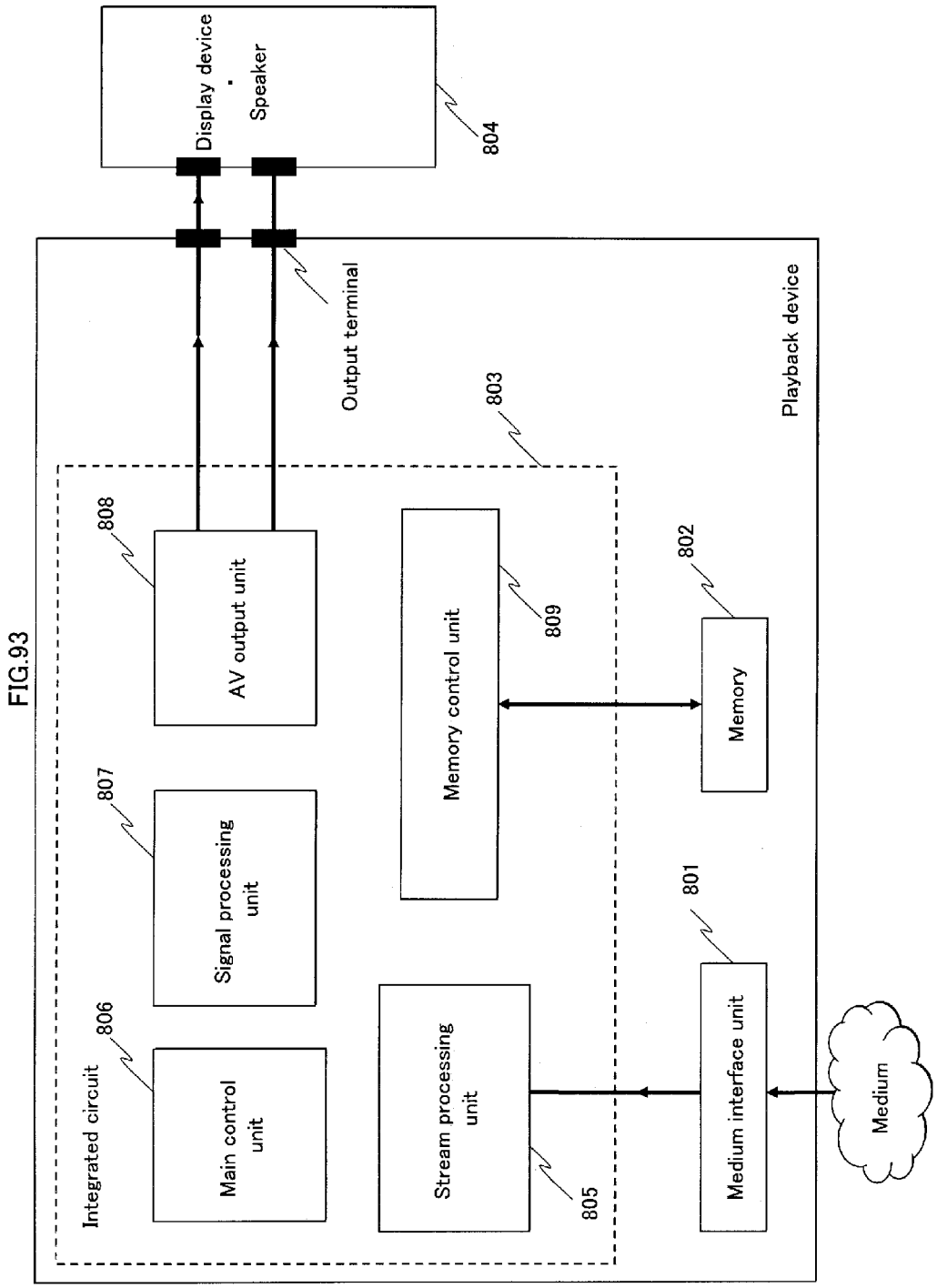
FIG. 93 shows an example structure of a 2D/3D playback device which is realized by using an integrated circuit.

FIG. 93 shows an example structure of a 2D/3D playback device which is realized by using the integrated circuit 803.

The medium interface unit 801 receives (reads) data from the medium, and transfers the data to the integrated circuit 803. Note that the medium interface unit 801 receives the data of the structure described in the earlier embodiment. The medium interface unit 801 is, for example: a disc drive when the medium is the optical disc or hard disk; a card interface when the medium is the semiconductor memory such as the SD card or the USB memory; a CAN tuner or Si tuner when the medium is broadcast waves of broadcast including the CATV; or a network interface when the medium is the Ethernet™, wireless LAN, or wireless public line.

The memory 802 is a memory for temporarily storing the data received (read) from the medium, and the data that is being processed by the integrated circuit 803. For example, the SDRAM (Synchronous Dynamic Random Access Memory), DDRx SDRAM (Double-Date-Ratex Synchronous Dynamic Random Access Memory; x=1, 2, 3 . . . ) or the like is used as the memory 802. Note that the number of the memories 802 is not fixed, but may be one or two or more, depending on the necessity.

The integrated circuit 803 is a system LSI for performing the video/audio processing onto the data transferred from the interface unit 801, and includes a main control unit 806, a stream processing unit 805, a signal processing unit 807, an AV output unit 808, and a memory control unit 809.

The main control unit 806 includes a processor core having the timer function and the interrupt function. The processor core controls the integrated circuit 803 as a whole according to the program stored in the program memory or the like. Note that the basic software such as the OS (operating software) is stored in the program memory or the like preliminarily.

The stream processing unit 805, under the control of the main control unit 806, receives the data transferred from the medium via the interface unit 801 and stores it into the memory 802 via the data bus in the integrated circuit 803. The stream processing unit 805, under the control of the main control unit 806, also separates the received data into the video-base data and the audio-base data. As described earlier, on the medium, AV clips for 2D/L including left-view video stream and AV clips for R including right-view video stream are arranged in an interleaved manner, in the state where each clip is divided into some Extents. Accordingly, the main control unit 806 performs the control so that, when the integrated circuit 803 receives the left-eye data including left-view video stream, the received data is stored in the first area in the memory 802; and when the integrated circuit 803 receives the right-eye data including right-view video stream, the received data is stored in the second area in the memory 802. Note that the left-eye data belongs to the left-eye Extent, and the right-eye data belongs to the right-eye Extent. Also note that the first and second areas in the memory 802 may be areas generated by dividing a memory logically, or may be physically different memories. Further note that although the present embodiment presumes that the left-eye data including the left-view video stream is the main-view data, and the right-eye data including the right-view video stream is the sub-view data, the right-eye data may be the main-view data and the left-eye data may be the sub-view data. Also, the graphics stream is multiplexed in either or both of the main-view data and the sub-view data.

The signal processing unit 807, under the control of the main control unit 806, decodes, by an appropriate method, the video-base data and the audio-base data separated by the stream processing unit 805. The video-base data has been recorded after being encoded by a method such as MPEG-2, MPEG-4 AVC, MPEG-4 MVC, or SMPTE VC-1. Also, the audio-base data has been recorded after being compress-encoded by a method such as Dolby AC-3, Dolby Digital Plus, MLP, DTS, DTS-HD, or Linear PCM. Thus, the signal processing unit 807 decodes the video-base data and the audio-base data by the methods corresponding thereto. Models of the signal processing unit 807 are various decoders of Embodiment 1 shown in FIG. 12.

The memory control unit 809 mediates the access to the memory 802 from each functional block in the integrated circuit 803.

The AV output unit 808, under the control of the main control unit 806, performs the superimposing of the video-base data having been decoded by the signal processing unit 807, or format conversion of the video-base data and the like, and outputs the data subjected to such processes to the outside of the integrated circuit 803.

Figure 94:
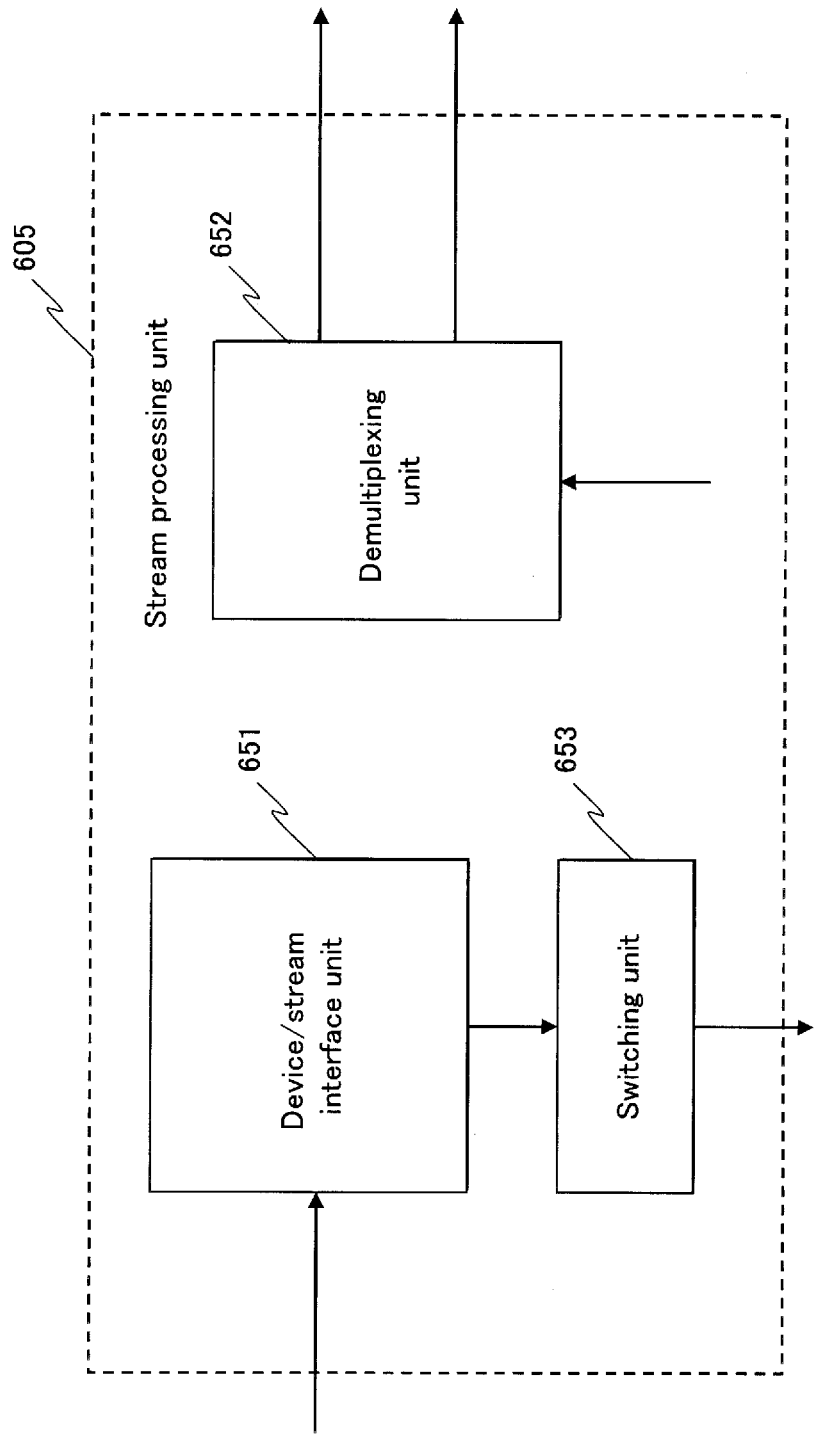
FIG. 94 is a functional block diagram showing a typical structure of the stream processing unit.

FIG. 94 is a functional block diagram showing a typical structure of the stream processing unit 805. The stream processing unit 805 includes a device/stream interface unit 851, a demultiplexing unit 852, and switching unit 853.

The device/stream interface unit 851 is an interface for transferring data between the interface unit 801 and the integrated circuit 803. The device/stream interface unit 851 may be: SATA (Serial Advanced Technology Attachment), ATAPI (Advanced Technology Attachment Packet Interface), or PATA (Parallel Advanced Technology Attachment) when the medium is the optical disc or the hard disk; a card interface when the medium is the semiconductor memory such as the SD card or the USB memory; a tuner interface when the medium is broadcast waves of broadcast including the CATV; or a network interface when the medium is the Ethernet, wireless LAN, or wireless public line. The device/stream interface unit 851 may have a part of the function of the interface unit 801, or the interface unit 801 may be embedded in the integrated circuit 803, depending on the type of the medium.

The demultiplexing unit 852 separates the playback data, transferred from the medium, including video and audio, into the video-base data and the audio-base data. Each Extent, having been described earlier, is composed of source packets of video, audio, PG (subtitle), IG (menu) and the like (dependent source packets may not include audio). The demultiplexing unit 852 separates the playback data into video-base TS packets and audio-base TS packets based on the PID (identifier) included in each source packet. The demultiplexing unit 852 transfers the data after the separation to the signal processing unit 807. A model of the demultiplexing unit 852 is, for example, the source depacketizer and the PID filter of Embodiment 1.

Figure 95:
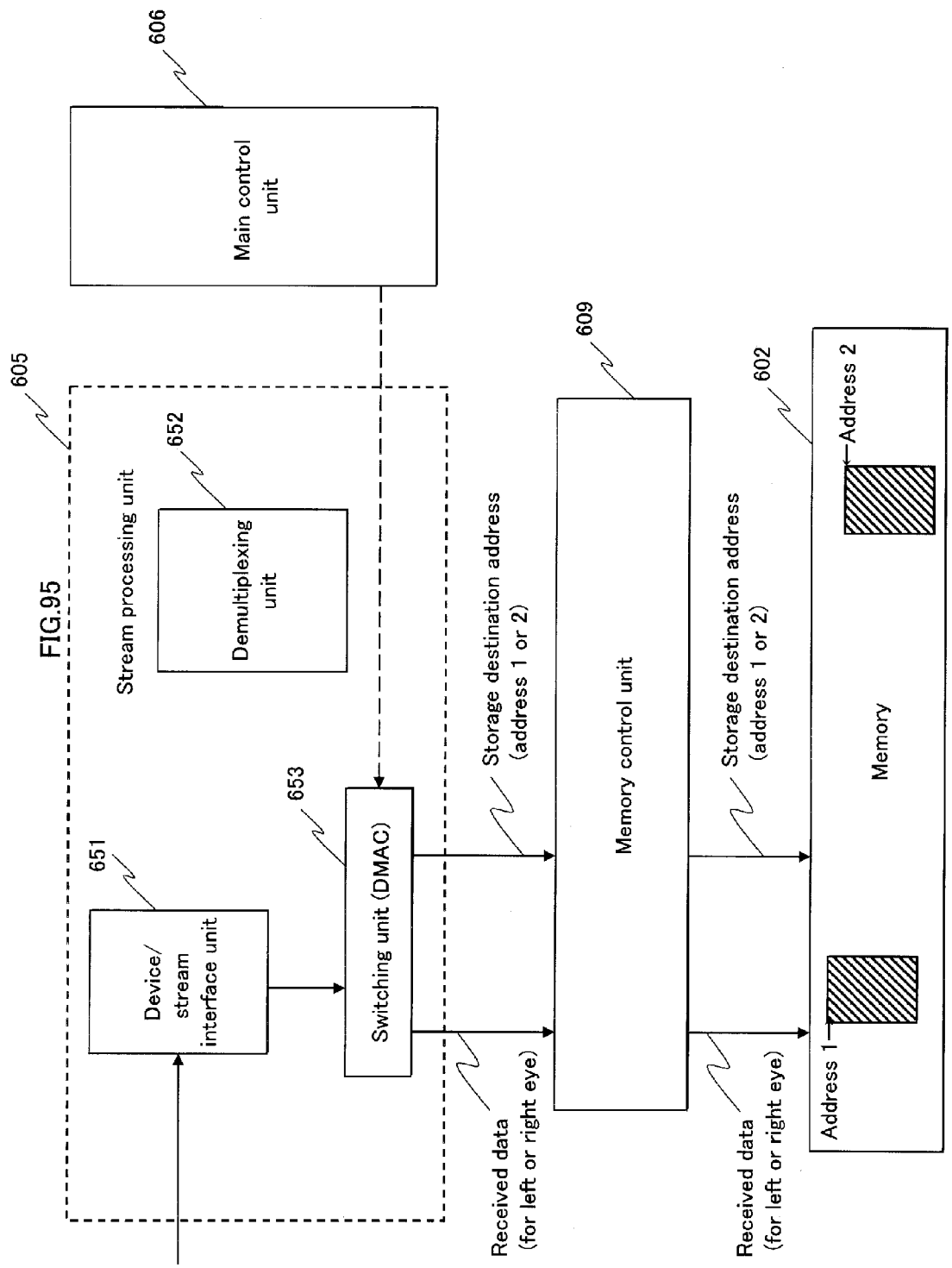
FIG. 95 is a conceptual diagram showing the switching unit and the peripheral when the switching unit is DMAC.

The switching unit 853 switches the output destination (storage destination) so that, when the device/stream interface unit 851 receives the left-eye data, the received data is stored in the first area in the memory 802; and when the integrated circuit 803 receives the right-eye data, the received data is stored in the second area in the memory 802. Here, the switching unit 853 is, for example, DMAC (Direct Memory Access Controller). FIG. 95 is a conceptual diagram showing the switching unit 853 and the peripheral when the switching unit 853 is DMAC. The DMAC, under the control of the main control unit 806, transmits the data received by the device stream interface and the data storage destination address to the memory control unit 809. More specifically, the DMAC switches the output destination (storage destination) depending on the received data, by transmitting Address 1 (the first storage area) to the memory control unit 809 when the device stream interface receives the left-eye data, and transmitting Address 2 (the second storage area) to the memory control unit 809 when the device stream interface receives the right-eye data. The memory control unit 809 stores data into the memory 802 in accordance with the storage destination address sent from the DMAC. Note that a dedicated circuit for controlling the switching unit 853 may be provided, instead of the main control unit 806.

In the above description, the device/stream interface unit 851, demultiplexing unit 852, and switching unit 853 are explained as a typical structure of the stream processing unit 805. However, the stream processing unit 805 may further include an encryption engine unit for decrypting received encrypted data, key data or the like, a secure management unit for controlling the execution of a device authentication protocol between the medium and the playback device and for holding a secret key, and a controller for the direct memory access. In the above, it has been explained that, when the data received from the medium is stored into the memory 802, the switching unit 853 switches the storage destination depending on whether the received data is left-eye data or right-eye data. However, not limited to this, the data received from the medium may be temporarily stored into the memory 802, and then, when the data is to be transferred to the demultiplexing unit 852, the data may be separated into the left-eye data and the right-eye data.

Figure 96:
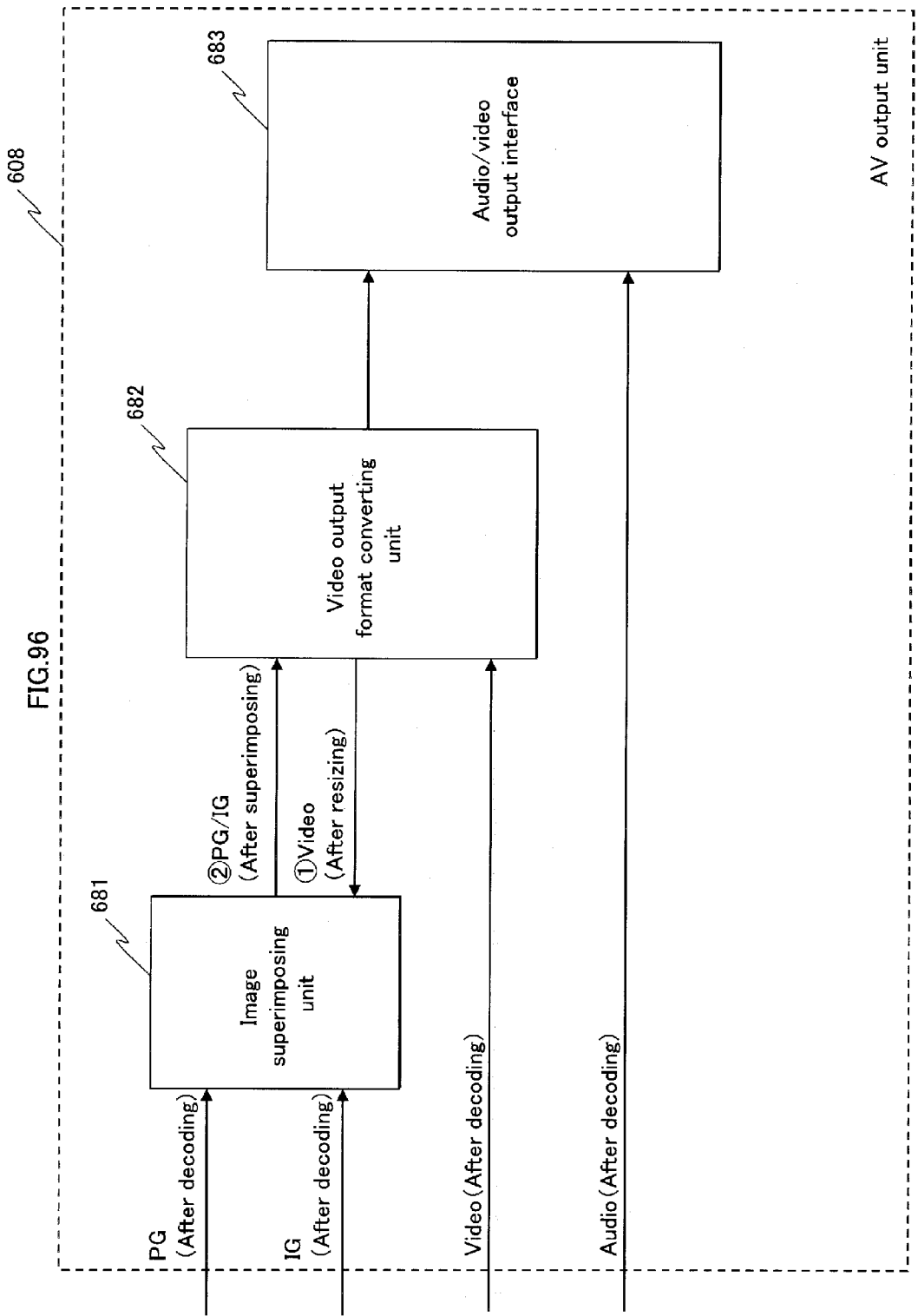
FIG. 96 is a functional block diagram showing a typical structure of the AV output unit.

FIG. 96 is a functional block diagram showing a typical structure of the AV output unit 808. The AV output unit 808 includes an image superimposing unit 881, a video output format converting unit 882, and an audio/video output interface unit 883. The image superimposing unit 881 superimposes the decoded video-base data.

More specifically, the image superimposing unit 881 superimposes the PG (subtitle) and the IG (menu) onto the left-view video data or the right-view video data in units of pictures. A model of the image superimposing unit 881 is, for example, FIG. 16. Note that, as described earlier, the playback of the graphics stream falls into two types: the first playback method in which the monoscopic graphics stream is used; and the second playback method for performing the stereoscopic playback by using a pair of the left-eye graphics stream and the right-eye graphics stream. One out of the two playback methods is selected depending on the combination of the data stored in the medium and the playback capability of the playback device that plays back the data. More specifically, the medium has an identification flag that indicates whether or not the graphics stream has the pair of the left-eye graphics stream and the right-eye graphics stream. Also, the playback device has, in the memory 802, information that indicates whether or not the playback device has a capability to perform a stereoscopic playback using the pair of the left-eye graphics stream and the right-eye graphics stream. The second playback method is selected when the identification flag indicates that the graphics stream has the pair of the left-eye graphics stream and the right-eye graphics stream, and the playback device has a capability to perform a stereoscopic playback using the pair of the left-eye graphics stream and the right-eye graphics stream. Otherwise, the first playback method is selected. When the second playback method is selected, the left-view video data is superimposed with the corresponding left-eye graphics data, and the right-view video data is superimposed with the corresponding right-eye graphics data. When the first playback method is selected, an offset in the positive (+) direction or negative (−) direction of the horizontal coordinates is given to the monoscopic graphics data, the left-view video data is superimposed with the corresponding monoscopic graphics data that has been given an offset in the positive (+) direction, and the right-view video data is superimposed with the corresponding monoscopic graphics data that has been given an offset in the negative (−) direction. Note that the information for the offset control is included in the sub-view stream.

The video output format converting unit 882 performs the following processes and the like as necessary: the resize process for enlarging or reducing the decoded video-base data; the IP conversion process for converting the scanning method from the progressive method to the interlace method and vice versa; the noise reduction process for removing the noise; and the frame rate conversion process for converting the frame rate.

The audio/video output interface unit 883 encodes, in accordance with the data transmission format, the video-base data, which has been subjected to the image superimposing and the format conversion, and the decoded audio-base data. Note that, as will be described later, the audio/video output interface unit 883 may be provided outside the integrated circuit 803.

Figure 97:
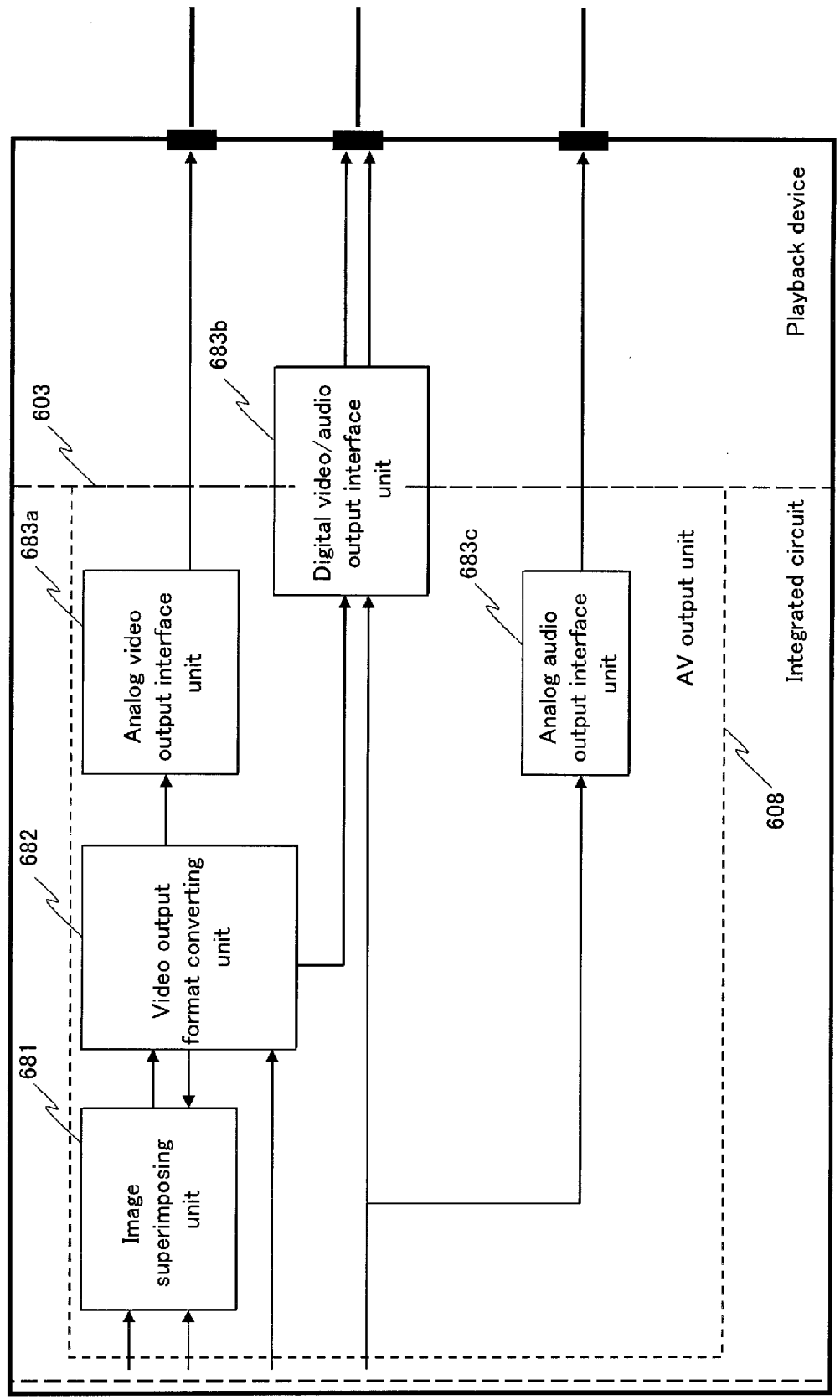
FIG. 97 is an example structure showing the AV output unit, or the data output part of the playback device in more detail.

FIG. 97 is an example structure showing the AV output unit 808, or the data output part of the playback device in more detail. The integrated circuit 803 of the present embodiment and the playback device support a plurality of data transmission formats for the video-base data and the audio-base data. The audio/video output interface unit 883 shown in FIG. 96 corresponds to an analog video output interface unit 883*a*, a digital video/audio output interface unit 883*b*, and an analog audio output interface unit 883*c*.

The analog video output interface unit 883*a* converts and encodes the video-base data, which has been subjected to the image superimposing process and the output format conversion process, into the analog video signal format, and outputs the conversion result. The analog video output interface unit 683*a* is, for example: a composit video encoder that supports any of the NTSC method, PAL method, and SECAM method; an encoder for the S image signal (Y/C separation); an encoder for the component image signal; or a DAC (D/A converter).

The digital video/audio output interface unit 883*b* overlays the decoded audio-base data with the video-base data having been subjected to the image superimposing and the output format conversion, encrypts the overlaid data, encodes in accordance with the data transmission standard, and outputs the encoded data. The digital video/audio output interface unit 683*b* is, for example, HDMI (High-Definition Multimedia Interface).

The analog audio output interface unit 8683*c*, being an audio DAC or the like, performs the D/A conversion onto the decoded audio-base data, and outputs analog audio data.

The transmission format of the video-base data and audio-base data may be switched depending on the data receiving device (data input terminal) supported by the display device/speaker, or may be switched in accordance with the selection by the user. Furthermore, it is possible to transmit a plurality of pieces of data corresponding to the same content in parallel by a plurality of transmission formats, not limited to the transmission by a single transmission format.

In the above description, the image superimposing unit 881, video output format converting unit 882, and audio/video output interface unit 883 are explained as a typical structure of the AV output unit 808. However, the AV output unit 808 may further include, for example, a graphics engine unit for performing the graphics processing such as the filter process, image overlaying, curvature drawing, and 3D display.

This completes the description of the structure of the playback device in the present embodiment. Note that all of the functional blocks included in the integrated circuit 803 may not be embedded, and that, conversely, the memory 802 shown in FIG. 93 may be embedded in the integrated circuit 803. Also, in the present embodiment, the main control unit 806 and the signal processing unit 807 have been described as different functional blocks. However, not limited to this, the main control unit 806 may perform a part of the process performed by the signal processing unit 807.

Figure 100:
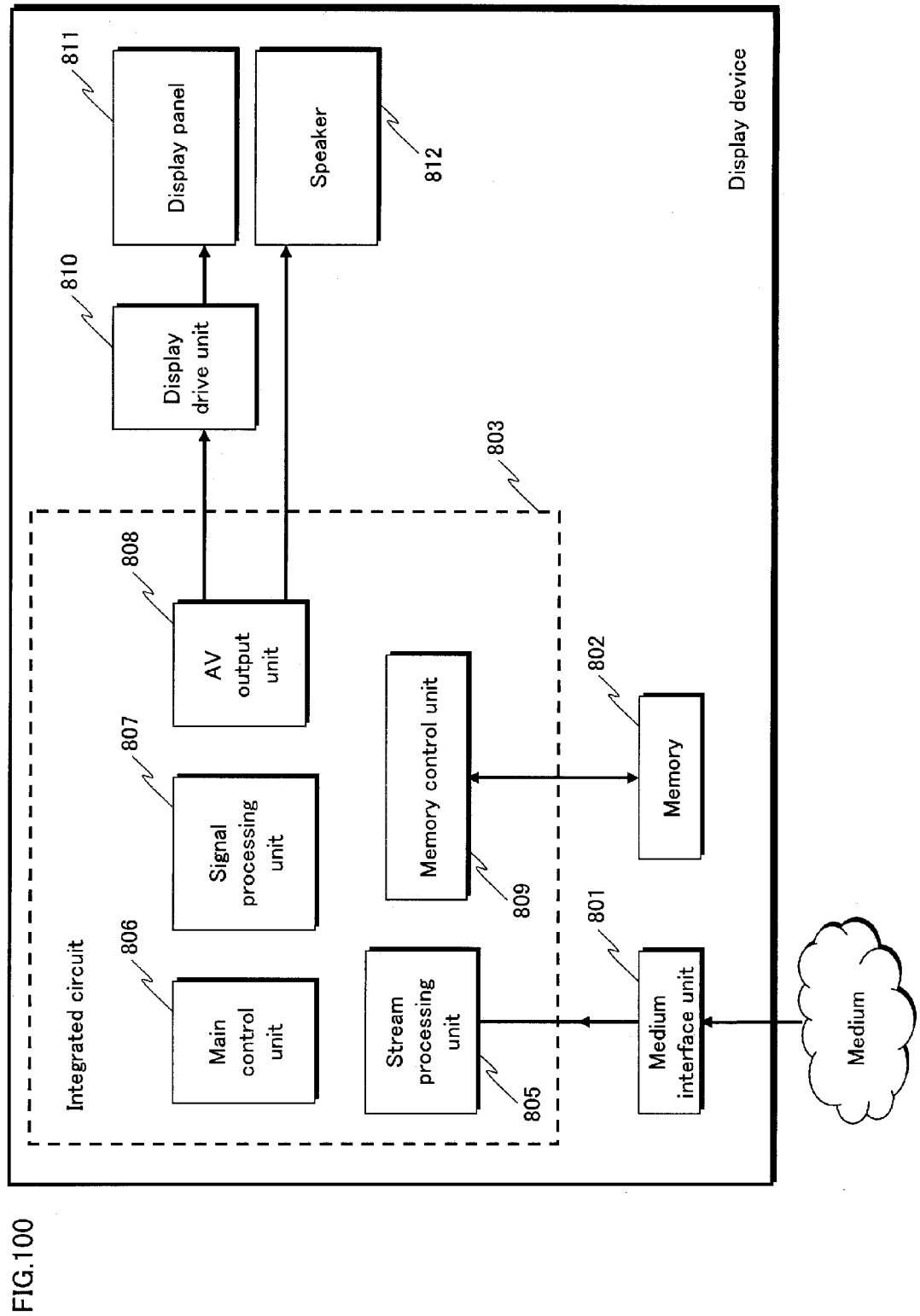
FIG. 100 shows an example structure of a display device which is realized by using an integrated circuit.
Figure 101:
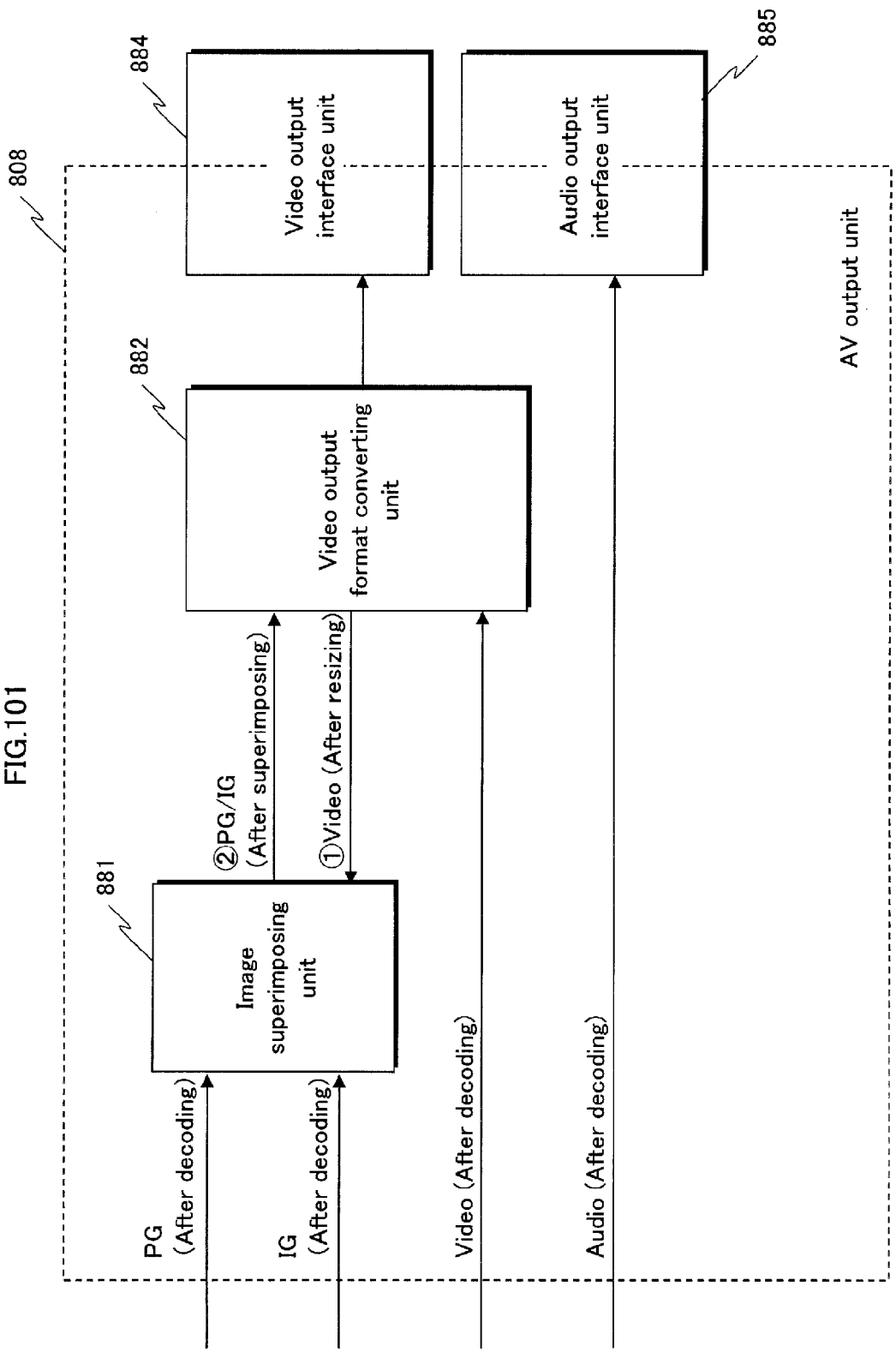
FIG. 101 is a functional block diagram showing a typical structure of the AV output unit in the display device.

Also, as shown in FIG. 100, the process performed by the playback device in the present embodiment may be performed by the display device. In that case, the data received by the medium interface unit 801 is subjected to the signal processing performed by the integrated circuit 803, and the video data after this processing is output via the display drive unit 810 onto the display panel 811 and the audio data after this processing is output onto the speaker 812. Here, the AV output unit 808 has, for example, a structure shown in FIG. 101, and the data is transferred via the video output interface unit 884 and the audio output interface unit 885 that are provided inside or outside the integrated circuit 803. Note that the device may be provided with a plurality of video output interface units 884 and a plurality of audio output interface units 885, or may be provided with an interface unit that is common to the video and the audio.

Figure 98:
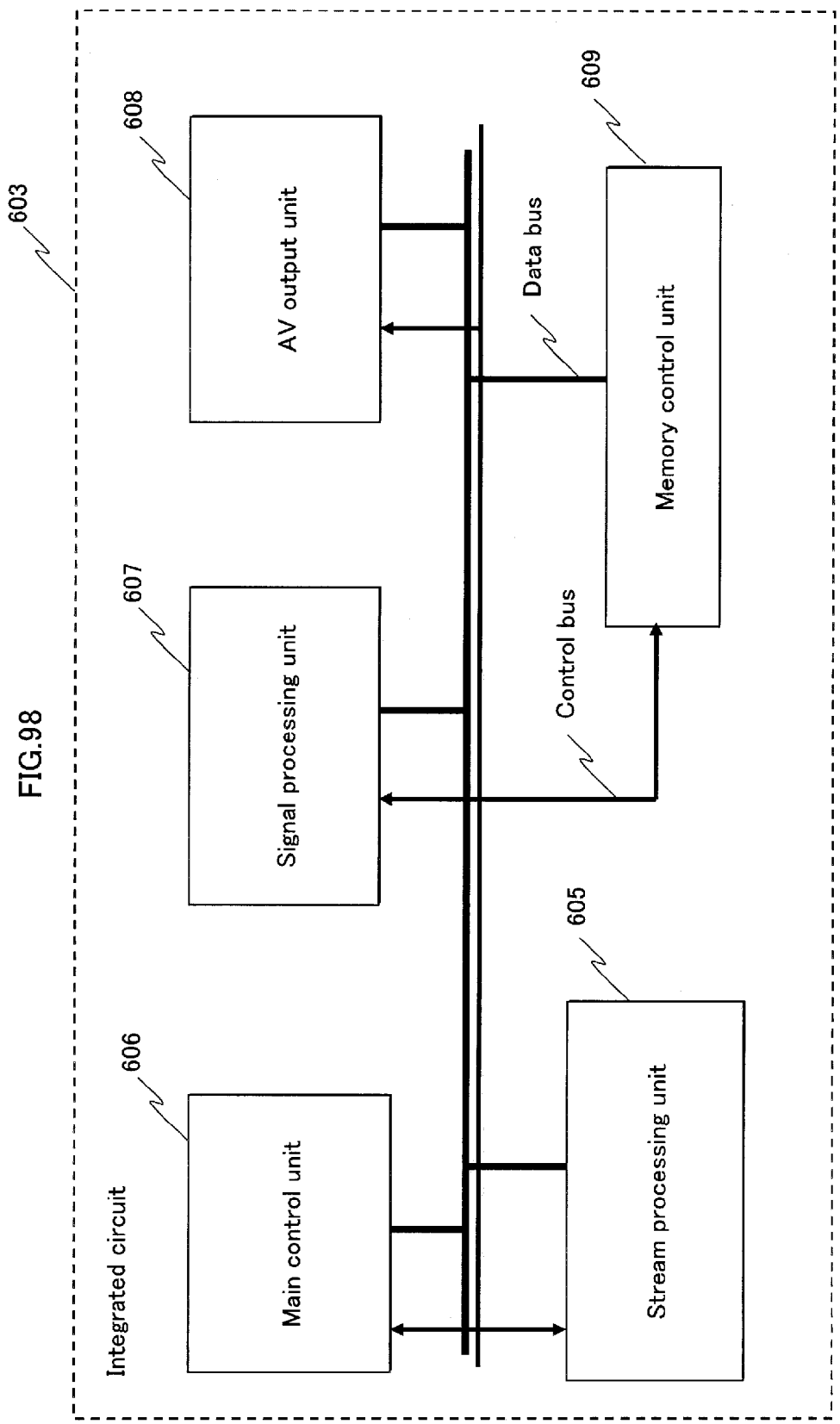
FIG. 98 shows arrangement of control buses and data buses in the integrated circuit.
Figure 99:
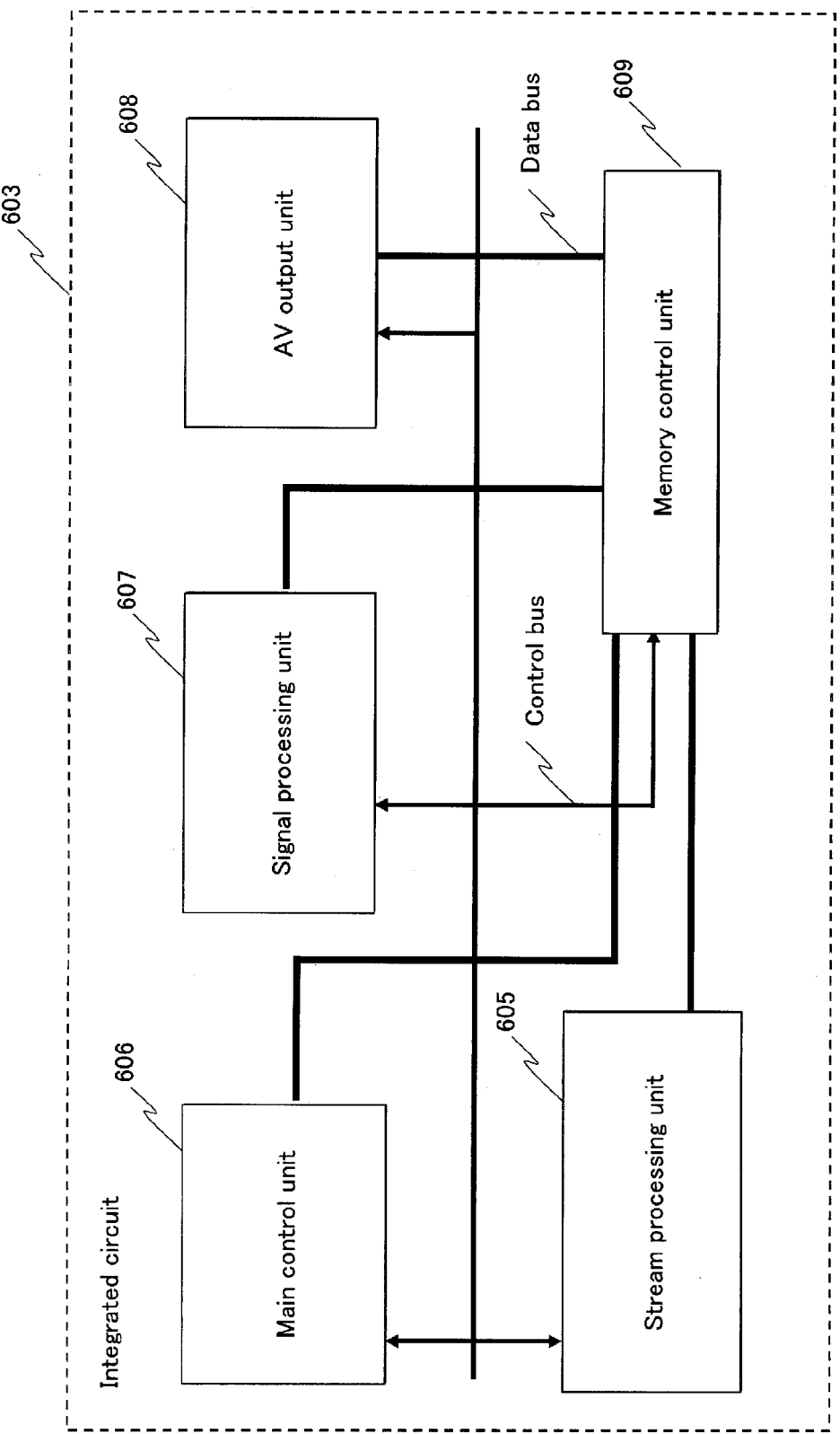
FIG. 99 shows arrangement of control buses and data buses in the integrated circuit.

The route of the control buses and the data buses in the integrated circuit 803 is designed in an arbitrary manner depending on the processing procedure of each processing block or the contents of the processing. However, the data buses may be arranged so that the processing blocks are connected directly as shown in FIG. 98, or maybe arranged so that the processing blocks are connected via the memory 802 (the memory control unit 809) as shown in FIG. 99.

The integrated circuit 803 may be a multi-chip module that is generated by enclosing a plurality of chips into one package, and its outer appearance is one LSI.

It is also possible to realize the system LSI by using the FPGA (Field Programmable Gate Array) that can be re-programmed after the manufacturing of the LSI, or the reconfigurable processor in which the connection and setting of the circuit cells inside the LSI can be reconfigured.

Next, the operation of the playback device having the above-described structure will be explained.

Figure 102:
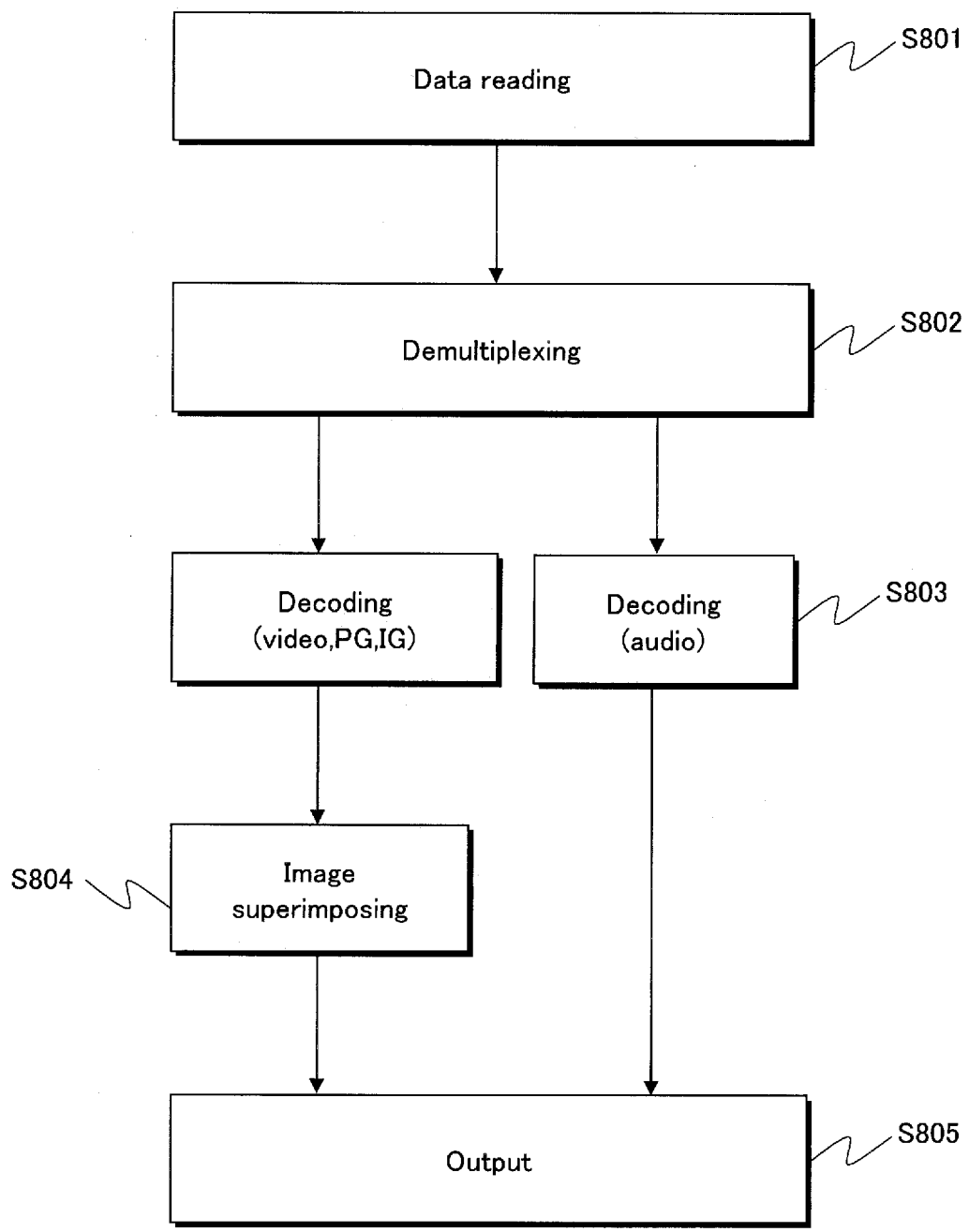
FIG. 102 is a flowchart showing an operation procedure in the playback device.

FIG. 102 is a flowchart showing a playback procedure in which data is received (read) from the medium, is decoded, and is output as a video signal and an audio signal.

S801: data is received (read) from the medium (the medium interface unit 801-> the stream processing unit 805).

S802: the data received (read) in S801 is separated into various data (the video-base data and the audio-base data) (the stream processing unit 805).

S803: the various data generated by the separation in S802 are decoded by the appropriate format (the signal processing unit 807).

S804: among the various data decoded in S803, the video-base data is subjected to the superimposing process (the AV output unit 808).

S805: the video-base data and the audio-base data having been subjected to the processes in S802 through S804 are output (the AV output unit 808).

Figure 103:
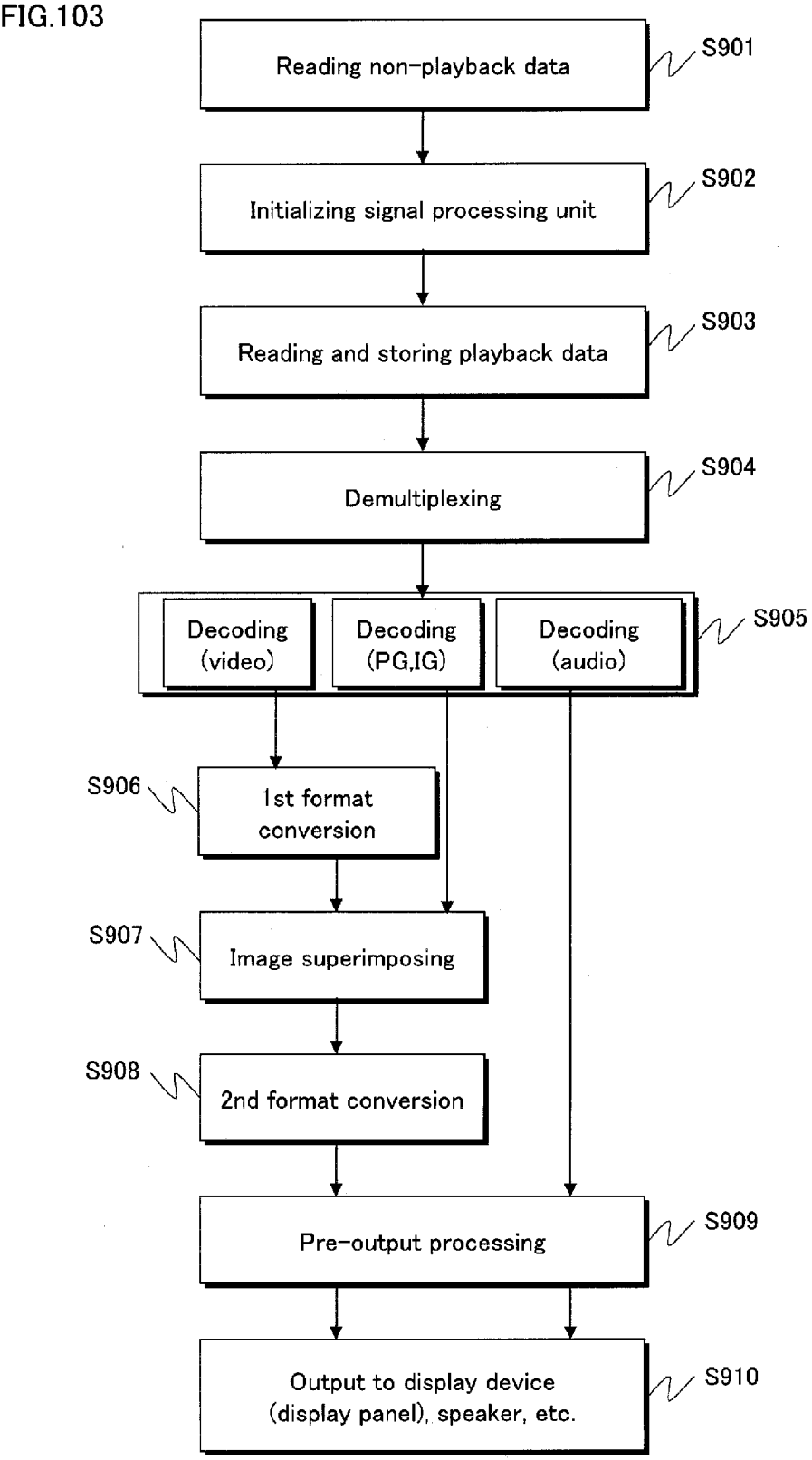
FIG. 103 is a flowchart showing a detailed operation procedure in the playback device.

FIG. 103 is a flowchart showing a detailed playback procedure. Each of the operations and processes is performed under the control of the main control unit 806.

S901: the device/stream interface unit 851 of the stream processing unit 805 receives (reads out) data (playlist, clip information, etc.) which is other than the data stored in the medium to be played back and is necessary for playback of the data, via the interface unit 801, and stores the received data into the memory 802 (the interface unit 801, the device/stream interface unit 851, the memory control unit 809, the memory 802).

S902: the main control unit 806 recognizes the compression method of the video and audio data stored in the medium by referring to the stream attribute included in the received clip information, and initializes the signal processing unit 807 so that the corresponding decode processing can be performed (the main control unit 806).

S903: the device/stream interface unit 851 of the stream processing unit 805 receives (reads out) the data of video/audio that is to be played back, from the medium via the interface unit 801, and stores the received data into the memory 802 via the stream processing unit 805 and the memory control unit 809. Note that the data is received (read) in units of Extents, and the main control unit 806 controls the switching unit 853 so that, when the left-eye data is received (read), the received data is stored in the first area; and when the right-eye data is received (read), the received data is stored in the second area, and the switching unit 853 switches the data output destination (storage destination) (the interface unit 801, the device/stream interface unit 851, the main control unit 806, the switching unit 853, the memory control unit 809, the memory 802).

S904: the data stored in the memory 802 is transferred to the demultiplexing unit 852 of the stream processing unit 805, and the demultiplexing unit 852 identifies the video-base data (main video, sub-video), PG (subtitle), IG (menu), and audio-base data (audio, sub-audio) based on the PIDs included in the source packets constituting the stream data, and transfers the data to each corresponding decoder in the signal processing unit 807 in units of TS packets (the demultiplexing unit 852).

S905: each decoder in the signal processing unit 807 performs the decode process onto the transferred TS packets by the appropriate method (the signal processing unit 807).

S906: among the video-base data decoded by the signal processing unit 807, the data corresponding to the left-view video stream and the right-view video stream is resized based on the display device (the video output format converting unit 882).

S907: the PG (subtitle) and IG (menu) are superimposed onto the video stream resized in S906 (the image superimposing unit 881).

S908: the IP conversion, which is a conversion of the scanning method, is performed onto the video data after the superimposing in S907 (the video output format converting unit 882).

S909: the encoding, D/A conversion and the like are performed onto video-base data and the audio-base data having been subjected to the above-described processes, based on the data output format of the display device/speaker or the data transmission format for transmission to the display device/speaker. The composit video signal, the S image signal, the component image signal and the like are supported for the analog output of the video-base data. Also, HDMI is supported for the digital output of the video-base data and the audio-base data. (the audio/video output interface unit 883)

S910: the video-base data and the audio-base data having been subjected to the process in S909 is output and transmitted to the display device/speaker (the audio/video output interface unit 883, the display device/speaker).

This completes the description of the operation procedure of the playback device in the present embodiment. Note that the result of process may be temporarily stored into the memory 802 each time a process is completed. Note that when the playback process is performed by the display device shown in FIG. 100, the operation procedure is basically the same, and functional blocks corresponding to the functional blocks of the playback device shown in FIG. 93 perform the processes similarly. Also, in the above operation procedure, the video output format converting unit 882 performs the resize process and the IP conversion process. However, not limited to this, the processes may be omitted as necessary, or other processes (noise reduction process, frame rate conversion process, etc.) may be performed. Furthermore, the processing procedures may be changed if possible.

(Supplementary Notes)

Up to now, the present invention has been described through the best embodiments that the Applicant recognize as of now. However, further improvements or changes can be added regarding the following technical topics. Whether to select any of the embodiments or the improvements and changes to implement the invention is optional and may be determined by the subjectivity of the implementer.

(Playback of Optical Disc)

The BD-ROM drive is equipped with an optical head that includes a semiconductor laser, collimated lens, beam splitter, objective lens, collecting lens, and light detector. The light beams emitted from the semiconductor laser pass through the collimated lens, beam splitter, and objective lens, and are collected on the information surface of the optical disc.

The collected light beams are reflected/diffracted on the optical disc, pass through the objective lens, beam splitter, and collimated lens, and are collected in the light detector. A playback signal is generated depending on the amount of light collected in the light detector.

(Variations of Recording Medium)

The recording medium described in each Embodiment indicates a general package medium as a whole, including the optical disc and the semiconductor memory card. In each Embodiment, it is presumed, as one example, that the recording medium is an optical disc in which necessary data is preliminarily recorded (for example, an existing read-only optical disc such as the BD-ROM or DVD-ROM). However, the present invention is not limited to this. For example, the present invention may be implemented as follows: (i) obtain a 3D content that includes the data necessary for implementing the present invention and is distributed by a broadcast or via a network; (ii) record the 3D content into a writable optical disc (for example, an existing writable optical disc such as the BD-RE, DVD-RAM) by using a terminal device having the function of writing into an optical disc (the function may be embedded in a playback device, or the device may not necessarily be a playback device); and (iii) apply the optical disc recorded with the 3D content to the playback device of the present invention.

Embodiments of Semiconductor Memory Card Recording Device and Playback Device

The following describes embodiments of the recording device for recording the data structure of each Embodiment into a semiconductor memory, and the playback device for playing back thereof.

First, the mechanism for protecting the copyright of the data recorded on the BD-ROM will be explained, as a presupposed technology.

Some of the data recorded on the BD-ROM may have been encrypted as necessitated in view of the confidentiality of the data.

For example, the BD-ROM may contain, as encrypted data, the data corresponding to a video stream, an audio stream, or a stream including these.

The following describes decryption of the encrypted data among the data recorded on the BD-ROM.

The semiconductor memory card playback device preliminarily stores data (for example, a device key) that corresponds to a key that is necessary for decrypting the encrypted data recorded on the BD-ROM.

On the other hand, the BD-ROM is preliminarily recorded with (i) data (for example, a medium key block (MKB) corresponding to the above-mentioned device key) that corresponds to a key that is necessary for decrypting the encrypted data, and (ii) encrypted data (for example, an encrypted title key corresponding to the above-mentioned device key and MKB) that is generated by encrypting the key itself that is necessary for decrypting the encrypted data. Note here that the device key, MKB, and encrypted title key are treated as a set, and are further associated with an identifier (for example, a volume ID) written in an area (called BCA) of the BD-ROM that cannot be copied in general. It is structured such that encrypted data cannot be decrypted if these elements are combined incorrectly. Only if the combination is correct, a key (for example, a title key that is obtained by decrypting the encrypted title key by using the above-mentioned device key, MKB, and volume ID) that is necessary for decrypting the encrypted data can be derived. The encrypted data can be decrypted by using the derived key.

When a playback device attempts to play back a BD-ROM loaded in the device, it cannot play back the encrypted data unless the device itself has a device key that makes a pair (or corresponds to) the encrypted title key and MKB recorded on the BD-ROM. This is because the key (title key) that is necessary for decrypting the encrypted data has been encrypted, and is recorded on the BD-ROM as the encrypted title key, and the key that is necessary for decrypting the encrypted data cannot be derived if the combination of the MKB and the device key is not correct.

Conversely, when the combination of the encrypted title key, MKB, device key, and volume ID is correct, the video stream and audio stream are decoded by the decoder with use of the above-mentioned key (for example, a title key that is obtained by decrypting the encrypted title key by using the device key, MKB, and volume ID) that is necessary for decrypting the encrypted data. The playback device is structured in this way.

This completes the description of the mechanism for protecting the copyright of the data recorded on the BD-ROM. It should be noted here that this mechanism is not limited to the BD-ROM, but may be applicable to, for example, a readable/writable semiconductor memory (such as a portable semiconductor memory such as the SD card) for the implementation.

Next, the playback procedure in the semiconductor memory card playback device will be described. In the case in which the playback device plays back an optical disc, it is structured to read data via an optical disc drive, for example. On the other hand, in the case in which the playback device plays back a semiconductor memory card, it is structured to read data via an interface for reading the data from the semiconductor memory card.

More specifically, the playback device may be structured such that, when a semiconductor memory card is inserted into a slot (not illustrated) provided in the playback device, the playback device and the semiconductor memory card are electrically connected with each other via the semiconductor memory card interface, and the playback device reads out data from the semiconductor memory card via the semiconductor memory card interface.

Embodiments of Receiving Device

The playback device explained in each Embodiment may be realized as a terminal device that receives data (distribution data) that corresponds to the data explained in each Embodiment from a distribution server for an electronic distribution service, and records the received data into a semiconductor memory card.

Such a terminal device may be realized by structuring the playback device explained in each Embodiment so as to perform such operations, or may be realized as a dedicated terminal device that is different from the playback device explained in each Embodiment and stores the distribution data into a semiconductor memory card. Here, a case where the playback device is used will be explained. Also, in this explanation, an SD card is used as the recording-destination semiconductor memory.

When the playback device is to record distribution data into an SD memory card inserted in a slot provided therein, the playback device first send requests a distribution server (not illustrated) that stores distribution data, to transmit the distribution data. In so doing, the playback device reads out identification information for uniquely identifying the inserted SD memory card (for example, identification information uniquely assigned to each SD memory card, more specifically, the serial number or the like of the SD memory card), from the SD memory card, and transmits the read identification information to the distribution server together with the distribution request.

The identification information for uniquely identifying the SD memory card corresponds to, for example, the volume ID having been described earlier.

On the other hand, the distribution server stores necessary data (for example, video stream, audio stream and the like) in an encrypted state such that the necessary data can be decrypted by using a predetermined key (for example, a title key).

The distribution server, for example, holds a private key so that it can dynamically generate different pieces of public key information respectively in correspondence with identification numbers uniquely assigned to each semiconductor memory card.

Also, the distribution server is structured to be able to encrypt the key (title key) itself that is necessary for decrypting the encrypted data (that is to say, the distribution server is structured to be able to generate an encrypted title key).

The generated public key information includes, for example, information corresponding to the above-described MKB, volume ID, and encrypted title key. With this structure, when, for example, a combination of the identification number of the semiconductor memory card, the public key contained in the public key information which will be explained later, and the device key that is preliminarily recorded in the playback device, is correct, a key (for example, a title key that is obtained by decrypting the encrypted title key by using the device key, the MKB, and the identification number of the semiconductor memory) necessary for decrypting the encrypted data is obtained, and the encrypted data is decrypted by using the obtained necessary key (title key).

Following this, the playback device records the received piece of public key information and distribution data into a recording area of the semiconductor memory card being inserted in the slot thereof.

Next, a description is given of an example of the method for decrypting and playing back the encrypted data among the data contained in the public key information and distribution data recorded in the recording area of the semiconductor memory card.

The received public key information stores, for example, a public key (for example, the above-described MKB and encrypted title key), signature information, identification number of the semiconductor memory card, and device list being information regarding devices to be invalidated.

The signature information includes, for example, a hash value of the public key information.

The device list is, for example, information for identifying the devices that might be played back in an unauthorized manner. The information, for example, is used to uniquely identify the devices, parts of the devices, and functions (programs) that might be played back in an unauthorized manner, and is composed of, for example, the device key and the identification number of the playback device that are preliminarily recorded in the playback device, and the identification number of the decoder provided in the playback device.

The following describes playing back the encrypted data among the distribution data recorded in the recording area of the semiconductor memory card.

First, it is checked whether or not the decryption key itself can be used, before the encrypted data is decrypted by using the decryption key.

More specifically, the following checks are conducted.

(1) A check on whether the identification information of the semiconductor memory card contained in the public key information matches the identification number of the semiconductor memory card preliminarily stored in the semiconductor memory card.

(2) A check on whether the hash value of the public key information calculated in the playback device matches the hash value included in the signature information.

(3) A check, based on the information included in the device list, on whether the playback device to perform the playback is authentic (for example, the device key shown in the device list included in the public key information matches the device key preliminarily stored in the playback device).

These checks may be performed in any order.

After the above described checks (1) through (3), the playback device performs a control not to decrypt the encrypted data when any of the following conditions is satisfied: (i) the identification information of the semiconductor memory card contained in the public key information does not match the identification number of the semiconductor memory card preliminarily stored in the semiconductor memory card; (ii) the hash value of the public key information calculated in the playback device does not match the hash value included in the signature information; and (iii) the playback device to perform the playback is not authentic.

On the other hand, when all of the conditions: (i) the identification information of the semiconductor memory card contained in the public key information matches the identification number of the semiconductor memory card preliminarily stored in the semiconductor memory card; (ii) the hash value of the public key information calculated in the playback device matches the hash value included in the signature information; and (iii) the playback device to perform the playback is authentic, are satisfied, it is judged that the combination of the identification number of the semiconductor memory, the public key contained in the public key information, and the device key that is preliminarily recorded in the playback device, is correct, and the encrypted data is decrypted by using the key necessary for the decryption (the title key that is obtained by decrypting the encrypted title key by using the device key, the MKB, and the identification number of the semiconductor memory).

When the encrypted data is, for example, a video stream and an audio stream, the video decoder decrypts (decodes) the video stream by using the above-described key necessary for the decryption (the title key that is obtained by decrypting the encrypted title key), and the audio decoder decrypts (decodes) the audio stream by using the above-described key necessary for the decryption.

With such a structure, when devices, parts of the devices, and functions (programs) that might be used in an unauthorized manner are known at the time of the electronic distribution, a device list showing such devices and the like may be distributed. This enables the playback device having received the list to inhibit the decryption with use of the public key information (public key itself) when the playback device includes anything shown in the list. Therefore, even if the combination of the identification number of the semiconductor memory, the public key itself contained in the public key information, and the device key that is preliminarily recorded in the playback device, is correct, a control is performed not to decrypt the encrypted data. This makes it possible to prevent the distribution data from being used by an unauthentic device.

It is preferable that the identifier of the semiconductor memory card that is preliminarily recorded in the semiconductor memory card is stored in a highly secure recording area. This is because, when the identification number (for example, the serial number of the SD memory card) that is preliminarily recorded in the semiconductor memory card is tampered with, unauthorized copying becomes easy. More specifically, unique, although different identification numbers are respectively assigned to semiconductor memory cards, if the identification numbers are tampered with to be the same, the above-described judgment in (1) does not make sense, and as many semiconductor memory cards as tamperings may be copied in an unauthorized manner.

For this reason, it is preferable that information such as the identification number of the semiconductor memory card is stored in a highly secure recording area.

To realize this, the semiconductor memory card, for example, may have a structure in which a recording area for recording highly confidential data such as the identifier of the semiconductor memory card (hereinafter, the recording area is referred to as a second recording area) is provided separately from a recording area for recording regular data (hereinafter, the recording area is referred to as a first recording area), a control circuit for controlling accesses to the second recording area is provided, and the second recording area is accessible only through the control circuit.

For example, data may encrypted so that encrypted data is recorded in the second recording area, and the control circuit may be embedded with a circuit for decrypting the encrypted data. In this structure, when an access is made to the second recording area, the control circuit decrypts the encrypted data and returns decrypted data. As another example, the control circuit may hold information indicating the location where the data is stored in the second recording area, and when an access is made to the second recording area, the control circuit identifies the corresponding storage location of the data, and returns data that is read from the identified storage location.

An application, which is running on the playback device and is to record data onto the semiconductor memory card with use of the electronic distribution, issues, to the control circuit via a memory card interface, an access request requesting to access the data (for example, the identification number of the semiconductor memory card) recorded in the second recording area. Upon receiving the request, the control circuit reads out the data from the second recording area and returns the data to the application running on the playback device. It sends the identification number of the semiconductor memory card and requests the distribution server to distribute the data such as the public key information, and corresponding distribution data. The public key information and corresponding distribution data that are sent from the distribution server are recorded into the first recording area.

Also, it is preferable that the application, which is running on the playback device and is to record data onto the semiconductor memory card with use of the electronic distribution, preliminarily checks whether or not the application is tampered with before it issues, to the control circuit via a memory card interface, an access request requesting to access the data (for example, the identification number of the semiconductor memory card) recorded in the second recording area. For checking this, an existing digital certificate conforming to the X.509 standard, for example, may be used.

Also, the distribution data recorded in the first recording area of the semiconductor memory card may not necessarily be accessed via the control circuit provided in the semiconductor memory card.

INDUSTRIAL APPLICABILITY

The information recording medium of the present invention stores a 3D image, but can be played back in both 2D-image playback devices and 3D-image playback devices. This makes it possible to distribute movie contents such as movie titles storing 3D images, without causing the consumers to be conscious about the compatibility. This activates the movie market and commercial device market. Accordingly, the recording medium and the playback device of the present invention have high usability in the movie industry and commercial device industry.

REFERENCE SIGNS LIST

100 recording medium
200 playback device
300 display device
400 3D glasses

The invention claimed is:
1. A playback device for playing back a non-transitory recording medium, the playback device comprising:
a capability register indicating whether or not a capability to perform a stereoscopic display is present in a display device connected with the playback device; and
a mode register storing an output mode of the playback device, wherein it is judged whether or not a plurality of conditions are satisfied, and a stereoscopic output mode is set in the mode register when it is judged that the plurality of conditions are satisfied,
a first condition among the plurality of conditions is that the capability register indicates that the capability to perform the stereoscopic display is present in the display device connected with the playback device,
a second condition among the plurality of conditions is that an initial value of an output mode recorded on the non-transitory recording medium indicates the stereoscopic output mode, and
it is judged whether or not the first condition and the second condition are satisfied when a disc is read, and the stereoscopic output mode is set in the mode register when it is judged that the first condition and the second condition are satisfied.
2. A playback device for playing back a non-transitory recording medium, the playback device comprising:
a capability register indicating whether or not a capability to perform a stereoscopic display is present in a display device connected with the playback device; and
a mode register storing an output mode of the playback device, wherein
it is judged whether or not a plurality of conditions are satisfied, and a stereoscopic output mode is set in the mode register when it is judged that the plurality of conditions are satisfied,
the non-transitory recording medium stores playlist information which indicates a playback path,
a first condition among the plurality of conditions is that the capability register indicates that the capability to perform the stereoscopic display is present in the display device connected with the playback device, a second condition among the plurality of conditions is that a piece of playlist information to be played back includes an extension stream selection table for stereoscopic playback, the extension stream selection table shows a list of elementary streams that can be selected by the playback device in the stereoscopic output mode, in correspondence with stream numbers, and it is judged whether or not the first condition and the second condition are satisfied when a playback of a playlist is started while the stereoscopic output mode is set in the mode register, and the stereoscopic output mode set in the mode register is maintained when it is judged that the first condition and the second condition are satisfied.

3. The playback device of claim 2, wherein when a monoscopic output mode is set in the mode register, the monoscopic output mode set in the mode register is maintained even if the plurality of conditions are satisfied.

4. The playback device of claim 2, wherein when a playlist is being played back, the output mode stored in the mode register is maintained.

5. A playback device for playing back a non-transitory recording medium, the playback device comprising:
a capability register indicating whether or not a capability to perform a stereoscopic display is present in a display device connected with the playback device; and
a mode register storing an output mode of the playback device, wherein it is judged whether or not a predetermined condition is satisfied, and a stereoscopic output mode is set in the mode register when it is judged that the predetermined condition is satisfied, display devices having the capability to perform a stereoscopic display include display devices which require viewers to wear stereoscopic glasses to view a stereoscopic playback, and display devices which do not require viewers to wear stereoscopic glasses to view a stereoscopic playback, the capability register includes a glasses necessity flag that indicates whether or not it is required for viewers to wear stereoscopic glasses to view a stereoscopic playback when the display device connected with the playback device has the capability to perform a stereoscopic display, and when the glasses necessity flag indicates that it is not required for viewers to wear stereoscopic glasses to view a stereoscopic playback, it is judged that the predetermined condition is satisfied and the stereoscopic output mode is set in the mode register.

* * * * *